(12) United States Patent
Nonaka et al.

(10) Patent No.: US 7,900,062 B2
(45) Date of Patent: Mar. 1, 2011

(54) UNAUTHORIZED CONTENTS DETECTION SYSTEM

(75) Inventors: Masao Nonaka, Osaka (JP); Yuichi Futa, Osaka (JP); Toshihisa Nakano, Osaka (JP); Kaoru Yokota, Hyogo (JP); Motoji Ohmori, Osaka (JP); Masaya Miyazaki, Osaka (JP); Masaya Yamamoto, Osaka (JP); Kaoru Murase, Nara (JP); Senichi Onoda, Osaka (JP)

(73) Assignee: Panasonic Corporation, Osaka (JP)

( * ) Notice: Subject to any disclaimer, the term of this patent is extended or adjusted under 35 U.S.C. 154(b) by 461 days.

(21) Appl. No.: 11/878,734

(22) Filed: Jul. 26, 2007

(65) Prior Publication Data
US 2008/0034442 A1   Feb. 7, 2008

Related U.S. Application Data

(62) Division of application No. 10/593,561, filed as application No. PCT/JP2005/006215 on Mar. 24, 2005, now Pat. No. 7,549,061.

(30) Foreign Application Priority Data

| Apr. 2, 2004 | (JP) | ................... 2004-110069 |
| May 17, 2004 | (JP) | ................... 2004-146963 |
| May 21, 2004 | (JP) | ................... 2004-151621 |
| Jun. 1, 2004 | (JP) | ................... 2004-163734 |
| Jul. 2, 2004 | (JP) | ................... 2004-196531 |
| Jul. 7, 2004 | (JP) | ................... 2004-201009 |
| Jul. 13, 2004 | (JP) | ................... 2004-206335 |

(51) Int. Cl.
| H04L 9/00 | (2006.01) |
| H04L 9/32 | (2006.01) |
| H04K 1/00 | (2006.01) |
| G06F 11/30 | (2006.01) |
| G06F 12/14 | (2006.01) |
| G06F 17/00 | (2006.01) |

(52) U.S. Cl. ................ 713/193; 713/179; 713/180; 713/181; 380/251; 380/259

(58) Field of Classification Search ................ 713/187; 726/27
See application file for complete search history.

(56) References Cited

U.S. PATENT DOCUMENTS
4,933,969 A  *  6/1990   Marshall et al. ............. 713/177
(Continued)

FOREIGN PATENT DOCUMENTS
EP            0 781 003         6/1997
(Continued)

OTHER PUBLICATIONS

European Search Report issued Dec. 18, 2007 in European Patent Application No. 07 11 2868.
(Continued)

*Primary Examiner*—Shin-Hon Chen
(74) *Attorney, Agent, or Firm*—Wenderoth, Lind & Ponack, L.L.P.

(57) ABSTRACT

Processing load on an executing device for conducting playback is high during the playback of contents since the executing device performs verification of the contents validity in parallel with the contents playback, and therefore the executing device has to be equipped with a highly efficient processor. The present invention reduces the processing load involved in the verification by using, for the verification, only a predetermined number of encrypted units selected randomly from multiple encrypted units constituting encrypted contents recorded on the DVD. In addition, the present invention is capable of improving the accuracy of detecting unauthorized contents to some extent by randomly selecting a predetermined number of encrypted units every time the verification is performed.

9 Claims, 71 Drawing Sheets

U.S. PATENT DOCUMENTS

| | | | |
|---|---|---|---|
| 6,056,197 | A | 5/2000 | Hara et al. |
| 6,470,329 | B1 * | 10/2002 | Livschitz ................. 707/1 |
| 6,480,961 | B2 | 11/2002 | Rajasekharan et al. |
| 6,574,676 | B1 | 6/2003 | Megiddo |
| 6,629,198 | B2 * | 9/2003 | Howard et al. .......... 711/112 |
| 6,931,537 | B1 | 8/2005 | Takura et al. |
| 2001/0023484 | A1 | 9/2001 | Ichimura |
| 2002/0004906 | A1 | 1/2002 | Rajasekharan et al. |
| 2003/0014658 | A1 | 1/2003 | Walker et al. |
| 2003/0023856 | A1 * | 1/2003 | Horne et al. ............ 713/187 |
| 2003/0231568 | A1 | 12/2003 | Ohhashi |
| 2003/0233514 | A1 | 12/2003 | Honig |
| 2004/0193876 | A1 * | 9/2004 | Donley et al. ........... 713/162 |
| 2005/0086241 | A1 * | 4/2005 | Ram et al. ............... 707/100 |
| 2005/0086567 | A1 * | 4/2005 | Cronch .................... 714/746 |

FOREIGN PATENT DOCUMENTS

| | | |
|---|---|---|
| EP | 0 913 757 | 5/1999 |
| EP | 1 056 010 | 11/2000 |
| JP | 63-225840 | 9/1988 |
| JP | 3-151738 | 6/1991 |
| JP | 6-68605 | 3/1994 |
| JP | 10-293721 | 11/1998 |
| JP | 2001-142398 | 5/2001 |
| JP | 2001-265217 | 9/2001 |
| JP | 2001-519930 | 10/2001 |
| JP | 2001-331102 | 11/2001 |
| JP | 2003-318887 | 11/2003 |
| JP | 2005-94146 | 4/2005 |
| JP | 2006-33729 | 2/2006 |
| WO | 99/40702 | 8/1999 |
| WO | 01/82267 | 11/2001 |

OTHER PUBLICATIONS

Jens Palsberg et al., "Experience with Software Watermarking", Computer Security Applications, ACSAC, 16th Annual Conference, IEEE Comput. Soc., pp. 308-316, XP010529828, ISBN: 0-7695-0859-6, Dec. 11, 2000.

European Search Report issued Jan. 10, 2008 in the corresponding European application.

Horne et al., "Dynamic Self-Checking Techniques for Improved Tamper Resistance", Lecture Notes in Computer Science, vol. 2320, pp. 141-159, 2002.

European Office Action issued Nov. 25, 2009 in European Patent Application No. 07112868.0.

European Office Action issued Mar. 25, 2010 in connection with the corresponding European Patent Application No. 05 727 373.2.

U.S. Office Action issued in U.S. Appl. No. 10/593,561 dated Sep. 29, 2008.

* cited by examiner

FIG.5

KEY BLOCK 1150

| DEVICE IDENTIFIER | ENCRYPTED CONTENTS KEY |
|---|---|
| AID_1 | Enc(DK_1, CK) |
| AID_2 | Enc(DK_2, CK) |
| AID_3 | Enc(DK_3, CK) |
| ⋮ | ⋮ |
| AID_n | Enc(DK_n, CK) |

1141 — (left column)  1142 — (right column)

ENCRYPTED CONTENTS

ENCRYPTED PARTIAL CONTENTS
「ECNT1」

ENCRYPTED PARTIAL CONTENTS
「ECNT2」

ENCRYPTED PARTIAL CONTENTS
「ECNT3」

•
•
•

ENCRYPTED PARTIAL CONTENTS
「ECNTc」

US 7,900,062 B2

UNAUTHORIZED CONTENTS DETECTION SYSTEM

This application is a divisional of U.S. application Ser. No. 10/593,561, filed Sep. 20, 2006 now U.S. Pat. No. 7,549,061, which is a national stage application of International application No. PCT/JP2005/006215, filed Mar. 24, 2005.

BACKGROUND OF THE INVENTION

1. Technical Field

The present invention relates to a technology for verifying validity of contents, especially to a technology for reducing processing load involved in such a verification.

2. Background Art

Means to prevent fraudulent acts involving illegal copying, falsification, and replacement of contents include applying signature information indicating that the contents have been issued by a legitimate right holder as well as distributing, together with the contents, verification information for verifying whether the contents include unauthorized contents in which falsification and the like have been made.

Patent Reference 1, being one example of such means, discloses a technology for verifying validity of contents by distributing signature information, verification information, and contents via network. According to the technology, authentication information including signature information of a transmission source and verification information for checking consistency of individual partial contents constituting the contents is transmitted to an executing device in advance of transmission of the contents. When receiving the authentication information, the executing device verifies the signature information included therein. If the verification of the signature information is successful, the executing device receives and plays the contents. In parallel with the playback, the executing device repeats the verification of consistency of the individual partial contents by using the verification information, and stops the playback when the verification fails.

Even if the executing device has received contents including unauthorized contents, the technology enables the executing device not to start playback of the contents or to stop the playback in the middle.

[Patent Reference 1] U.S. Pat. No. 6,480,961;
[Patent Reference 2] Japanese Laid-Open Patent Application Publication No. 2002-281013;
[Nonpatent Reference 1] http://positron.jfet.org/dvd-video.html (Accessed 17 May 2004);
[Nonpatent Reference 2] http://www.pioneer.co.jp/crdl/tech/mpeg/1.html (Accessed 17 May 2004);
[Nonpatent Reference 3] *"The Art of Computer Programming Vol. 2 Seminumerical Algorithms"* written by Donald E. Knuth, ISBN: 0-201-03822-6; and
[Nonpatent Reference 4] *"Joho Security* (Information Security)" written and edited by Atsuko Miyaji and Hiroaki Kikuchi, and compiled by Information Processing Society of Japan.

According to the conventional technology described above, however, the executing device has to continue verifying the verification information in parallel with the playback, and therefore there is, a problem that processing load of the executing device becomes high during the contents playback.

Furthermore, from a safety standpoint, it is also often the case that encoded contents are distributed, instead of contents. In such a case, the executing device has to also conduct decryption processing in parallel, and thus the processing load increases even more.

Accordingly, the executing device has to be equipped with a highly efficient processor operable to conduct these processes in parallel.

The present invention solves these problems, and aims at offering a data processing device, a data processing method, a data processing program, and a recording medium that achieve hindrance-free contents playback, even if the equipped processor is poorly efficient, by reducing processing load of the executing device during the contents playback.

SUMMARY OF THE INVENTION

In order to accomplish the objectives above, the data processing device of the present invention utilizes a digital work recorded on a recording medium having also recorded (i) a plurality of record digest values generated from a plurality of data blocks constituting the digital work and (ii) record signature data generated based on some or all of the plurality of record digest values thereon. The data processing device comprises: a using unit operable to use the digital work;
a selecting unit operable to randomly select a predetermined number of data blocks from the plurality of data blocks; a calculating unit operable to calculate a calculation digest value with respect to each of the selected data blocks; a reading unit operable to read remaining record digest values, each of which corresponds to one of the unselected data blocks, from among the plurality of record digest values; a signature verifying unit operable to verify whether the digital work is valid by using the record signature data, the calculation digest values, and the remaining record digest values; and a use controlling unit operable to stop the using unit from using the digital work when the signature verifying unit judges that the digital work is not valid.

ADVANTAGEOUS EFFECTS OF THE INVENTION

According to the above structure, the selecting unit of the data processing device of the present invention selects a predetermined number of data blocks from the plurality of data blocks. The calculating unit calculates calculation digest values from the selected data blocks, while the signature verifying unit verifies the validity of the digital work by using the calculated calculation digest values, the record signature data read from the recording medium, and the remaining record signature data. Herewith, it is possible to reduce a series of processing load involved in the verification of the record signature data by limiting calculation digest values to be newly calculated to a predetermined number.

In addition, the selection performed by the selecting unit is random. Accordingly, different data blocks will be verification targets every time when the verification is performed, and therefore it is possible to complement, to some extent, degradation in accuracy of the verification due to limiting the number of data blocks used for the verification to a predetermined number. Furthermore, it is difficult for a third person to predict which data blocks are to be selected, which makes it possible to prevent fraudulent acts involving falsifying or replacing only part of the digital work not to be used for the verification with unauthorized information.

In the data processing device of the present invention, the plurality of record digest values may include a plurality of primary record digest values, each of which is generated for one of the plurality of data blocks, and a plurality of secondary record digest values generated from two or more of the plurality of primary record digest values, and the record signature data may be generated by performing a digital signature on the plurality of secondary record digest values. The reading unit may read the remaining record digest values from among the plurality of primary record digest values. The signature verifying unit may verify validity of the digital work by calculating one or more secondary calculation digest values based one the calculation digest values and the remaining record digest values, and performing a digital signature verification with use of the record signature data, the plurality of secondary record digest values, and the secondary calculation digest values.

According to the above structure, the record digest values include 1st record digest values and 2nd record digest values. The signature verifying unit calculates one or more 2nd calculation digest values based on the calculation digest values and the remaining record digest values. Accordingly, the reading unit reads only 1st record digest values required for calculation of the 2nd calculation digest values and 2nd digest values not corresponding to the selected data blocks. Thus, it is possible to reduce the total number of record digest values read from the recording medium.

In the data processing device of the present invention, the digital work may include a plurality of files, each of which corresponds to one of the plurality of secondary record digest values and is constituted by two or more of the plurality of data blocks. Each of the plurality of secondary record digest values may be generated by using primary record digest values corresponding one-to-one with the two or more of the plurality of data blocks constituting a file corresponding to the secondary record digest value. The signature verifying unit may include: a primary reading subunit operable to read the record signature data from the recording medium; a calculating subunit operable to calculate a secondary calculation digest value, with respect to each file including at least one of the selected data blocks, by using primary record digest values corresponding to the unselected data blocks included in the file and the calculation digest values corresponding to the selected data blocks; a secondary reading subunit operable to read, with respect to each file including none of the selected data blocks, a secondary record digest value corresponding to the file; a signature subunit operable to generate calculation signature data by performing the digital signature with use of the calculated secondary calculation digest values and the read secondary record digest values; and a comparing subunit operable to compare the calculation signature data and the record signature data. The signature verifying unit may verify that the digital work is valid when the calculation signature data and the record signature data conform to each other, and judges that the digital work is not valid when the calculation signature data and the record signature data do not conform to each other.

According to the above structure, the reading unit reads, with respect to each file including at least one of the selected data blocks, 1st record digest values corresponding to the unselected data blocks included in the file. On the other hand, the 2nd reading subunit in the signature verifying unit reads, with respect to each file including none of the selected data blocks, a 2nd record digest value corresponding to the file from the recording medium. Accordingly, it is possible to reduce the total number of the record digest values read from the recording medium. Furthermore, it is possible to readily perform the verification of validity of the digital work by generating calculation signature data based on the 2nd record digest values and 2nd calculation digest values and comparing the generated calculation signature data and the record signature data.

In the data processing device of the present invention, the plurality of record digest values may be hash values each generated by a hash function. The calculation digest values calculated by the calculating unit may be hash values calculated by applying the hash function to each of the selected data blocks. The secondary calculation digest values calculated by the calculating subunit may be hash values calculated by applying the hash function to the primary record digest values corresponding to the unselected data blocks and the calculation digest values.

According to the above structure, the record digest values are generated by the hash function. The calculating unit and the calculating subunit calculate the calculation digest values and the 2nd calculation digest values by using the hash function.

Since the hash function is a one-way function, if the data blocks used for calculating the 1st record digest values corresponding to the selected data blocks are even partly different from the selected data blocks, the 1st record digest values and the 1st calculation digest values do not conform with each other. Accordingly, when the selected data blocks have been falsified, the calculation digest values and the 2nd calculation digest values do not agree with corresponding 1st digest values and 2nd digest values recorded on the recording medium. Thereby, it is possible to accurately detect the falsification of the selected data blocks.

In the data processing device of the present invention, the digital work may be digital contents, and the using unit uses the digital contents by playing back the digital contents.

According to the above structure, the use controlling unit stops the playback of digital contents which have been falsified. Herewith, it is possible to reduce circulation of the falsified contents.

In the data processing device of the present invention, the digital work may be a computer program, and the using unit may use the computer program by decrypting instruction codes constituting the computer program and operating according to the decrypted codes.

According to the above structure, the use controlling unit stops the execution of computer program which has been falsified. Herewith, it is possible to prevent negative influences caused by the execution of unauthorized programs, such as destruction of user's data and application of data that should not be used.

The data processing device of the present invention may comprise, instead of the use controlling unit, a warning display unit operable to display, when the digital work is judged as not being valid, a notice of invalidity of the digital work.

According to the above structure, when the digital work is verified as not being valid, the warning display unit displays accordingly, and therefore, the data processing device is capable of informing the user that the digital work recorded on the recording medium is unauthorized. Thereby, the user becomes aware that the digital work recorded on the recording medium is unauthorized, and employs protection measures such as not loading the recording medium on the data processing device from that point. Thus, it possible to avoid possible negative influences caused by using the digital work.

In the data processing device of the present invention, the recording medium has additionally recorded (i) filling contents having an adjusted data size so that capacity of free space on the recording medium becomes a predetermined value or lower and (ii) signature data generated based on part or all of the digital work and the filling contents. The data processing device may further comprise: a verifying unit operable to verify whether the digital work and the filling contents are valid by using the digital work, the filling contents, and the signature data. The use controlling unit operable to stop the using unit from using the digital work when the verifying unit judges that at least one of the digital work and the filling contents is not valid.

According to the above structure, the filling contents are recorded on the recording medium. If the capacity of the free space is a predetermined value, which is sufficiently small, or even smaller than the predetermined value, an unauthorized third person cannot add unauthorized information to the recording medium. Furthermore, the data processing device verifies not only the validity of the digital work but also that of the filling contents. Therefore, even if part or all of the filling contents is falsified, the data processing device stops the use of the digital work. Accordingly, even if unauthorized information is distributed in such a manner, it is possible to prevent use of the unauthorized information.

In the data processing device of the present invention, the recording medium has additionally recorded (i) area information indicating an access permitted area, on the recording medium, that an external device is permitted to access and (ii) signature data generated based on part or all of the digital work and the area information. The data processing device may further comprise: an access prohibiting unit operable to prohibit access to areas other than the access permitted area based on the area information; and a verifying unit operable to verify whether the digital work and the area information are valid by using the digital work, the area information, and the signature data. The use controlling unit operable to stop the using unit from using the digital work when the verifying unit judges that at least one of the digital work and the area information is not valid.

In general, it is sometime the case that a procedure file showing a procedure for using the digital work is included, in addition to digital work, in a recording medium. According to the above structure, the data processing device does not access areas other than the access permitted area indicated by the area information.

Accordingly, even if an unauthorized third person has added unauthorized information to free space on the recording medium, and further has falsified the procedure file so as to have the unauthorized information used, the data processing device does not read the unauthorized information.

In addition, since the signature data is generated based on the digital work and the area information, the use controlling unit is capable of stopping the use of the digital work by the using unit even if an unauthorized person has falsified the area information. Thus, it is possible to prevent the use of the unauthorized information.

Here, the data processing device in the claims is an executing device in the following embodiments. The data blocks in the claims correspond to encrypted units in the first, fifth, and sixth embodiments, as well as correspond to partial contents in the second to fourth embodiments.

BRIEF DESCRIPTION OF THE DRAWINGS

FIG. 5 shows the details of a key block 1150 generated by a key block generating unit 1103;

FIG. 32 shows a structure of encrypted contents generated by an encryption processing unit 2109;

DETAILED DESCRIPTION OF THE INVENTION

1. First Embodiment

The following describes an unauthorized contents detection system 1 as one example of embodiments of the present invention, with the aid of drawings.

1.1 Unauthorized Contents Detection System 1

Figure 1:
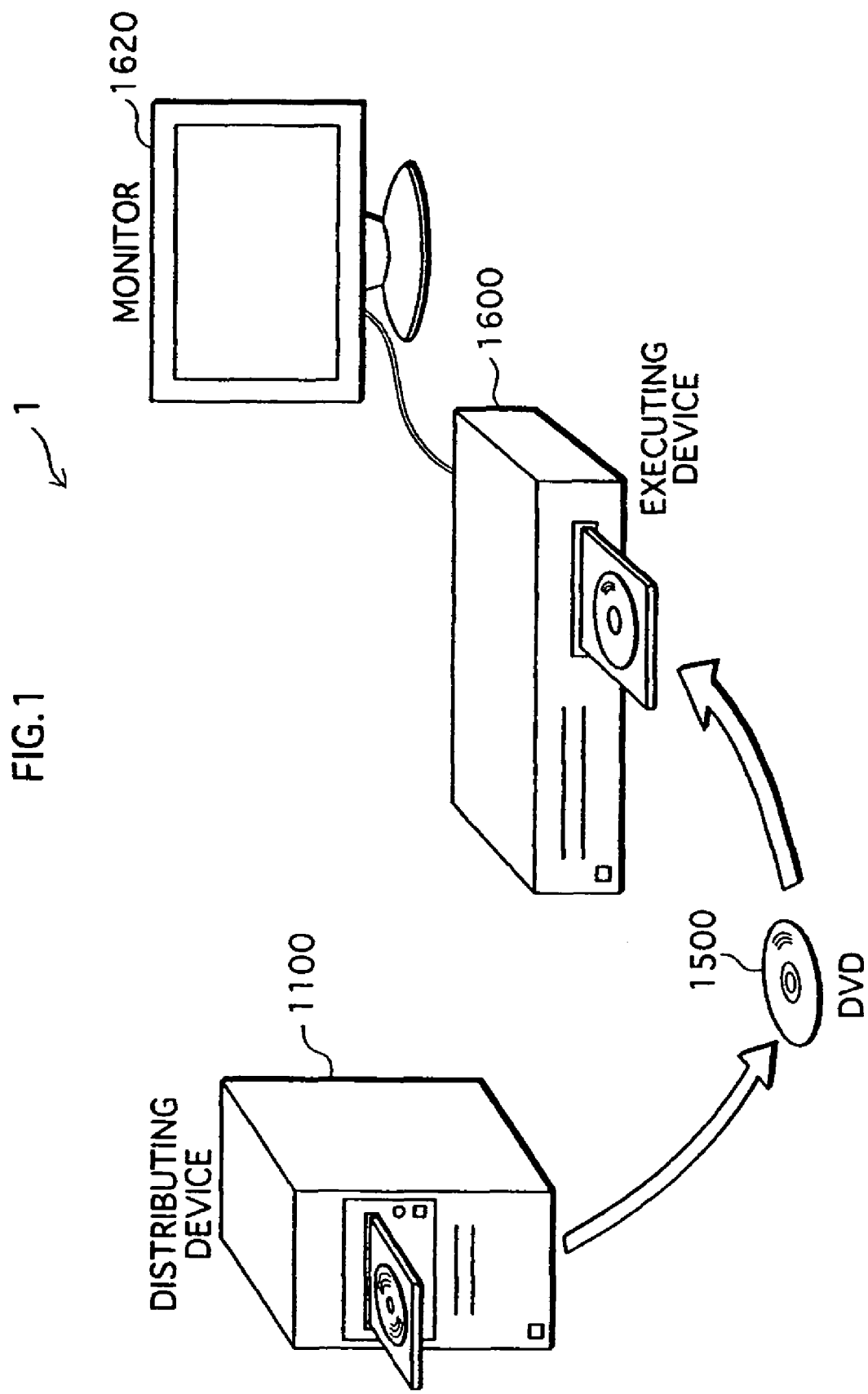
FIG. 1 is a structural diagram showing a structure of an unauthorized contents detection system of a first embodiment.

As shown in FIG. 1, the unauthorized contents detection system 1 comprises a distributing device 1100, an executing device 1600, and a monitor 1620.

The distributing device 1100 is, as an example, a device owned by a legitimate copyright holder of contents including video and audio. According to operations conducted by an operator, the distributing device 1100 acquires contents, and generates encrypted contents by encrypting the acquired contents. In addition, the distributing device 1100 generates various kinds of information by using the contents. The information generated by the distributing device 1100 includes, for example, header information used in the executing device 1600 for verifying whether unauthorized contents are included in the contents. Furthermore, the distributing device 1100 generates signature information by using a signature key specific to itself, and writes the generated encrypted contents, signature information, header information, and the like on a DVD (Digital Versatile Disk) 1500.

The DVD 1500 will be sold or distributed to users through distribution outlets.

When loaded with the DVD 1500, the executing device 1600 reads the signature information, header information, and the like from the loaded DVD 1500, and conducts verification of the read signature information as well as verification of whether unauthorized contents are included, based on the information read from the DVD 1500.

Only when the verification of the signature information is successful, the executing device 1600 starts playback of the contents.

Individual devices composing the unauthorized contents detection system 1 and the DVD 1500 are described in detail below.

1.2 Distributing Device 1100

Figure 2:
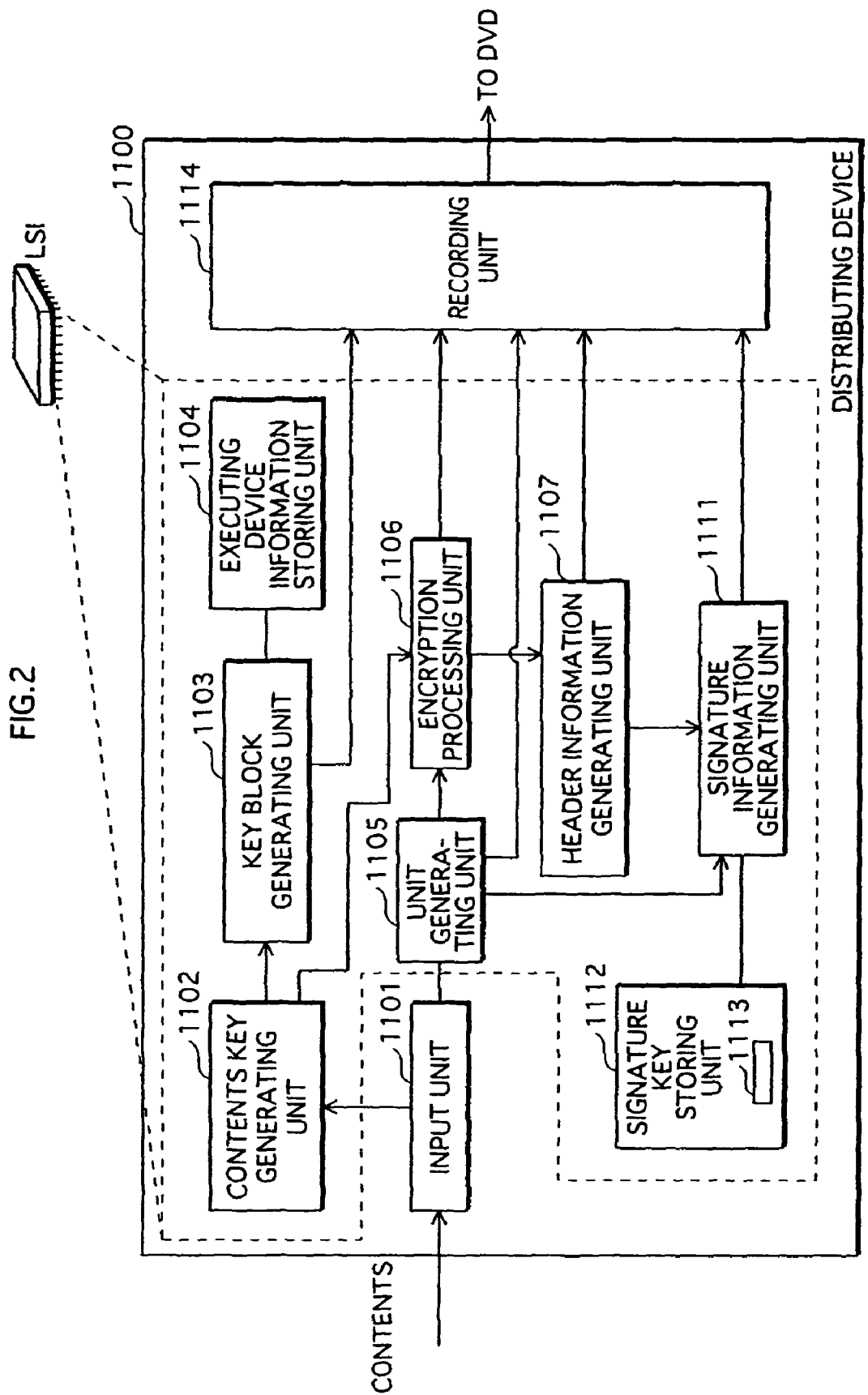
FIG. 2 is a block diagram showing a structure of a distribution device 1100 of the first embodiment.

As shown in FIG. 2, the distributing device 1100 comprises an input unit 1101, a contents key generating unit 1102, a key block generating unit 1103, an executing device information storing unit 1104, a unit generating unit 1105, an encryption processing unit 1106, a header information generating unit 1107, a signature information generating unit 1111, a signature key storing unit 1112, and a recording unit 1114.

1.2.1 Input Unit 1101

The input unit 1101 receives contents from an external device or external recording medium according to operations of the operator. Here is described a structure of the contents received by the input unit 1101 with the aid of FIG. 3.

Figure 3:
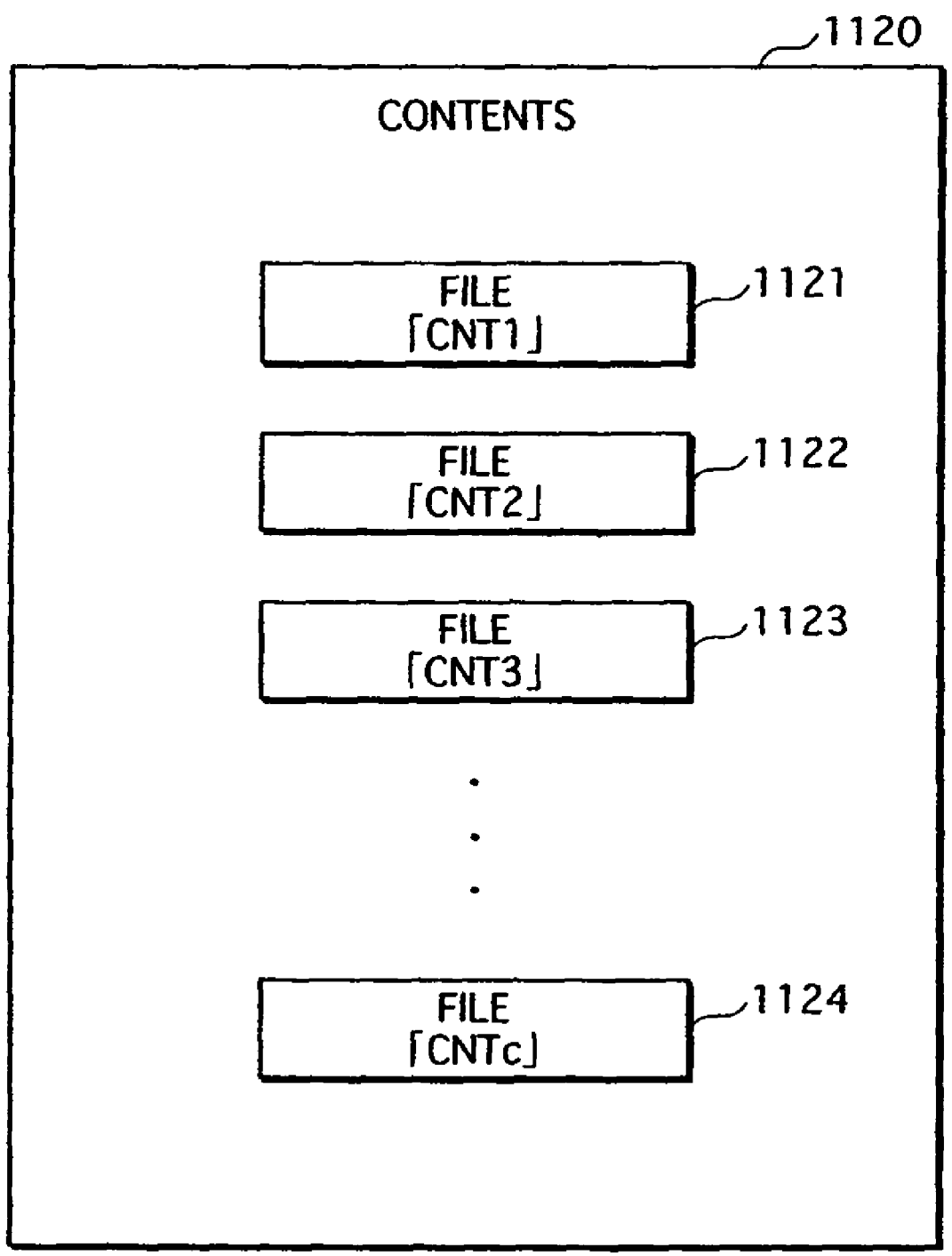
FIG. 3 shows a structure of contents 1120 to be input to the distribution device 1100.

As shown in FIG. 3, contents 1120 received by the input unit 1101 are composed of c pieces (c is an integer of 1 or greater) of files "CNT1" 1121, "CNT2" 1122, "CNT3" 1123, . . . , and "CNTc" 1124. Here, the contents 1120 acquired by the input unit 1101 are a playable format for the executing device 1600 (as will hereinafter be described in detail), and the DVD-Video format and the MPEG-2 (Moving Picture Experts Group 2) format are examples of such playable formats. The present embodiment is described assuming that the contents 1120 are the DVD-Video format and each of the files is a VOB (Video Object) file.

When acquiring the contents 1120, the input unit 1101 instructs the contents key generating unit 1102 to generate a contents key, and outputs the acquired contents 1120 to the unit generating unit 1105.

1.2.2 Contents Key Generating Unit 1102

The contents key generating unit 1102 is instructed by the input unit 1101 to generate the contents key. In response to the instruction, the contents key generating unit 1102 generates a pseudorandom number, and then generates a 128-bit length contents key "CK" with the use of the generated pseudorandom number. Instead of a pseudorandom number, a true random number may be generated by using, for example, noise on a signal. Nonpatent Reference 3 supplies details about a method for generating random numbers. In addition, a different method may be used for generating the contents key.

Subsequently, the contents key generating unit 1102 outputs the generated contents key "CK" to the key block generating unit 1103 and encryption processing unit 1106.

1.2.3 Key Block Generating Unit 1103 and Executing Device Information Storing Unit 1104

Figure 4:
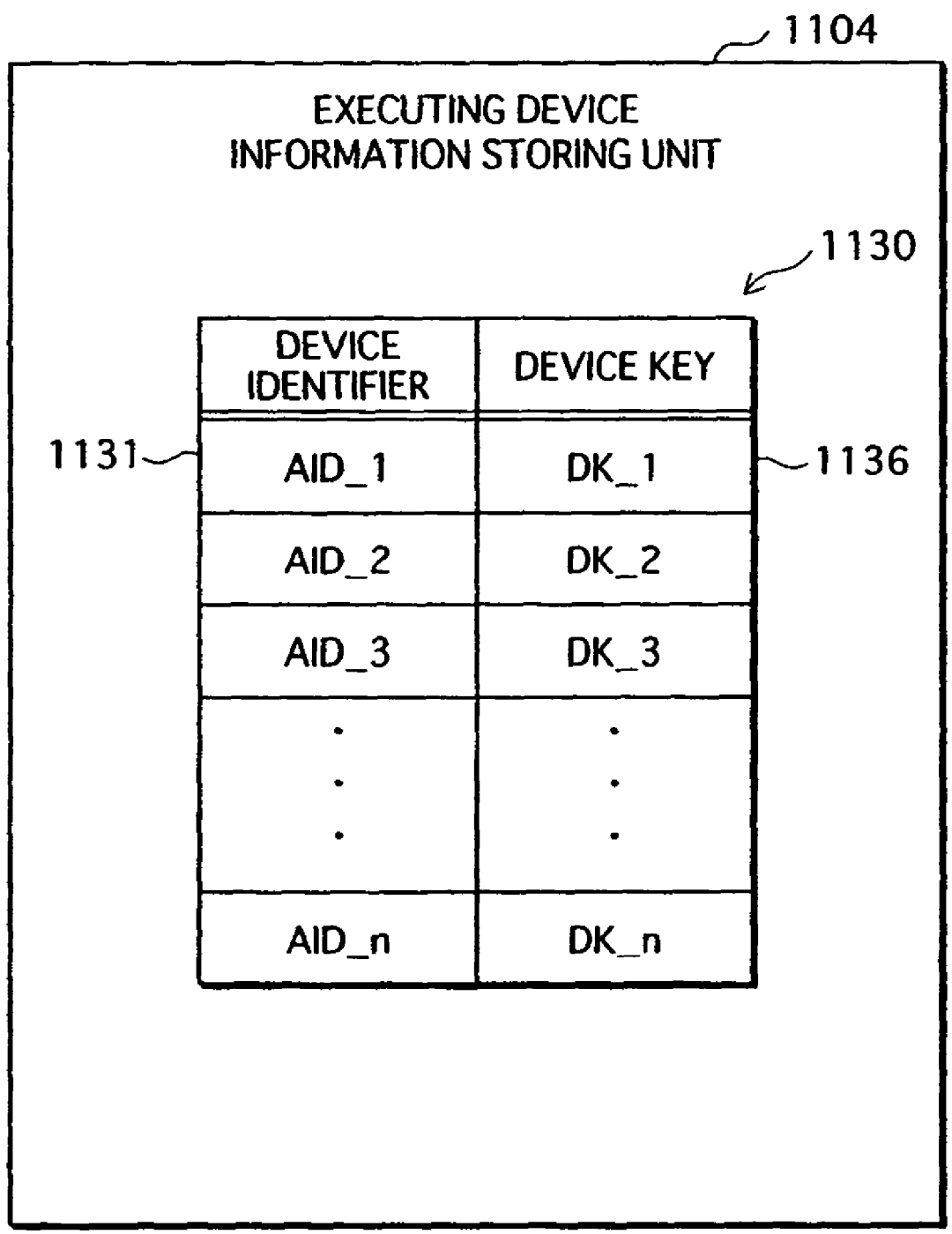
FIG. 4 shows a structure of a device identification table 1130 stored by an executing device information storing unit 1104.

The executing device information storing unit 1104 is, for example, composed of a ROM or an EEPROM, and stores a device identification table 1130 as shown in FIG. 4.

The device identification table 1130 is composed of n pieces of device identifiers and n pieces of device keys (n is a natural number). The device identifiers are pieces of identifying information with each piece being specific to a device which has been allowed to read information on the DVD 1500 written by the distributing device 1100 and play the read information. The device keys, which correspond one-to-one with the device identifiers, are pieces of key information respectively specific to individual devices indicated by the corresponding device identifiers. For example, a device identifier "AID_1" 1131 corresponds to a device key "DK_1" 1136.

The key block generating unit 1103 receives the contents key "CK" from the contents key generating unit 1102, and generates a key block.

FIG. 5 shows one example of a structure of a key block 1150 generated at this point. The key block 1150 is composed of n pieces of device identifiers and n pieces of encrypted contents keys. The device identifiers are the same as the device identifiers included in the device identification table 1130. The device identifiers correspond one-to-one with the encrypted contents keys, and the encrypted contents keys are generated by applying an encrypting algorithm E1 to the contents key "CK" with the use of the corresponding device keys. For example, a device identifier "AID_1" 1141 is the same as the device identifier "AID_1" 1131 included in the device identification table 1130, and corresponds to an encrypted contents key "Enc(DK_1, CK)" 1142. The encrypted contents key "Enc(DK_1, CK)" 1142 is generated by encrypting the contents key "CK" with the use of the device key "DK_1" 1136 included in the device identification table 1130. In the description hereinafter, an encrypted text generated by encrypting a plain text B with the use of a key A is denoted as "Enc(A, B)".

A procedure for generating the key block 1150 is described next.

When receiving the contents key "CK", the key block generating unit 1103 reads the device identifier "AID_1" 1131 and the device key "DK_1" 1136 in the first line from the device identification table 1130 of the executing device information storing unit 1104. The key block generating unit 1103 generates the encrypted contents key "Enc(DK_1, CK)" by applying the encrypting algorithm E1 to the contents key "CK" with the use of the read device key "DK_1" 1136. Here, AES (Advanced Encryption Standard) is used, as an example, for the encrypting algorithm E1. Nonpatent Reference 4 supplies details about AES Note that the encryption system used here is not limited to AES, and a different system may be employed.

The key block generating unit 1103 stores the read device identifier "AID_1" 1131 and the generated encrypted contents key "Enc(DK_1, CK)", associating these two with each other.

The key block generating unit 1103 repeats processing of the same kind for all n pairs of device identifiers and device keys, generates n pairs of device identifiers and encrypted contents keys, and puts these pairs together to form the key block 1150.

Subsequently, the key block generating unit 1103 outputs the generated key block 1150 to the recording unit 1114.

Here, as the simplest example, the case is described in which a specific key is assigned to each device operable to play the information written to the DVD 1500. However, technologies disclosed in Patent Reference 2 include ones for reducing the number of the encrypted contents keys and for preventing specific devices from playing the contents.

1.2.4 Unit Generating Unit 1105

The unit generating unit 1105 receives the contents 1120 from the input unit 1102. When receiving the contents 1120, the unit generating unit 1105 generates split contents and unit pick-out information in a procedure described below.

Next described are: split contents generation (a); and unit pick out information generation (b).

(a) Split Contents Generation

Figure 6:
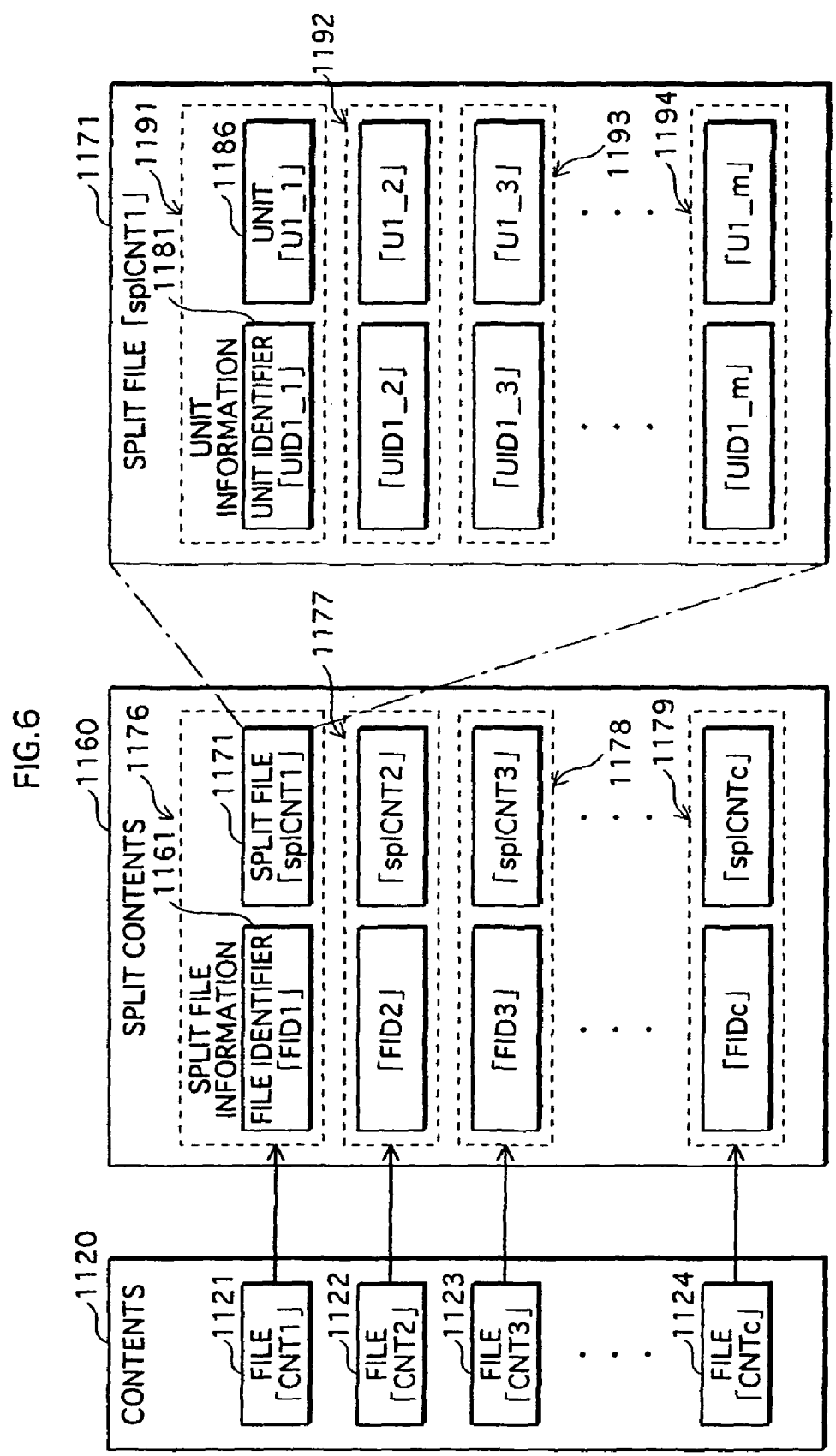
FIG. 6 shows a general outline of a generation procedure of split contents performed by a unit generating unit 1105.

As shown in FIG. 6, the unit generating unit 1105 generates split contents 1160 from the contents 1120. A procedure for generating the split contents 1160 is described next with the aid of FIG. 6.

When receiving the contents 1120, the unit generating unit 1105 generates a file identifier "FID1" 1161 and a piece of file identifying information "AD1" corresponding to the file "CNT1" 1121 included in the received contents 1120. The file identifier "FID1" 1161 is identifying information uniquely indicating the file "CNT1" 1121, and is, for example, a natural number indicating the order of the file "CNT1" 1121 within the contents 1120 or a name of the file. The piece of file identifying information "AD1" is information for identifying the file "CNT1" 1121, and is, for example, an offset from the head of the contents 1120, a sector number, or an address.

Next, the unit generating unit 1105 splits the file "CNT1" 1121 with respect to each VOBU (Video OBject Unit) to generate m pieces (m is any natural number) of units "U1_1", "U1_2", . . . , and "U1_m". Then, the unit generating unit 1105 generates a unit number "N1" which indicates the number of the generated units (here, N1=m).

Next, the unit generating unit 1105 generates file information composed of the file identifier "FID1" 1161, the piece of file identifying information "AD1", and the unit number "N1", and stores the generated file information.

Then, the unit generating unit 1105 generates unit identifiers for the respective units. The unit identifiers are pieces of identifying information with each piece uniquely identifying one of them pieces of units, and may be, for example, ordinal numbers starting from the head unit, like 1, 2, 3, ..., and m, or may be cumulative numbers of bits from the head unit. In the present embodiment, assume that the unit identifiers are ordinal numbers starting from the head unit. In the following explanation, a pair of a corresponding unit identifier and a unit is referred to as a piece of unit information while m pieces of unit information are collectively referred to as a split file. Thus, a split file "splCNT1" 1171 generated from the file "CNT1" 1121 is composed of m pieces of unit information 1191, 1192, 1193, ..., and 1194 as shown in FIG. 6. Each piece of unit information is composed of a corresponding unit identifier and a unit. As an example, one piece of unit information 1191 includes a unit identifier "UID1_1" 1181 and a unit "U1_1" 1186.

Next, the unit generating unit 1105 generates split file information 1176 including the file identifier "FID1" 1161 and the split file "splCNT1" 1171.

The unit generating unit 1105 repeats processing of the same kind for all the files to generate c pieces of file information and c pieces of split file information 1176, 1177, 1178, ..., and 1179. Here, the generated c pieces of split file information are collectively referred to as the split contents 1160. Note that the number of generated units m can be different from file to file.

Next, the unit generating unit 1105 outputs the generated split contents 1160 to the encryption processing unit 1106.

Note that the unit generating unit 1105 here generates the file identifiers and file identifying information, however, these can be input externally along with the contents 1120.

In addition, the individual files are split with respect to each VOBU, however the split unit is not limited to this. For example, each of the files can be split every 64 kilobytes, or every portion corresponding to one second of the playback time. Alternatively, it may be designed to let the operator input information indicating the split unit.

(b) Unit Pick-Out Information Generation

Figure 7:
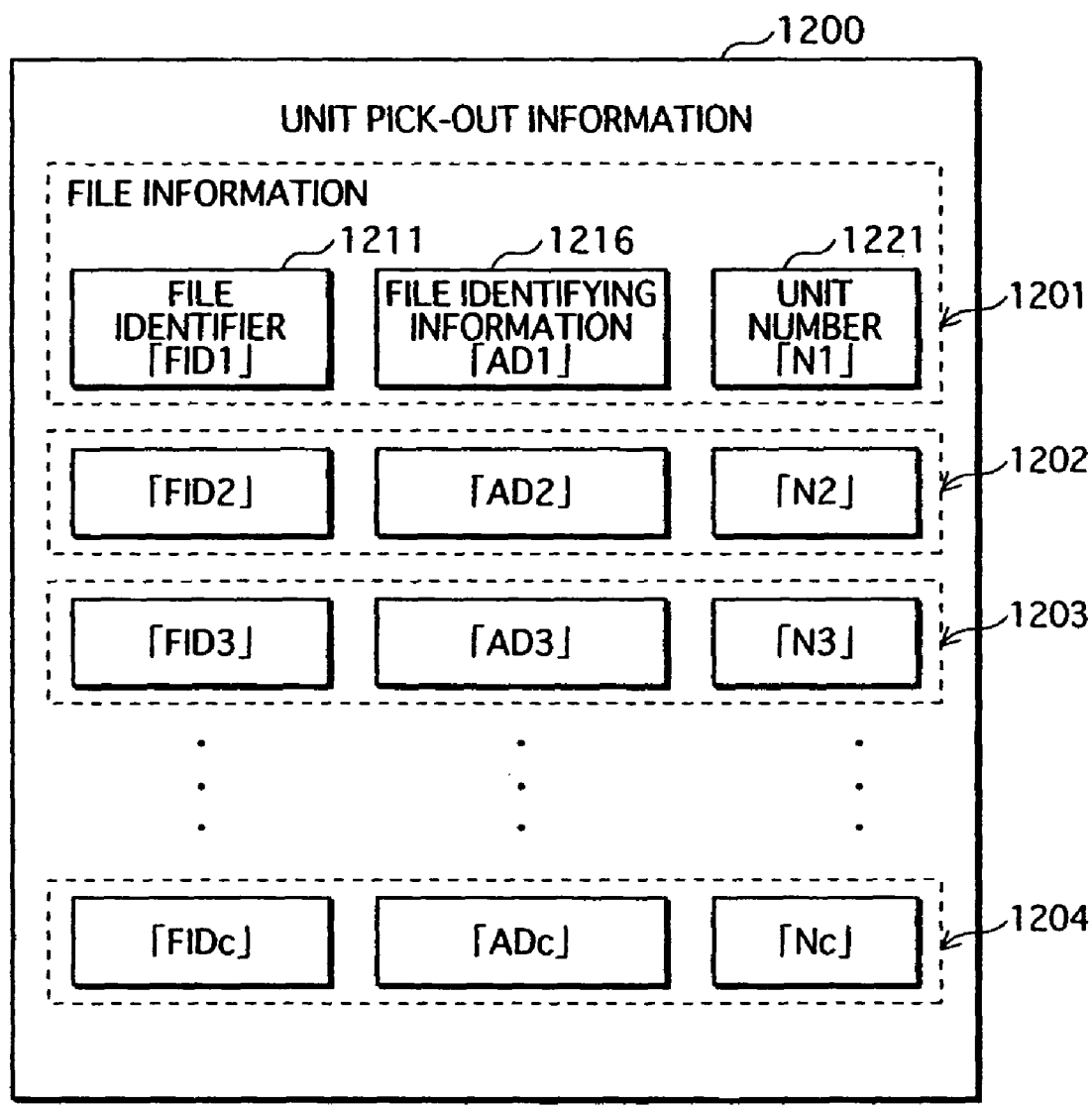
FIG. 7 shows a structure of unit pick-out information 1200 generated by the unit generating unit 1105.

After finishing the output of the split contents 1160, the unit generating unit 1105 generates unit pick-out information composed of c pieces of file information. FIG. 7 shows a structure of unit pick-out information 1200 generated at this point.

The unit pick-out information 1200 is composed of c pieces of file information 1201, 1202, ..., and 1204. Each piece of file information is composed of a file identifier, a piece of file identifying information, and a unit number.

As an example, one piece of file information 1201 includes a file identifier "FID1" 1211, a piece of file identifying information "AD1" 1216, and a unit number "N1" 1221.

The unit generating unit 1105 outputs the generated unit pick-out information 1200 to the signature information generating unit 1111 and the recording unit 1114.

1.2.5 Encryption Processing Unit 1106

The encryption processing unit 1106 receives the contents key "CK" from the contents key generating unit 1102 as well as receives the split contents 1160 from the unit generating unit 1105.

Figure 8:
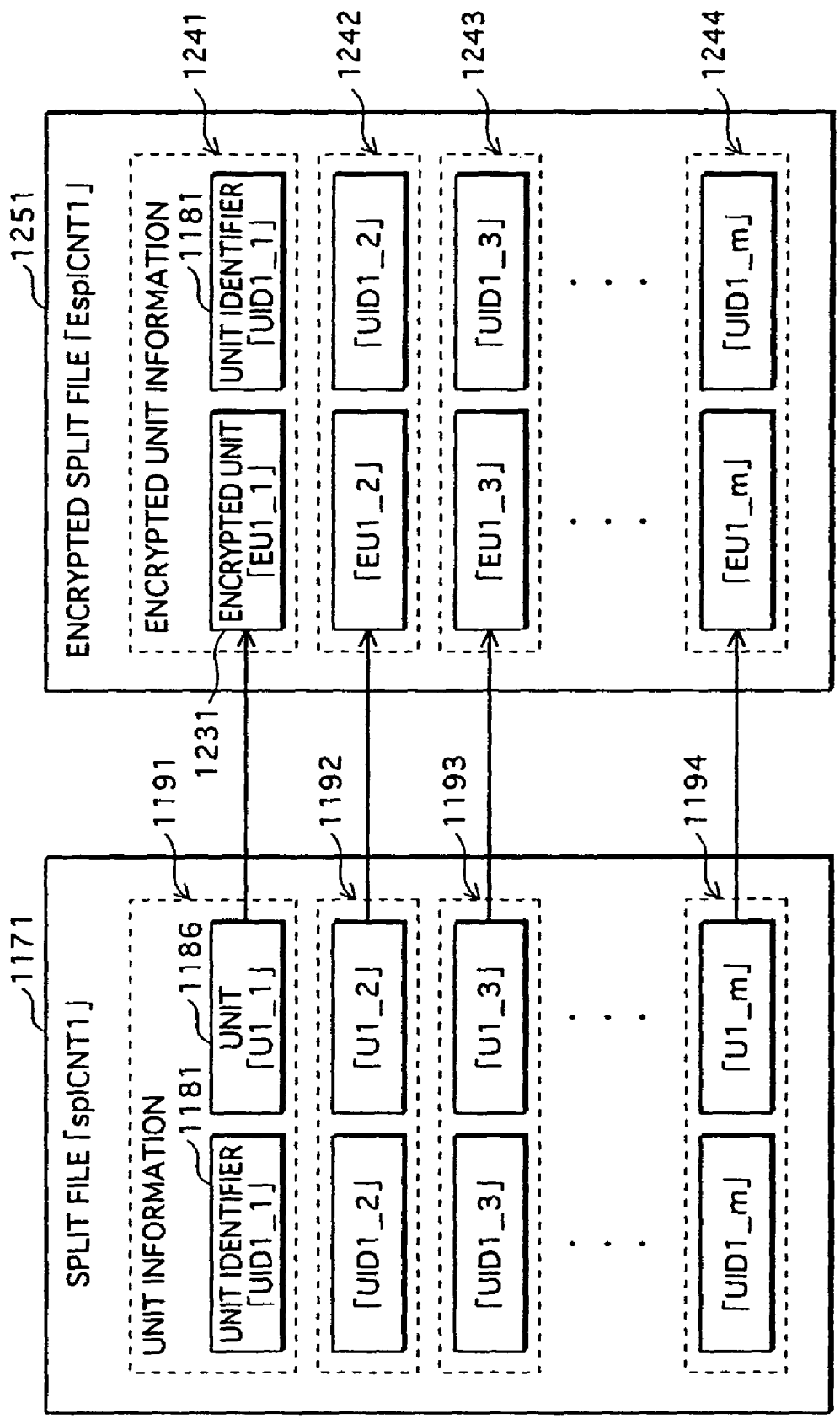
FIG. 8 shows part of encryption processing performed by an encryption processing unit 1106.

FIG. 8 shows part of processing conducted by the encryption processing unit 1106. The following describes the processing conducted by the encryption processing unit 1106 with the aid of FIG. 8.

When receiving the split contents 1160, the encryption processing unit 1106 selects the split file "splCNT1" 1171 included in the split file information 1176 composing the received split contents 1160. The encryption processing unit 1106 extracts the unit "U1_1" 1186 from the head piece of unit information 1191 of the selected split file "splCNT1" 1171, and generates an encrypted unit "EU1_1" 1231 by applying the encrypting algorithm E1 to the extracted unit "U1_1" 1186 with the use of the contents key "CK". Here, EU1_1=Enc(CK, U1_1).

The encryption processing unit 1106 generates encrypted unit information 1241 composed of the generated encrypted unit "EU1_1" 1231 and the unit identifier "UID1_1" 1181 which are included in the unit information 1191. In the following explanation, a pair of a corresponding unit identifier and an encrypted unit is referred to as a piece of encrypted unit information.

The encryption processing unit 1106 repeats processing of the same kind for the rest of unit information 1192, 1193, ..., and 1194 to generate corresponding pieces of encrypted unit information 1242, 1243, ..., and 1244. Here, m pieces of encrypted unit information generated from one split file are collectively referred to as an encrypted split file.

As shown in FIG. 8, an encrypted split file "EsplCNT1" 1251 generated from the split file "splCNT1" 1171 in the above-mentioned procedure is composed of m pieces of the encrypted unit information 1241, 1242, 1243, ..., and 1244. Each piece of the encrypted unit information is generated based on a piece of the unit information composing the split file 1171, and includes a unit identifier and an encrypted unit. For example, the encrypted unit information 1241 is generated based on the unit information 1191, and includes the unit identifier "UID1_1" 1181 and the encrypted unit "EU1_1" 1231.

Next, the encryption processing unit 1106 extracts an encrypted unit from each piece of the encrypted unit information composing the generated encrypted split file "EsplCNT1" 1251. Here, m pieces of extracted encrypted units are correctively referred to as an encrypted file "ECNT1".

Then, the encryption processing unit 1106 generates encrypted split file information by replacing the split file "splCNT1" 1171 included in the split file information 1176 with the generated encrypted split file "EsplCNT1" 1251.

Figure 10:
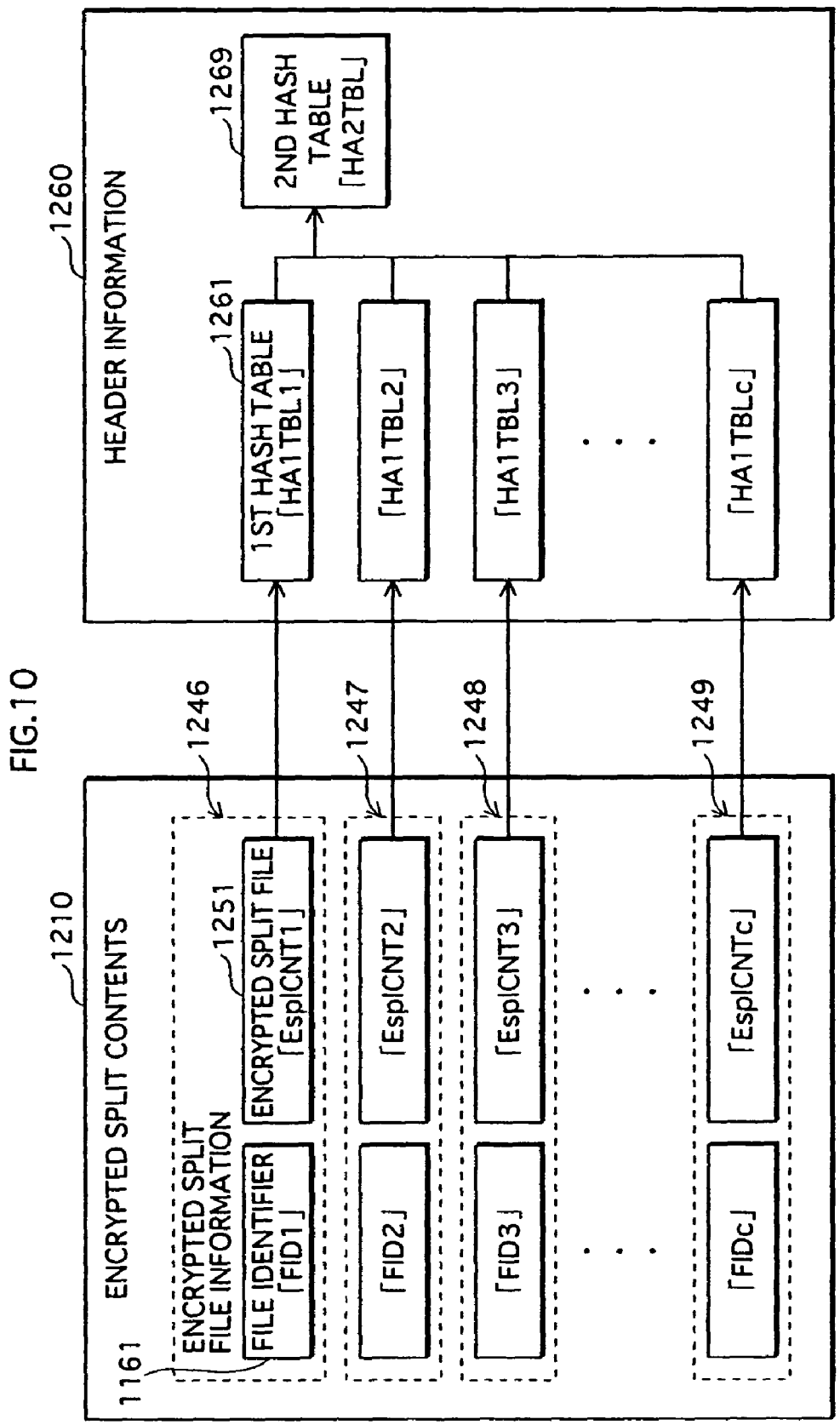
FIG. 10 shows a general outline of a generation procedure of header information 1260 performed by a header information generating unit 1107.

The encryption processing unit 1106 does the same with the pieces of the split file information 1177, 1178, ..., and 1179 to generate encrypted split file information and encrypted files.

c pieces of encrypted split file information generated at this point are collectively referred to as encrypted split contents. Then, the encryption processing unit 1106 outputs the generated encrypted split contents to the header information generating unit 1107. FIG. 10 shows a structure of encrypted split contents 1210 output here.

Figure 9:
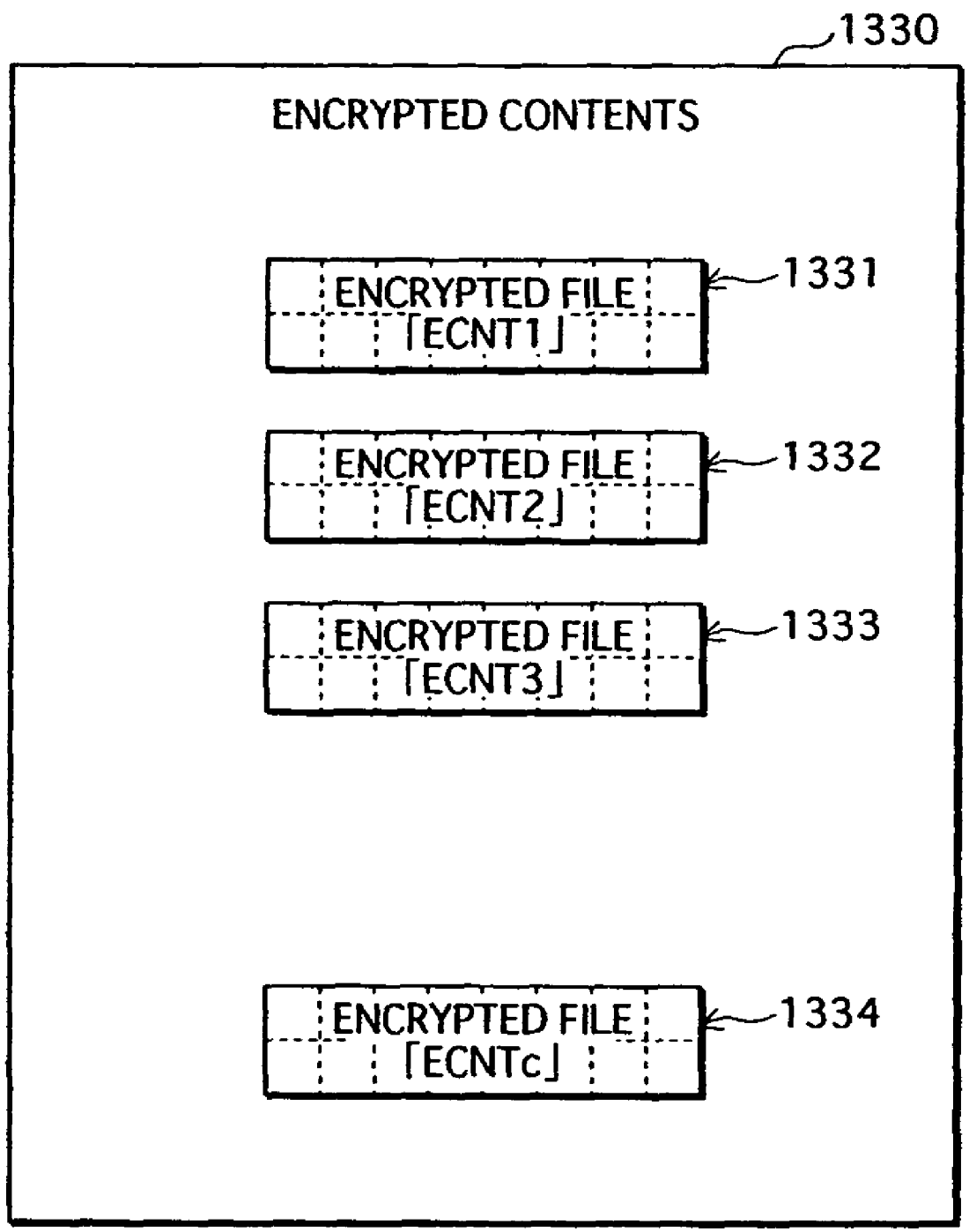
FIG. 9 shows a structure of encrypted contents 1330 generated by the encryption processing unit 1106.

Next, the encryption processing unit 1106 outputs c pieces of the encrypted files as encrypted contents to the recording unit 1114. FIG. 9 shows a structure of encrypted contents 1330 generated here. The encrypted contents 1330 are composed of c pieces of encrypted files "ECNT1" 1331, "ECNT2" 1332, "ECNT3" 1333, ..., and "ECNTc" 1334. Each of the encrypted files is generated based on an encrypted split file included in the encrypted split contents, and includes a plurality of encrypted units. As an example, the encrypted file "ECNT1" 1331 includes encrypted units "EU1_1", "EU1_2", ..., and so on.

1.2.6 Header Information Generating Unit 1107

The header information generating unit 1107 receives the encrypted split contents 1210 from the encryption processing unit 1106. When receiving the encrypted split contents 1210, the header information generating unit 1107 generates header information 1260 with the use of the received encrypted split contents as shown in FIG. 10.

FIG. 10 shows a general outline of a generation procedure of the header information 1260 performed by the header information generating unit 1107. The encrypted split contents 1210 received by the header information generating unit 1107 are composed of c pieces of encrypted split file information 1246, 1247, 1248, . . . , and 1249. Each piece of encrypted split file information includes a file identifier and an encrypted split file. For example, one piece of encrypted split file information 1246 includes a file identifier "FID1" 1161 and an encrypted split file "EsplCNT1" 1251.

The header information generating unit 1107 generates a 1st hash table based on each split file included in the encrypted split file information 1246. For example, the header information generating unit 1107 generates a 1st hash table "HA1TBL1" 1261 based on the encrypted split file "EsplCNT1" 1251. The header information generating unit 1107 generates a 2nd hash table "HA2TBL" 1269 from the generated c pieces of 1st hash tables.

The above-mentioned generation procedures of the 1st and 2nd hash tables are described in detail below.

1.2.6.1. First Hash Table Generation

Figure 11:
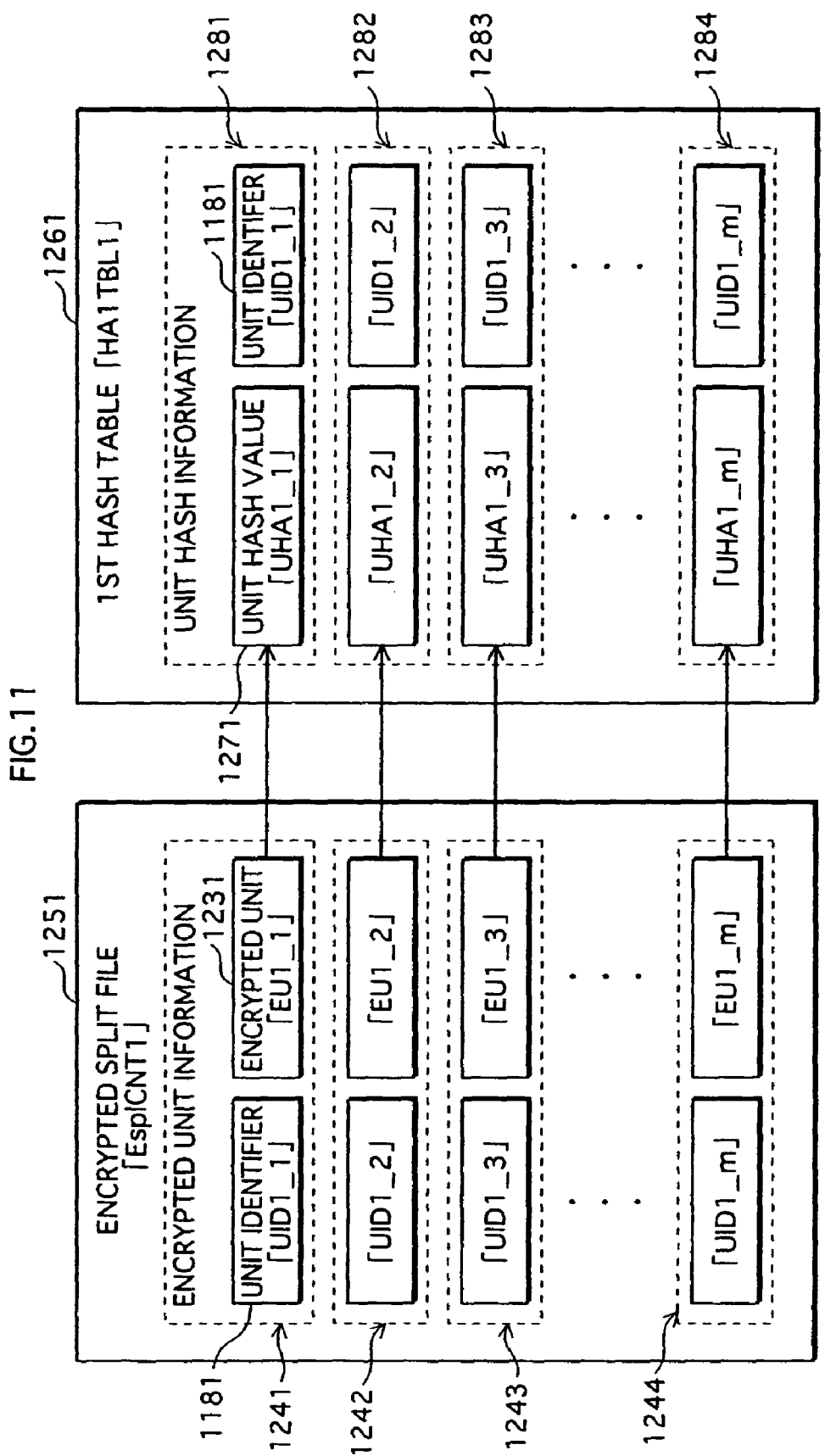
FIG. 11 shows a generation procedure of a 1st hash table performed by the header information generating unit 1107.

FIG. 11 shows a general outline of a generation procedure of the 1st hash table "HA1TBL1" 1261 performed by the header information generating unit 1107.

The generation procedure of the 1st hash table "HA1TBL1" 1261 is described below with the aid of FIG. 11. A generation procedure for all the 1st hash tables "HA1TBL2", "HA1TBL3", . . . , and "HA1TBLc" is the same for the 1st hash table "HA1TBL1" 1261.

First, the header information generating unit 1107 extracts an encrypted unit "EU1_1" 1231 from the head encrypted unit information 1241 composing the encrypted split file "EsplCNT1" 1251, and generates a unit hash value "UHA1_1" 1271 by assigning the extracted encrypted unit "EU1_1" 1231 to a hash function.

Here, SHA-1 (Secure Hash Algorithm-1) or CBC-MAC (Cipher Block Chaining-Message Authentication Code) using a block cipher is applied for the hash function.

Here, the header information generating unit 1107 generates unit hash information 1281 by replacing the encrypted unit "EU1_1" 1231 of the encrypted unit information 1241 with the generated unit hash value "UHA1_1" 1271.

The header information generating unit 1107 repeats processing of the same kind for the rest of the encrypted unit information 1242, 1243, . . . , and 1244 to generate corresponding pieces of unit hash information 1282, 1283, . . . , and 1284. m pieces of unit hash information generated at this point are collectively referred to as the 1st hash table "HA1TBL1" 1261. FIG. 11 shows a structure of the 1st hash table "HA1TBL1" 1261 generated at this point.

1.2.6.2 Second Hash Table Generation

Figure 12:
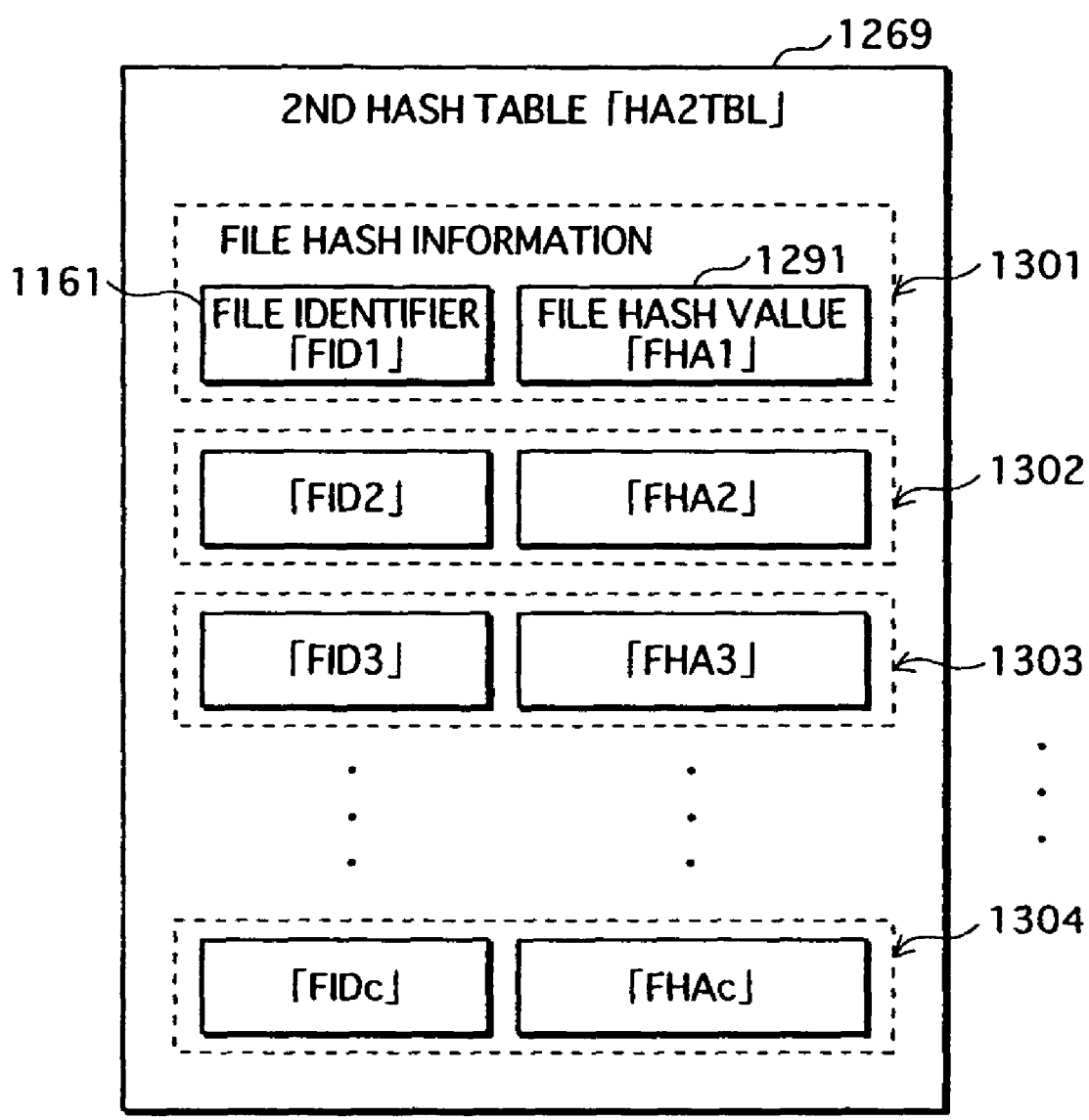
FIG. 12 shows the details of a 2nd hash table generated by the header information generating unit 1107.

The header information generating unit 1107 repeats the above procedure. After completing generating the c pieces of 1st hash tables from the encrypted split contents 1210, the header information generating unit 1107 generates the 2nd hash table 1269 as shown in FIG. 12 from the generated c pieces of 1st hash tables. The 2nd hash table "HA2TBL" 1269 is composed of c pieces of file hash information 1301, 1302, 1303, . . . , and 1304, and each piece of file hash information includes a file identifier and a file hash value. As an example, one piece of file-hash information 1301 includes the file identifier "FID1" 1161 and a file hash value "FHA1" 1291.

A generation-procedure of the 2nd hash table 1269 is described below.

The header information generating unit 1107 generates the file hash value "FHA1" 1291 by assigning, to the hash function, a combined result formed by combining all the unit identifiers and unit hash values composing the generated 1st hash table "HA1TBL1" 1261.

Subsequently, the header information generating unit 1107 extracts the file identifier "FID1" 1161 from the encrypted split file information 1246 corresponding to the 1st hash table "HA1TBL1" 1261, and generates the file hash information 1301 composed of the extracted file identifier "FID1" 1161 and the generated file hash value "FHA1" 1291.

The header information generating unit 1107 repeats processing of the same kind for the 1st hash tables 1262, 1263, . . . , and 1264 to generate the pieces of file hash information 1302, 1303, . . . , and 1304, respectively.

Next, the header information generating unit 1107 puts these generated c pieces of 1st file hash information together to form the 2nd hash table "HA2TBL" 1269.

Thus conclude the descriptions of the generation procedures of the 1st hash tables (1.2.6.1) and the 2nd hash table (1.2.6.2). The header information generating unit 1107 generates the header information 1260 including the c pieces of 1st hash table and a single piece of the 2nd hash table "HA2TBL" 1269 generated in the above-mentioned procedures, and outputs the generated header information 1260 to the recording unit 1114.

Furthermore, the header information generating unit 1107 outputs the generated 2nd hash table "HA2TBL" 1269 to the signature information generating unit 1111.

1.2.7 Signature Information Generating Unit 1111 and Signature Key Storing Unit 1112

The signature key storing unit 1112 that is composed of a ROM stores a signature key 1113 specific to the distributing device 1100.

Figure 13:
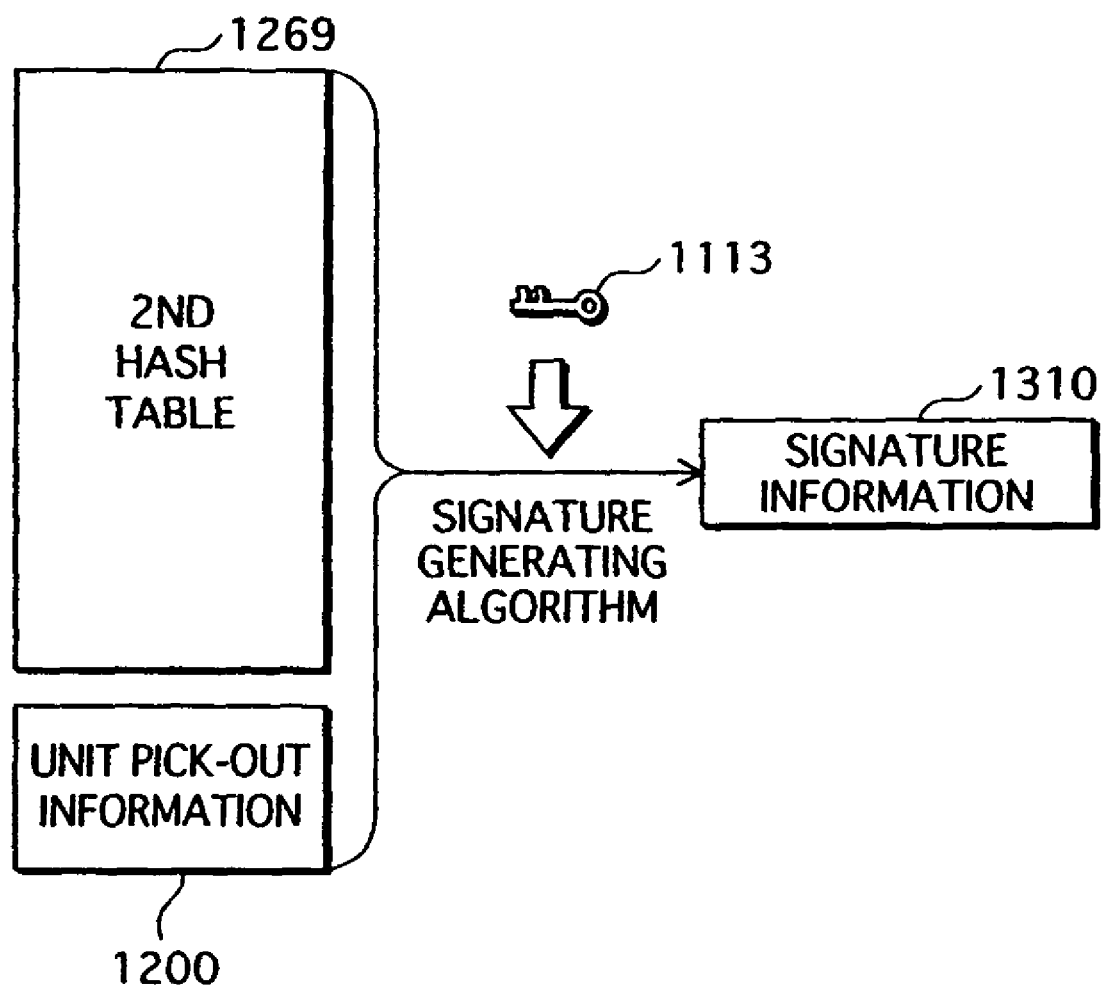
FIG. 13 shows processing conducted by a signature information generating unit 1111.

FIG. 13 shows a general outline of the operational behavior of the signature information generating unit 1111. Signature information generation performed by the signature information generating unit 1111 is described below with the aid of FIG. 13.

The signature information generating unit 1111 receives the unit pick-out information 1200 from the unit generating unit 1105 while receiving the 2nd hash table "HA2TBL" 1269 from the header information generating unit 1107. When receiving the unit pick-out information 1200 and the 2nd hash table 1269, the signature information generating unit 1111 reads the signature key 1113 from the signature key storing unit 1112.

Subsequently, the signature information generating unit 1111 generates signature information 1310 from the received unit pick-out information 1200 and the 2nd hash table 1269 with the use of the read signature key 1113. To be more specific, the signature information generating unit 1111 applies, with the use of the read signature key 1113, a signature generating algorithm S to a combined result formed by combining c pieces of the file hash values included in the received 2nd hash table 1269 and c pieces of file information included in the unit pick-out information 1200.

As an example, DSA (Digital Signature Algorithm) is used for the signature generating algorithm S.

Then, the signature information generating unit 1111 outputs the generated signature information 1310 to the recording unit 1114.

1.2.8 Recording Unit 1114

The recording unit 1114 is loaded with the DVD 1500.

The recording unit 1114 receives: the key block 1150 from the key block generating unit 1103; the unit pick-out information 1200 from the unit generating unit 1105; the encrypted contents 1330 from the encryption processing unit 1106; the header information 1260 from the header information generating unit 1107; and the signature information 1310 from the signature information generating unit 1111.

When receiving the above information, the recording unit 1114 writes the received key block 1150, unit pick-out information 1200, header information 1260, signature information 1310, and encrypted contents 1330 to the DVD 1500.

1.3 DVD 1500

The DVD 1500 is a transportable optical disc medium loaded on the executing device 1600.

Figure 14:
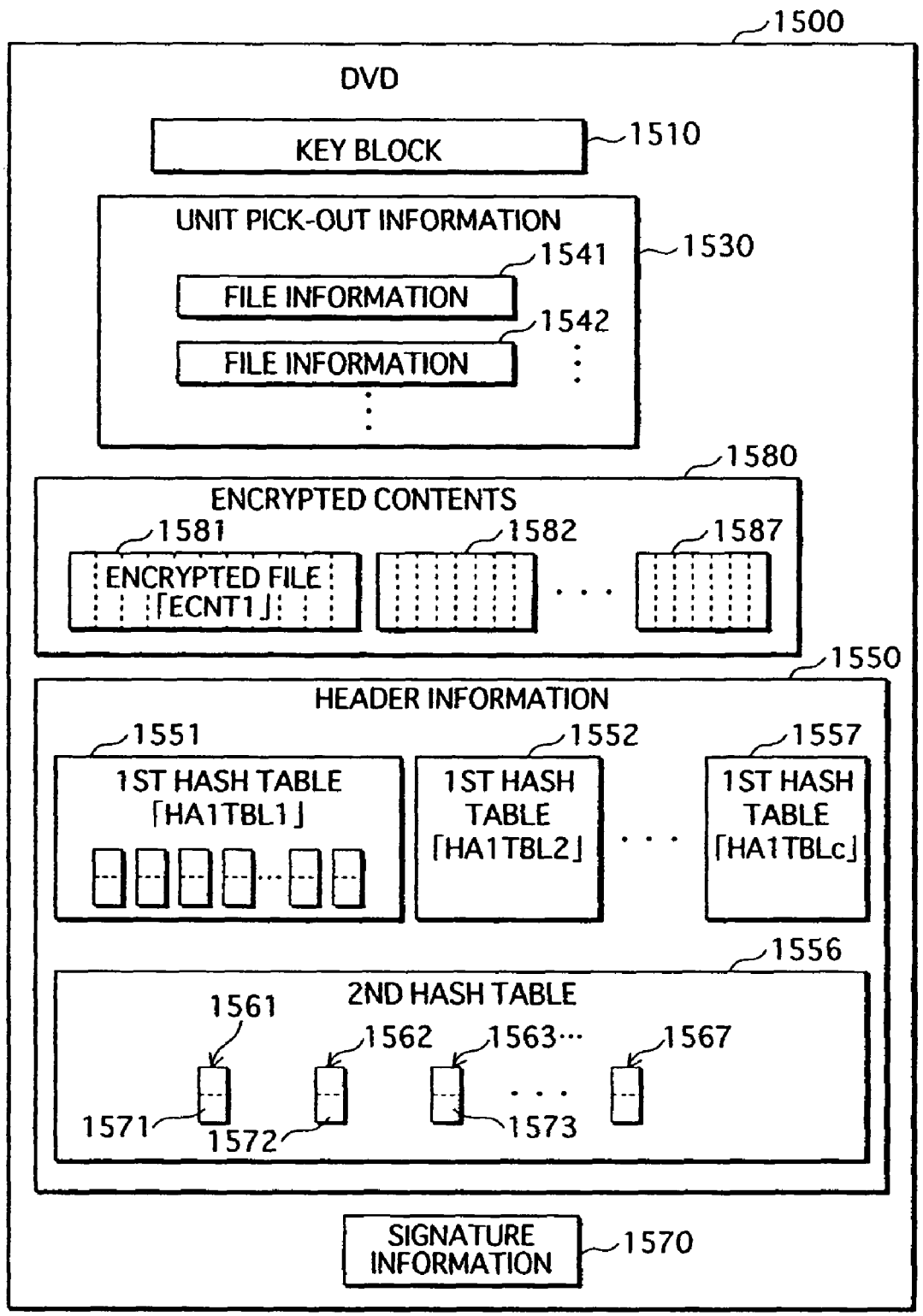
FIG. 14 shows information stored by a DVD 1500 of the first embodiment.

As shown in FIG. 14, the DVD 1500 stores a key block 1510, unit pick-out information 1530, header information 1550, signature information 1570, and encrypted contents 1580. These have been written by the distributing device 1100, and are the same as the key block 1150, the unit pick-out information 1200, the header information 1260, the signature information 1310, and the encrypted contents 1330 generated by the distributing device 1100, respectively. Therefore, brief descriptions are provided for these items.

1.3.1 Key Block 1510

The key block 1510 is composed of n pieces of device identifiers "AID_1", "AID_2", "AID_3", . . . , and "AID_n" and n pieces of encrypted contents keys "Enc(DK_1, CK)", "Enc(DK_2, CK)", "Enc(DK_3, CK)", . . . , and "Enc(DK_n, CK)" which correspond to the n pieces of the device identifiers, respectively.

1.3.2 Unit Pick-Out Information 1530

The unit pick-out information 1530 is composed of c pieces of file information 1541, 1542, . . . , and so on, and each piece of file information includes a file identifier, file identifying information, and a unit number. Individual pieces of the file information correspond to the encrypted files included in the encrypted contents 1580. In addition, each of the files corresponds to a 1st hash table included in the header information 1550.

1.3.3 Encrypted Contents 1580

The encrypted contents 1580 are composed of c pieces of encrypted files 1581, 1582, 1583, . . . , and 1587. Each of the encrypted files includes a plurality of encrypted units.

1.3.4 Header Information 1550

The header information 1550 is composed of c pieces of 1st hash tables 1551, 1552, . . . , and 1557 and a 2nd hash tables 1556.

Each of the 1st hash tables is composed of a plurality of pieces of unit hash information, and each piece of the unit hash information includes a unit identifier and a unit hash value.

The 2nd hash table 1556 is composed of c pieces of file hash information 1561, 1562, 1563, . . . , and 1567, and each piece of the file hash information includes a file identifier and a file hash value.

1.3.5 Signature Information 1570

The signature information 1570 is generated by applying the signature generating algorithm S to a combined result formed by combining c pieces of file hash values included in the 2nd hash table 1556 and c pieces of file information included in the unit pick-out information 1530.

1.4 Executing Device 1600

Figure 15:
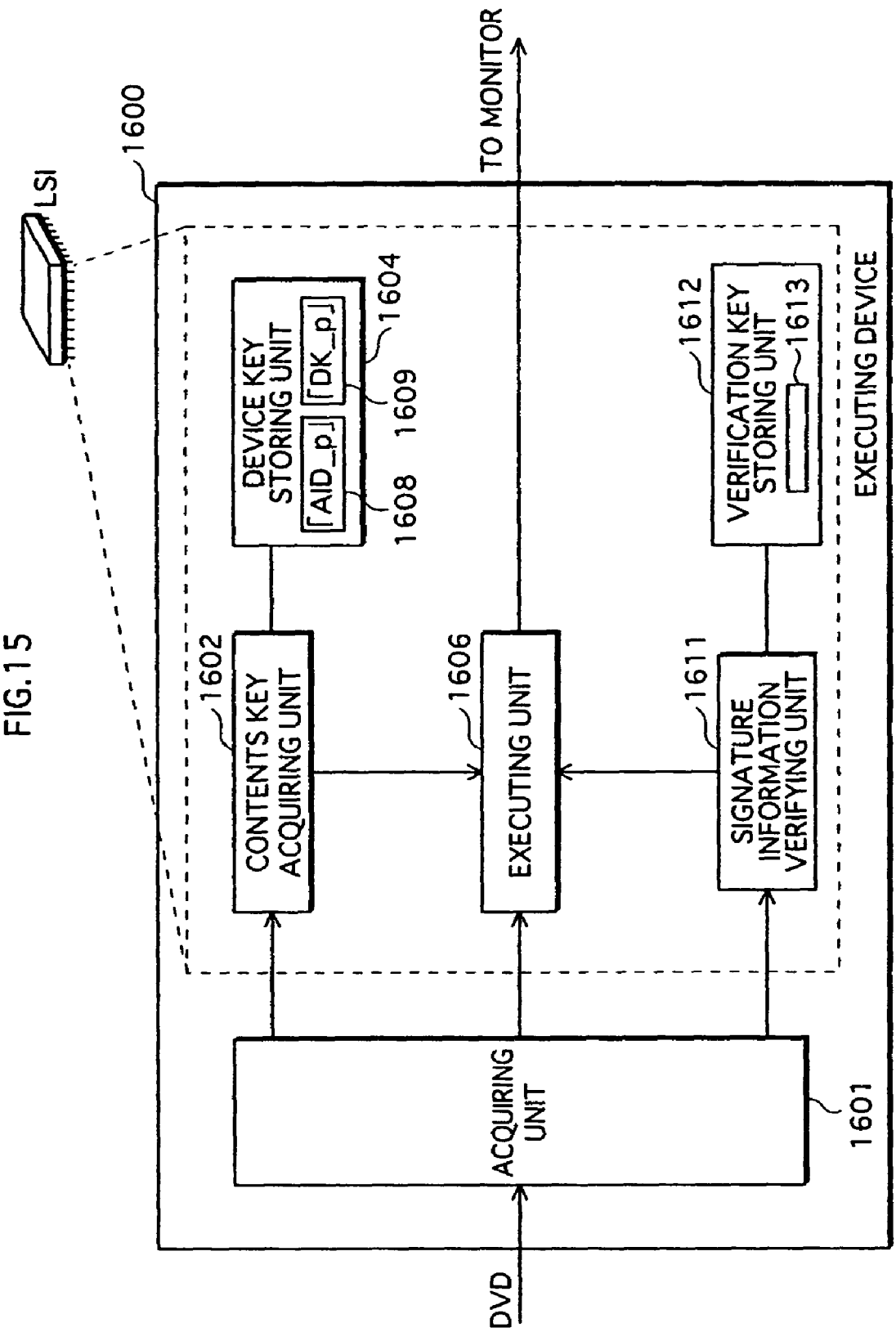
FIG. 15 is a block diagram showing a structure of an executing device 1600 of the first embodiment.

As shown in FIG. 15, the executing device 1600 is composed of an acquiring unit 1601, a contents key acquiring unit 1602, a device key storing unit 1604, an executing unit 1606, a signature information verifying unit 1611, and a verification key storing unit 1612.

1.4.1 Acquiring Unit 1601

The acquiring unit 1601 is loaded with the DVD 1500. When detecting the DVD 1500 being loaded thereon, the acquiring unit 1601 reads the key block 1510, unit pick-out information 1530, and signature information 1570 from the DVD 1500, and outputs the read key block 1510 to the contents key acquiring unit 1602 while outputting the read unit pick-out information 1530 and signature information 1570 to the signature information verifying unit 1611.

In addition, the acquiring unit 1601 reads all or part of the header information 1550 and encrypted contents 1580 from the DVD 1500 according to instructions from the executing unit 1606 and the signature information verifying unit 1611.

1.4.2 Contents Key Acquiring Unit 1602 and Device Key Storing Unit 1604

The device key storing unit 1604 that is composed of a ROM stores a device identifier "AID_p" 1608 and a device key "DK_p" 1609 (p is a natural number of n or smaller) as shown in FIG. 15.

The device identifier "AID_p" 1608 is identifying information uniquely indicating the executing device 1600, while the device key "DK_p" 1609 is key information specific to the executing device 1600.

The contents key acquiring unit 1602 receives the key block 1510 from the acquiring unit 1601. When receiving the key block 1510, the contents key acquiring unit 1602 reads the device identifier "AID_p" 1608 from the device key storing unit 1604. Then, the contents key acquiring unit 1602 detects a device identifier corresponding to the device identifier "AID_p" 1608 read from the received key block 1510, and extracts an encrypted contents key corresponding to the detected device identifier.

Subsequently, the contents key acquiring unit 1602 reads the device key "DK_p" 1609 from the device key storing unit 1604. The contents key acquiring unit 1602 generates the contents key "CK" by applying a decrypting algorithm D1 to the extracted encrypted contents key with the use of the read device key "DK_p" 1609, and then outputs the generated contents key "CK" to the executing unit 1606.

Here, the decrypting algorithm D1 is an algorithm used for decrypting encrypted texts generated by using the encrypting algorithm E1.

1.4.3 Signature Information Verifying Unit 1611 and Verification Key Storing Unit 1612

The verification key storing unit 1612 that is composed of a ROM stores a verification key 1613. The verification key 1613 is key information corresponding to the signature key 1113 stored by the distributing device 1100.

The signature information verifying unit 1611 receives the unit pick-out information 1530 and signature information 1570 from the acquiring unit 1601.

Figure 16:
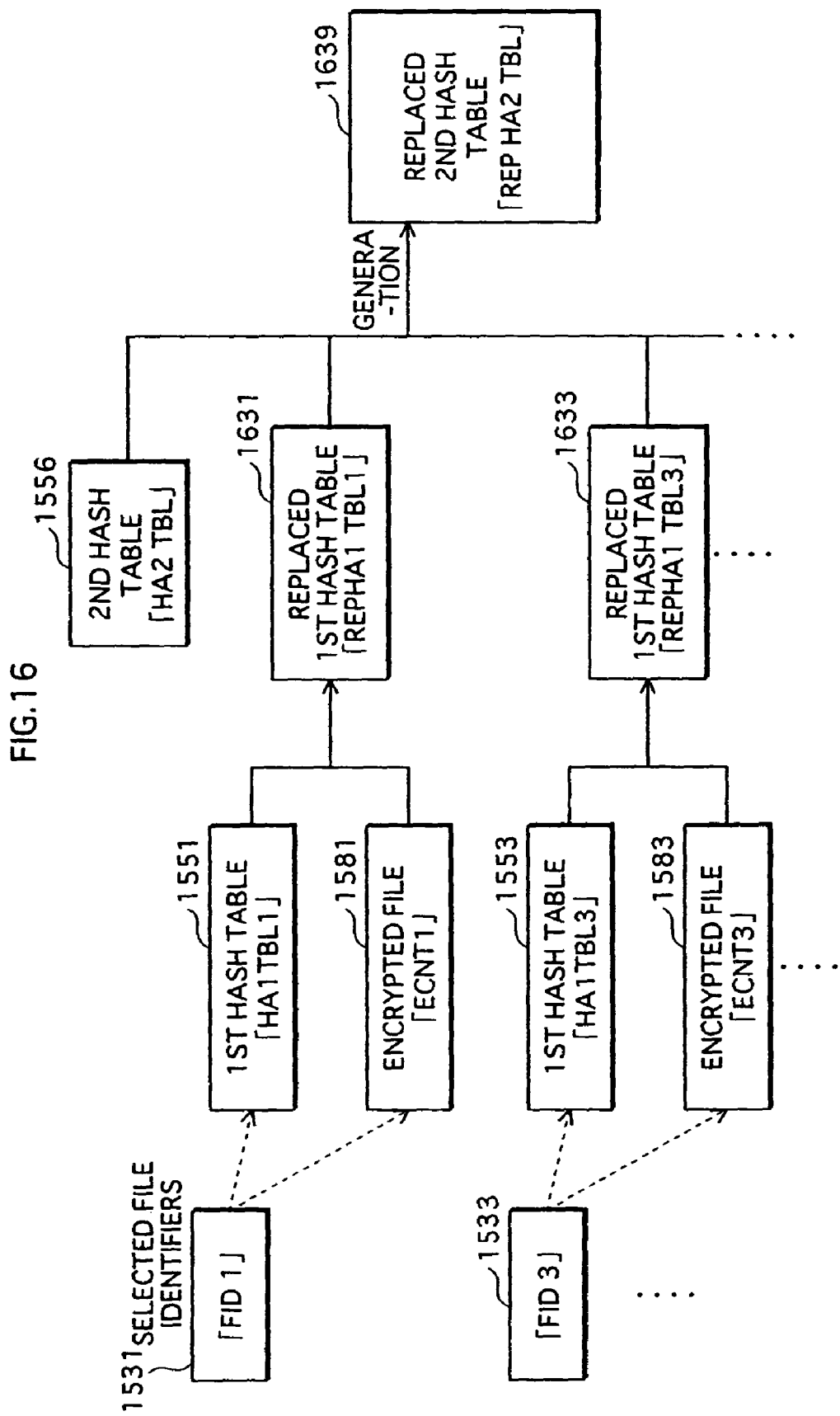
FIG. 16 shows a general outline of verification processing of the signature information performed by a signature information verifying unit 1611.

FIG. 16 shows a general outline of verification operations for signature information performed by the signature information verifying unit 1611. When receiving the unit pick-out information 1530 and signature information 1570, the signature information verifying unit 1611 selects i pieces (i is a natural number of c or smaller) of file identifiers from the received unit pick-out information 1530, as shown in FIG. 16. Here, the following description is provided on the assumption that the signature information verifying unit 1611 has selected file identifiers "FID1" 1531, "FID3" 1533, ..., and so on.

The signature information verifying unit 1611 generates a replaced 1st hash table "REPHA1TBL1" 1631 based on the 1st hash table "HA1TBL1" 1551 and the encrypted file "ECNT1" 1581 corresponding to the selected file identifier "FID1" 1531. The signature information verifying unit 1611 does the same with the other selected file identifiers "FID3", ..., and so on to generate replaced 1st hash tables 1633, ..., and so on. The signature information verifying unit 1611 generates a replaced 2nd hash table "REPHA2TBL" 1639 based on the generated replaced 1st hash table 1631, 1633, ..., and so on and the 2nd hash table "HA2TBL" 1556 stored in the DVD 1500, and verifies signature information 1570 by using the generated replaced 2nd hash table "REPHA2TBL" 1639.

Thus concludes the general outline shown in FIG. 16. The following provides detailed descriptions on: generation of replaced 1st hash tables (1.4.3.1); generation of a replaced 2nd hash table (1.4.3.2); and a verification procedure of signature information (1.4.3.3), with the aid of drawings.

1.4.3.1 Generation of Replaced 1st Hash Tables

Figure 17:
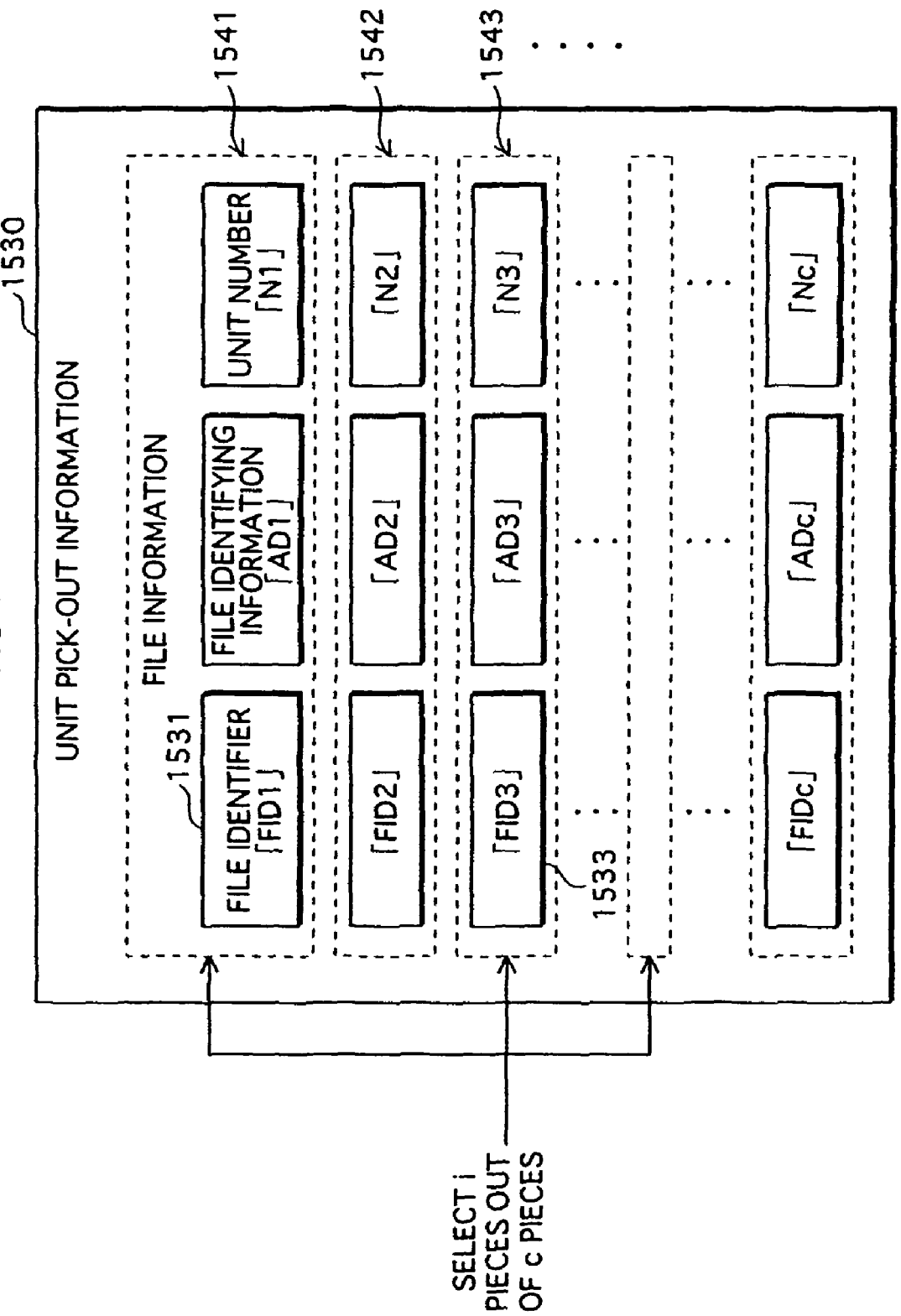
FIG. 17 shows part of processing conducted by the signature information verifying unit 1611.
Figure 18:
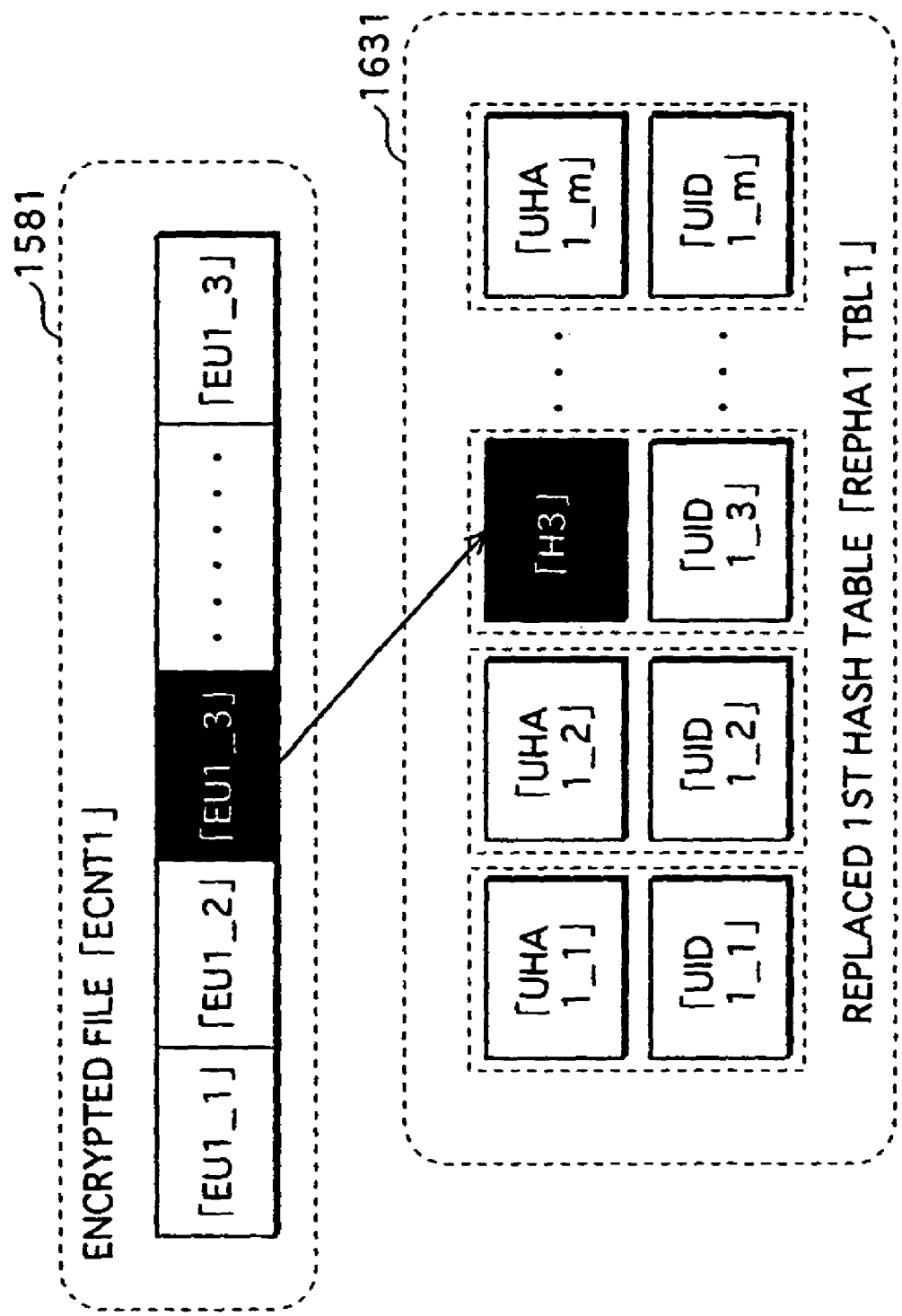
FIG. 18 shows a generation procedure of a replaced 1st hash table performed by the signature information verifying unit 1611.

A procedure for generating replaced 1st hash tables is explained with the aid of FIGS. 17 and 18.

As shown in FIG. 17, the signature information verifying unit 1611 selects i pieces (is a natural number of c or smaller) from among c pieces of file information included in the received unit pick-out information 1530. How to select i pieces is, for example, generating i pieces of pseudorandom numbers (r1, r2, ..., and ri), each of which is 1 or greater but c or smaller, and selecting the r1st, r2nd, ..., and ri-th file identifiers. The selecting method is not limited to this, and any method is applicable as long as it is difficult to predict which file identifiers are selected. For example, a temperature, humidity, noise on an electronic signal, and the like may be used.

In the present embodiment, the following description is provided on the assumption that i=7, and seven pieces of file information 1541, 1543, ..., and so on are selected.

Subsequently, the signature information verifying unit 1611 selects any one of the encrypted units in the encrypted file "ECNT1" 1581 corresponding to the file identifier "FID1" included in the selected file information 1541, and reads the selected encrypted unit from the DVD 1500, as shown in FIG. 18. To be more specific, the signature information verifying unit 1611 reads the unit number "N1" included in the selected file information 1541, and generates a pseudorandom number t (here, t=3), which is "N1" or smaller. Then, the signature information verifying unit 1611 reads an encrypted unit "EU1_3", which is the third encrypted unit in the encrypted file "ENCT1" 1581, from the DVD 1500 via the acquiring unit 1601 based on the file identifying information "AD1" included in the selected file information 1541.

Next, the signature information verifying unit 1611 generates a replacing unit hash value "H3" by assigning the read encrypted unit "EU1_3" to a hash function. Here, the signature information verifying unit 1611 uses the same hash function used by the header information generating unit 1107 of the distributing device 1100.

Next, the signature information verifying unit 1611 reads the 1st hash table "HA1TBL1" 1551 included in the header information 1550 via the acquiring unit 1601.

Then, the signature information verifying unit 1611 replaces, with the calculated replacing unit hash value "H3", a unit hash value "UHA1_3" corresponding to a unit identifier "UID1_3" conforming to t=3, out of m pieces of unit hash information composing the read 1st hash table "HA1TBL1" 1551. The result is the replaced 1st hash table "REPHA1TBL1" 1631.

The signature information verifying unit 1611 repeats processing of the same kind for the other selected pieces of file information 1542, ..., and so on to generate replaced 1st hash tables "REPHATBL3" 1633, ..., and so on, respectively.

1.4.3.2 Generation of Replaced 2nd Hash Table

Figure 19:
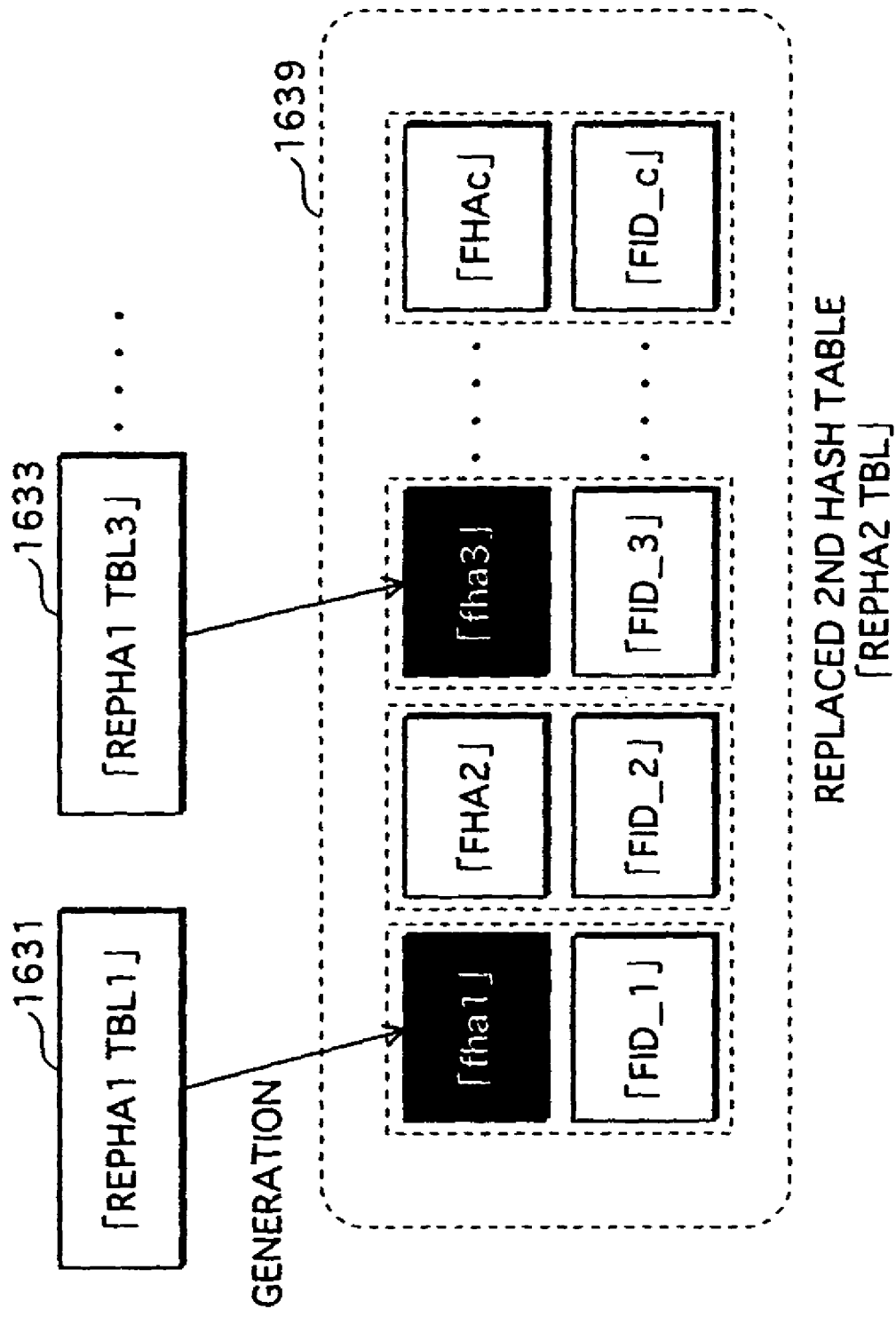
FIG. 19 shows a generation procedure of a replaced 2nd hash table performed by the signature information verifying unit 1611.

The following describes a procedure for generating a replaced 2nd hash table with the aid of FIG. 19.

After completing generating the replaced 1st hash tables based on the selected 7 pieces of file information, the signature information verifying unit 1611 combines all the unit identifiers, all the unit hash values, and the replaced hash values composing the generated replaced 1st hash table "REPHA1TBL1" 1631, and generates a replacing file hash value "fha1" by assigning the combined result to the hash function. In a similar fashion, the signature information verifying unit 1611 generates replacing file hash values "fha3", ..., and so on based on replaced 1st hash tables 1633 "REPHA1TBL3", ..., and so on, respectively.

Next, the signature information verifying unit 1611 reads the 2nd hash table "HA2TBL" 1556 included in the header information 1550 from the DVD 1500. From among c pieces of file hash information included in the read 2nd hash table "HA2TBL" 1556, the signature information verifying unit 1611 replaces file hash values of file hash information including the file identifiers "FID1", "FID3", ..., and so on, which are included in the selected seven pieces of file information, with the generated replacing file hash values "fha1", "fha3", ..., and so on, respectively. The 2nd hash table "HA2TBL" 1556 to which this replacement has been conducted is the replaced 2nd hash table "REPHA2TBL" 1639.

1.4.3.3 Signature Information Verification

Figure 20:
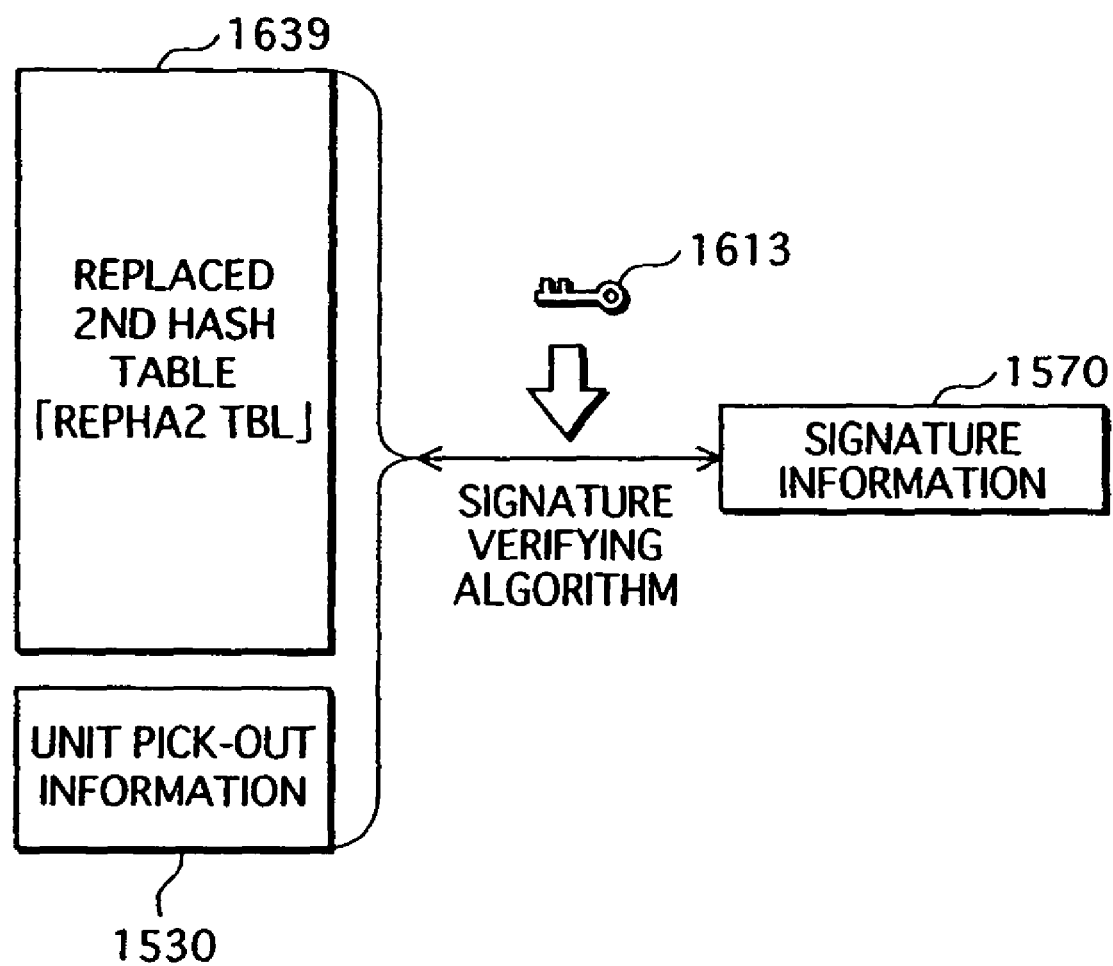
FIG. 20 shows verification of signature information performed by the signature information verifying unit 1611.

The following describes signature information verification with the aid of FIG. 20.

After generating the replaced 2nd hash table "REPHA2TBL" 1639, the signature information verifying unit 1611 reads the verification key 1613 from the verification key storing unit 1612.

Subsequently, the signature information verifying unit 1611 generates a combined result formed by combining all the file hash values and replacing file hash values included in the replaced 2nd hash table "REPHA2TBL" 1639 and c pieces of file information included in the unit pick-out information 1530, and generates signature verification information by applying a signature verifying algorithm V to the generated combined result with the use of the verification key 1613. Then, the signature information verifying unit 1611 compares the generated signature verification information and the signature information 1570 received from the acquiring unit 1601. When these two do not agree, the signature information verifying unit 1611 judges that the signature verification is unsuccessful, and outputs playback prohibition information indicating prohibition of the contents playback to the executing unit 1606. Here, the signature verifying algorithm V is an algorithm for verifying a signature generated by using the signature generating algorithm S.

When the two agree, the signature information verifying unit 1611 ends the verification processing.

1.4.4 Executing Unit 1606

The executing unit 1606 receives the contents key "CK" from the contents key acquiring unit 1602.

In addition, the executing unit 1606 may receive the playback prohibition information from the signature information verifying unit 1611.

When receiving the contents key "CK", the executing unit 1606 reads the encrypted file "ECNT1" composing the encrypted contents 1580 from the DVD 1500 via the acquiring unit 1601. The executing unit 1606 sequentially applies the decrypting algorithm D1 to the encrypted units "EU1_1", "EU1_2", . . . , and so on composing the read encrypted file 1581 with the use of the received contents key "CK" to generate the file "CNT1" composed of the units "U1_1", "U1_2", . . . , and so on.

Subsequently, the executing unit 1606 expands the generated file "CNT1" to generate video and audio data. The executing unit 1606 generates video and audio signals based on the generated video and audio data, and outputs the generated video and audio signals to the monitor 1620.

Regarding the encrypted filed "ECNT2", . . . , and "ECNTc", the executing unit 1606 repeats the readout, decryption, and expansion as well as output of video and audio signals in a similar fashion.

If receiving the playback prohibition information from the signature information verifying unit 1611 during the repetition, the executing unit 1606 aborts the repetition, and notifies the user of the playback impracticability of the DVD loaded on the executing device 1600 by, for example, turning on an indicator lamp or having the monitor 1620 display a screen notifying an error.

1.4.5 Monitor 1620

The monitor 1620 has a built-in speaker which is connected with the executing device 1600 by a cable.

The monitor 1620 receives the video and audio signals from the executing unit 1606 of the executing device 1600, generates screens from the received image signal, and displays the screens. Furthermore, the monitor 1620 generates audio from the audio signal, and outputs the generated audio from the speaker.

1.5 Operational Behaviors

The following describes operational behaviors of the distributing device 1100 and the executing device 1600.

1.5.1 Operational Behavior of Distributing Device 1100

Figure 21:
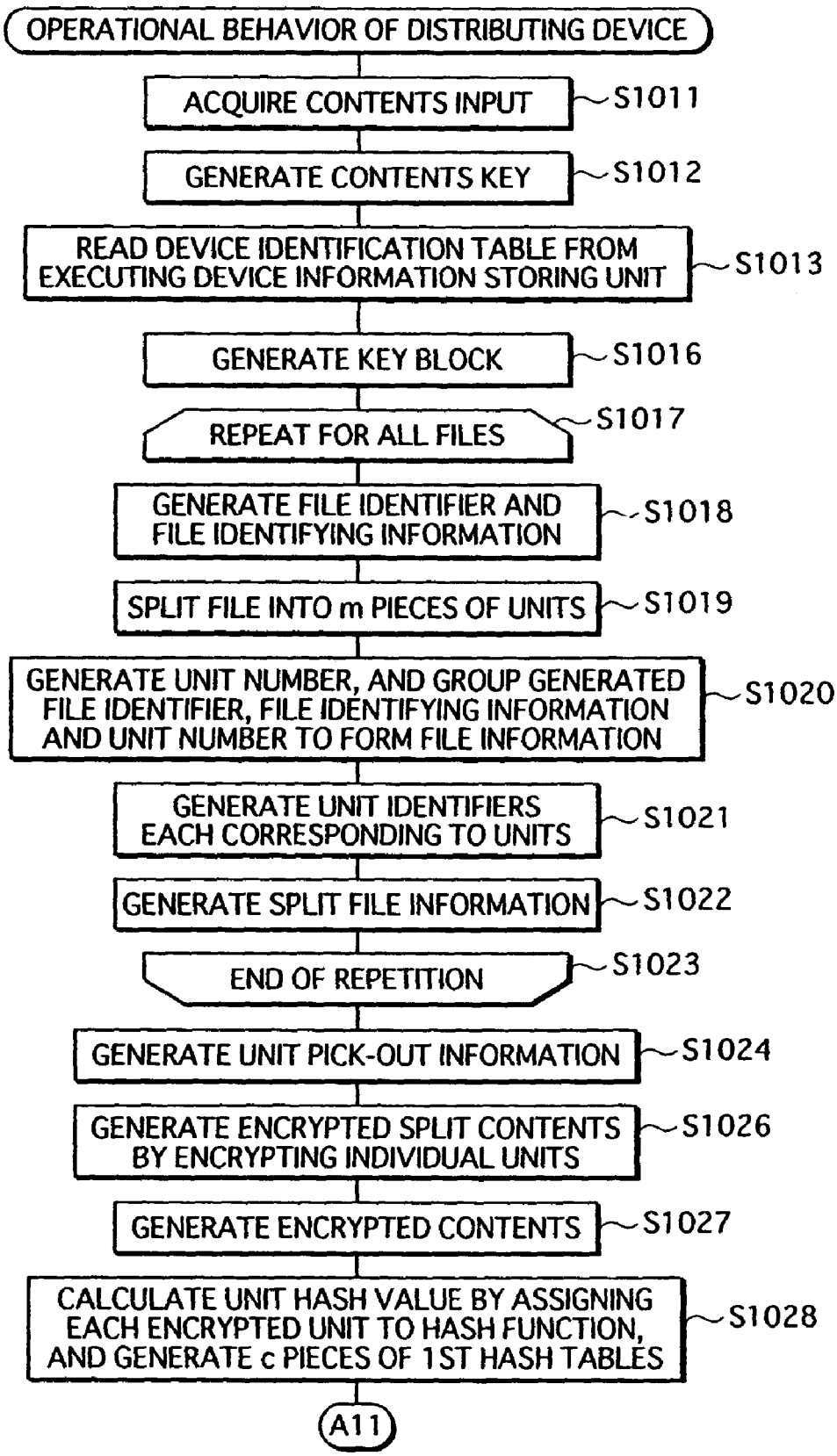
FIG. 21 is a flowchart showing operational behavior of the distributing device 1100.
Figure 22:
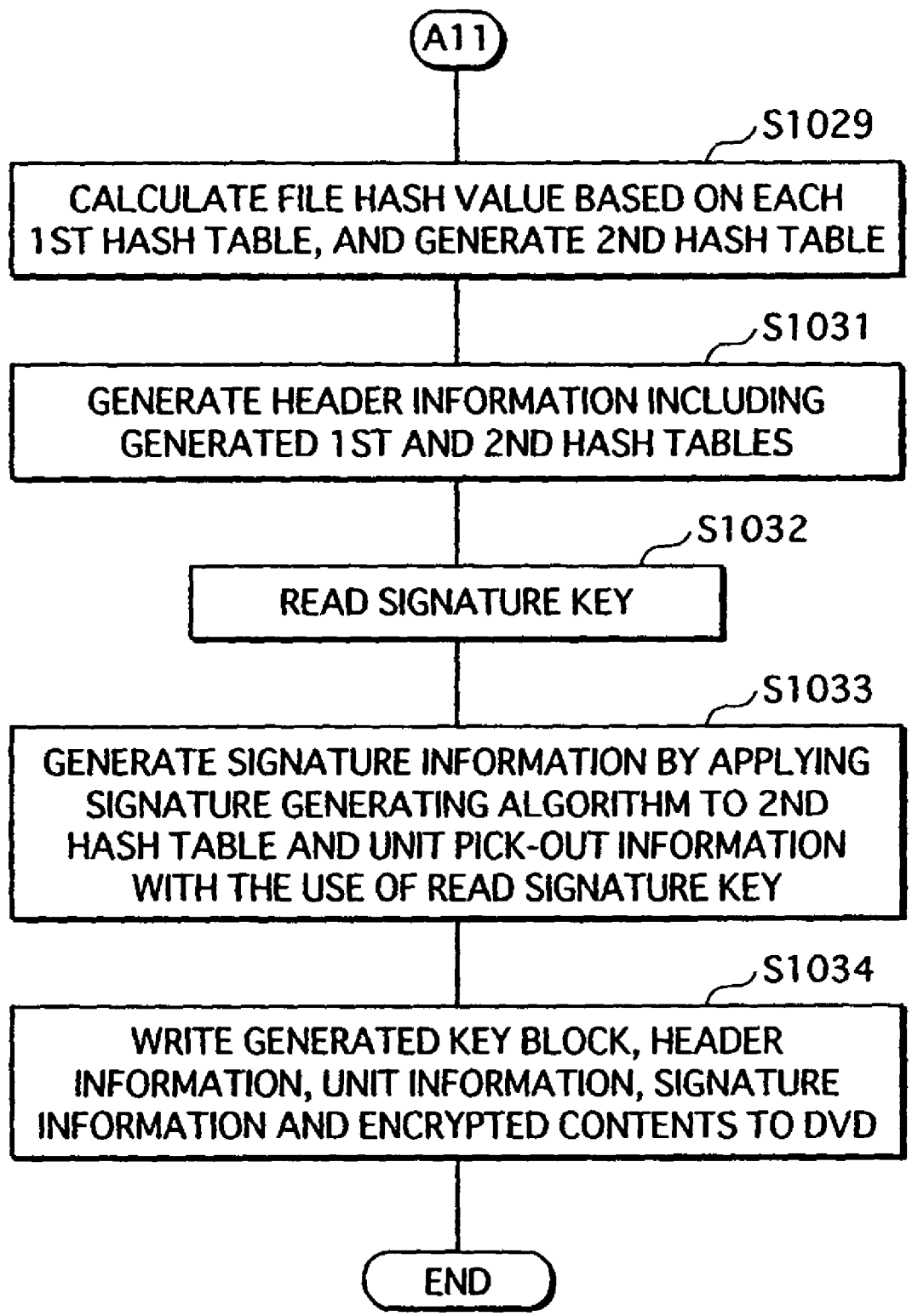
FIG. 22 is a flowchart showing operational behavior of the distributing device 1100 (continued from FIG. 21)

The operational behavior of the distributing device 1100 is described with the aid of flowcharts shown in FIGS. 21 and 22.

The input unit 1101 acquires the contents 1120 composed of c pieces of files according to operations conducted by an operator (Step S1011), and instructs the contents key generating unit 1102 to generate the contents key.

The contents key generating unit 1102 generates the contents key "CK" using a random number, and outputs the generated contents key "CK" to the key block generating unit 1103 (Step S1012).

The key block generating unit 1103 receives the contents key "CK", and reads the device identification table 1130 from the executing device information storing unit 1104 (Step S1013) The key block generating unit 1103 generates the key block 1150, using the received contents key "CK" and the read device identification table 1130 (Step S1016).

In Steps S1017 to S1023, the unit generating unit 1105 of the distributing device 1100 repeats processing of Steps S1018 to S1022 with respect to each file composing the contents 1120.

The unit generating unit 1105 generates a file identifier and file identifying information corresponding to a file (Step S1018). Subsequently, the unit generating unit 1105 generates m pieces of units by splitting the file (Step S1019), generates a unit number indicating the number of the generated units, and generates file information composed of the generated file identifier, file identifying information, and unit number (Step S1020).

Next, the unit generating unit 1105 generates unit identifiers corresponding one-to-one with the generated units (Step S1021). Subsequently, the unit generating unit 1105 generates m pieces of unit information, each piece of which includes a corresponding unit identifier and a unit, and puts these pieces of unit information together to form a split file. Then, the unit generating unit 1105 generates split file information composed of the split file and file identifier (Step S1022).

After completing the repetition of Steps S1017 to S1023 for all the files and the generation of c pieces of split file information and file information, the unit generating unit 1105 generates the unit pick-out information 1200 composed of the c pieces of file information (Step S1024), and outputs the generated unit pick-out information 1200 to the signature information generating unit 1111 and the recording unit 1114. In addition, the unit generating unit 1105 outputs the split contents 1160 composed of the c pieces of split file information to the encryption processing unit 1106.

The encryption processing unit 1106 receives the split contents 1160 from the unit generating unit 1105, and generates the encrypted split contents 1210 by encrypting each unit of individual split files composing the received split contents 1160 with the use of the contents key "CK" (Step S1026).

Next, the encryption processing unit 1106 generate c pieces of encrypted files by extracting encrypted units from each encrypted split file, and puts these encrypted files together to form the encrypted contents 1330 (Step S1027). Next, the encryption processing unit 1106 outputs the encrypted split contents 1210 to the header information generating unit 1107 while outputting the encrypted contents 1330 to the recording unit 1114.

The header information generating unit 1107 receives the encrypted split contents 1210 from the encryption processing unit 1106. The header information generating unit 1107 calculates unit hash values by assigning encrypted units included in each encrypted split file composing the encrypted split contents 1210 to the hash function, and generates c pieces of 1st hash tables (Step S1028).

Next, the header information generating unit 1107 calculates, with respect to each of the 1st hash tables, a file hash value based on the 1st hash table, and generates the 2nd hash table 1269 including c pieces of calculated file hash values (Step S1029).

Next, the header information generating unit 1107 generates the header information 1260 including the generated 2nd hash table 1269 and the c pieces of 1st hash tables (Step S1031).

The signature information generating unit 1111 reads the signature key 1113 from the signature key storing unit 1112 (Step S1032), and generates signature information by applying the signature generating algorithm to the 2nd hash table 1269 and unit pick-out information with the use of the read signature key 1113 (Step S1033).

The recording unit 1114 writes the key block 1150, unit information 1200, header information 1260, signature information 1310, and encrypted contents 1330 to the DVD 1500 (Step S1034).

1.5.2 Operational Behavior of Executing Device 1600

Figure 23:
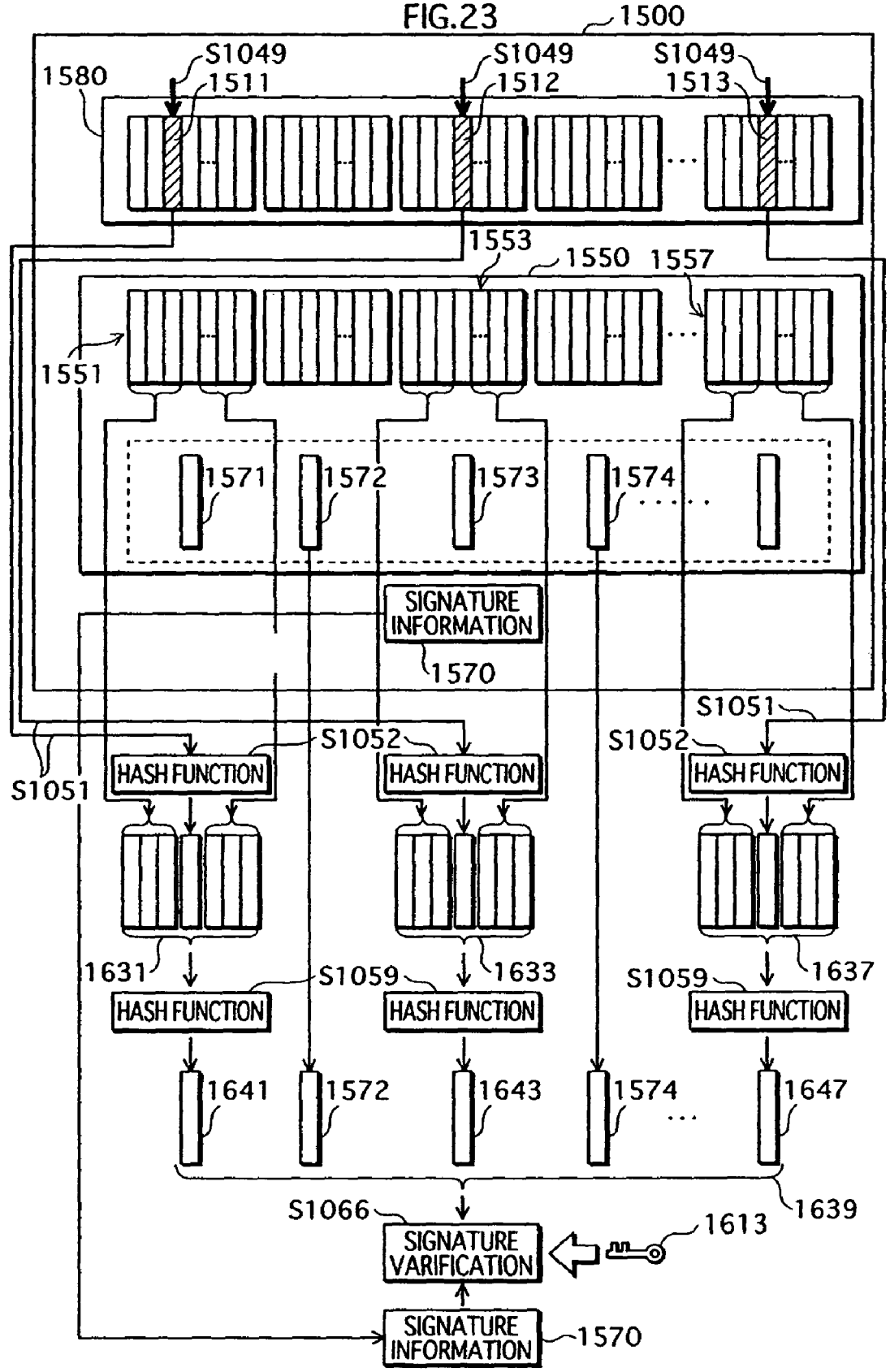
FIG. 23 shows a verification procedure of signature information performed by the executing device 1600.
Figure 24:
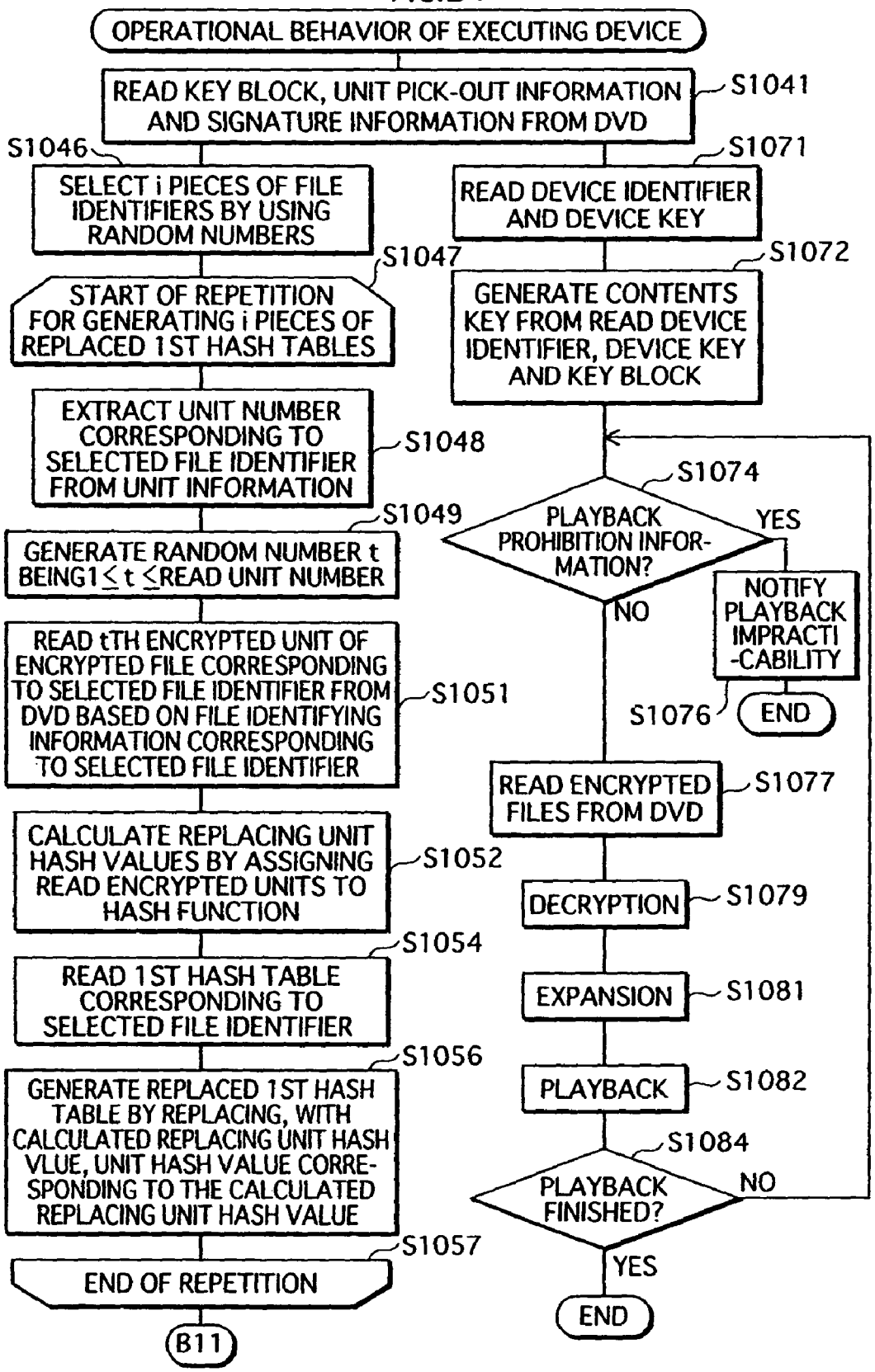
FIG. 24 is a flowchart showing operational behavior of the executing device 1600.
Figure 25:
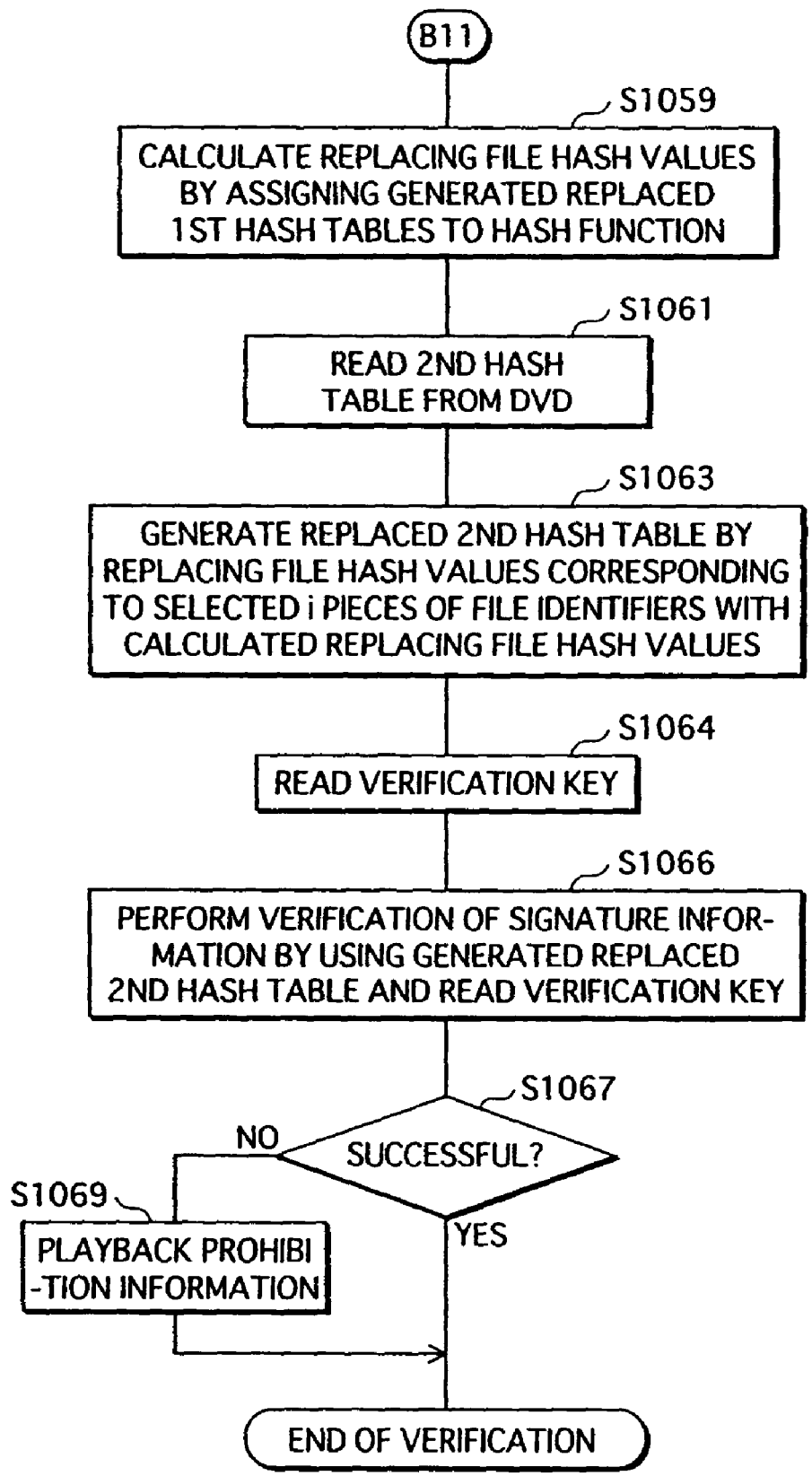
FIG. 25 is a flowchart showing operational behavior of the executing device 1600 (continued from FIG. 24)

FIG. 23 shows a process of information fabrication involved in verification of the signature information. For convenience of the description, regarding the header information 1550, only unit hash values included in the let hash tables and file hash values included in the 2nd hash table are depicted in the figure. FIGS. 24 and 25 are flowcharts showing operational behavior of the executing device 1600. Note that the same step numbers in FIGS. 23 to 25 indicate the same processing.

The following explains the operational behavior of the executing device 1600 with the aid of FIGS. 23 to 25.

When being loaded with the DVD 1500, the acquiring unit 1601 reads the key block 1510, unit pick-out information 1530, and signature information 1570 from the DVD 1500, and outputs the key block 1510 to the contents key acquiring unit 1602 while outputting the unit pick-out information 1530 and signature information 1570 to the signature information verifying unit 1611 (Step S1041).

The signature information verifying unit 1611 receives the unit pick-out information 1530 and signature information 1570, and selects i pieces out of c pieces of file identifiers included in the unit pick-out information 1530 with the use of a random number (Step S1046).

In Steps S1047 to S1057, the signature information verifying unit 1611 repeats processing of Steps S1048 to S1056 with respect to each of the selected i pieces of file identifiers to generate i pieces of replaced 1st hash tables.

The signature information verifying unit 1611 extracts a unit number corresponding to one of the selected file identifiers from unit information (Step S1048). Subsequently, the signature information verifying unit 1611 generates a random number t that is 1 or greater but the read unit number or smaller (Step S1049) The signature information verifying unit 1611 extracts a piece of file identifying information corresponding to the selected file identifier from the unit information, and reads the t-th encrypted unit in the encrypted file corresponding to the selected file identifier from the DVD 1500 based on the extracted unit identifying information (Step S1051). In FIG. 23, every time when the above processing is repeated, the signature information verifying unit 1161 sequentially reads: an encrypted unit 1511 included in the encrypted file 1581; an encrypted unit 1512 included in the encrypted file 1583; . . . ; and an encrypted unit 1513 included in the encrypted file 1587.

The signature information verifying unit 1611 calculates replacing unit hash values by assigning the read encrypted units to the hash functions (Step S1052).

Next, the signature information verifying unit 1611 reads a 1st-hash table corresponding to the selected file identifier from the DVD 1500 (Step S1054), and generates a replaced 1st hash table by replacing, with the calculated replacing unit hash value, a unit hash value corresponding to the calculated replacing unit hash value (Step S1056) In FIG. 23, every time when the above processing is repeated, the signature information verifying unit 1611 generates: the replaced 1st hash table 1631 from the encrypted unit 1511 and 1st hash table 1551; the replaced 1st hash table 1633 from the encrypted unit 1512 and 1st hash table 1553; . . . ; and the replaced 1st hash table 1637 from the encrypted unit 1513 and 1st hash table 1557.

After completing the repetition of Steps S1047 to S1057 for all the i pieces of file identifiers, the signature information verifying unit 1611 calculates i pieces of replacing file hash values by individually assigning the replaced 1st hash tables to the hash function (Step S1059).

Next, the signature information verifying unit 1611 reads the 2nd hash table 1556 from the DVD 1500 (Step S1061), and generates a replaced 2nd hash table 1639 by replacing file hash values corresponding to the selected i pieces of file identifiers with the calculated i pieces of replacing file hash values (Step S1063). In FIG. 23, the generated replaced 2nd hash table 1639 includes: a replacing file hash value 1641 calculated from the replaced 1st hash table 1631; a file hash value 1572 read from the DVD 1500; a replacing file hash value 1643 calculated from the replaced 1st hash table 1633; . . . ; and a replacing file hash value 1647 calculated from the replaced 1st hash table 1637.

Next, the signature information verifying unit 1611 reads the verification key 1613 from the verification key storing unit 1612 (Step S1064), and performs verification of the signature information 1570 by using the unit pick-out information 1530, the generated replaced 2nd hash table, and the read verification key 1613 (Step S1066).

When the verification of the signature information is successful (Step S1067: YES), the signature information verifying unit 1611, then, ends the verification of the signature information 1570.

If the signature verification is unsuccessful (Step S1067: NO), the signature information verifying unit 1611 outputs playback prohibition information to the executing unit 1606 (Step S1073).

The contents key acquiring unit 1602 receives the key block 1510, and reads the device identifier 1608 and device key 1609 from the device key storing unit 1604 (Step S1071). Then, the contents key acquiring unit 1602 generates the contents key "CK" from the read device identifier 1608, devise key 1609, and key block 1510, and outputs the generated contents key "CK" to the executing unit 1606 (Step S1072).

The executing unit 1606 receives the contents key "CK". Here, if having received playback prohibition information from the signature information verifying unit 1611 (Step S1074: YES), the executing unit 1606 notifies the user of the playback impracticability of the contents stored on the DVD 1500 (Step S1076), and ends the playback.

If having not received playback prohibition information (Step S1074: NO), the executing unit 1606 reads encrypted files composing the encrypted contents 1580 from the DVD 1500 (Step S1077). The executing unit 1606 first generates files by decrypting the read encrypted files with the use of the contents key "CK" (Step S1079), and then generates video and audio data by expanding the generated files (Step S1081). Then, the executing unit 1606 generates video and audio signals from the generated video and audio data, respectively, outputs these signals to the monitor 1400, and has the monitor 1400 play the video and audio (Step S1082). When having finished reading all the encrypted files or being instructed to finish the playback by operations conducted by the user (Step S1084: YES), the executing unit 1606 ends the playback.

If there are still encrypted files which have not yet been read, and the executing unit 1606 has not been received an instruction for finishing the playback from the user, the executing unit 1606 returns to Step S1074 and repeats the processing of Steps 1074 to S1084.

1.6 Summary and Advantageous Effects

As having been described, in the present embodiment, the DVD 1500 stores: encrypted contents including c pieces of encrypted files, each of which includes a plurality of encrypted units; header information including c pieces of 1st hash tables generated based on the plurality of encrypted units as well as a 2nd hash table; and signature information generated based on the 2nd hash table.

At the same time when starting readout, decryption, and playback of the encrypted contents, the executing device 1600 randomly selects i pieces of encrypted units with the use of random numbers, and calculates replacing unit hash values and replacing file hash values based on the selected i pieces of encrypted units.

Next, the executing device 1600 reads the 2nd hash table from the DVD, and generates a replaced 2nd hash table by replacing, from among file hash values included in the read 2nd hash table, file hash values corresponding to the calculated replacing file hash values with the calculated replacing file hash value. Then, the executing device 1600 performs verification of signature information by using the replaced 2nd hash table. If the verification is unsuccessful, the executing device 1600 aborts playback of the contents.

Thus, by limiting the number of unit hash values newly calculated for verification of the signature information to i pieces, it is possible to reduce the amount of calculation involved in the verification of signature information, which leads to a reduction in processing load at the contents playback.

Furthermore, by performing the verification of signature information with the use of a two-layer structure composed of 1st and 2nd hash tables, the executing device 1600 is capable of reducing the amount of information read from the DVD 1500. More specifically speaking, in the first embodiment of the present invention, there is no need to read 1st hash tables corresponding to file information which was not selected. Accordingly, it is possible to shorten the time required for reading information.

Additionally, 1st hash tables corresponding to selected file information are read in the first embodiment. However, from among components making up 1st hash tables corresponding to the selected file information, only components other than unit hash values corresponding to the calculated replacing unit hash values may be read. The same applies to reading a 2nd hash table. Herewith, it is possible to further reduce the amount of information read from the DVD 1500.

By performing the verification of signature information with the use of replaced hash values generated from the encrypted units, it is possible to complete both verification of whether unauthorized contents are included and verification of whether signature information was generated by using a signature key owned by a legitimate right holder at one time.

In the verification processing, if part or all of the encrypted contents of the DVD 1500 is replaced with unauthorized contents, the first embodiment has a high chance of detecting the unauthorized contents since only i pieces of encrypted units are randomly selected for use.

Here, a specific description is provided on the assumption that half of the encrypted contents have been rewritten to unauthorized contents. The probability of a selected single encrypted unit being a valid encrypted unit generated by the distributing device 1100 is 1/2. For example, in the case of selecting seven encrypted units and performs the verification, the probability of all the selected seven encrypted units being valid encrypted units is $(1/2)^7=1/128$. Namely, in this case, the probability of not being able to detect the unauthorized contents and is less than 1%. Herewith, the first embodiment acts as a deterrent to prevent fraudulent acts involving replacing part of contents distributed by a legitimate right holder with unauthorized contents and distributing this.

1.7 Modification of First Embodiment

In the first embodiment, the distributing device 1100 splits each file composing the acquired contents into units, and then conducts encryption for each unit. However, the distributing device 1100 may conducts encryption with respect to each file to generate encrypted files, and generate encrypted units by splitting each of the generated encrypted files. In this case, the executing unit 1606 of the executing device 1600 reads the encrypted contents from the DVD 1500, decrypts the read encrypted contents with respect to each encrypted file, and plays the decrypted contents.

Figure 26:
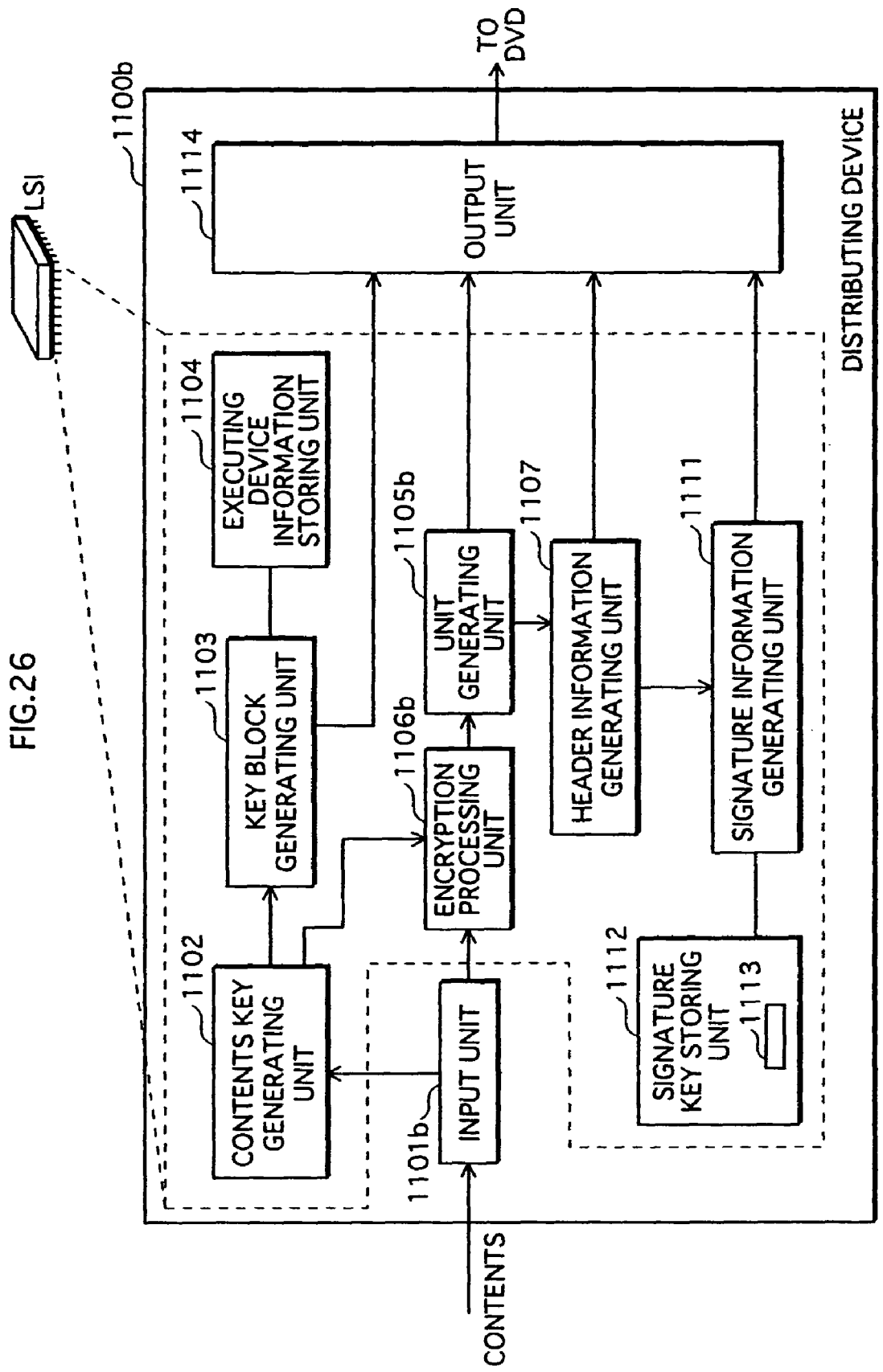
FIG. 26 is a block diagram showing a structure of an executing device 1100b according to a modification of the first embodiment.

A distributing device 1100*b* of the present modification is described with the aid of FIG. 26.

The distributing device 1100*b* is composed of an input unit 1101*b*, a contents key generating unit 1102, a key block generating unit 1103, an executing device information storing unit 1104, a unit generating unit 1105*b*, an encryption processing unit 1106*b*, a header information generating unit 1107, a signature information generating unit 1111, a signature key storing unit 1112, and a recording unit 1114.

Since the contents key generating unit 1102, key block generating unit 1103, and executing device information storing unit 1104, header information generating unit 1107, signature information generating unit 1111, signature key storing unit 1112, and recording unit 1114 are the same as in the first embodiment, the descriptions for these components are left out.

Additionally, since the input-unit 1101*b* is the same as the input unit 1101 of the first embodiment except for outputting the contents to the encryption processing unit instead of to the unit generating-unit, the description is also omitted.

1.7.1 Encryption Processing Unit 1106*b*

The encryption processing unit 1106*b* receives the contents key "CK" from the contents key generating unit 1102.

The encryption processing unit 1106 receives contents from the input unit 1101*b*. Here, the contents are composed of files "CNT1", "CNT2", ..., and "CNTc", as is the case with the contents 1120 shown in FIG. 3.

When receiving the contents, the encryption processing unit 1106 generates the encrypted file "ECT1" by applying the encrypting algorithm E1 to the file "CNT1" included in the received contents with the use of the contents key "CK".

The encryption processing unit 1106 does the same with the files "CNT2" to "CNTc" to generate encrypted files "ECNT2" to "ECNTc".

Next, the encryption processing unit 1106 outputs the encrypted contents composed of the generated encrypted files "ECNT1", "ECNT2", "ECNT3", ..., and "ECNTc" to the unit generating unit 1105*b* and recording unit 1114*b*.

1.7.2 Unit Generating Unit 1105*b*

The unit generating unit 1105*b* receives the encrypted contents from the encryption processing unit 1106*b*. When receiving the encrypted contents; the unit generating unit 1105*b* generates the file identifier "FID1" and the piece of file identifying information "AD1" corresponding to the encrypted file "ECNT1" included in the received encrypted contents.

Next, the unit generating unit 1105*b* splits the encrypted file "ECNT1" every 64 kilobytes to generate m pieces of encrypted units. At this point, if the last encrypted unit is less than 64 kilobytes, the encrypted unit is supplemented with data like "000 ... 000".

Next, the unit generating unit 1105*b* generates a number "N1" indicating the number of the generated encrypted units, and then generates file information composed of the generated file identifier "FID1", piece of file identifying information "AD1", and unit number "N1".

Next, the unit generating unit 1105*b* generates unit identifiers "UID1_1", "UID1_2", "UID1_3", ..., and "UID1_m" corresponding to the generated m pieces of encrypted units "EU1_1", "EU1_2", "EU1_3", ..., and "EU1_m", respectively. Subsequently, the unit generating unit 1105*b* forms m pieces of encrypted unit information by pairing the corresponding encrypted units with the unit identifiers.

Next, the unit generating unit 1105b puts the m pieces of encrypted unit information together to form the encrypted split file "SplECNT1".

The unit generating unit 1105b repeats processing of the same kind for the rest of encrypted files "ECNT2", "ECNT3", . . . , and "ECNTc" included in the encrypted contents to generate encrypted split files "SplECNT2", "SplECNT3", . . . , and "SplECNTc" as well as the rest pieces of file information. Then, the unit generating unit 1105b outputs the generated c pieces of encrypted split files "SplECNT1", "SplECNT2", "SplECNT3", . . . , and "SplECNTc" to the header information generating unit 1107b as encrypted split contents.

In addition, the unit generating unit 1105b generates unit pick-out information composed of the c pieces of file information, and outputs the generated unit pick-out information to the recording unit 1114 and signature information generating unit 1111b.

2. Second Embodiment

A second embodiment according to the present invention is described below with the aid of drawings.

2.1 Unauthorized Contents Detection System

An unauthorized contents detection system of a second embodiment is composed of a distributing device, an executing device, and a monitor, as in the unauthorized contents detection system 1 of the first embodiment.

The distributing device acquires contents according to operations conducted by an operator, and generates encrypted contents by encrypting the acquired contents. In addition, the distributing, device extracts part of the contents, and generates information such as header information used for detecting whether unauthorized contents are included in the contents, signature information for proving that the contents are issued by a legitimate right holder, and the like, based on the extracted part of the contents (hereinafter, referred to as "representative partial contents"). The distributing device writes the generated encrypted contents, signature information, and the like to a DVD.

The DVD will be sold or distributed to users through distribution outlets.

When loaded with the DVD, the executing device generates representative partial contents from the encrypted contents stored in the loaded DVD, and performs verification of the signature information and header information based on the generated representative partial contents. If the verification is successful, the executing device starts playback of the contents. When the verification is unsuccessful, the executing device prohibits the contents playback.

Individual devices composing the unauthorized contents detection system of the present embodiment and the DVD are described in detail below.

2.2 Distributing Device 2100

Figure 27:
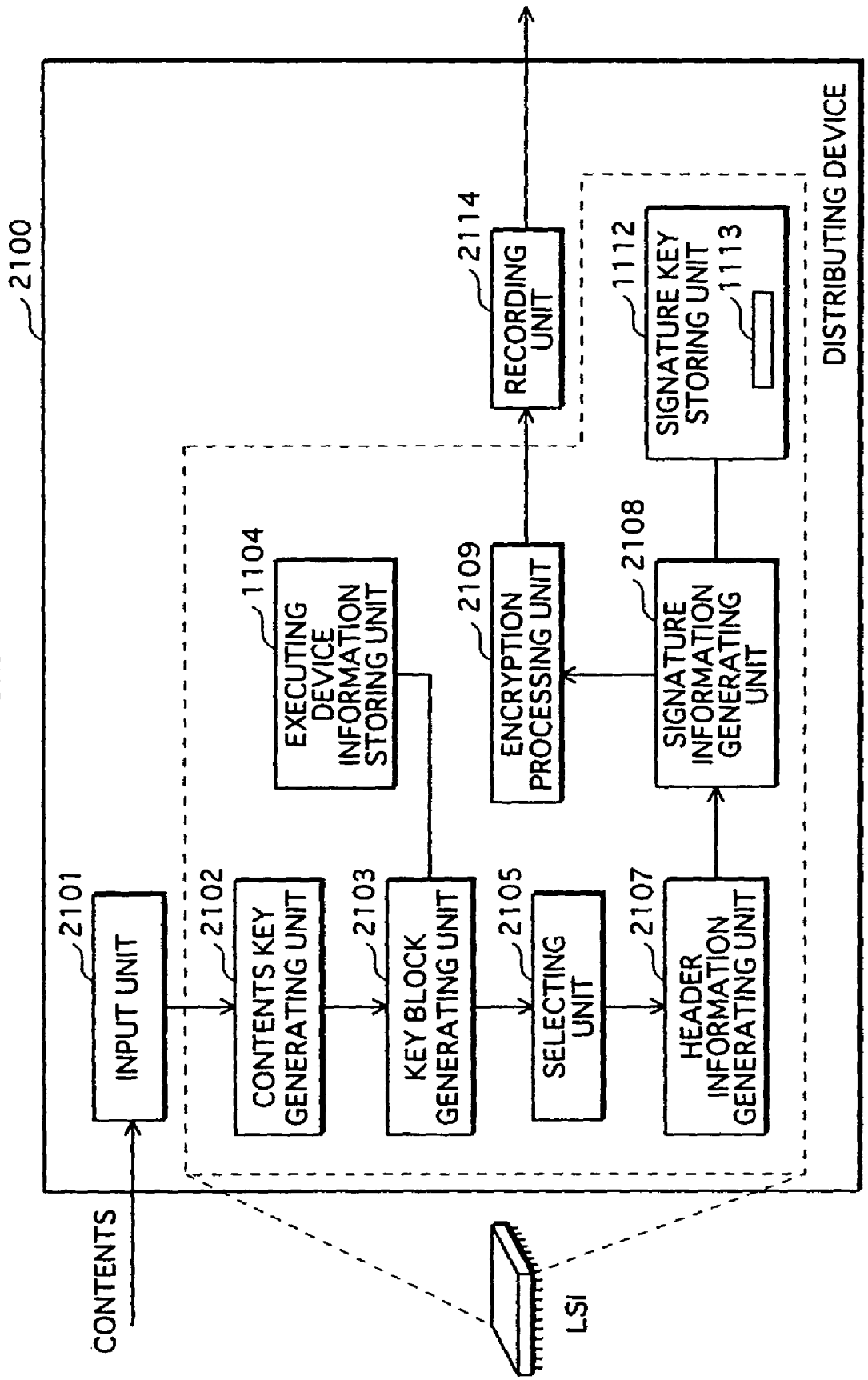
FIG. 27 is a block diagram showing a structure of a distributing device 2100 according to a second embodiment.

FIG. 27 shows a structure of a distributing device constituting the unauthorized contents detection system of the present embodiment. As shown in FIG. 27, the distributing device 2100 is composed of an input unit 2101, a contents key generating unit 2102, a key block generating unit 2103, an executing device information storing unit 1104, a selecting unit 2105, a header information generating unit 2167, a signature information generating unit 2108, a signature key storing unit 1112, an encryption processing unit 2109, and a recording unit 2114.

Individual components composing the distributing device 2100 are described in detail below. Note that, since the executing device information storing unit 1104 and signature key storing unit 1112 are the same as in the first embodiment, the descriptions for these components are left out.

2.2.1 Input Unit 2101

The input unit 2101 acquires contents and multiple pieces of identifying information from an external device or external recording medium according to operations of the operator.

Figure 28:
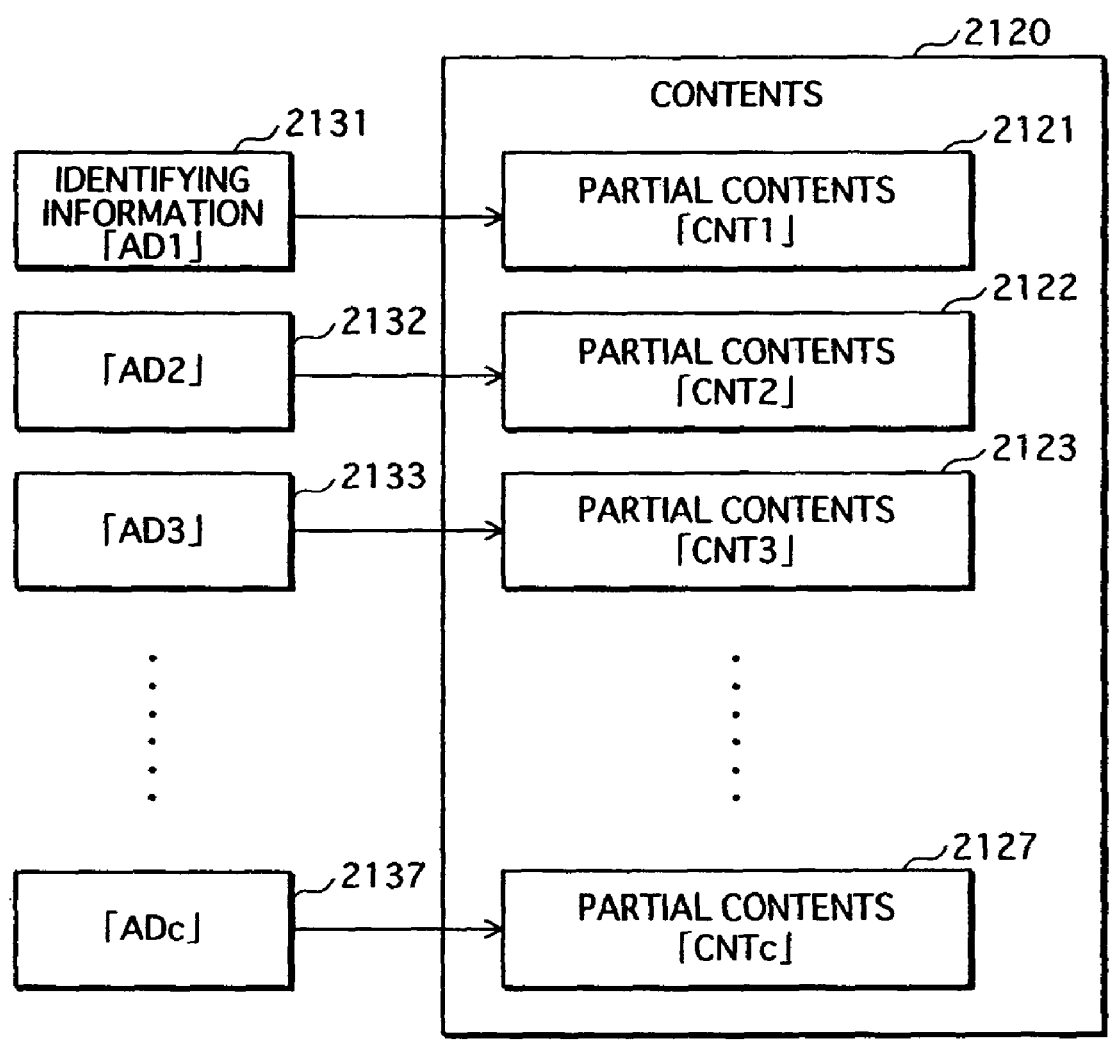
FIG. 28 shows contents 2120 and pieces of identifying information to be input to the distributing device 2100.

FIG. 28 shows an example of a structure of the contents and identifying information acquired by the input unit 2101. Contents 2120 are composed of c pieces of partial contents "CNT1" 2121, "CNT2" 2122, "CNT3" 2123, . . . , and "CNTc" 2127. Here, the contents 2120 acquired by the input unit 2101 are a playable format for an executing device 2600 (as will hereinafter be described in detail), and the DVD-Video format and the MPEG-2 format are examples of such playable formats.

Each piece of the identifying information is information uniquely indicating one of the partial contents constituting the contents 2120, and is, for example, an offset of a corresponding piece of partial contents from the head of the contents, a sector number, or a playback starting point of the piece of partial contents specified by reference to the head of the contents. For example, a piece of identifying information "AD1" 2131 corresponds to the partial contents "CNT1" 2121, and the head of the partial contents "CNT1" 2121 is positioned at "AD1" from the head of the contents 2120.

The input unit 2101 outputs the acquired contents 2120 and c pieces of identifying information to the contents key generating unit 2102.

2.2.2 Contents Key Generating Unit 2102

The contents key generating unit 2102 receives the contents 2120 and c pieces of identifying information from the input unit 2101. When receiving the contents 2120 and c pieces of identifying information, the contents key generating unit 2102 generates a pseudorandom number, and generates a 128-bit length contents key "CK" with the use of the generated pseudorandom number. Instead of a pseudorandom number, a true random number may be generated by using, for example, noise on a signal.

Next, the contents key generating unit 2102 outputs the generated contents key "CK", the received contents 2120 and c pieces of identifying information to the key block generating unit 2103 and encryption processing unit 2109.

2.2.3 Key Block Generating Unit 2103

The key block generating unit 2103 receives the contents key "CK", contents 2120, and c pieces of identifying information from the contents key generating unit 2102. When receiving the contents key "CK", the key block generating unit 2103 generates a key block by using the device identification table 1130 stored in the executing device information storing unit 1104 and the received contents key "CK". Since a procedure for generating the key block is the same as in the first embodiment, the description is omitted. In addition, the key block generated here has the same structure as the key block 1150 shown in FIG. 5.

Next, the key block generating unit 2103 outputs the generated key block, and the received contents key "CK", contents 2120, and c pieces of identifying information to the selecting unit 2105.

2.2.4 Selecting Unit 2105

Figure 29:
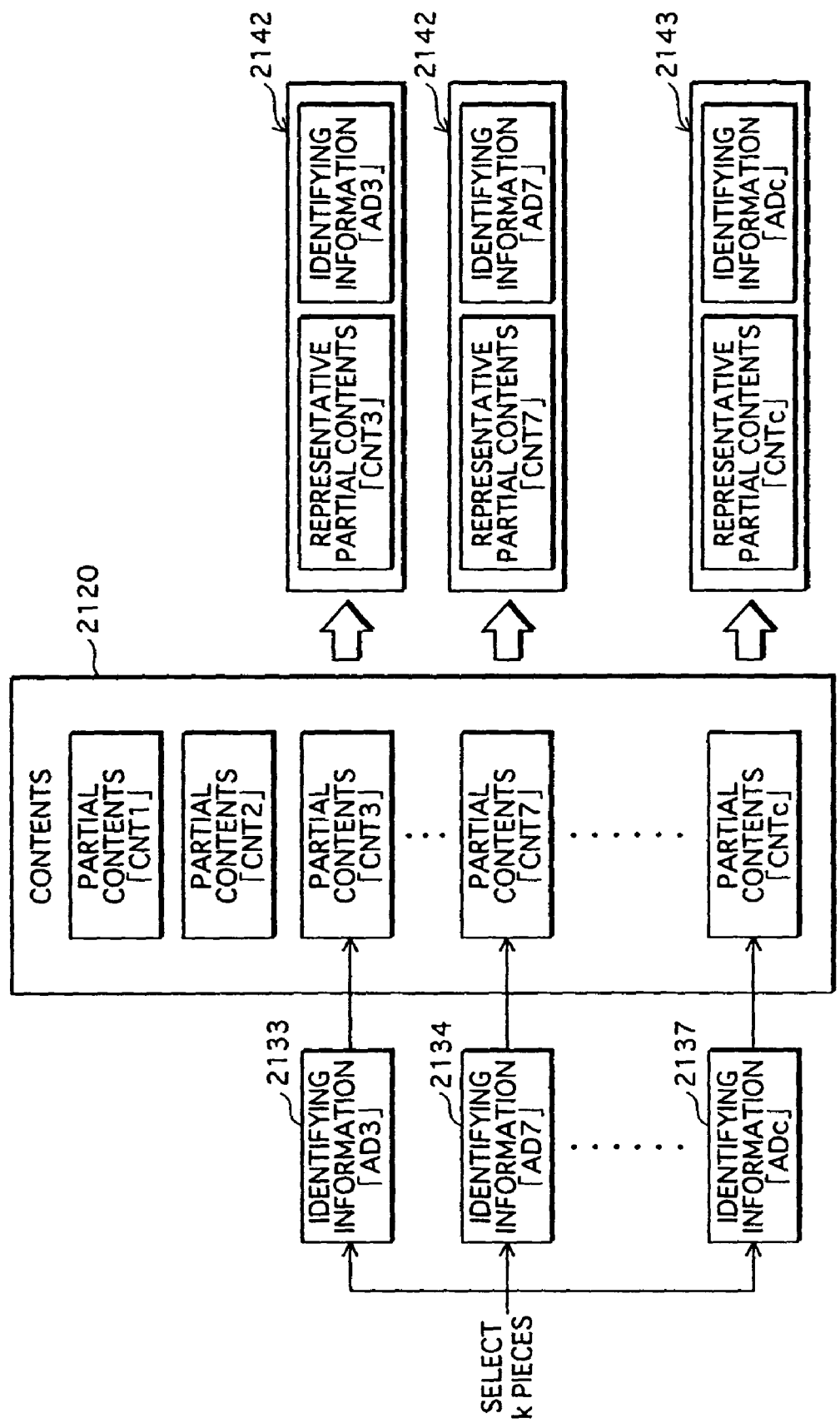
FIG. 29 shows a general outline of processing conducted by a selecting unit 2105.

FIG. 29 shows a general outline of processing performed by the selecting unit 2105. The following describes the selecting unit 2105 with the aid of FIG. 29.

The selecting unit 2105 receives the key block, contents key "CK", contents 2120, and c pieces of identifying information from the key block generating unit 2103. When receiving these sets of information, the selecting unit 2105 selects k pieces but of the received c pieces of identifying information. The description, here, is provided on the assumption that k=3.

Regarding the selecting method, k pieces may be selected, for example, by using random numbers, or selected from dates, temperatures, or the like. Alternatively, it may be designed to accept selections from the operator. If the contents 2120 are the MPEG format, pieces of identifying information indicating intra pictures may be selected. In addition, the selecting unit 2105 may prestore information identifying k pieces to be selected, or may perform selection in response to an instruction from the operator.

As shown in FIG. 29, the selecting unit 2105 here selects pieces of identifying information "AD3" 2133, "AD7" 2134, and "ADc" 2137.

Next, the selecting unit 2105 extracts a piece of partial contents "CNT3" corresponding to the piece of identifying information "AD3" 2133 selected from the received contents 2120, and generates a piece of representative information 2141 composed of the selected piece of identifying information "AD3" 2133 and the extracted piece of partial contents "CNT3". Here, the selected piece of partial contents is referred to as "a piece of representative partial contents".

The selecting unit 2105 repeats processing of the same kind for the pieces of identifying information "AD7" 2134 and "ADc" 2137 to generate pieces of representative information 2142 and 2143.

Next, the selecting unit 2105 outputs to the header information generating unit 2107: the generated three pieces of representative information 2141, 2142, and 2143; and the received key block, contents key "CK", and contents 2120.

2.2.5 Header Information Generating Unit 2107

The header information generating unit 2107 receives the three pieces of representative information 2141, 2142, and 2143, key block, contents key "CK", and contents 2120 from the selecting unit 2105.

When receiving these, the header information generating unit 2107 generates an identifying information identifier "ADID1" uniquely identifying the received piece of representative information 2141. Methods for generating the identifying information identifier include, for example, a sequential assignment of natural numbers and a random assignment using random numbers.

Next, the header information generating unit 2107 extracts the piece of identifying information "AD3" from the received piece of representative information 2141, and generates a piece of representative detecting information composed of the generated identifying information identifier "ADID1" and the piece of identifying information "AD3".

Subsequently, the header information generating unit 2107 extracts the piece of representative partial contents "CNT3" from the received piece of representative information 2141, and generates a partial hash value "HA3" by assigning the extracted representative partial contents "CNT3" to a hash function. The header information generating unit 2107 generates a piece of representative hash information composed of the generated identifying information identifier "ADID1" and partial hash value "HA3".

The header information generating unit 2107 repeats processing of the same kind for the pieces of representative information 2142 and 2143, and generates pieces of representative detecting information and representative hash information. The header information generating unit 2107 generates selected position information composed of the generated three pieces of representative detecting information.

Figure 30:
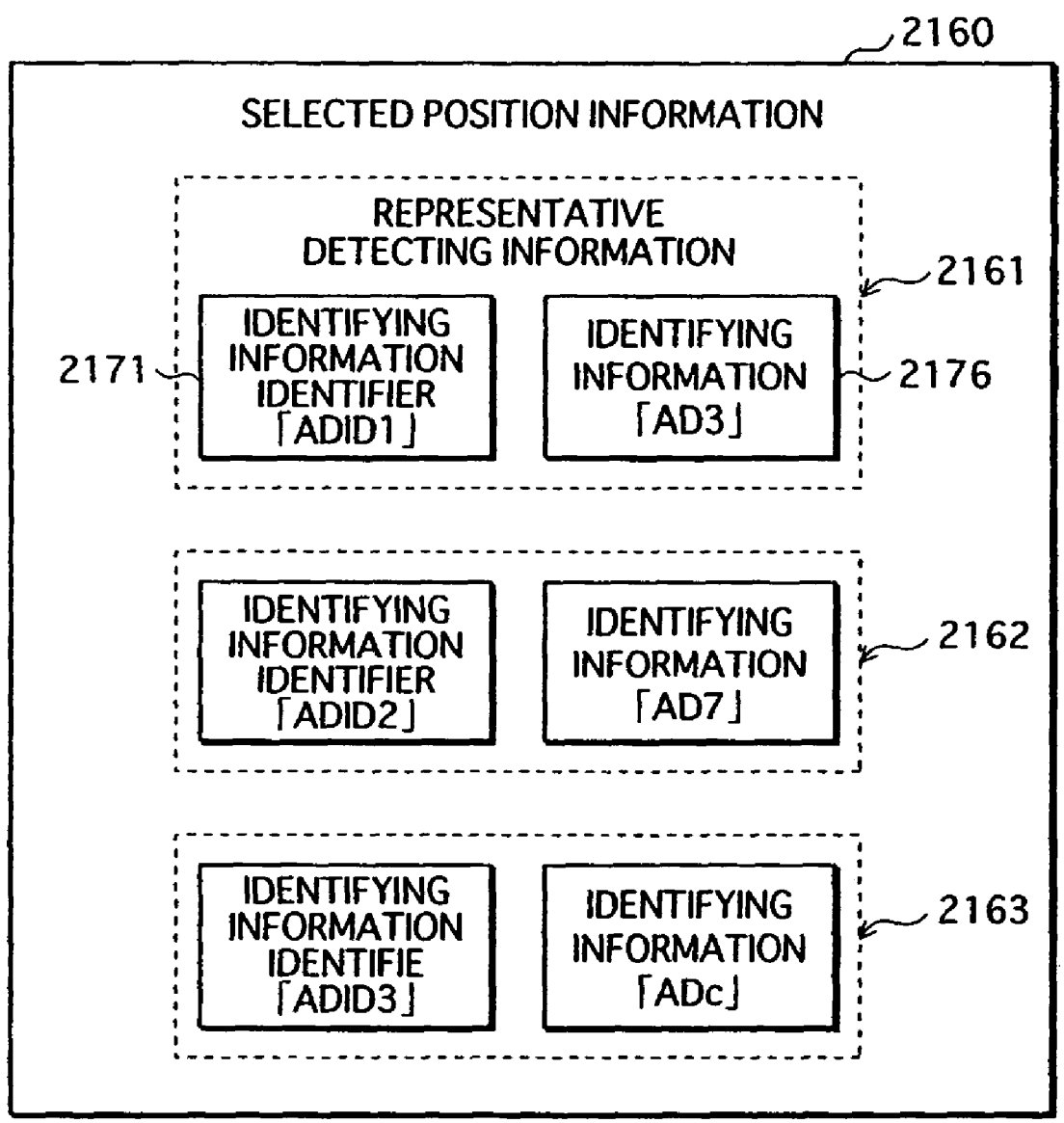
FIG. 30 shows a structure of selected position information 2160 generated by a header information generating unit 2107.

FIG. 30 shows a structure of the selected position information generated at this point. The selected position information 2160 is composed of the pieces of representative detecting information 2161, 2162, and 2163, which correspond to the pieces of representative information, 2141, 2142, and 2143, respectively. Each piece of the representative detecting information is composed of an identifying information identifier and a piece of identifying information. As an example, the piece of representative detecting information 2161 corresponds to the piece of representative information 2141, and includes an identifying information identifier "ADID1" 2171 and a piece of identifying information "AD3" 2176.

In addition, the header information generating unit 2107 generates header information composed of the generated three pieces of representative hash information.

Figure 31:
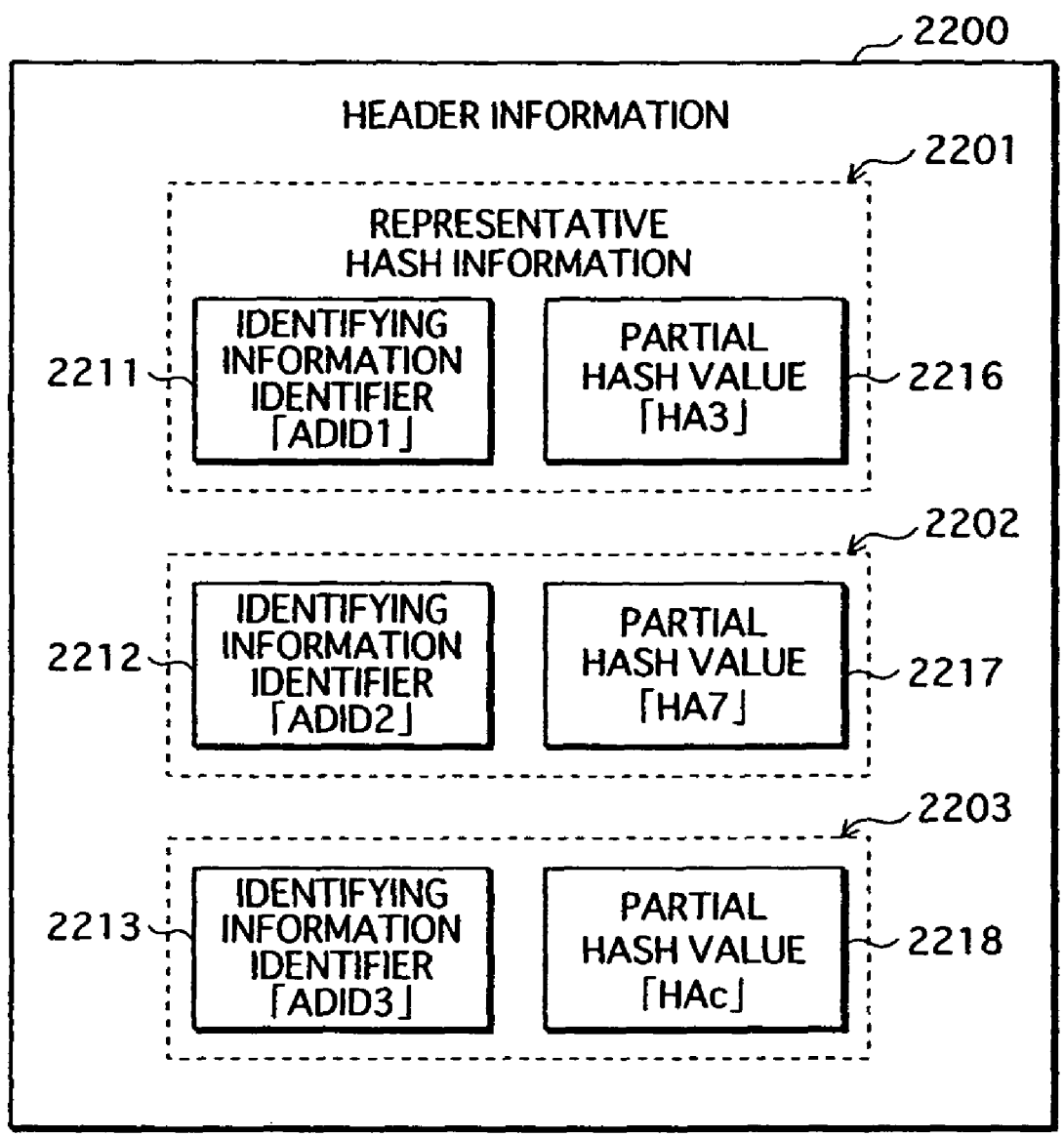
FIG. 31 shows a structure of header information 2200 generated by the header information generating unit 2107.

FIG. 31 shows a structure of the header information generated at this point. As shown in FIG. 31, header information 2200 is composed of pieces of representative hash information 2201, 2202, and 2203, which correspond the pieces of representative detecting information 2161, 2162, and 2163, respectively.

Each piece of representative hash information includes an identifying information identifier and a partial hash value. For example, the piece of representative hash information 2201 is generated based on the piece of representative information 2141, and includes an identifying information identifier "ADID1" 2211 and a partial hash value "HA3".

Next, the header information generating unit 2107 outputs the generated selected position information 2160, header information 2200, and the received key block, contents key "CK", and contents 2120 to the signature information generating unit 2108.

2.2.6 Signature Information Generating Unit 2108

The signature information generating unit 2108 receives the selected position information 2160, header information 2200, key block, contents key "CK", and contents 2120 from the header information generating unit 2107. When receiving these sets of information, the signature information generating unit 2108 extracts the partial hash values "HA3", "HA5", and "HAc" included in the received header information 2200.

Next, the signature information generating unit 2108 reads a signature key 1113 from the signature key storing unit 1112. The signature information generating unit 2108 generates signature information by assigning the signature generating algorithm S to a combined result formed by combining the extracted partial hash values "HA3", "HA5", and "HAc" with the use of the reed of signature key 1113.

Next, the signature information generating unit 2108 outputs the generated signature information, and the received selected position information 2160, header information 2200, key block, contents key "CK", and contents 2120 to the encryption processing unit 2109.

2.2.7 Encryption Processing Unit 2109

The encryption processing unit 2109 receives the signature information, selected position information 2160, header information 2200, key block, contents key "CK", and contents 2120 from the signature information generating unit 2108.

When receiving these sets of information, the encryption processing unit 2109 generates pieces of encrypted partial contents "ECNT1", "ECNT2", "ECNT3", . . . , and "ECNTc" by applying the encrypting algorithm E1 respectively to the pieces of partial contents "CNT1", "CNT2", "CNT3", . . . , and "CNTc" constituting the received the contents 2120 with the use of the received contents key "CK". The generated pieces of encrypted partial contents "ECNT1", "ECNT2", "ECNT3", . . . , and "ECNTc" are collectively referred to as encrypted contents. Here, encryption contents can be denoted as ECNTb=Enc (CK, CNTb), where b is a natural number of c of smaller. FIG. 32 shows a structure of the encrypted contents 2220 generated at this point.

Subsequently, the encryption processing unit 2109 generates encrypted selected position information by applying the encrypting algorithm E1 to the received selected position information with the use of the received contents key "CK".

Next, the encryption processing unit 2109 outputs, the generated encrypted contents 2220 and encrypted selected position information, and the received signature information, header information 2200, and key block to the recording unit 2114.

2.2.8 Recording Unit 2114

The recording unit 2114 is capable of being loaded with the DVD.

The recording unit 2114 receives the encrypted contents 2220, encrypted selected position information, signature information, header information 2200, and key block from the encryption processing unit 2109, and writes the received encrypted contents 2220, encrypted selected position information, signature information, header information 2200, and key block to the DVD.

2.3 DVD 2500

Figure 33:
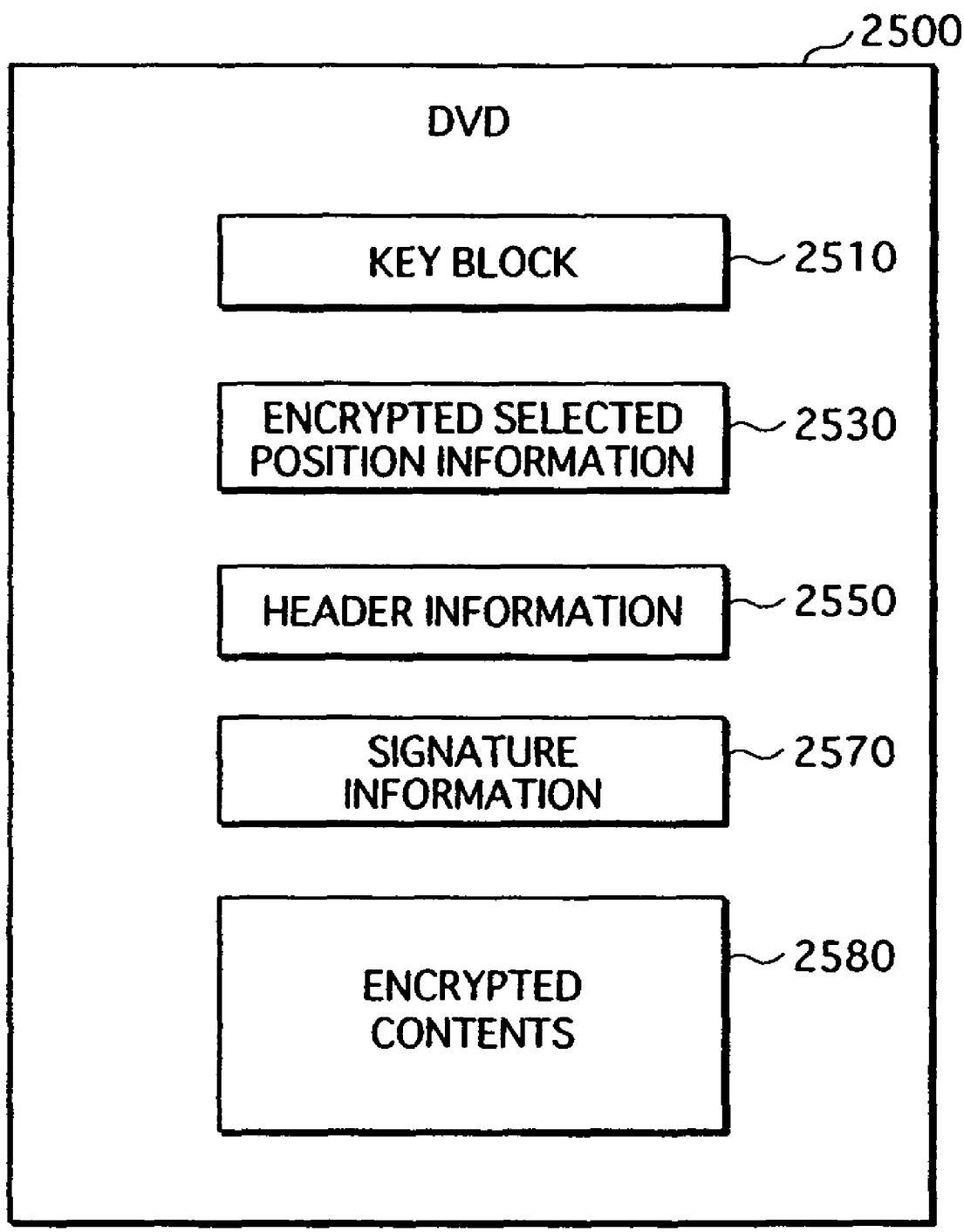
FIG. 33 shows information recorded on a DVD 2500 of the second embodiment.

As shown in FIG. 33, a DVD 2500 stores a key block 2510, encrypted selected position information 2530, header information 2550, signature information 2570, and encrypted contents 2580.

The key block 2510, encrypted selected position information 2530, header information 2550, signature information 2570, and encrypted contents 2580 have been written by the distributing device 2100, and structures of these components are as stated above.

2.4 Executing Device 2600

Figure 34:
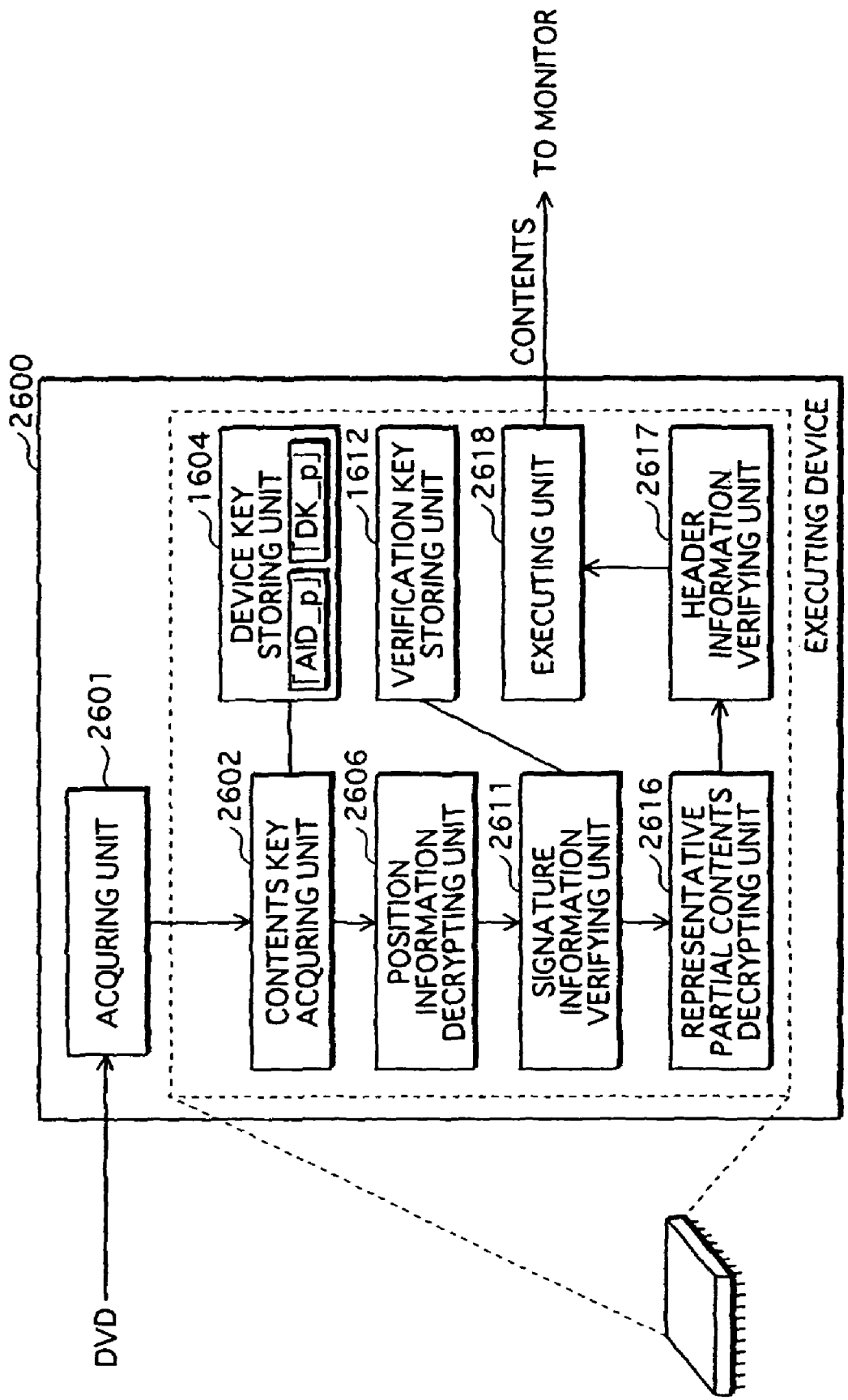
FIG. 34 is a block diagram showing a structure of an executing apparatus 2600 of the second embodiment.

As shown in FIG. 34, the executing device 2600 is composed of an acquiring unit 2601, a contents key acquiring unit 2602, a device key storing unit 1604, a position information decrypting unit 2606, a signature information verifying unit 2611, a verification key storing unit 1612, a representative partial contents decrypting unit 2616, a header information verifying unit 2617, and an executing unit 2618.

Individual components making up the executing device 2600 are described in detail below. Note that, since the device key storing unit 1604 and verification key storing unit 1612 are the same as those constituting the executing device 1600 of the first embodiment, the descriptions of these components are omitted.

2.4.1 Acquiring Unit 2601

The acquiring unit 2601 is loaded with the DVD 2500. When detecting the DVD 2500 being loaded thereon, the acquiring unit 2601 reads the key block 2510, encrypted selected position information 2530, header information 2550, signature information 2570, and encrypted contents 2580 from the DVD 2500. The acquiring unit 2601 outputs the read key block 2510, encrypted selected position information 2530, header information 2550, signature information 2570, and encrypted contents 2580 to the contents key acquiring unit 2602.

2.4.2 Contents Key Acquiring Unit 2602

The contents key acquiring unit 2602 receives the key block 2510, encrypted selected position information 2530, header information 2550, signature information 2570, and encrypted contents 2580 from the acquiring unit 2601.

When receiving these sets of information, the contents key acquiring-unit 2602 generates the contents key "CK" by using the device identifier "AID_p" and the device key "DK_p" stored by the device key storing unit 1604 and the received key block. A procedure for generating the contents key "CK" is the same as the generation procedure of the contents key "CK" conducted by the contents key acquiring unit 1602 constituting the executing device 1600 of the first embodiment, and therefore the description is left out.

Next, the contents key acquiring unit 2602 outputs the generated contents key "CK", and the received encrypted selected position information 2530, header information 2550, signature information 2570, and encrypted contents 2580 to the position information decrypting unit 2606.

2.4.3 Position Information Decrypting Unit 2606

The position information decrypting unit 2606 receives the contents key "CK", encrypted selected position information 2530, header information 2550, signature information 2570, and encrypted contents 2580 from the contents key acquiring unit 2602.

When receiving these sets of information, the position information decrypting unit 2606 generates selected position information by applying the decrypting algorithm D1 to the received encrypted selected position information 2530 with the use of the received contents key "CK". The selected position information generated at this point has the same structure as the selected position information 2160 shown in FIG. 30.

Next, the position information decrypting unit 2606 outputs the generated selected position information, and the received contents key "CK", header information 2550, signature information 2570, and encrypted contents 2580 to the signature information verifying unit 2611.

2.4.4 Signature Information Verifying Unit 2611

The signature information verifying unit 2611 receives the selected position information, contents key "CK", header information 2550, signature information 2570, and encrypted contents 2580 from the position information decrypting unit 2606.

When receiving these sets of information, the signature information verifying unit 2611 reads a verification key from the verification key storing unit 1612. Next, the signature information verifying unit 2611 extracts the partial hash values "HA3", "HA7", and "HAc" from the three pieces of representative hash information, respectively, constituting the received header information 2550, and generates signature verification information by applying the signature verifying algorithm V to the combined result formed by combining the extracted partial hash values "HA3", "HA7", and "HAc" with the use of the read verification key. The signature information verifying unit 2611 compares the generated signature verification information and the received signature information. When these two do not agree, the signature information verifying unit 2611 judges that the signature verification is unsuccessful, and aborts the subsequent processing.

When these two agree, the signature information verifying unit 2611 judges that the signature verification is successful, and outputs the received selected position information, contents key "CK", header information 2550, and encrypted contents 2580 to the representative partial contents decrypting unit 2616.

2.4.5 Representative Partial Contents Decrypting Unit 2616

The representative partial contents decrypting unit 2616 receives the selected position information, contents key "CK" header information 2550, and encrypted contents 2580 from the signature information verifying unit 2611.

When receiving these sets of information, the representative partial contents decrypting unit 2616 extracts the identifying information identifier "ADID1" and the corresponding piece of identifying information "AD3" included in the first representative detecting information constituting the received selected position information, and further extracts a piece of encrypted partial contents "ECNT3" from the received encrypted contents 2580 based on the piece of extracted identifying information "AD3". Next, the representative partial contents decrypting unit 2616 generates the piece of representative partial contents "CNT3" by applying the decrypting algorithm D1 to the extracted encrypted partial contents "ECNT3" with the use of the received contents key "CK". Here, a pair of the generated piece of representative partial contents "CNT3" and the extracted piece of identifying information identifier "ADID1" is referred to as "a piece of verifying representative information".

Next, the representative partial contents decrypting unit 2616 repeats processing of the same kind for the rest pieces of representative detecting information to generate a piece of verifying representative information composed of the identifying information identifier "ADID2" and the piece of representative partial contents "CNT7" as well as a piece of verifying representative information composed of the identifying information identifier "ADID3" and the piece of representative partial contents "CNTc".

Next, the representative partial contents decrypting unit 2616 outputs the generated three pieces of verifying representative information and the received contents key "CK", header information 2550, and encrypted contents 2580 to the header information verifying unit 2617.

2.4.6 Header Information Verifying Unit 2617

The header information verifying unit 2617 receives the three pieces of verifying representative information, contents key "CK", header information 2550, and encrypted contents 2580 from the representative partial contents decrypting unit 2616.

When receiving these sets of information, the header information verifying unit 2617 generates verifying hash values "H3", "H7", and "Hc" by respectively assigning the pieces of representative partial contents "CNT3", "CNT7", and "CNTc" included in the received three verifying representative information to the hash function. The hash function used here is the same as that used in the header information generating unit 2107 of the distributing device 2100.

Next, the header information verifying unit 2617 searches, in the header information 2550, an identifying information identifier conforming to the identifying information identifier "ADID1" included in the corresponding piece of verifying representative information, and extracts the partial hash value "HA3" corresponding to the detected identifying information identifier. Then, the header information verifying unit 2617 compares the extracted partial hash value "HA3" and the generated verifying hash value "H3".

In addition, the header information verifying unit 2617 extracts the partial hash value "HA7" from the header information 2550 based on the identifying information identifier "ADID2" included in the corresponding piece of verifying representative information, and compares the extracted partial hash value "HA7" and the generated verifying hash value "H7".

The header information verifying unit 2617 extracts the partial hash value "HAc" from the header information 2550 based on the identifying information identifier "ADIDc" included in the corresponding piece of verifying representative information, and compares the extracted partial value "HAc" and the generated verifying hash value "Hc".

When each of the three pairs is compared and there is even one pair disagreeing with one another, the header information verifying unit 2617 aborts the subsequent processing.

When all three pairs agree in the above comparison of three pairs, the header information verifying unit 2617 judges that the verification of the header information 2550 is successful, and outputs the received contents key "CK" and encrypted contents 2580 to the executing unit 2618.

2.4.7 Executing Unit 2618

The executing unit 2618 receives the contents key "CK" and encrypted contents 2580 from the header information verifying unit 2617.

When receiving these sets of information, the executing unit 2618 generates the contents composed of the pieces of partial contents "CNT1", "CNT2", "CNT3", . . . , and "CNTc" by applying the decrypting algorithm D1 to each of the encrypted pieces of partial contents "ECNT1", "ECNT2", "ECNT3", . . . , and, "ECNTc" composing the received encrypted contents 2580 with the use of the received contents key "CK".

Next, the executing unit 2618 expands the generated contents to generate video and audio data, and generates video and audio signals from the generated video and audio data. The executing unit 2618 outputs the generated video and audio signals to the monitor.

2.5 Operational Behaviors of Distributing Device 2100 and Executing Device 2600

Operational behaviors of the distributing device 2100 and executing device 2600 are described next.

2.5.1 Operational Behavior of Distributing Device 2100

Figure 35:
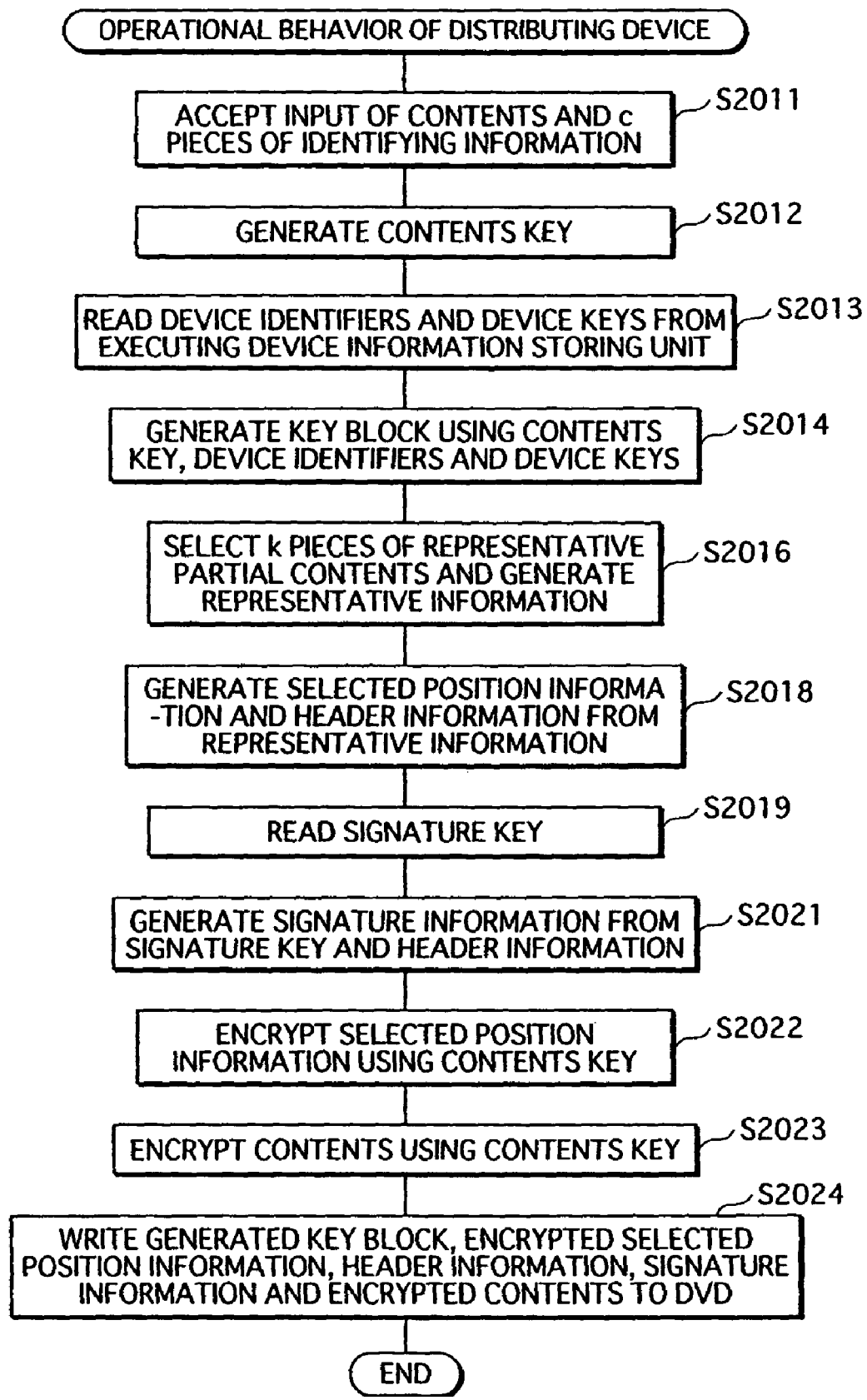
FIG. 35 is a flowchart showing operational behavior of the distributing device 2100.

The operational behavior of the distributing device 2100 is described with the aid of a flowchart shown in FIG. 35.

The input unit 2101 receives the contents 2120 composed of c pieces of partial contents and c pieces of identifying information (Step S2011), and outputs the received contents 2120 and identifying information to the contents key generating unit 2102.

The contents key generating unit 2102 receives the contents 2120 and c pieces of identifying information, and generates a contents key (Step S2012).

The key block generating unit 2103 receives the contents key, contents 2120, and c pieces of identifying information from the contents key generating unit 2102, and reads device identifiers and device keys from the executing device information storing unit 1104 (step S2013). The key block generating unit 2103 generates a key block by using the read device identifiers and device keys (Step S2014), and outputs the generated key block, the received contents key, contents 2120, and c pieces of identifying information to the selecting unit 2105.

The selecting unit 2105 receives the key block, contents key, contents 2120, and identifying information, and generates k pieces of representative information by selecting k pieces of representative partial contents from the received contents 2120 (Step S2016). Then, the selecting unit 2105 outputs the generated k pieces of representative information and the received contents key and contents 2120 to the header information generating unit 2107.

The header information generating unit 2107 receives the k pieces of representative information, contents key, and contents 2120 from the selecting unit 2105, and generates the selected position information 2160 and header information 2200 from the received k pieces of representative information (Step S2018). Next, the header information generating unit 2107 outputs the generated selected position information 2160 and header information 2200, and the received key block, contents key, and contents 2120 to the signature information generating unit 2108.

Subsequently, the signature information generating unit 2108 receives the selected position information 2160, header information 2200, key block, contents key, and contents 2120 from the header information generating unit 2107. When receiving these sets of information, the signature information generating unit 2108 reads the signature key 1113 from the signature key storing unit 1112 (Step S2019), and generates signature information from the read signature key 1113 and header information 2200 (Step S2021). Next, the signature information generating unit 2108 outputs the generated signature information, and the received key block, selected position information 2160, header information 2200, contents key, and contents 2120 to the encryption processing unit 2109.

The encryption processing unit 2109 receives the signature information, key block, selected position information 2160, header information 2200, contents key, and contents 2120 from the signature information generating unit 2108, and generates encrypted selected position information by encrypting the selected position information 2160 with the use of the received contents key (Step S2022). Subsequently, the encryption processing unit 2109 generates encrypted contents by encrypting the contents 2120 with the use of the contents key (Step S2023), and then outputs the generated encrypted selected position information and encrypted contents, and the received key block, signature information, and header information 2200 to the recording unit 2114.

The recording unit 2114 writes the key block, encrypted selected position information, header information 2200, signature information, and encrypted contents received from the encryption processing unit 2109 to the DVD 2500 (Step S2024).

2.5.2 Operational Behavior of Executing Device 2600

Figure 36:
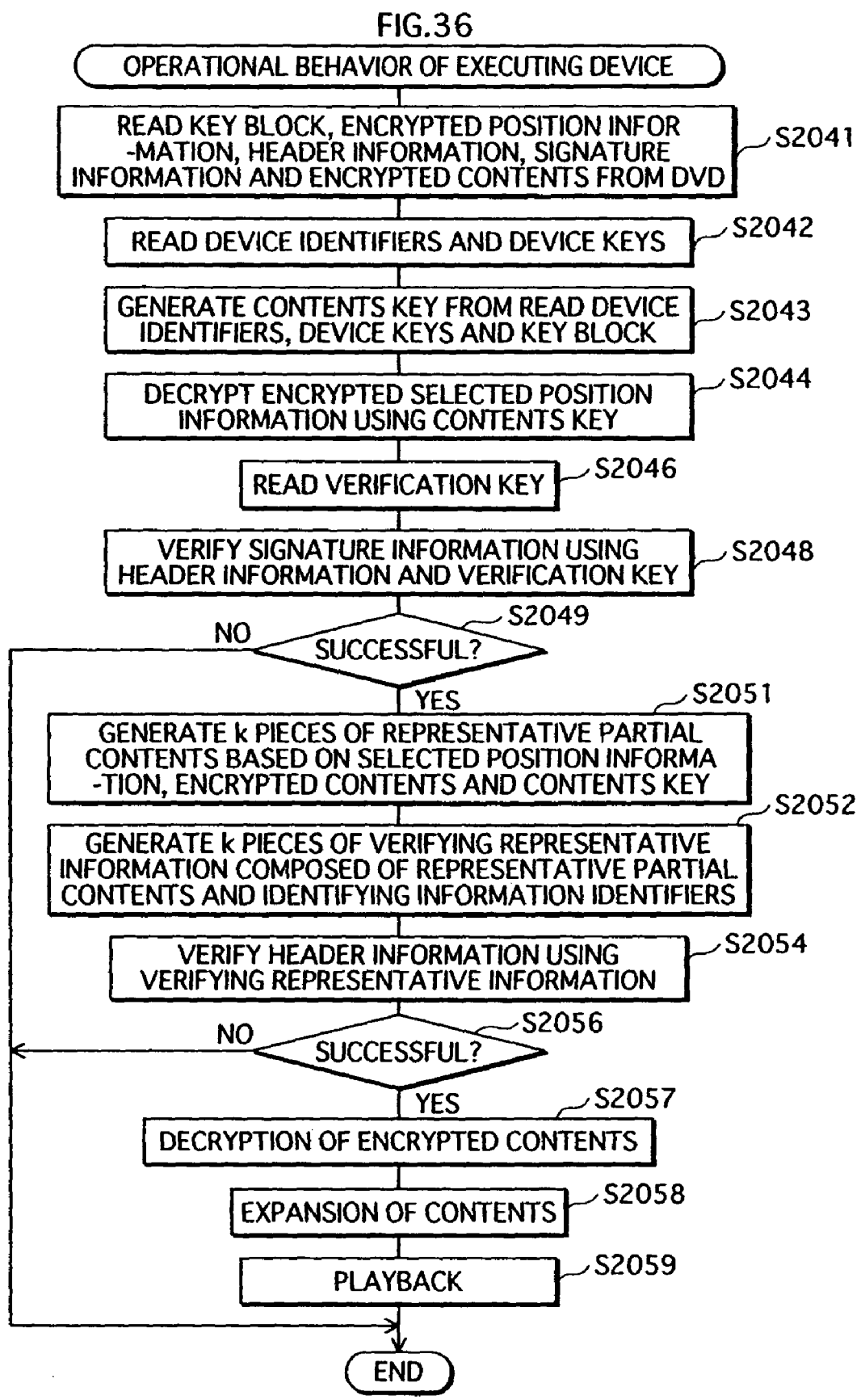
FIG. 36 is a flowchart showing operational behavior of the executing device 2600.

The operational behavior of the executing device 2600 is described with the aid of a flowchart shown in FIG. 36.

When being loaded with the DVD 2500, the acquiring unit 2601 reads the key block 2510, encrypted selected position information 2530, header information 2550, signature information 2570, and encrypted contents 2580 from the DVD 2500 (Step S2041). Then, the acquiring unit 2601 outputs the read key block 2510, encrypted selected position information 2530, header information 2550, signature information 2570, and encrypted contents 2580 to the contents key acquiring unit 2602.

When receiving the key block 2510, encrypted selected position information 2530, header information 2550, signature information 2570, and encrypted contents 2580 from the acquisition unit 2601, the contents key acquiring unit 2602 reads the device identifiers and device keys from the device key storing unit 1604 (Step S2042). The contents key acquiring unit 2602 generates a contents key from the read device identifiers and device keys and the received key block 2510 (Step S2043). The contents key acquiring unit 2602 outputs the generated contents key, and the received encrypted selected position information 2530, header information 2550, signature information 2570, and encrypted contents 2580 to the position information decrypting unit 2606.

The position information decrypting unit 2606 receives the contents key, encrypted selected position information 2530, header information 2550, signature information 2570, and encrypted contents 2580 from the contents key acquiring unit 2602, and generates selected position information by decrypting the encrypted selected position information 2530 with the use of the received contents key (Step S2044). Next, the position information decrypting unit 2606 outputs the generated selected position information, and the received contents key, header information 2550, signature information 2570, and encrypted contents 2580 to the signature information verifying unit 2611.

The signature information verifying unit 2611 receives the selected position information, contents key, header information 2550, signature information 2570, and encrypted contents 2580 from the position information decrypting unit 2606, and reads a verification key from the verification key storing unit 1612 (Step S2046). Then, the signature information verifying unit 2611 verifies the signature information 2570 by using the read verification key and the received header information 2550 (Step S2048). When the verification of the signature information 2570 is unsuccessful (Step S2049: NO), the signature information verifying unit 2611 aborts the subsequent processing in the executing device 2600.

When the verification of the signature information 2570 is successful (Step S2049: YES), the signature information verifying unit 2611 outputs the received selected position information, contents key, header information 2550, and encrypted contents 2580 to the representative partial contents decrypting unit 2616.

The representative partial contents decrypting unit 2616 receives the selected position information, contents key, header information 2550, and encrypted contents 2580 from the signature information verifying unit 2611, and generates k pieces of representative partial contents based on the received selected position information, encrypted contents 2580, and contents key (Step S2051). Then, the representative partial contents decrypting unit 2616 generates k pieces of verifying representative information composed of corresponding pieces of representative partial contents and identifying information identifiers (Step S2052), and outputs the generated k pieces of verifying representative information, and the received contents key, header information 2550, and encrypted contents 2580 to the header information verifying unit 2617.

The header information verifying unit 2617 receives the k pieces of verifying representative information, contents key, header information 2550, and encrypted contents 2580 from the representative partial contents decrypting unit 2616, and performs verification of the header information 2550 by using the received k pieces of verifying representative information (Step S2054). If the verification is unsuccessful (Step S2056: NO), the header information verifying unit 2617 aborts the subsequent processing.

When the verification is successful (Step S2056: YES), the header information verifying unit 2617 outputs the received contents key and encrypted contents 2589 to the executing unit 2618.

When receiving the contents key and encrypted contents 2580 from the header information verifying unit 2617, the executing unit 2618 generates the contents by decrypting the encrypted contents 2580 with the use of the received contents key (Step S2057), expands the generated contents (Step S2058), and have the monitor play the contents (Step S2059).

2.6 Summary and Advantageous Effects

As having been described, in the second embodiment, the distributing device 2100 generates the header information by using only k pieces of representative partial contents from among c pieces of partial contents making up the contents, and further generates the signature information by applying the signature generating algorithm to the header information.

The executing device 2600 performs verification of whether unauthorized contents are included by generating k pieces of representative partial contents based on the selected position information and performing verification of the header information by using the generated k pieces of representative partial contents. When the verification is successful, the executing device 2600 starts the contents playback, judging that no unauthorized contents are included.

Thus, performing the verification of the header information with the use of only k pieces out of c pieces of partial contents making up the contents achieves a reduction in processing load of the executing device 2600 for the verification.

Furthermore, it is also possible to reduce processing load involved in the generation of the header information in the distributing device 2100.

3. Third Embodiment

The following describes an unauthorized contents detection system according to a third embodiment of the present invention.

3.1 Unauthorized Contents Detection System

The unauthorized contents detection system of the third embodiment is composed of a distributing device, an executing device, and a monitor, as in the unauthorized contents detection system of the first embodiment.

The distributing device acquires contents according to operations conducted by an operator, and generates encrypted contents by encrypting the acquired contents.

In addition, the distributing device extracts part of the contents, and generates information such as header information used for detecting whether unauthorized contents are included in the contents, signature information for proving that the contents are issued by a legitimate right holder, and the like, based on the extracted part of the contents (hereinafter, referred to as "a piece of representative partial contents"). The distributing device repeats extraction of a piece of representative partial contents, generation of a piece of header information, and generation of a piece of signature information to generate multiple pieces of header and signature information, and writes the generated encrypted contents, and multiple pieces of header and signature information to a DVD.

The DVD will be sold or distributed to users through distribution outlets.

The executing device selects one piece each from the multiple pieces of signature information and the multiple pieces of header information recorded on the DVD, and performs verification of the selected pieces of signature and header information.

Individual devices composing the unauthorized contents detection system of the present embodiment and the DVD are described in detail below.

3.2 Distributing Device 3100

Figure 37:
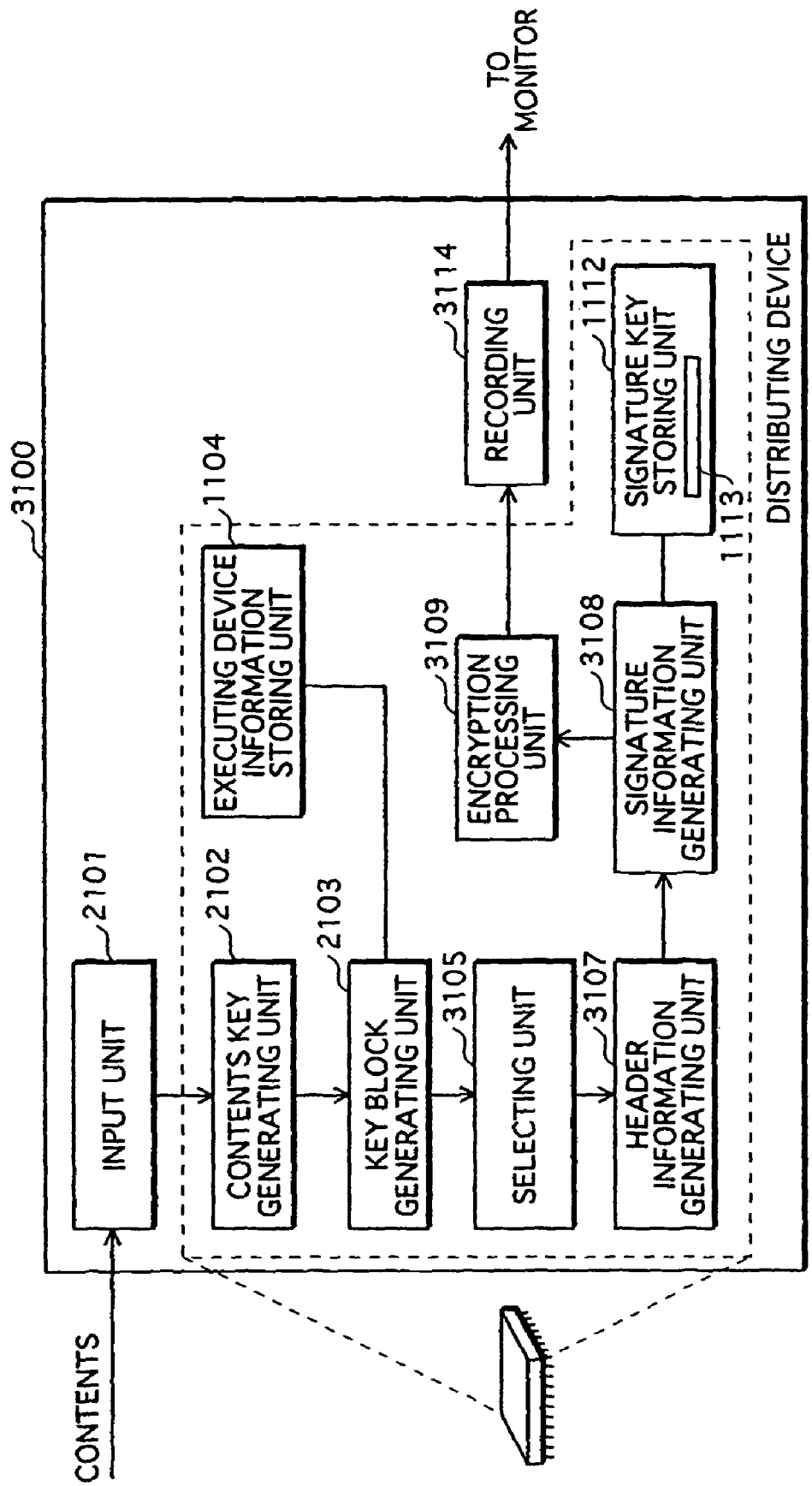
FIG. 37 is a block diagram showing a structure of a distributing device 3100 of a third embodiment.

FIG. 37 shows a structure of the distributing device of the present embodiment. As shown in FIG. 37, a distributing device 3100 is composed of an input unit 2101, a contents key generating unit 2102, a key block generating unit 2103, an executing device information storing unit 1104, a selecting unit 3105, a header information generating unit 3107, a signature information generating unit 3108, a signature key storing unit 1112, an encryption processing unit 3109, and a recording unit 3114. The input unit 2101, contents key generating unit 2102, key block generating unit 2103, executing device information storing unit 1104, and signature key storing unit 1112 are the same as in the second embodiment, and therefore the descriptions for these components are omitted.

3.2.1 Selecting Unit 3105

The selecting unit 3105 prestores the number of iteration "x" (x is an integer of 2 or greater).

The selecting unit 3105 receives the key block, contents key "CK", contents, and c pieces of identifying information from the key block generating unit 2103. When receiving the key block, contents key "CK", contents, and c pieces of identifying information, the selecting unit 3105 generates k pieces of representative information in the same fashion as the selecting unit 2105 of the second embodiment.

The selecting unit 3105 repeats processing of the same kind x times to generate x groups of k pieces of representative information. Here, the first group of representative information is referred to as a "1st representative group" while the second group, . . . , and x-th group of representative information are referred to respectively as a "2nd representative group" and an "x-th representative group". A specific example here is that all of the 1st to x-th representative groups are respectively composed of k pieces of representative information, however, the number of pieces of representative information can be different from group to group.

Next, the selecting unit 3105 outputs the generated 1st, 2nd, . . . , and x-th representative groups, and the received key block, contents key "CK", and contents to the header information generating unit 3107.

3.2.2 Header Information Generating Unit 3105

The header information generating unit 3107 receives the 1st, 2nd, and x-th representative groups, key block, contents key "CK", and contents from the selecting unit 3105.

When receiving these sets of information, the header information generating unit 3107 generates selected position information "POS1" and header information "HEAD1" based on the k pieces of representative information included in the received 1st representative group and the contents. A specific procedure for generating the selected position information and header information is the same as the generation procedures of selected position information 2160 and header information 2200 performed by the header information generating unit 2107 of the second embodiment, and therefore the descriptions are omitted here. The selected position information "POS1" has the same structure as the selected position information 2160 shown in FIG. 30 while the header information "HEAD1" has the same structure as the header information 2200 shown in FIG. 31.

Next, the header information generating unit 3107 generates a header identifier "HEADID1" specific to a pair of the generated selected position information "POS1" and header information "HEAD1". Here, a collection of the generated header identifier "HEADID1", a piece of selected position information "POS1", and a piece of header information "HEAD1" is referred to as a "1st header group".

The header information generating unit 3107 repeats processing of the same kind for the 2nd, 3rd, . . . , and x-th representative groups to generate 2nd, 3rd, . . . , x-th header groups.

Next, the header information generating unit 3107 extracts header identifiers from the 1st to x-th header groups, and generates header selecting information composed of extracted x pieces of header identifiers.

Figure 38:
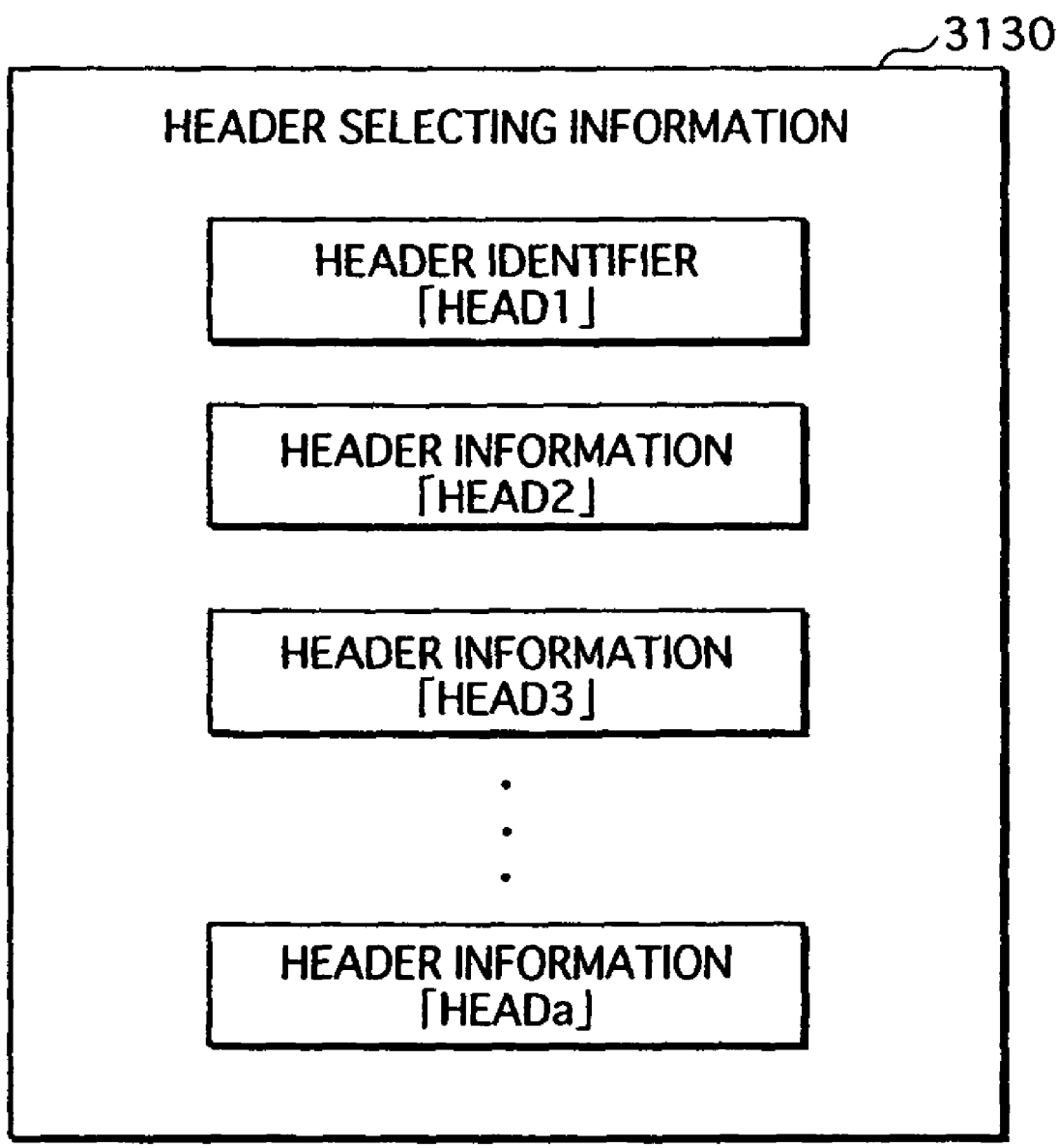
FIG. 38 shows a structure of header selecting information 3130 generated by a header information generating unit 3107.

FIG. 38 shows an example of a structure of the header selecting information generated at this point. Header selecting information 3130 is composed of x pieces of header identifiers, and the header identifiers correspond respectively to the 1st to x-th header groups.

Next, the header information generating unit 3107 outputs the generated header selecting information 3130 and 1st, 2nd, . . . , and x-th header groups, and the received key block, contents key "CK", and contents to the signature information generating unit 3108.

3.2.3 Signature Information Generating Unit 3108

The signature information generating unit 3108 receives the header selecting information 3130, 1st, 2nd, . . . , and x-th header groups, key block, contents key "CK", and contents from the header information generating unit 3107.

When receiving these sets of information, the signature information generating unit 3108 reads the signature key 1113 from the signature key storing unit 1112.

Next, the signature information generating unit 3108 generates a piece of signature information "Sign1" with the use of the header information "HEAD1" included in the 1st header group and the read signature key 1113. A specific procedure for generating the piece of signature information is the same as one conducted by the signature information generating unit 2108.

Here, the term "1st header group" is reassigned to a result formed by adding the generated piece of signature information "Sign1" to the header identifier "HEADID1", piece of selected position information "POS1", and piece of header information "HEAD1".

The signature information generating unit 3108 repeats processing of the same kind for the 2nd to x-th header groups to generate pieces of signature information, and newly forms 2nd to x-th header groups by adding the generated pieces of signature information respectively to corresponding header identifiers, pieces of selected position information, and pieces of header information.

Next, the signature information generating unit 3108 outputs the 1st, 2nd, . . . , and x-th header groups, and the received header selecting information 3130 key block, contents key "CK", and contents to the encryption processing unit 3109.

3.2.4 Encryption Processing Unit 3109

The encryption processing unit 3109 receives the 1st; 2nd, . . . , and x-th header groups, header selecting information 3130, key block, contents key "CK", and contents from the signature information generating unit 3108.

The encryption processing unit 3109 generates c pieces of encrypted partial contents by applying the encrypting algorithm E1 to individual pieces of partial contents constituting the received contents with the use of the received contents key "CK", and puts the generated c pieces of encrypted partial contents together to form encrypted contents. The encrypted contents generated at this point have the same structure as the encrypted contents 2220 in FIG. 32.

Next, the encryption processing unit 3109 extracts the piece of selected position information "POS1" from the 1st header group, and generates a piece of encrypted selected position information "EPOS1" by applying the encrypting algorithm E1 to the extracted piece of selected position information "POS1" with the use of the contents key "CK". Next, the encryption processing unit 3109 replaces the piece of selected position information "POS1" included in the 1st header group with the generated piece of encrypted selected position information "EPOS1". Here, EPOS1=Enc(CK, POS1).

The encryption processing unit 3109 does the same with the 2nd to x-th header groups to generate pieces of encrypted selected position information, and replaces the corresponding pieces of selected position information with the pieces of encrypted selected position information.

Next, the encryption processing unit 3109 outputs the 1st, 2nd, . . . , and x-th header groups, the generated encrypted contents, and the received header selecting information 3130 and key block to the recording unit 3114.

3.2.5 Recording Unit 3114

The recording unit 3114 receives the 1st, 2nd, . . . , and x-th header groups, encrypted contents, header selecting information 3130, and key block from the encryption processing unit 3109, and writes the received 1st, 2nd, . . . , and x-th header groups, encrypted contents, header selecting information 3130, and key block to a DVD.

3.3 DVD 3500

Figure 39:
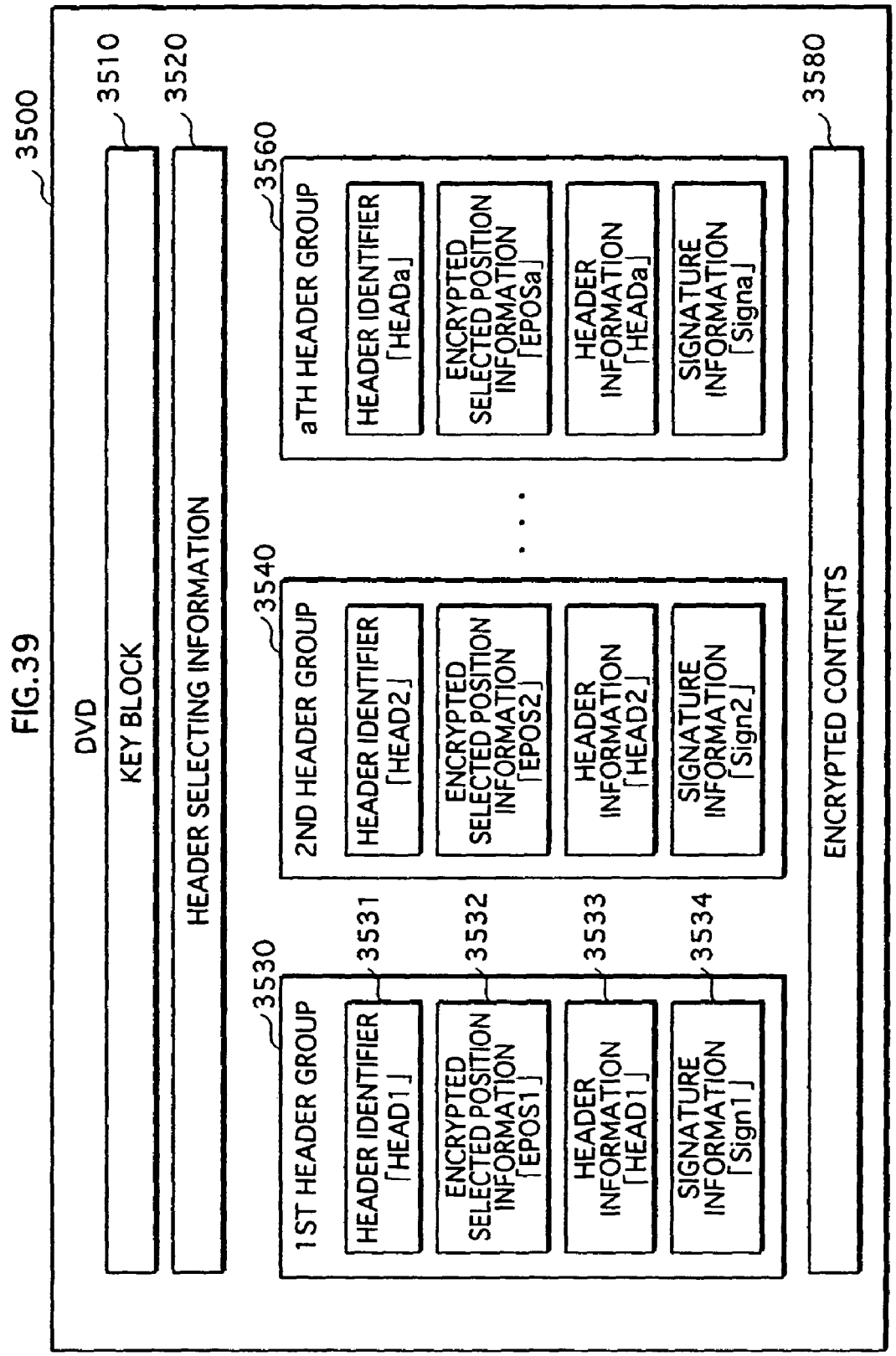
FIG. 39 shows information recorded on a DVD 3500 of the third embodiment.

FIG. 39 shows information recorded by a DVD according to the present embodiment.

As shown in FIG. 39, a DVD 3500 stores a key block 3510, header selecting information 3520, a 1st header group 3530, a 2nd header group 3540, . . . , and an x-th header group 3560, and encrypted contents 3580.

Each of the 1st header group 3530, 2nd header group 3540, . . . , and x-th header group 3560 is composed of a header identifier, a piece of encrypted selected position information, a piece of header information, and a piece of signature information.

For example, the 1st header group 3530 is composed of a header identifier "HEAD1" 3531, a piece of encrypted selected position information "EPOS1" 3532, a piece of header information "HEAD1", and a piece of signature information "Sign1" 3534.

These sets of information have been written to the DVD 3500 by the distributing device 3100. The structure of each set of the information is as previously mentioned, and therefore the description is omitted here.

3.4 Executing Device 3600

Figure 40:
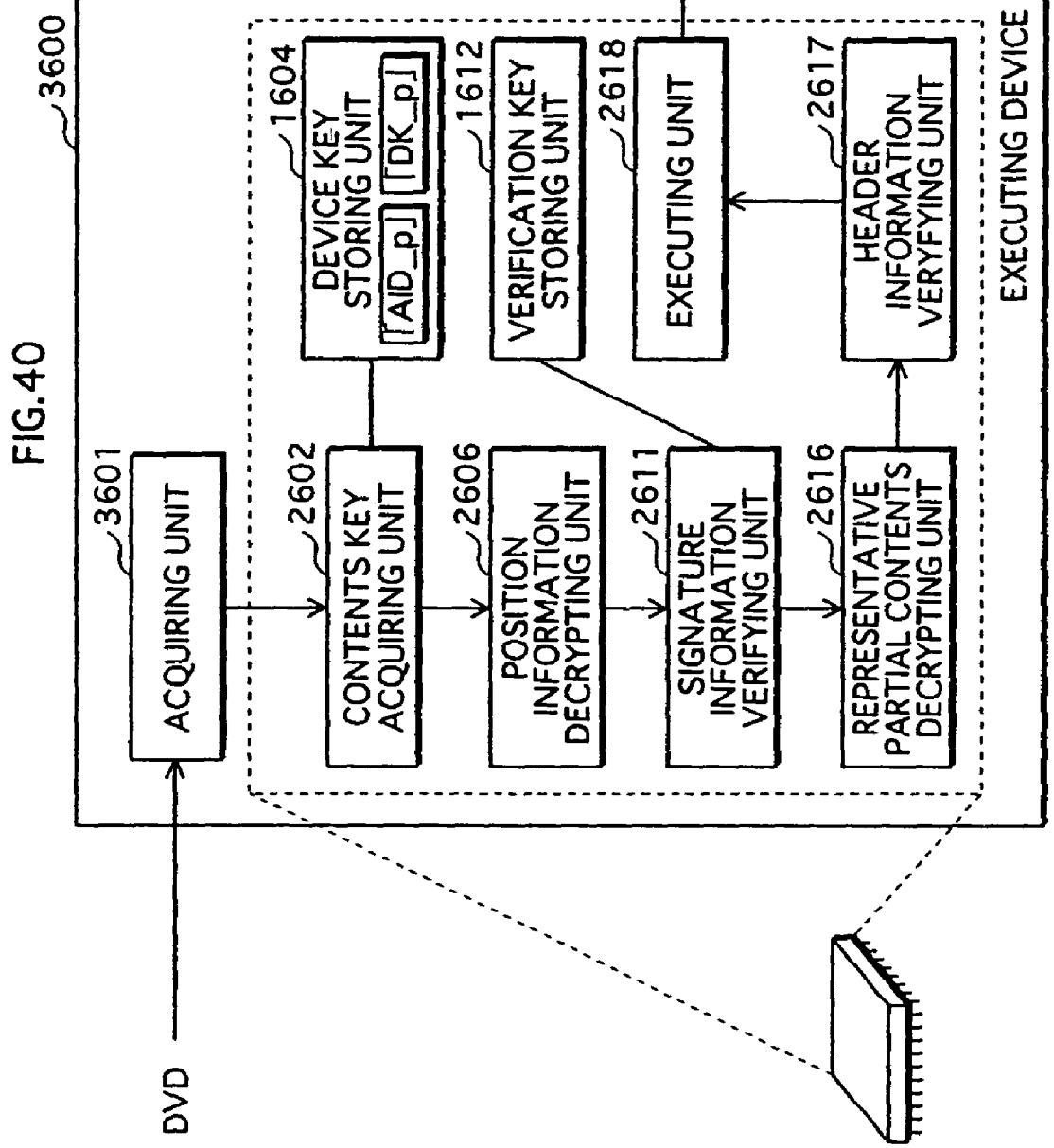
FIG. 40 is a block diagram showing a structure of an executing device 3600 of the third embodiment.

As shown in FIG. 40, an executing device 3600 is composed of an acquiring unit 3601, a contents key acquiring unit 2602, a device key storing unit 1604, a position information decrypting unit 2606, a signature information verifying unit 2611, a verification key storing unit 1612, a representative partial contents decrypting unit 2616, a header information verifying unit 2617, and an executing unit 2618.

The components other than the acquiring unit 3601 have the same structures and operational behaviors as the contents key acquiring unit 2602, device key storing unit 1604, position information decrypting unit 2606, signature information verifying unit 2611, verification key storing unit 1612, representative partial contents decrypting unit 2616, header information verifying unit 2617, and executing unit 2618 constituting the executing device 2600 of the second embodiment. Now therefore, here is described only the acquiring unit 3601.

3.4.1. Acquiring Unit 3601

When detecting the DVD 3500 being loaded thereon, the acquiring unit 3601 reads the header selecting information 3520 from the DVD 3500. Then, the acquiring unit 3601 selects one of header identifiers "HEADID1", "HEAID2", "HEADID3", . . . , and "HEADIDx" included in the read header information 3520 with the use of a random number.

The selecting method is not limited to this, and any method is applicable as long as it is difficult for a third party to predict which identifier is selected.

Next, the acquiring unit 3601 retrieves, from among the 1st, 2nd, ..., and x-th header groups recorded on the DVD 3500, a header group including the selected header identifier, and reads a piece of encrypted selected position information, a piece of header information, and a piece of signature information from the header group.

Subsequently, the acquiring unit 3601 reads the key block 3510 and encrypted contents 3580 from the DVD 3500, and outputs the read key block 3510, encrypted contents, encrypted selected position information, header information, and signature information to the contents key acquiring unit 2602.

3.5 Summary and Advantageous Effects

As having been described, the distributing device 3100 of the third embodiment generates x groups, each of which is composed of a piece of encrypted selected position information, a piece of header information, and a piece of signature information, and the executing device selects one of the x groups and performs verification of whether unauthorized contents are included by using a piece of encrypted selected position information, a piece of header information, and a piece of signature information of the selected group of.

Thus, by increasing the number of pieces of the representative partial contents used for the verification, it is possible to enhance accuracy for detecting unauthorized contents. Furthermore, it is difficult to predict which header group, out of the 1st to x-th header groups, is selected in the executing device 3600, and therefore it is possible to prevent fraudulent acts involving replacing specifically only pieces of partial contents not to be used for the verification with unauthorized contents.

4. Fourth Embodiment

An unauthorized contents detection system according to a fourth embodiment of the present invention is described below.

4.1 Unauthorized Contents Detection System

The unauthorized contents detection system of a fourth embodiment is composed of a distributing device, an executing device; and a monitor, as in the first embodiment.

The distributing device acquires contents according to operations of an operator, and generates encrypted contents by encrypting the acquired contents.

In addition, the distributing device splits the contents into multiple pieces of partial contents, and generates header information used for verifying whether unauthorized contents are included in the contents as well as signature information for proving that the contents are issued by a legitimate right holder based on all pieces of the partial contents. The distributing device writes the generated encrypted contents, signature information, and the like to a DVD.

The DVD will be sold or distributed to users through distribution outlets.

When being loaded with the DVD, the executing device selects some pieces out of the multiple pieces partial contents making up the contents, and verifies the header information by using only the selected pieces of partial contents.

Individual devices composing the unauthorized contents detection system of the present embodiment and the DVD are described in detail below.

4.2 Distributing Device 4100

Figure 41:
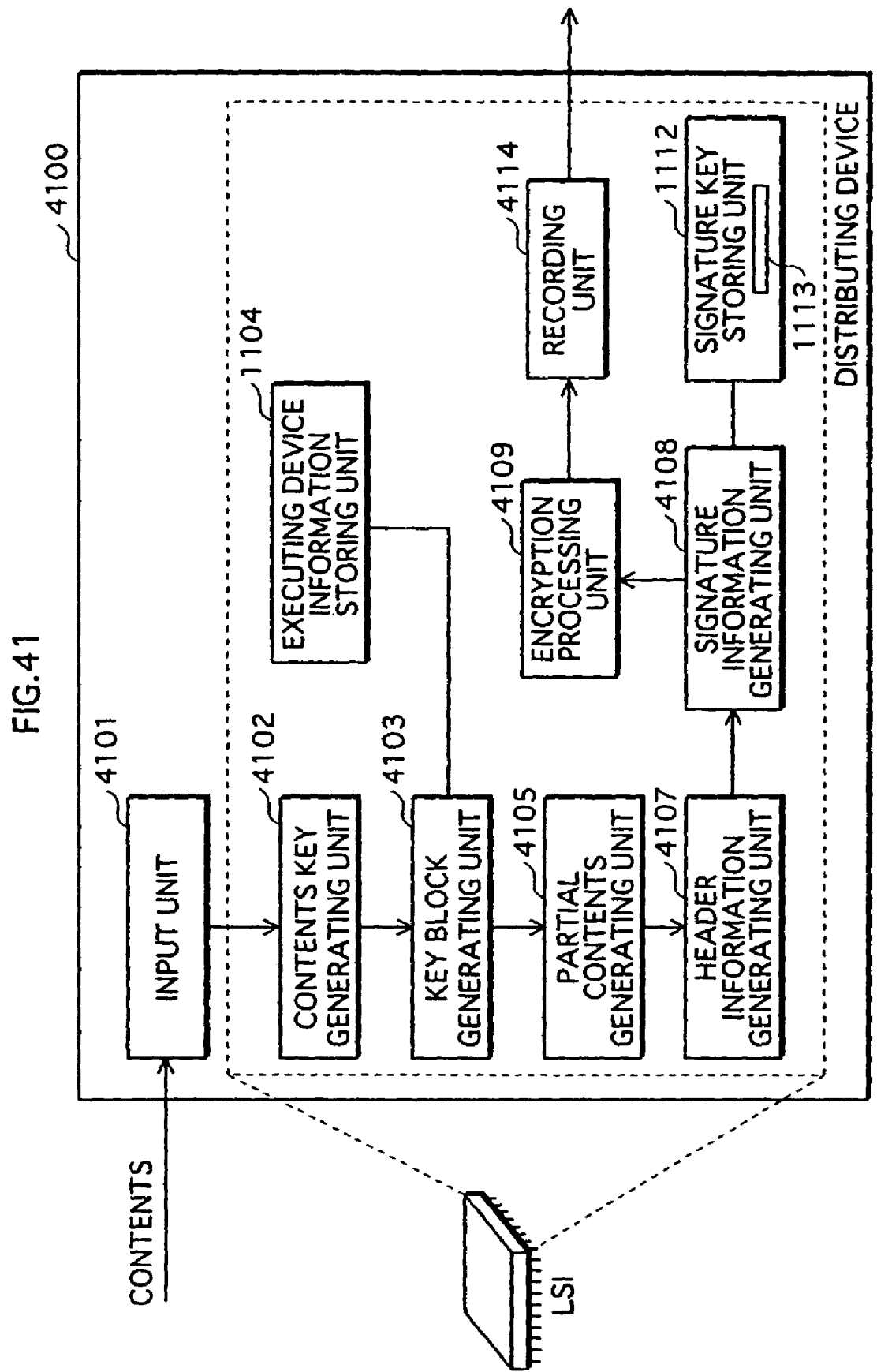
FIG. 41 is a block diagram showing a structure of a distributing device 4100 of a fourth embodiment.

FIG. 41 shows a structure of the distributing device of the fourth embodiment. As shown in FIG. 41, a distributing device 4100 is composed of an input unit 4101, a contents key generating unit 4102, a key block generating unit 4103, an executing device information storing unit 1104, a partial contents generating unit 4105, a header information generating unit 4107, a signature information generating unit 4108, a signature key storing unit 1112, an encryption processing unit 4109, and a recording unit 4114.

The following describes individual components constituting the distributing device 4100. Note that, since the executing device information storing unit 1104 and signature key storing unit 1112 are the same in the first embodiment, the descriptions for these components are left out.

4.2.1 Input Unit 4101

The input unit 4101 acquires contents from an external device or external recording medium according to operations of the operator of the distributing device 4100. The contents acquired here are a playable format for an executing device 4600 (as will hereinafter be described in detail), and the DVD-video format and the MPEG-2 format are examples of such playable formats.

The input unit 4101 outputs the acquired contents to the contents key generating unit 4102.

4.2.2 Contents Key Generating Unit 4102

The contents key generating unit 4102 receives the contents from the input unit 4101. When receiving the contents, the contents key generating unit 4102 generates a pseudorandom number, and generates a 128-bit length contents key "CK" with the use of the generated pseudorandom number. Instead of a pseudorandom number, a true random number may be generated by using, for example, noise on a signal.

Next, the contents key generating unit 4102 outputs the generated contents key "CK" and the received contents to the key block generating unit 4103.

4.2.3 Key Block Generating Unit 4103

The key block generating unit 4103 receives the contents key "CK" and contents from the contents key generating unit 4102. When receiving the contents key "CK" and contents, the key block generating unit 4103 generates a key block by using the received contents key "CK" and a device identification table stored in the executing device information storing unit 1104. A specific procedure for generating the key block is the same as one performed by the key block generating unit 1103 of the first embodiment, and therefore the description is omitted.

Next, the key block generating unit 4103 outputs the generated key block, and the received contents key "CK" and contents to the partial contents generating unit 4105.

4.2.4 Partial Contents Generating Unit 4105

The partial contents generating unit 4105 receives the key block, contents key "CK", and content's from the key block generating unit 4103.

When receiving these sets of information, the partial contents generating unit 4105 splits the received contents into a pieces of partial contents "CNT1", "CNT2", "CNT3", ..., and "CNTc". For example, when the contents are the DVD-Video format, VOBs or VOBUs can be used as the split unit. On the other hand, when the contents are the MPEG-2 format, GOPs (Group of Pictures), fields, frames, or intra pictures can be used as the split unit. Alternatively, regardless of the contents format, the contents can bee split every 64 kilobytes, or every portion corresponding to one second of the playback time. The c pieces of partial contents generated at this point are correctively referred to as a split contents.

Next, the partial contents generating unit 4105 generates pieces of identifying information "AD1", "AD2", "AD3", . . . , and "ADc" which respectively correspond to the generated n pieces of partial contents. Each piece of the identifying information is information uniquely identifying a corresponding piece of partial contents, and is, for example, a playback starting point of the piece of the partial contents which is specified by reference of the head of the contents, or an offset from the head of the contents.

Figure 42:
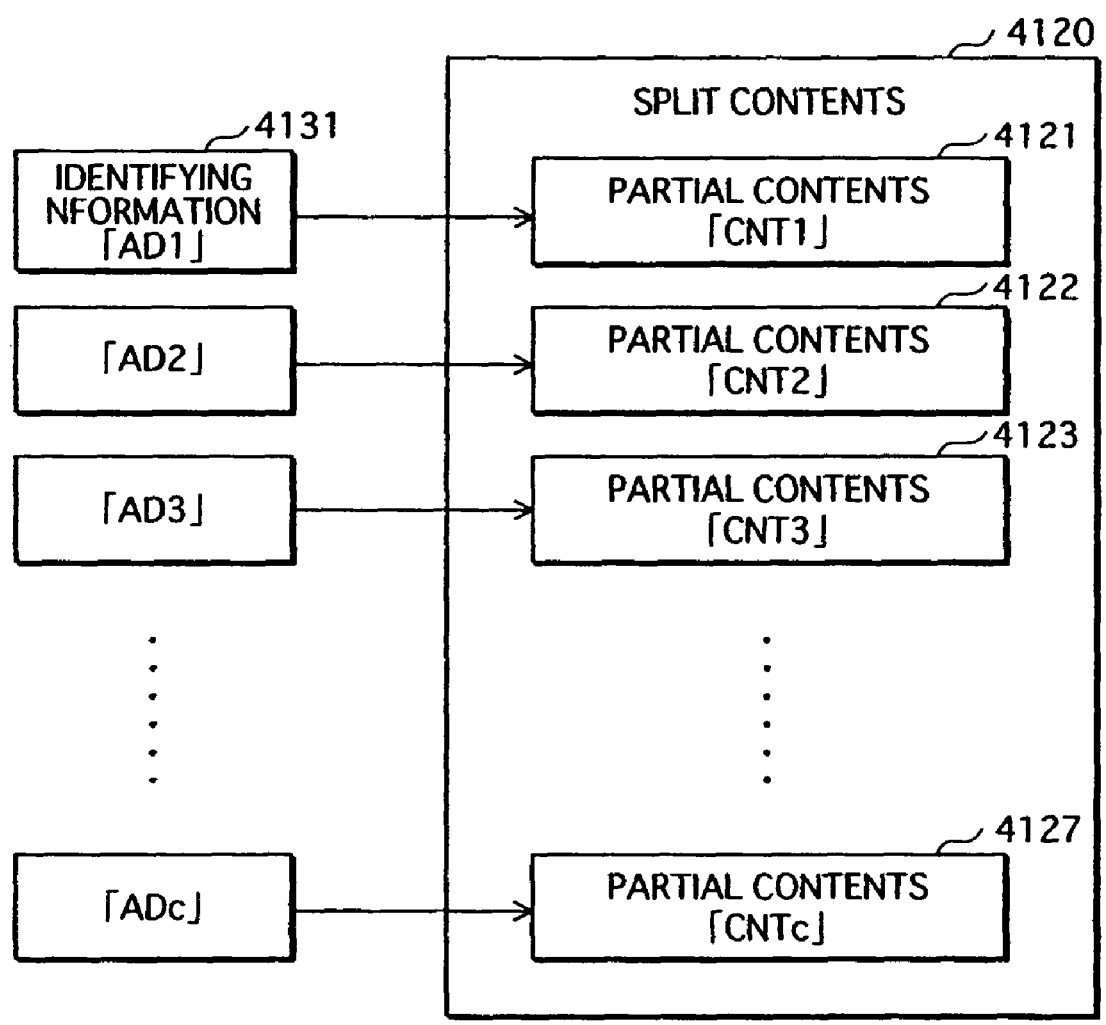
FIG. 42 shows split contents and pieces of identifying information generated by a partial contents generating unit 4105.

FIG. 42 shows split contents and identifying information generated at this point. The split contents 4120 are composed of c pieces of partial contents "CNT1" 4121, "CNT2" 4122, "CNT3" 4123, . . . , and "CNTc" 4127. Each piece of the partial contents corresponds to a piece of the identifying information. For example, a piece of identifying information "AD1" 4131 is information for identifying the piece of partial contents "CNT1" 4121.

Next, the partial contents generating unit 4105 outputs the generated c pieces of identifying information and split contents 4120, and the received key block and contents key "CK" to the header information generating unit 4107.

4.2.5 Header Information Generating Unit 4107

The header information generating unit 4107 receives the c pieces of identifying information "AD1", "AD2", "AD3", . . . , and "ADc", and split contents 4120, key block, and contents key "CK" from the partial contents generating unit 4105.

When receiving these sets of information, the header information generating unit 4107 generates an identifying information identifier "ADID1" uniquely identifying the piece of identifying information "AD1" with the use of a random number.

Here, a pair of the generated identifying information identifier "ADID1" and the received piece of identifying information "AD1" is referred to as "a piece of contents detecting information".

Next, the header information generating unit 4107 extracts the partial contents "CNT1" 4121 from the split contents 4120 based on the received pieces of identifying information "AD1", and calculates a partial hash value "HA1" by assigning the extracted the piece of partial contents "CNT1" 4121 to the hash function. Here, a pair of the generated identifying information identifier "ADID1" and calculated hash value "HA1" is referred to as "a piece of partial hash information".

The header information generating unit 4107 repeats processing of the same kind for the rest pieces of identifying information "AD2", "AD3", . . . , and "ADc" to generate pieces of contents detecting information and pieces of partial hash information.

Figure 43:
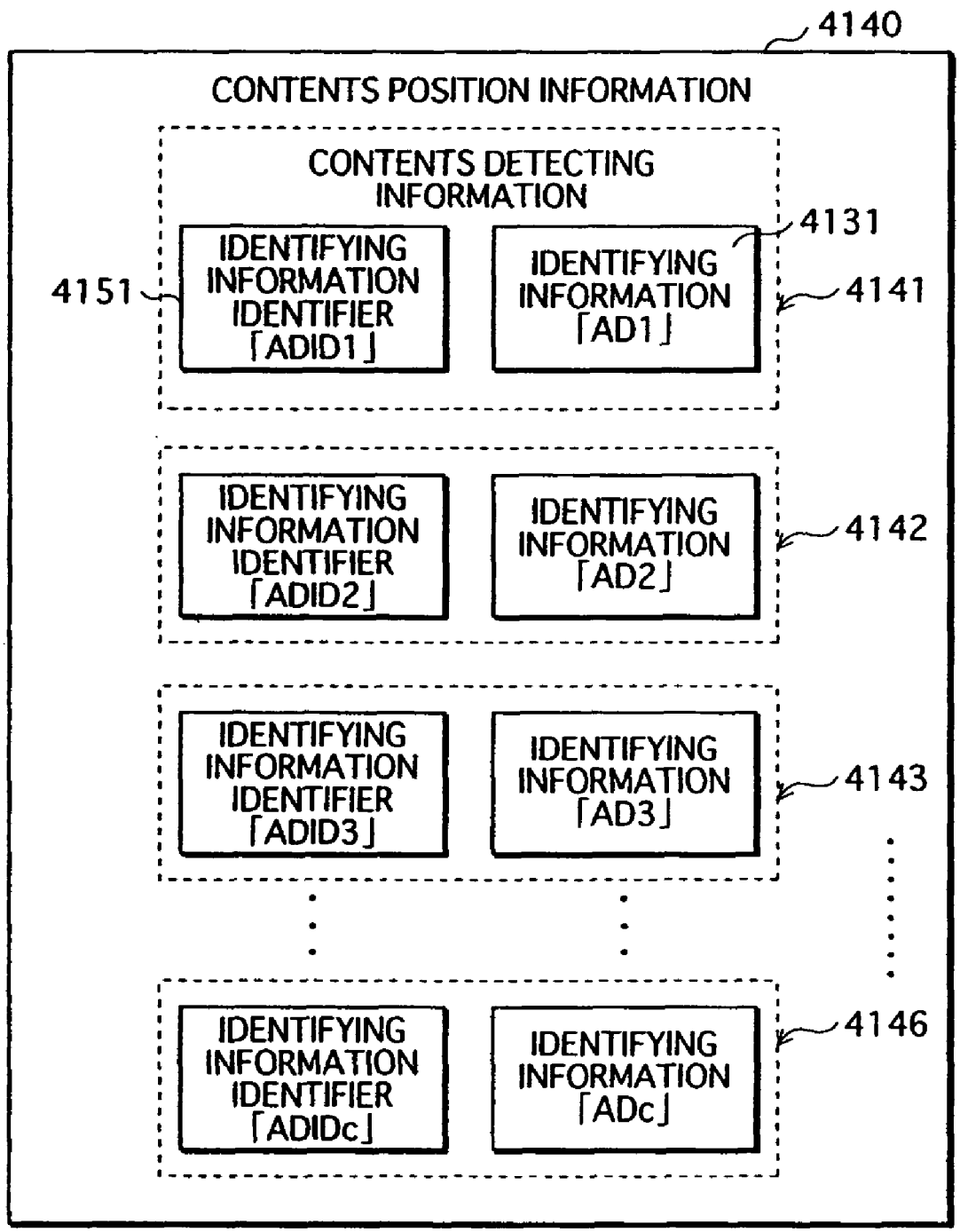
FIG. 43 shows a structure of contents position information 4140 generated by a header information generating unit 4107.

Next, the header information generating unit 4107 generates contents position information composed of the generated c pieces of contents detecting information. FIG. 43 shows a structure of the contents position information generated at this point. Contents position information 4140 is composed of c pieces of contents detecting information 4141, 4142, 4143, . . . , and 4146. Each piece of contents detecting information includes an identifying information identifier and a piece of identifying information. As an example, the piece of contents detecting information 4141 includes an identifying information identifier "ADID1" 4151 and the piece of identifying information "AD1" 4131.

Figure 44:
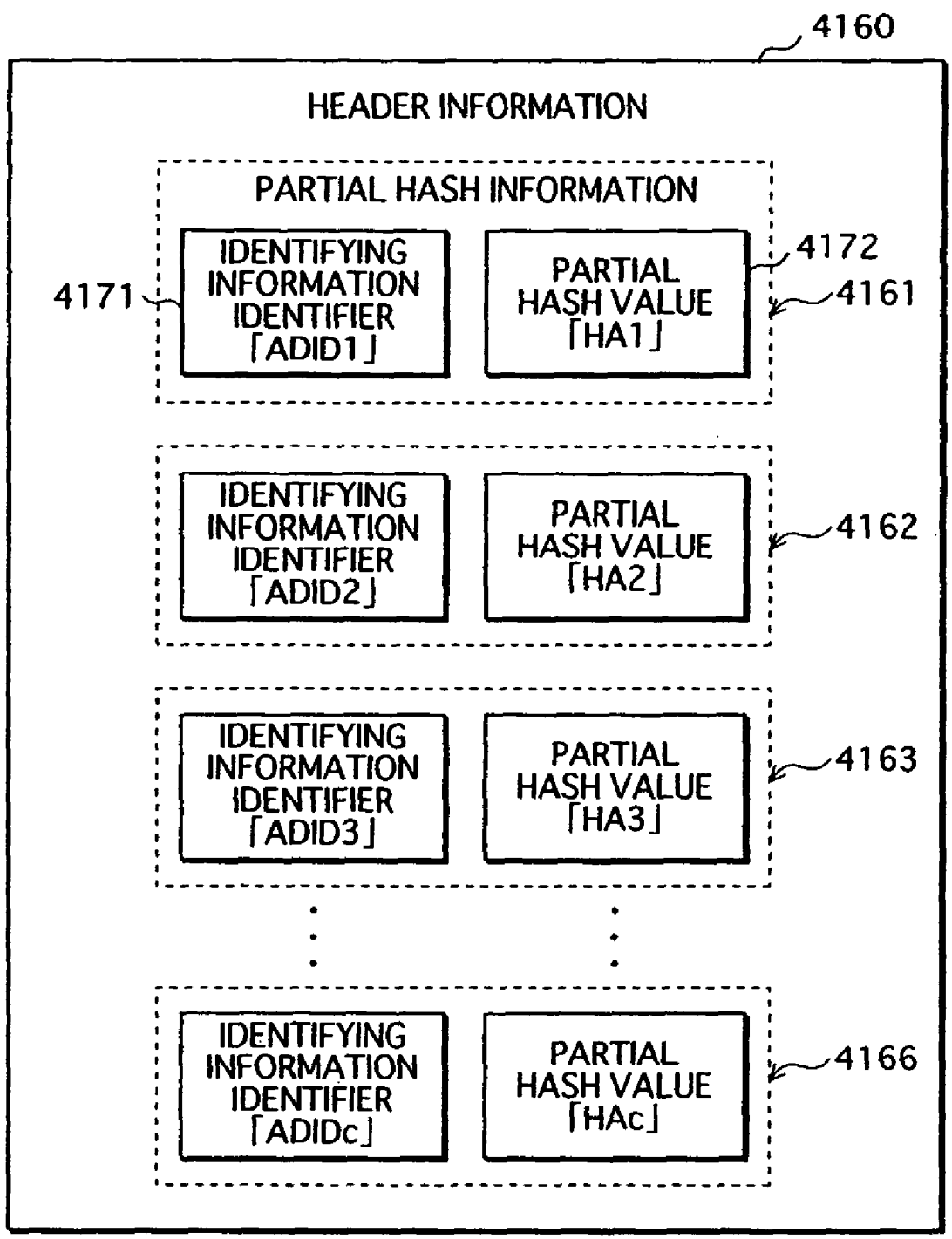
FIG. 44 shows a structure of header information 4160 generated by the header information generating unit 4107.

Subsequently, the header information generating unit 4107 generates header information composed of the generated c pieces of partial hash information. FIG. 44 shows a structure of the header information generated at this point. Header information 4160 is composed of c pieces of partial hash information 4161, 4162, 4163, . . . , and 4166. Each piece of the partial hash information includes an identifying information identifier and a partial hash value, and corresponds to a piece of contents detecting information making up the contents position information 4140. For example, the piece of partial hash information 4161 includes an identifying information identifier "ADID1" 4171 and a partial hash value "HA1" 4172.

Next, the header information generating unit 4107 outputs the generated contents position information 4140 and header information 4160, and the received split contents 4120, key block, and contents key "CK" to the signature information generating unit 4108.

4.2.6 Signature Information Generating Unit 4108

The signature information generating unit 4108 receives the contents position information 4140, header information 4160, split contents 4120, key-block, and contents key "CK" from the header information generating unit 4107.

When receiving these sets of information, the signature information generating unit 4108 extracts hash values included in individual pieces of partial hash information constituting the received header information 4160. The signature information generating unit 4108 generates a combined hash value by assigning a combined result formed by combining the extracted c pieces of partial hash values "HA1", "HA2", "HA3", . . . , and "HAc" to the hash function.

Next, the signature information generating unit 4108 reads the signature key 1113 from the signature key storing unit 1112, and generates signature information by applying the signature generating algorithm S to the generated combined hash value with the use of the read signature key 1113.

When having generated the signature information, the signature information generating unit 4108 outputs the generated signature information, and the received contents position information 4140, header information 4160, split contents 4120, key block, and contents key "CK" to the encryption processing unit 4109.

4.2.7 Encryption Processing Unit 4109

The encryption processing unit 4109 receives the signature information, contents position information 4140, header information 4160, split contents 4120, key block, and contents key "CK" from the signature information generating unit 4108.

When receiving these sets of information, the encryption processing unit 4109 generates a piece of encrypted partial contents "ECNT1" by applying an encrypting algorithm to the piece of partial contents "CNT1" 4121 constituting the received split contents 4120. The encryption processing unit 4109 repeats processing of the same kind for the pieces of partial contents "CNT2" 4122, "CNT3" 4123, . . . , and "CNTc" 4121 to generate pieces of encrypted partial contents "ECNT2", "ECNT3", . . . , and "ECNTc".

Next, the encryption processing unit 4109 generates encrypted contents composed of the generated c pieces of encrypted partial contents "ECNT1", "ECNT2", "ECNT3", . . . , and "ECNTc". The encrypted contents generated at this point have the same structure as the encrypted contents 2220 (FIG. 32) of the second embodiment.

Next, the encryption processing unit 4109 outputs the generated encrypted contents, and the received signature information, contents position information 4140, header information 4160, and key block to the recording unit 4114.

4.2.8 Recording Unit 4114

The recording unit 4114 is loaded with a DVD.

The recording unit 4114 receives the encrypted contents, signature information, contents position information 4140, header information 4160, and key block from the encryption processing unit 4109.

When receiving these sets of information, the recording unit 4114 writes the received encrypted contents, signature information, contents position information 4140, header information 4160, and key block to the DVD.

4.3 DVD 4500

Figure 45:
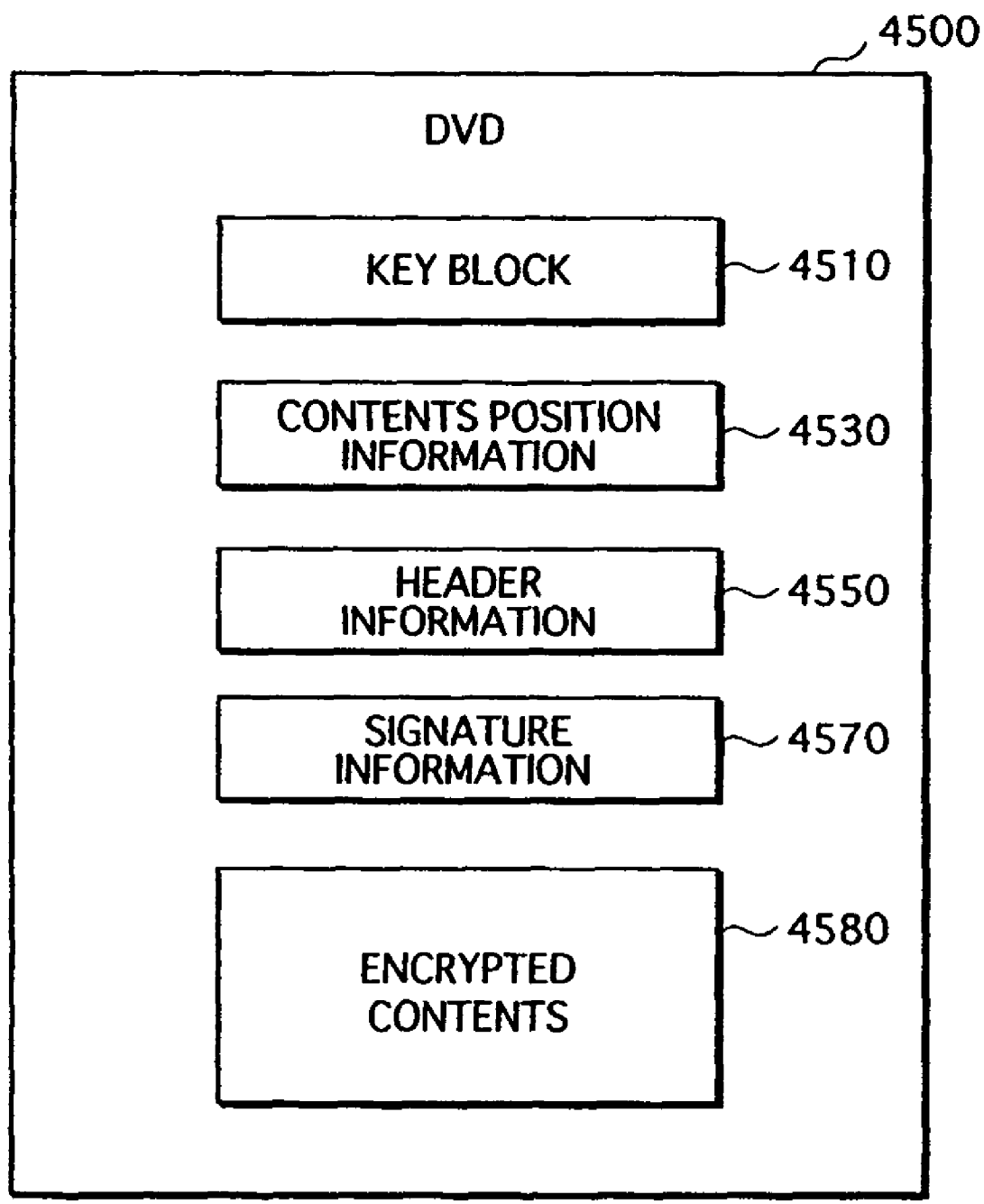
FIG. 45 shows information recorded on a DVD 4500 of the fourth embodiment.

FIG. 45 shows information stored in a DVD of the fourth embodiment. As shown in FIG. 45, a DVD 4500 stores a key block 4510, contents position information 4530, header information 4550, signature information 4570, and encrypted contents 4580.

These sets of information have been written by the distributing device 4100. Structures of the individual sets of information are as stated above, and therefore the descriptions are omitted here.

4.4 Executing Device 4600

Figure 46:
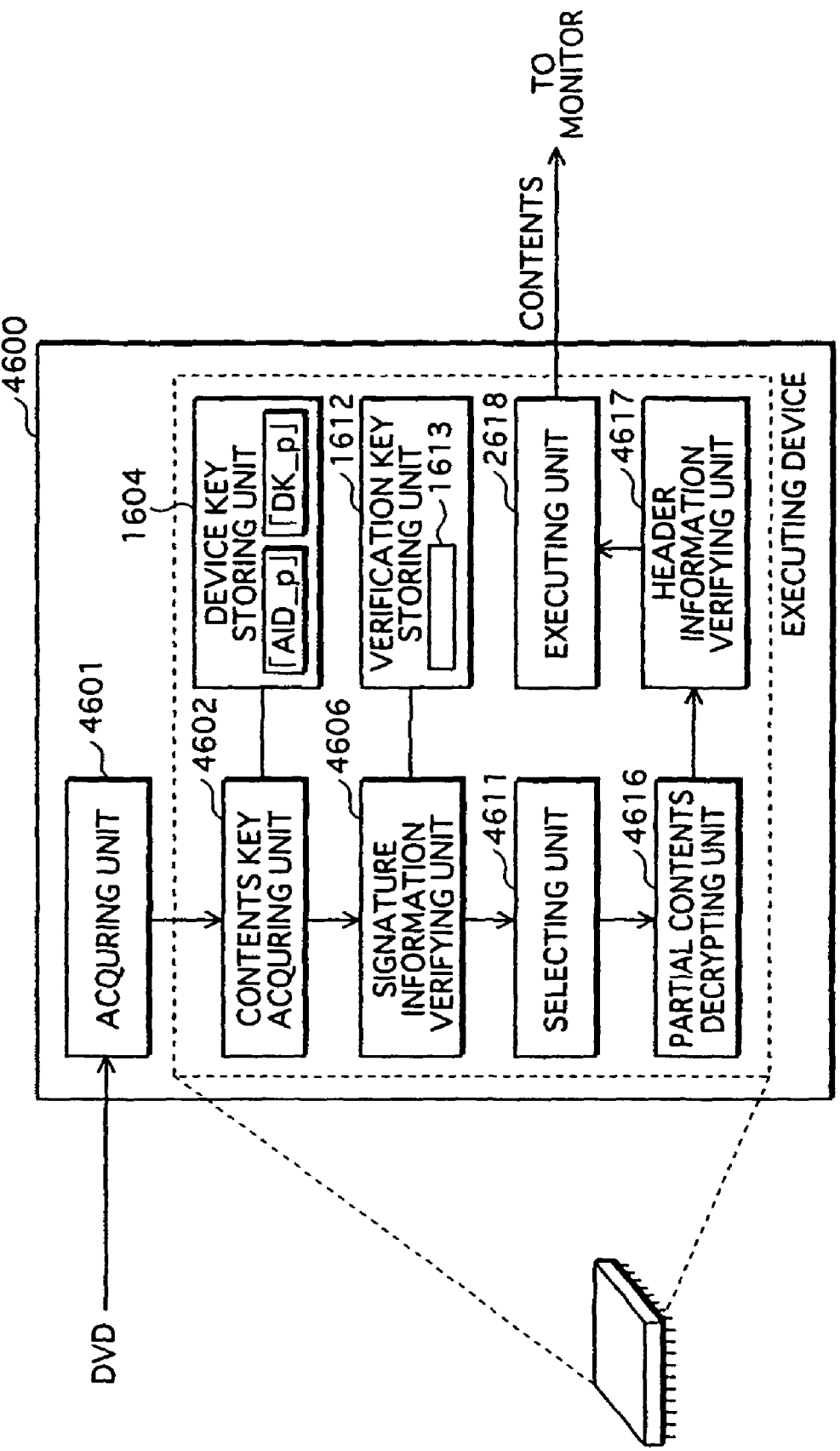
FIG. 46 is a block diagram showing a structure of an executing device 4600 of the fourth embodiment.

FIG. 46 shows a structure of the executing device of the fourth embodiment. As shown in FIG. 46, an executing device 4600 is composed of an acquiring unit 4601, a contents key acquiring unit 4602, a device key storing unit 1604, a signature information verifying unit 4606, a verification key storing unit 1612, a selecting unit 4611, a partial contents decrypting unit 4616, a header information verifying unit 4617, and an executing unit 2618.

Individual components making up the executing device 4600 are described in detail below. Note that, since the device key storing unit 1604 and verification key storing unit 1612 are the same as in the first embodiment while the executing unit 2618 being the same as in the second embodiment, the descriptions of these components are omitted.

4.4.1 Acquiring Unit 4601

The acquiring unit 4601 is loaded with the DVD 4500. When detecting the DVD 4500 loaded thereon, the acquiring unit 4601 reads the key block 4510, contents position information 4530, header information 4550, signature information 4570, and encrypted contents 4580, and outputs the read key block 4510, contents position information 4530, header information 4550, signature information 4570, and encrypted contents 4580 to the contents key acquiring unit 4602.

4.4.2 Contents Key Acquiring Unit 4602

The contents key acquiring unit 4602 receives the key block 4510, contents position information 4530, header information 4550, signature information 4570, and encrypted contents 4580 from the acquiring unit 4601.

When receiving these sets of information, the contents key acquiring unit 4602 generates the contents key "CK" by using the received key block 4510, the device identifier "AID_p" and the device key "DK_p" stored by the device key storage unit 1604. A procedure for generating the contents key "CK" is the same as one conducted by the contents key acquiring unit 1602 constituting the executing device 1600 of the first embodiment, and therefore the description is left out.

Next, the contents key acquiring unit 4602 outputs the generated contents key "CK", and the received contents position information 4530, header information 4550, signature information 4570, and encrypted contents 4580 to the signature information verifying unit 4606.

4.4.3 Signature Information Verifying Unit 4606

The signature information verifying unit 4606 receives the contents key "CK", contents position information 4530, header information 4550, signature information 4570, and encrypted contents 4580 from the contents key acquiring unit 4602.

When receiving these sets of information, the signature information verifying unit 4606 performs verification of the signature information 4570 in the following procedure.

First, the signature information verifying unit 4606 extracts partial hash values from individual pieces of partial hash information constituting the received header information, and calculates a signature verifying combined hash value by assigning a combined result formed by combining the extracted partial hash values "HA1", "HA2", "HA3", . . . , and "HAc" to the hash function.

Next, the signature information verifying unit 4606 reads a verification key 1613 from the verification key storing unit 1612, and generates signature verification information by applying the signature verifying algorithm V to the calculated signature verifying combined hash value. Then, the signature information verifying unit 4606 compares the generated signature verifying information and the received signature information. When these two do not agree, the signature information verifying unit 4606 judges that the verification of the signature information 4570 is unsuccessful, and aborts the subsequent processing in the executing device 4600.

When these two agree, the signature information verifying unit 4606 judges that the verification of the signature information 4570 is successful, and outputs the received contents key "CK", contents position information 4530, header information 4550, and encrypted contents 4580 to the selecting unit 4611.

4.4.4 Selecting Unit 4611

The selecting unit 4611 receives the contents key "CK", contents position information 4530, header information 4550, and encrypted contents 4580 from the signature information verifying unit 4606.

Figure 47:
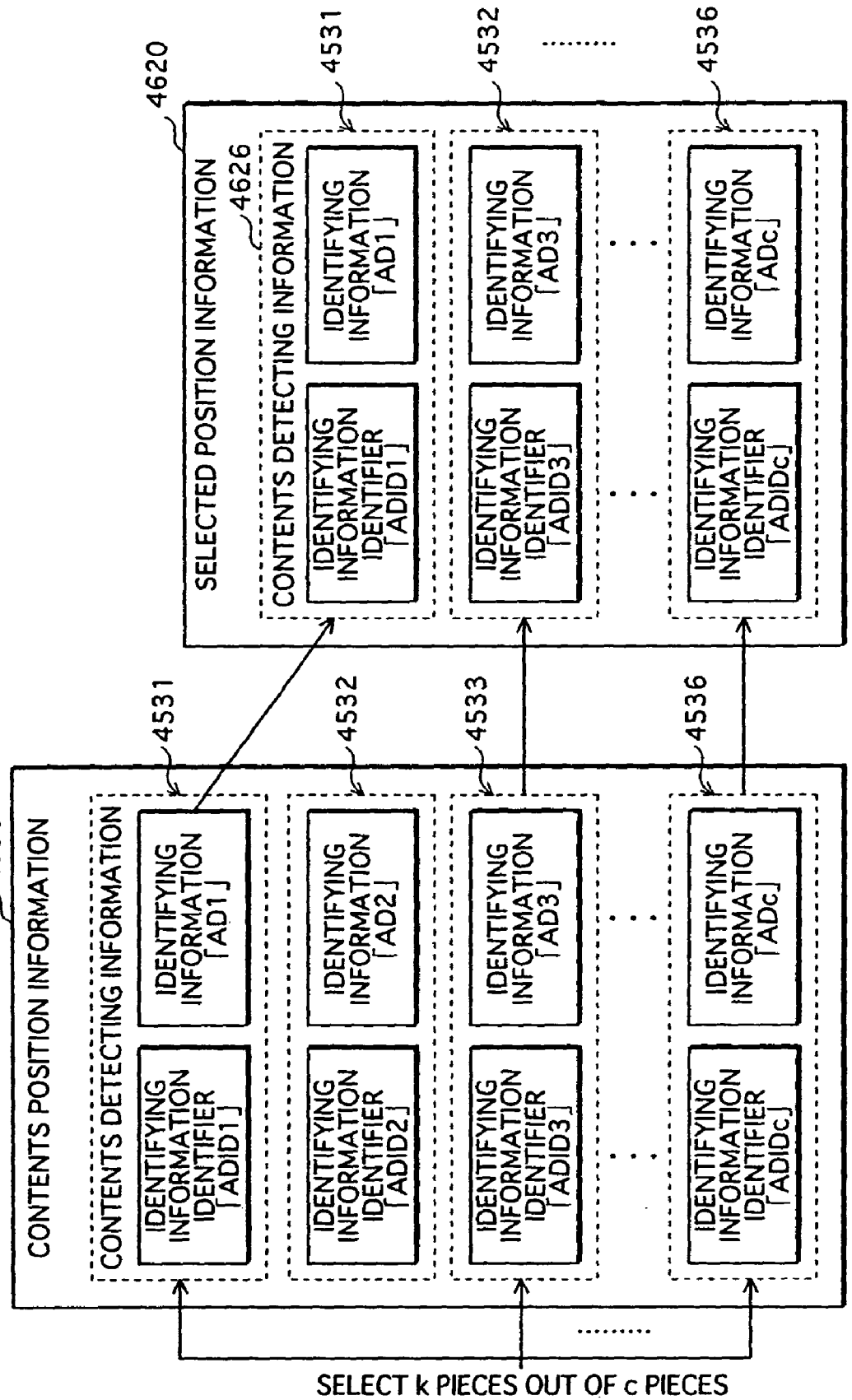
FIG. 47 shows a general outline of a generation procedure of selected position information 4620 performed by a selecting unit 4611.

When receiving these sets of information, the selecting unit 4611 generates selected position information from the received contents position information 4530 in a procedure described as follows. FIG. 47 shows a general outline of a generation procedure of the selected position information performed by the selecting unit 4611 and a structure of the selected position information generated at this point. The following describes the generation procedure of the selected position information with the aid of FIG. 47.

The selecting unit 4611 selects k pieces out of c pieces of contents detecting information 4531, 4532, 4533, . . . , and 4536 constituting the received contents position information 4530 with the use of random numbers. The selecting method is not limited to this, and any method is applicable as long as it is difficult for a third party to predict which pieces are selected.

FIG. 47 shows a case in which k pieces including pieces of contents detecting information 4531, 4533, and 4536 have been selected.

Next, the selecting unit 4611 generates selected position information 4620 composed of the selected k pieces of contents detecting information 4531, 4533, . . . , and 4536.

Figure 48:
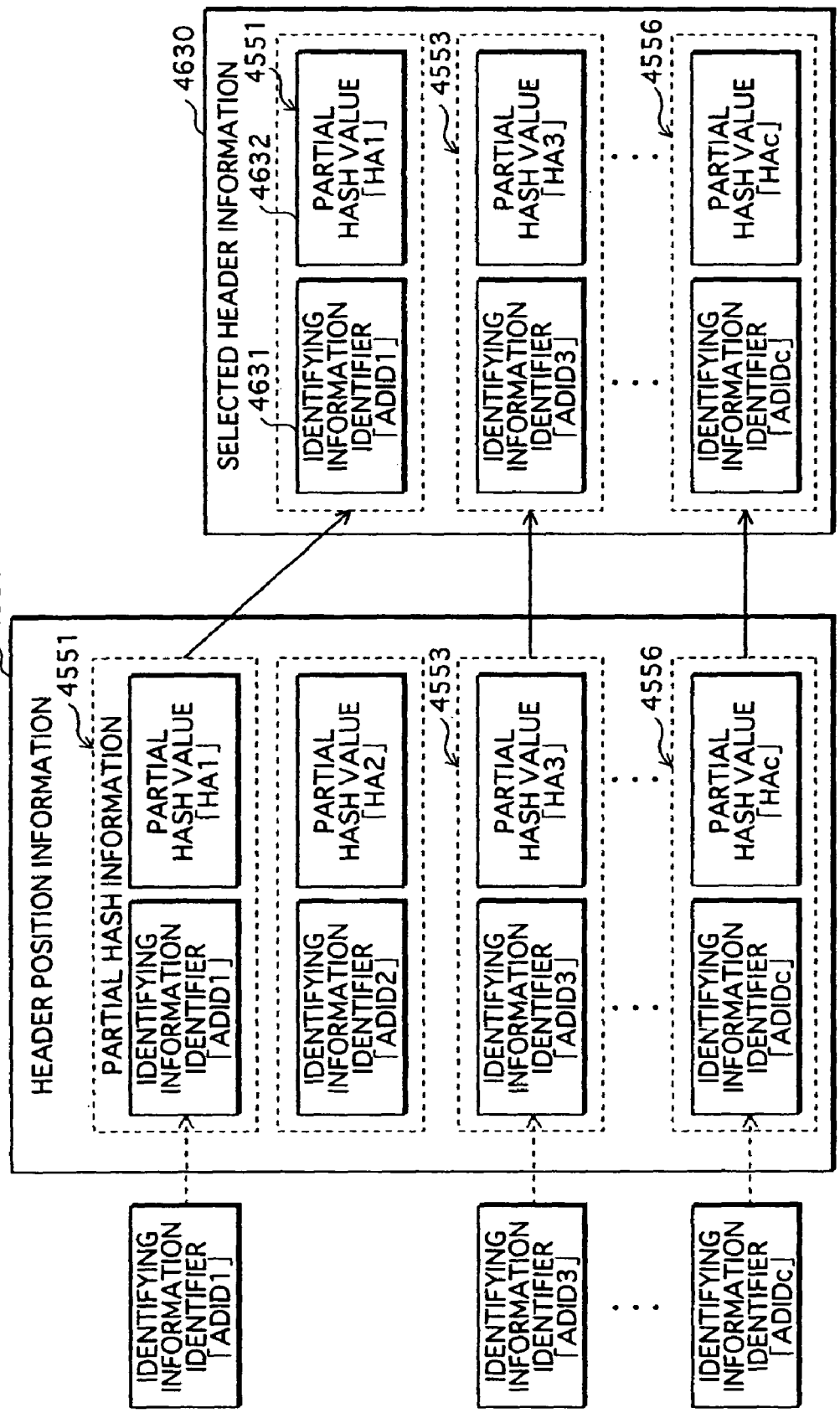
FIG. 48 shows a general outline of a generation procedure of selected header information 4630 performed by the selecting unit 4611.

Next, the selecting unit 4611 generates selecting header information in the following procedure based on the received header information 4550. FIG. 48 shows a general outline of a procedure for generating the selecting header information and a structure of the selecting header information. The following gives an account of the generation procedure of the selecting header information with the aid of FIG. 48.

First, the selecting unit 4611 extracts an identifying information identifier from each of the pieces of contents detecting information 4531, 4532, . . . , and 4536 constituting the generated selected position information 4620, and further extracts pieces of partial hash information 4551, 4553, . . . , and 4556 including the same identifying information identifiers as the extracted identifying information identifiers "ADID1", "ADID3", . . . , and "ADIDc".

Next, the selecting unit 4611 generates selecting header information 4630 composed of the extracted pieces of partial hash information 4551, 4553, . . . , and 4556.

Next, the selecting unit 4611 outputs the generated selected position information 4620 and selecting header information 4630, and the received contents key "CK" and encrypted contents 4580 to the partial contents decrypting unit 4616.

4.4.5 Partial Contents Decrypting Unit 4616

The partial contents decrypting unit 4616 receives the selected position information 4620, selecting header information 4630, contents key "CK", and encrypted contents 4580 from the selecting unit 4611.

Figure 49:
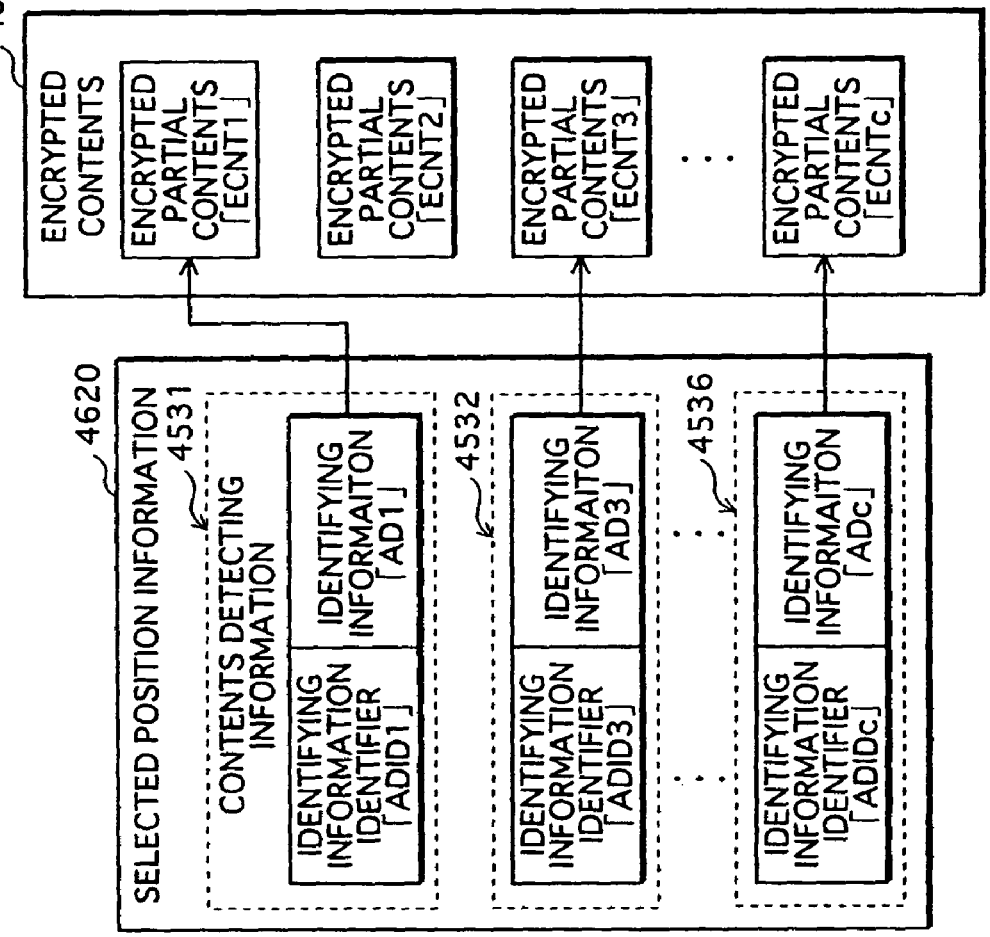
FIG. 49 shows a general outline of decryption processing conducted by a partial contents decrypting unit 4616.

When receiving these sets of information, the partial contents decrypting unit 4616 generates verifying contents in a procedure explained as follows. FIG. 49 shows a general outline of a procedure for generating verifying contents and a structure of verifying contents 4650 generated at this point. The procedure for generating the verification contents is described below with the aid of FIG. 49.

First, the partial contents decrypting unit 4616 extracts the piece of identifying information "AD1" from the contents detecting information 4531 constituting the received selected position information 4620, and further extracts the piece of encrypted partial contents "ECNT1" from the received encrypted contents 4580 based on the extracted piece of identifying information "AD1".

The partial contents decrypting unit 4616 generates the piece of partial contents "CNT1" by applying the decrypting algorithm D1 to the piece of extracted partial content "ECNT1". Subsequently, the partial contents decrypting unit 4616 generates a piece of verifying partial contents information 4651 composed of the identifying information identifier "ADID1" included in the piece of contents detecting information 4531 and the generated piece of partial contents "CNT1".

The partial contents decrypting unit 4616 repeats processing of the same kind for the rest pieces of contents detecting information 4532, . . . , and 4536 to generate pieces of verifying partial contents information 4652, . . . , and 4656. Next, the partial contents decrypting unit 4616 generates the verifying contents 4650 composed of the generated k pieces of verifying partial contents information.

When having generated the verifying contents 4650, the partial contents decrypting unit 4616 outputs the generated verifying contents 4650, and the received selecting header information 4630, contents key "CK", and encrypted contents 4580 to the header information verifying unit 4617.

4.4.6 Header Information Verifying Unit 4617

The header information verifying unit 4617 receives the verifying contents 4650, selecting header information 4630, content key "CK", and encrypted contents 4580 from the partial contents decrypting unit 4616.

When receiving these sets of information, the header information verifying unit 4617 generates a verifying hash value "H1" by assigning a piece of partial contents "CNT1" 4624 included in the first piece of verifying partial contents information 4651 constituting the received verifying contents 4650 to the hash function.

Next, the header information verifying unit 4617 extracts an identifying information identifier "ADID1" 4621 included in the piece of verifying partial contents information 4651. Then, the header information verifying unit 4617 detects a piece of partial hash information 4551 including the same identifying information identifier as the extracted identifying information identifier "ADID1" 4621 from the received selecting header information 4630, and extracts a partial hash value "HA1" 4632 included in the detected partial hash information 4551. Next, the header information verifying unit 4617 compares the extracted partial hash value "HA1" 4632 and the calculated verifying hash value "H1".

The header information verifying unit 4617 repeats processing of the same kind for the rest pieces of verifying partial contents information 4652, . . . , and 4656, and performs comparison of a partial hash value with a verifying hash value k times.

When even once in the k comparisons a partial hash value and a verifying hash value do not conform to each other, the header information verifying unit 4617 aborts the subsequent processing in the executing device 4600.

When all pairs of a partial hash value and a verifying hash value agree in the k comparisons, the header information verifying unit 4617 outputs the received contents key "CK" and encrypted contents 4580 to the executing unit 4618.

4.5 Operational Behaviors

The following describes operational behaviors of the distributing device 4100 and the executing device 4600.

4.5.1 Operational Behavior of Distributing Device 4100

Figure 50:
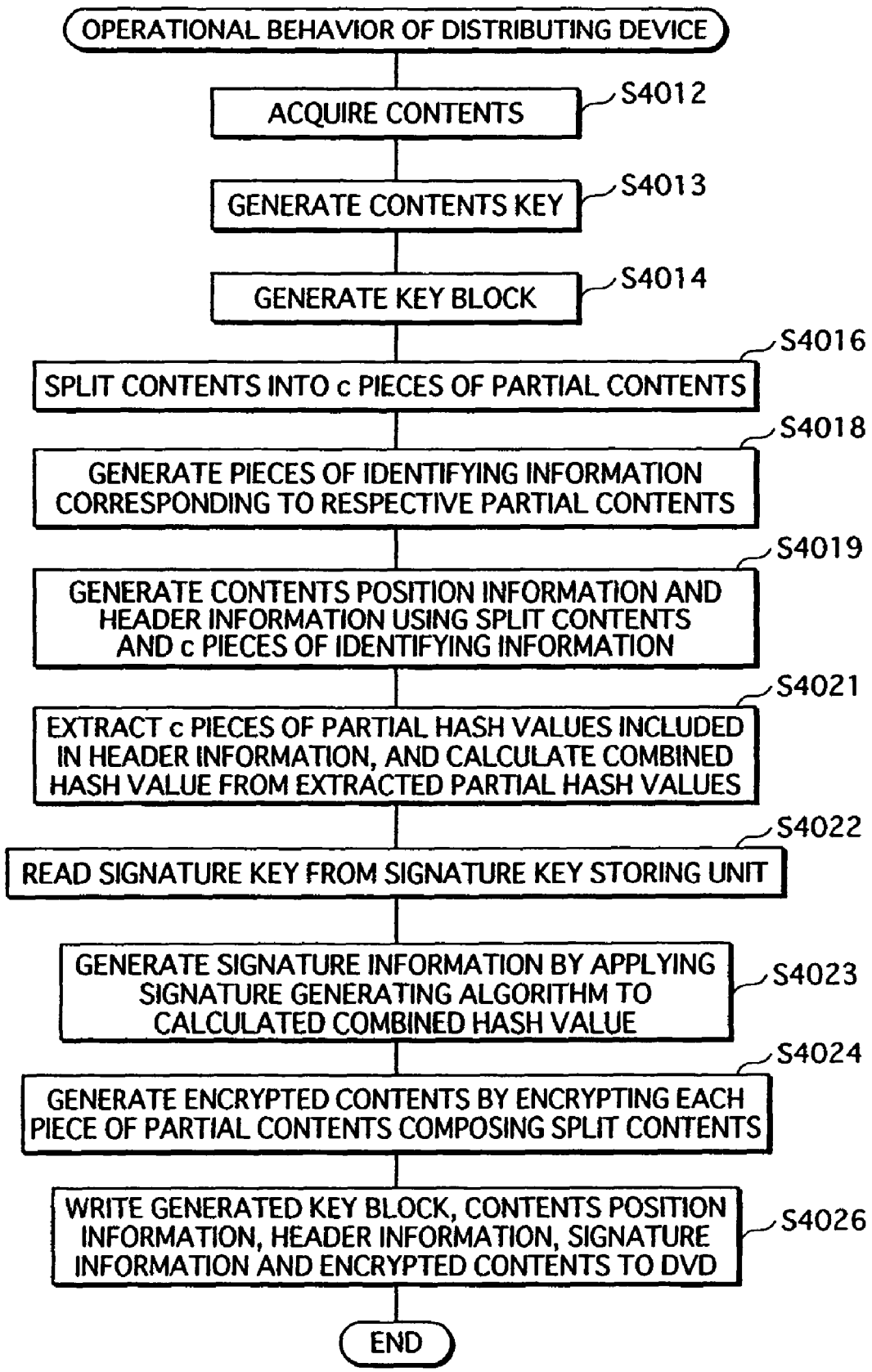
FIG. 50 is a flowchart showing operational behavior of the distributing device 4100.
Figure 51:
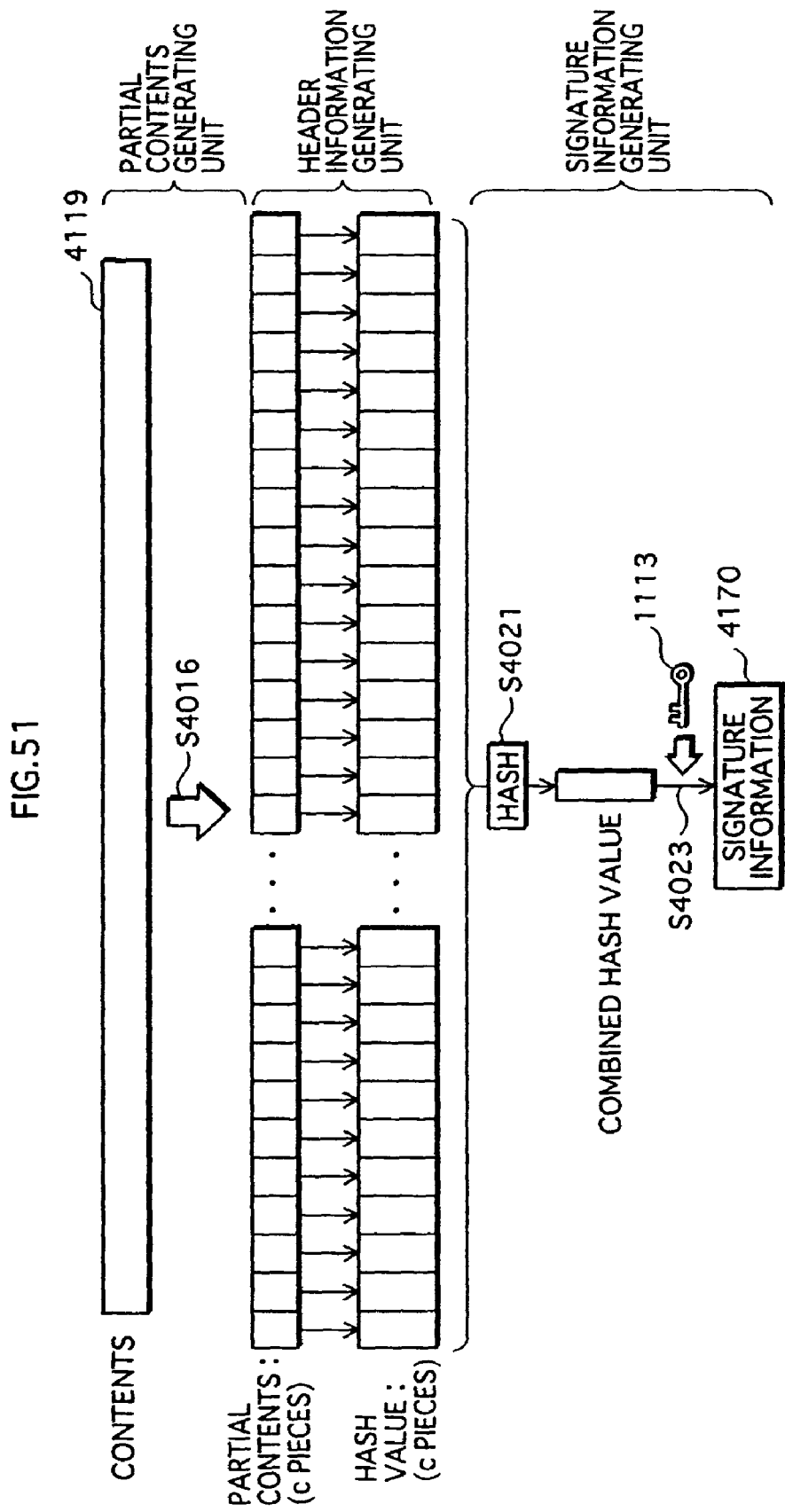
FIG. 51 shows a generation procedure of signature information 4170 performed by the distributing device 4100.

FIG. 50 is a flowchart showing an operational behavior of the distributing device 4100, while FIG. 51 shows a flow of processing the contents in the operational behavior of the distributing device 4100.

The operational behavior of the distributing device 4100 is described with the aid of FIGS. 50 and 51.

The input unit 4101 acquires the contents (Step S4012), and outputs the acquired contents to the contents key generating unit 4102.

The contents key generating unit 4102 receives the contents, generates a contents key with the use of a random number (Step S4013), and outputs the generated contents key and the received contents to the key block generating unit 4103.

When receiving the contents key and contents, the key block generating unit 4103 generates a key block, and outputs the generated key block, and the received contents key and contents to the partial contents generating unit 4105 (Step S4014).

The partial contents generating unit 4105 receives the key block, contents key, contents from the key block generating unit 4103. Next, the partial contents generating unit 4105 splits the received contents 4119, as shown in FIG. 51, to generate c pieces of partial contents (Step S4016), and puts the generated c pieces of partial contents together to form the split contents 4120. Next, the partial contents generating unit 4105 generates pieces of identifying information respectively corresponding to the generated c pieces of partial contents (Step S4018), and outputs the generated split contents 4120 and the c pieces of identification information, and the received key block, contents key, and contents to the header information generating unit 4107.

The header information generating unit 4107 receives the split contents, c pieces of identifying information, key block, and contents key from the partial contents generating unit 4105, generates identifying information identifiers respectively corresponding to the received pieces of identification information, and further generates the contents position information 4140 including the generated identifying information identifiers and pieces of identifying information. Furthermore, as shown in FIG. 51, the header information generating unit 4101 calculates c pieces of partial hash values by assigning individually the c pieces of partial contents making up the received split contents 4120 to the hash function, and generates the header information 4160 including the calculated c piece of partial hash values (Step S4019). Next, the header information generating unit 4107 outputs the generated contents position information 4140 and header information 4160, and the received key block and contents key to the signature information generating unit 4108.

The signature information generating unit 4108 receives the contents position information 4140, header information 4160, key block, and contents key from the header information generating unit 4107. As shown in FIG. 51, the signature information generating unit 4108 extracts c pieces of partial hash values included in the received header information, combines the extracted c pieces of partial hash values, and calculates a combined hash value by assigning the combined result to the hash function (Step S4021).

Next, the signature information generating unit 4108 reads the signature key 1113 from the signature key storing unit 1112 (Step S4022). As shown in FIG. 51, the signature information generating unit 4108 generates the signature information 4170 by applying a signature generating algorithm to the generated combined hash value with the use of the read signature key 1113 (Step S4023).

Next, the signature information generating unit 4108 outputs the generated signature information, and the received contents position information 4140, header information 4160, split contents 4120 and contents key to the encryption processing unit 4109.

The encryption processing unit 4109 receives the signature information, contents position information 4140, header information 4160, split contents 4120, and contents key, and generates encrypted contents by encrypting individual pieces of partial contents constituting the split contents 4120 with the use of the received contents key (Step S4024). The encryption processing unit 4109 outputs the generated encrypted contents, and the received signature information, contents position information 4140, header information 4160, and key block to the recording unit 4114.

The recording unit 4114 receives the encrypted contents, signature information, contents position information 4140, header information 4160, and key block, and writes the received key block, contents position information 4140, header information 4160, signature information, encrypted contents to the DVD 4500 (Step S4026).

4.5.2 Operational Behavior of Executing Device 4600

Figure 52:
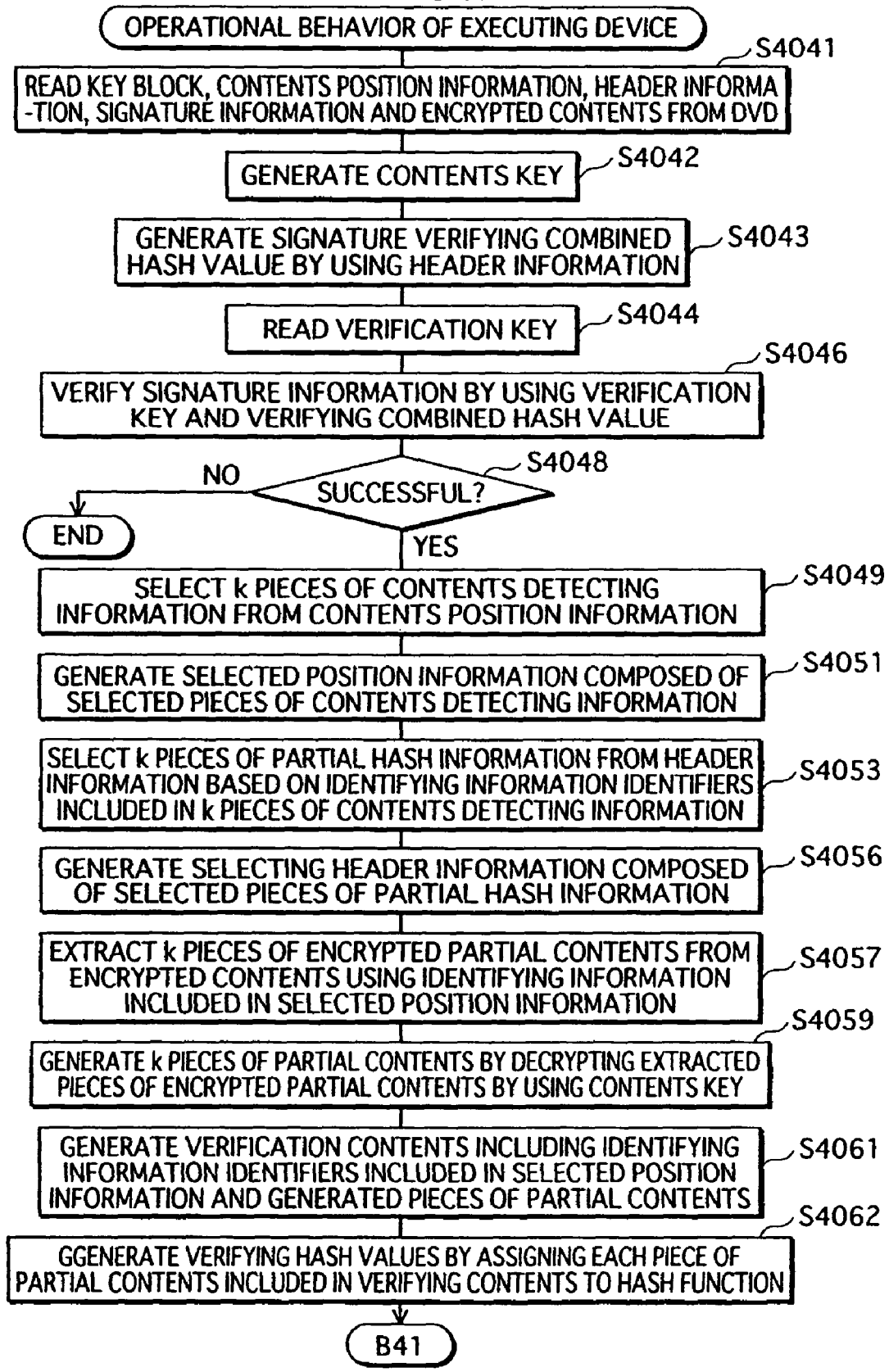
FIG. 52 is a flowchart showing operational behavior of the executing device 4600.
Figure 53:
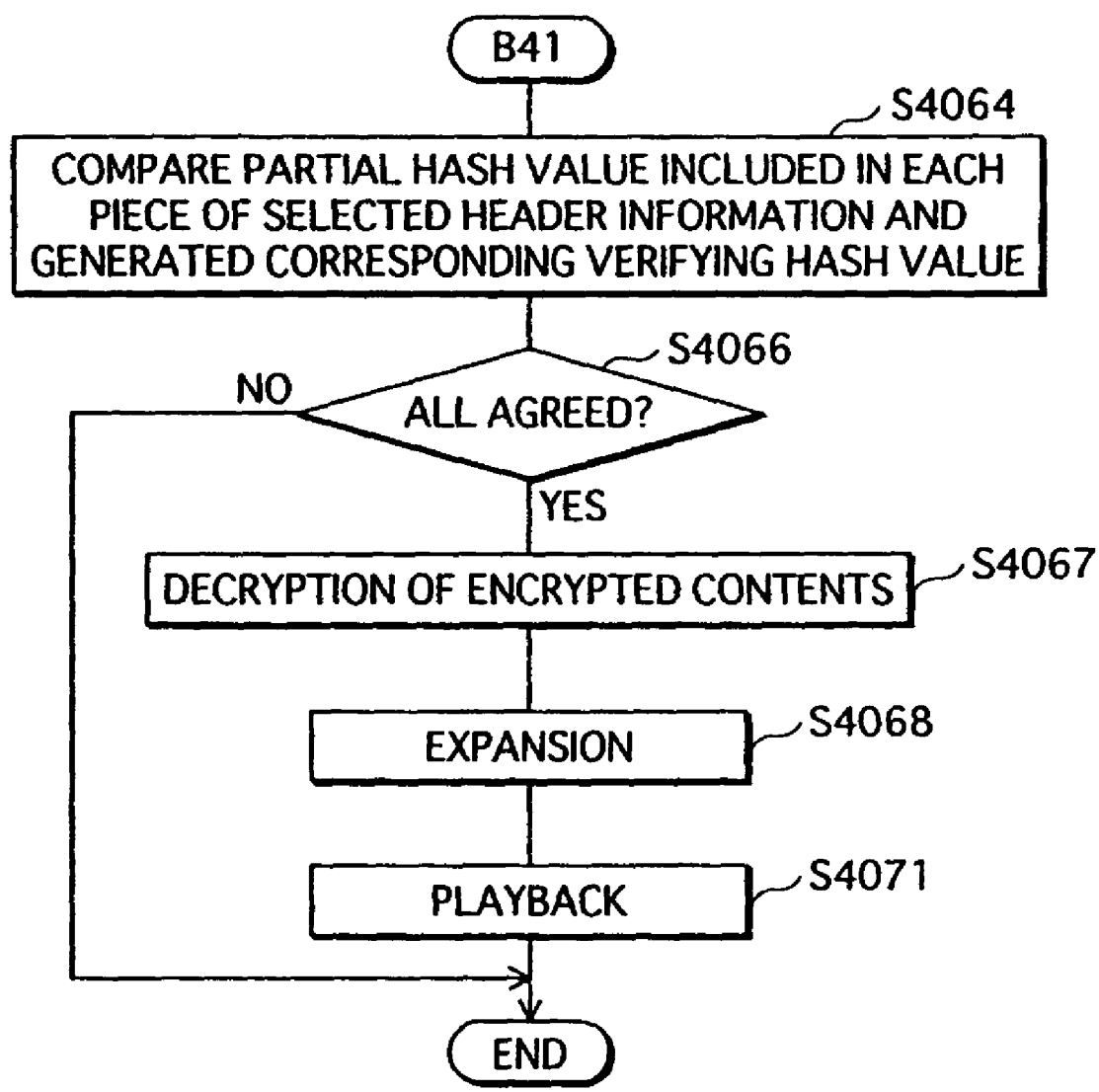
FIG. 53 is a flowchart showing operational behavior of the executing device 4600 (continued from FIG. 52)
Figure 54:
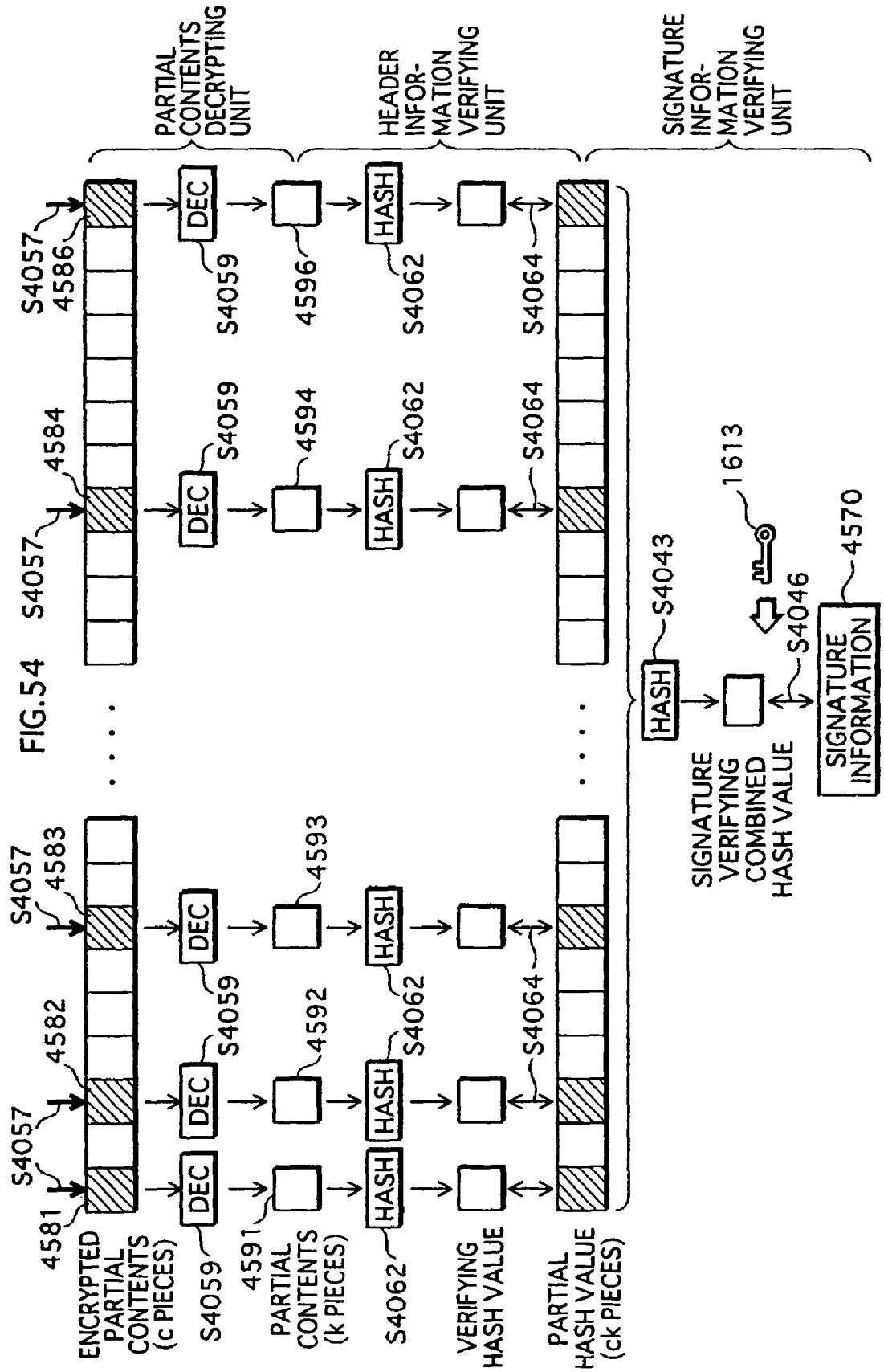
FIG. 54 shows a verification procedure for signature information and header information performed by the executing device 4600.

FIGS. 52 and 53 are flowcharts showing an operational behavior of the execution device 4600. FIG. 54 schematically shows information dealt by individual components making up the executing device 4600. Note that the same referential step numbers in FIGS. 52 to 54 indicate the same processing.

The following explains the operational behavior of the executing device 4600 with the aid of FIGS. 52 to 54.

When being loaded with the DVD 4500, the acquiring unit 4601 reads the key-block 4510, contents position information 4530, header information 4550, signature information 4570, and encrypted contents 4580 from the DVD 4500 (Step S4041), and outputs the read these sets of information to the contents key acquiring unit 4602.

The contents key acquiring unit 4602 receives the key block 4510, contents position information 4530, header information 4550, signature information 4570, and encrypted contents 4580, and generates the contents key by using the received key block 4510, a device identifier and a device key stored by the device key storing unit 1604 (Step S4042). Next, the contents key acquisition unit 4602 outputs the generated contents key, and the received contents position information 4530, header information 4550, signature information 4570, and encrypted contents 4580 to the signature information verifying unit 4606.

The signature information verifying unit 4606 receives the contents key, contents position information 4530, header information 4550, signature information 4570, and encrypted contents 4580, combines c pieces of partial hash values included in the received header information 4550, and generates a signature verifying combined hash value by assigning the combined result to the hash function (Step S4043). Next, the signature information verifying unit 4606 reads the verification key 1613 from the verification key storing unit 1612 (Step S4044), and verifies the received signature information 4570 by using the read verification key 1613 and the generated signature verifying combined hash value (Step S4046).

If the verification of the signature information 4570 is unsuccessful (Step S4048: NO), the signature information verifying unit 4606 aborts the subsequent processing in the executing device 4600.

If the verification of the signature information 4570 is successful (Step S4048: YES), the signature information verifying unit 4606 outputs the received contents key, contents position information 4530, header information 4550, and encrypted contents 4580 to the selecting unit 4611.

When receiving the contents key, contents position information 4530, header information 4550, and encrypted contents 4580, the selecting unit 4611 selects k pieces out of the c pieces of contents detecting information included in the contents position information 4530 (Step S4049). Next, the selecting unit 4611 generates the selected position information 4620 composed of the selected pieces of contents detecting information (Step S4051). Then, the selecting unit 4611 selects k pieces of partial hash information from the received header information 4550 based on the identifying information identifiers included in the k pieces of contents detecting information making up the generated selected position information 4620 (Step S4053), and generates the selecting header information 4630 composed of the selected, k pieces of partial hash information (Step S4056). Next, the selecting unit 4611 outputs the generated selected position information 4620 and selecting header information 4630, and the received contents key and encrypted contents 4580 to the partial contents decrypting unit 4616.

The partial contents decrypting unit 4616 receives the selected position information 4620, selecting header information 4630, contents key, and encrypted contents 4580, and extracts k pieces of encrypted partial contents 4581, 4582, 4583, . . . , and 4586 from the encrypted contents 4580 based on the pieces of identifying information included in the received selected position information 4620 as shown in FIG. 54 (Step S4057). Next, the partial contents decrypting unit 4616 generates pieces of partial contents by decrypting the extracted k pieces of encrypted partial contents 4581, 4582, 4583, . . . , and 4586 (Step S4059). Next, the partial contents decrypting unit 4616 generates the verifying contents 4650 including k pieces of identifying information identifiers included in the received selected position information 4620 and the generated k pieces of partial contents (Step S4061). The partial contents decrypting unit 4616 outputs the generated verifying contents 4650, and the received selecting header information 4630, content key, and encrypted contents 4650 to the header information verifying unit 4617.

The header information verifying unit 4617 receives the verifying contents 4650, selecting header information 4530, contents key, and encrypted contents 4580. When receiving these sets of information, the header information verifying unit 4617 generates k pieces of verifying hash values by individually assigning k pieces of partial contents 4591, 4592, 4593, ..., and 4596 included in the received verifying contents 4650 to the hash function (Step S4062), and compares individually k pieces of partial hash values included in the received header information and corresponding generated verifying hash values (Step S4064: YES).

In the comparison of k pairs, each of which is composed of a verifying hash value and a corresponding partial hash value, when any one pair does not conform to each other (Step S4066: NO), the header information verifying unit 4617 aborts the subsequent processing in the executing device 4600.

In the comparison of k pairs, when all k pairs show agreements (Step S4066: YES), the header information verifying unit 4617 outputs the received contents key and encrypted contents 4580 to the executing unit 2618.

The executing unit 2618 receives the contents key and encrypted contents 4580 from the header information verifying unit 4617, generates contents composed of c pieces of partial contents by decrypting individual encrypted partial contents making up the received encrypted contents 4580 with the use of the received contents key (Step S4067), expands the generated contents (Step S4068), and has the monitor play the expanded contents (Step S4071).

4.6 Summary and Advantageous Effects

As having been described, the unauthorized contents detection system of the fourth embodiment is composed of the distributing device 4100 and executing device 4600, and the distributing device 4100 generates c pieces of partial contents by splitting the contents, and further generates header information and verification information with the use of all the generated c pieces of partial contents.

The executing device 4600 selects k pieces out of c pieces of encrypted partial contents making up the encrypted contents, and extracts k pieces of partial hash values corresponding to the selected k pieces of partial contents from among c pieces of partial hash values included in the header information. The executing device 4600 verifies only the selected k pieces of encrypted, partial contents by using the extracted k pieces of partial hash values. Only when the verification is successful, the executing device 4600 generates the contents by decrypting the encrypted contents and plays the decrypted contents.

Thus, by limiting, to k pieces, the number of pieces of encrypted partial contents used for the verification of whether unauthorized contents are included, it is possible to reduce processing load involved in the verification.

By selecting a different piece of encrypted partial contents with the use of a random number every time when the executing device 4600 performs the verification, it is possible to complement degradation of accuracy for detecting unauthorized contents due to limiting, only to k pieces, the number of pieces of encrypted partial contents used for the verification.

In addition, it in difficult to predict which pieces of encrypted partial contents are to be used for the verification, and therefore it is possible to prevent fraudulent acts involving replacing, from among pieces of encrypted partial contents making up the encrypted contents, specifically only pieces of encrypted partial contents not to be used for the verification with unauthorized contents.

5. Fifth Embodiment

An unauthorized contents detection system according to a fifth embodiment of the present invention is described below.

5.1 Unauthorized Contents Detection System

The unauthorized contents detection system of the fifth embodiment is composed of a distributing device, an executing device, and a monitor, as in the first embodiment.

The distributing device acquires contents according to operations of an operator, and generates encrypted contents by encrypting the acquired contents. Additionally, the distribution device generates unit pick-out information, header information, and signature information used in the executing device for verifying the validity of the contents.

The distributing device acquires a storage capacity of a writable area on a DVD and data sizes of the generated various information.

The distributing device calculates a filling capacity which is found by subtracting the sum of the acquired data sizes of the various information from the acquired storage capacity, generates filling contents having a data size corresponding to the calculated filling capacity, and writes the generated filling contents to the DVD together with the various information.

5.2 Distributing Device 5100

Figure 55:
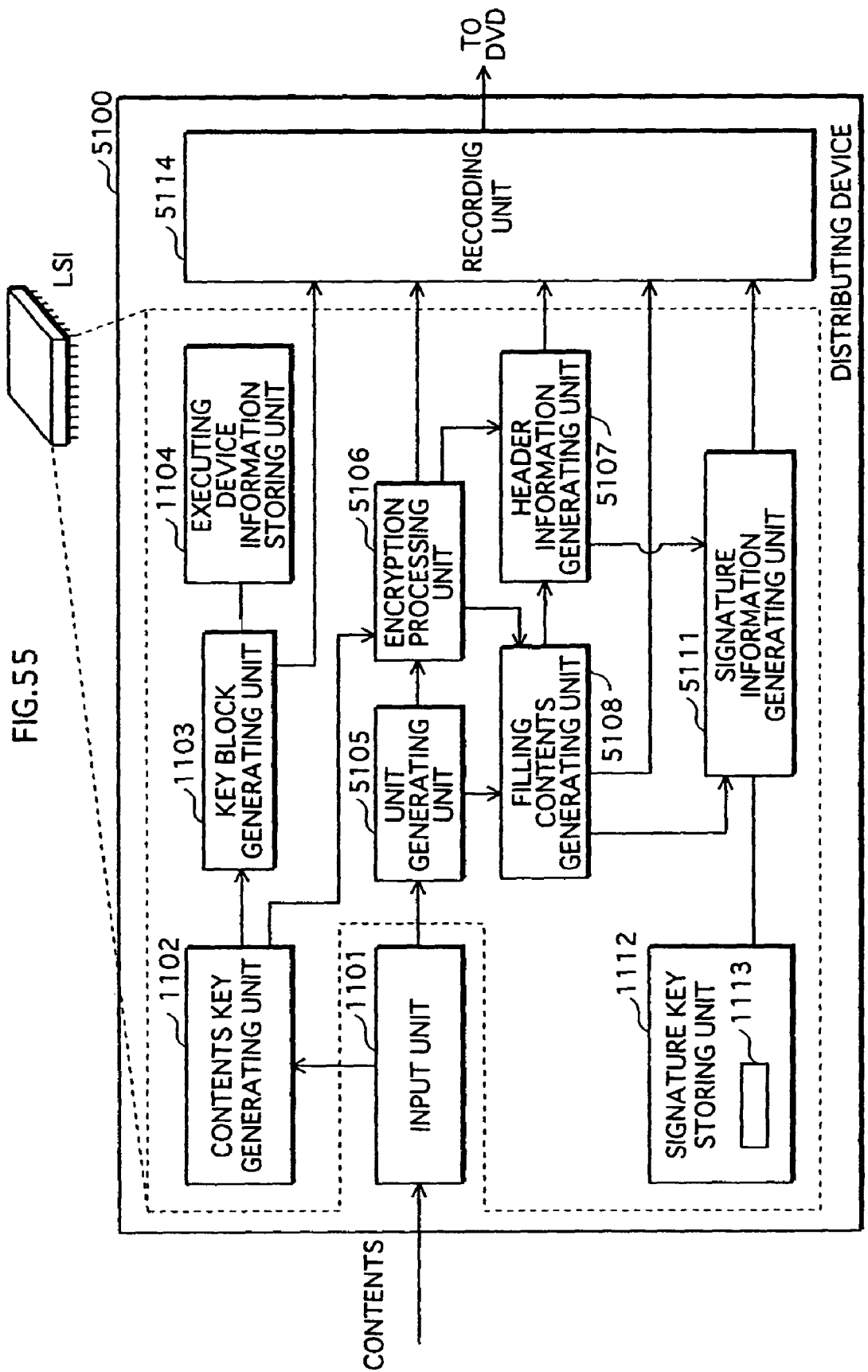
FIG. 55 is a block diagram showing a structure of a distributing device 5100 of a fifth embodiment.

FIG. 55 shows a structure of a distributing device of a fifth embodiment. As shown in FIG. 55, a distributing device 5100 is composed of an input unit 1101, a contents key generating unit 1102, a key block generating unit 1103, an executing device information storing unit 1104, a unit generating unit 5105, an encryption processing unit 5106, a header information generating unit 5107, a filling contents generating unit 5108, a signature information generating unit 5111, a signature key storing unit 1112, and a recording unit 5114.

Individual components making up the distributing device 5100 are described below. Note that, since the input unit 1101, contents key generating unit 1102, key block generating unit 1103, executing device information storing unit 1104, and signature key storing unit 1112 are the same as in the distributing device 1100 of the first embodiment, the descriptions of these components are omitted.

5.2.1 Unit Generating Unit 5105

As the unit generating unit 1105 described in the first embodiment, the unit generating unit 5105 receives contents, which are composed of c pieces of files "CNT1", "CNT2", "CNT3", ..., and so on, from the input unit 1101, and generates unit pick-out information and split contents with the use of the received contents. Procedures for generating the unit pick-out information and the split contents are same as ones conducted by the unit generating unit 1105 of the first embodiment, and the structures of the unit pick-out information and split contents generated here are as shown in FIGS. 6 and 7, respectively, and therefore the descriptions are omitted.

Next, the unit generating unit 5105 outputs the generated split contents to the encryption processing unit 5106, while outputting the generated unit pick-out information to the filling contents generating unit 5108.

5.2.2 Encryption Processing Unit 5106

The encryption processing unit 5106 receives the split contents from the unit generating unit 5105, and generates encrypted split contents and encrypted contents based on the received split contents. Procedures for generating these encrypted split contents and encrypted contents are the same as ones performed by the encryption processing unit 1106 of the first embodiment, and the structures of the generated encrypted contents and encrypted split contents here are as shown in FIGS. 9 and 10, respectively, and therefore the descriptions are omitted.

Next, the encryption processing unit 5106 outputs the generated encrypted split contents to the header information generating unit 5107, while outputting the generated encrypted contents to the recording unit 5114 and filling contents generating unit 5108.

5.2.3 Filling Contents Generating Unit 5108

The filling contents generating unit 5108 prestores a key block size "KBSIZE", a file information size "FISIZE", a unit hash size "USIZE", a file hash size "FSIZE", a ratio "RT", and a split number "j".

The unit hash size "USIZE" shows a data size of pieces of unit hash information constituting a 1st hash table generated by the header information generating unit 5107. Specifically speaking, the unit hash information here is the same as the unit hash information generated by the header information generating unit 1107 of the first embodiment.

The file hash size "FSIZE" shows a bit length of pieces of file hash information constituting a 2nd hash table generated by the header information generating unit 5107. Specifically speaking, the file hash information here is the same as the file hash information generated by the header information generating unit 1107 of the first embodiment.

The ratio "RT" shows a bit length ratio between information A and a signature SignA in the case where the signature information generating unit 5111 generates the signature SignA by applying the signature generating algorithm S to the information A.

The split number "J" is the number of units generated by the filling contents generating unit 5108 splitting the filling contents (as will hereinafter be described in detail).

In addition, the filling contents generating unit 5108 prestores 56-bit length playback impracticability information "DAMY" indicating that the filling contents are not able to be played.

The filling contents generating unit 5108 receives the unit pick-out information from the unit generating unit 5105, while receiving the encrypted contents from the encryption processing unit 5106.

When receiving the unit pick-out information and encrypted contents, the filling contents generating unit 5108 calculates a filling capacity with the use of the received unit pick-out information and encrypted contents in the following procedure, generates filling contents based on the calculated filling capacity, and updates the unit pick-out information.

The following provides detailed descriptions on the calculation of the filling capacity (a), the generation for the filling contents (b), and the update of the unit pick-out information (c) mentioned above.

(a) Filling Capacity Calculation

The filling capacity indicates free space on a DVD after a key block, unit pick-out information, header information, signature information, and encrypted contents have been written thereto. The following describes a procedure for generating the filling capacity.

First, the filling contents generating unit 5108 measures, via the recording unit 5114, a storage capacity of a writable area on the DVD loaded on the recording unit 5114, and generates a maximum storage capacity "MSIZE" indicating a capacity available for writing information therein. Here, instead of measuring the storage capacity of a writable area via the recording unit 5114, the maximum storage capacity "MSIZE" may be acquired by an input from the operator.

Next, the filling contents generating unit 5108 measures (?) a data size of the received encrypted contents, and generates a contents size "CNTSIZE".

Next, the filling contents generating unit 5108 counts pieces "c" of the file information included in the received contents pick-out information, and calculates a data size "UCSIZE" of unit pick-out information after update (the details will be described in the following description on the unit pick-out information update in (c)) by using the following equation of:

$$UCSIZE = FISIZE \times (c+1).$$

Next, the filling contents generating unit 5108 extracts c pieces of unit numbers, "N1", "N2", "N3", ..., and "Nc" included in the received unit pick-out information, and calculates the sum "HA1SIZE" of data sizes of (c+1) pieces of 1st hash tables (as will hereinafter be: described in detail) generated by the header information generating unit 5107 with the use of the extracted unit numbers "N1", "N2", "N3", ..., and "Nc" and the stored split number "j" by using the following equation of:

$$HA1SIZE = [N1+N2+N3+\ldots+Nc+j] \times USIZE.$$

Subsequently, the filling contents generating unit 5108 generates a data size "HA2SIZE" of a 2nd hash table (as will hereinafter be described in detail) generated by the header information unit 5107 by using the following equation of:

$$HA2SIZE = FSIZE \times (c+1),$$

and calculates a data size "HEADSIZE" of header information generated by the header information generating unit 5107 from the generated sum of data sizes of the 1st hash tables "HA1SIZE" and the data size of the 2nd hash table "HA2SIZE" by using the following equation of:

$$HEADSIZE = HA1SIZE + HA2SIZE.$$

Next, the filling contents generating unit 5108 calculates "SigSIZE" indicating a data size of signature information generated by the signature information generating unit 5111 with the use of the ratio "RT" by using the following equation of:

$$SigSIZE = (UCSIZE + HA2SIZE) \times RT.$$

Next, the filling contents generating unit 5108 calculates a filling capacity "FilSIZE" by using the following equation of:

$$FilSIZE = MSIZE - [KBSIZE + UCSIZE + HEADSIZE + SigSIZE].$$

(b) Filling Contents Generation

When having calculated the filling capacity "FilSIZE", the filling contents generating unit 5108 generates a random number, and combine the generated random number with the playback impracticable information "DAMY" to generate filling contents whose data size is "FilSIZE".

Figure 56:
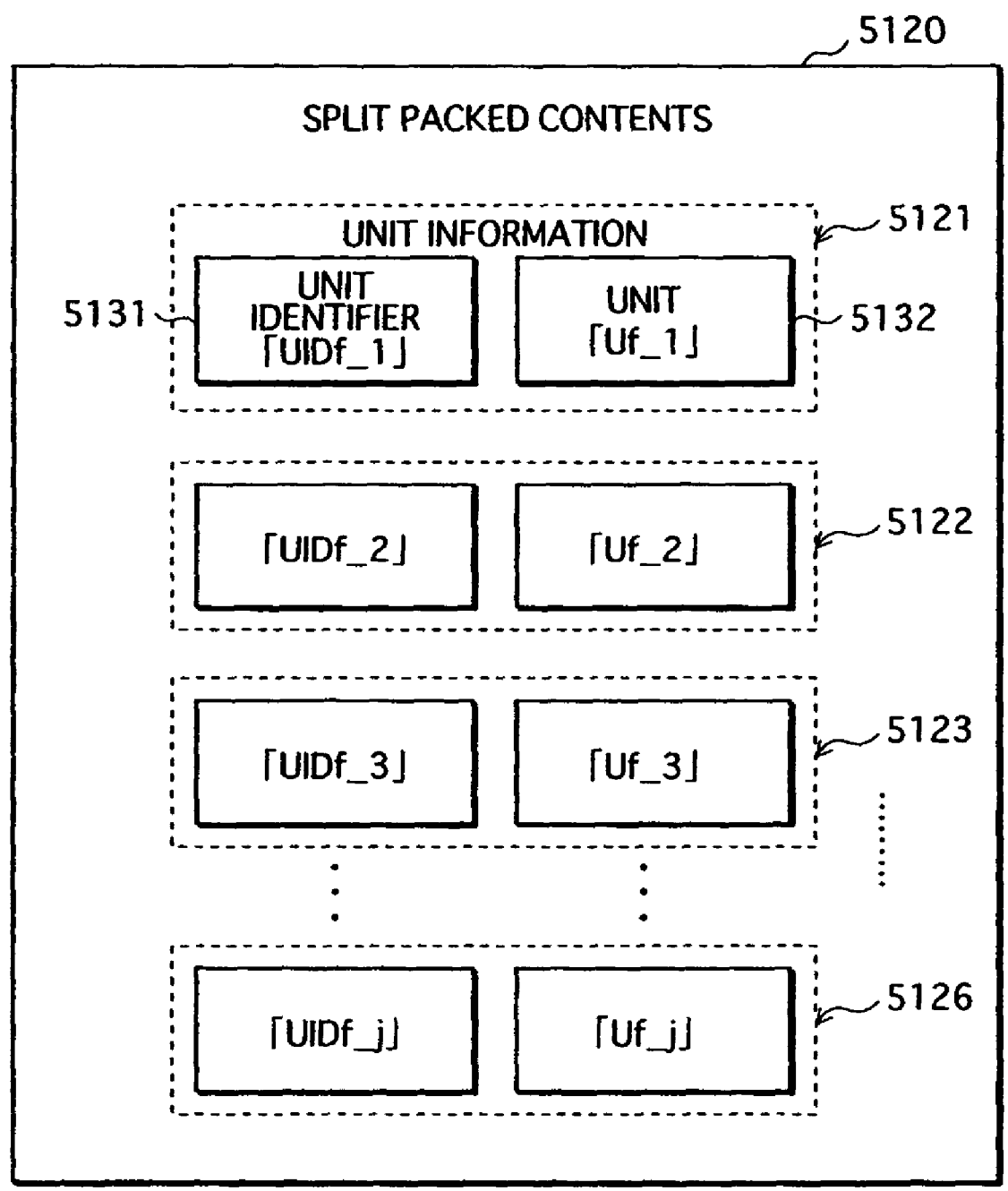
FIG. 56 shows a structure of split filling contents 5120 generated by a filling contents generating unit 5108.

Next, the filling contents generating unit 5108 generates a file identifier "FIDf" for specifically indicating the generated filling contents and file identifying information "ADf" for identifying the generated-filling contents. Next, the felling contents generating unit 5108 splits the generated split contents, based on the stored split number "j", into j pieces of units "Uf_1", "Uf_2", "Uf_3", ..., and "Uf_j", and generates unit identifiers "UIDf_1", "UIDf_2", "UIDf_3", ..., and "UIDf_j", each of which corresponds to one of the units. Here, a pair of a unit and a corresponding unit identifier is referred to hereinafter as "(a piece of) unit information". In addition, the filling contents generating unit 5108 generates split filling contents composed of j pieces of unit information. FIG. 56 shows a structure of the split filling contents generated at this point. As shown in FIG. 56*f*, the split filling contents 5120 is composed of multiple pieces of unit information 5121, 5122, 5123, . . . , and 5126, and each piece of unit information includes a unit identifier and a unit. For example, the piece of unit information 5121 includes the unit identifier "UIDf_1" 5131 and a unit "Uf_1" 5132. A procedure for generating the split filling contents from the filling contents is the same as a procedure for generating split files from a file, and therefore only a brief description is provided here.

Here, a pair of the generated file identifier "FIDf" and the split filling contents 5120 is referred to as "filling file information".

(c) Unit Pick-Out Information Update

Figure 57:
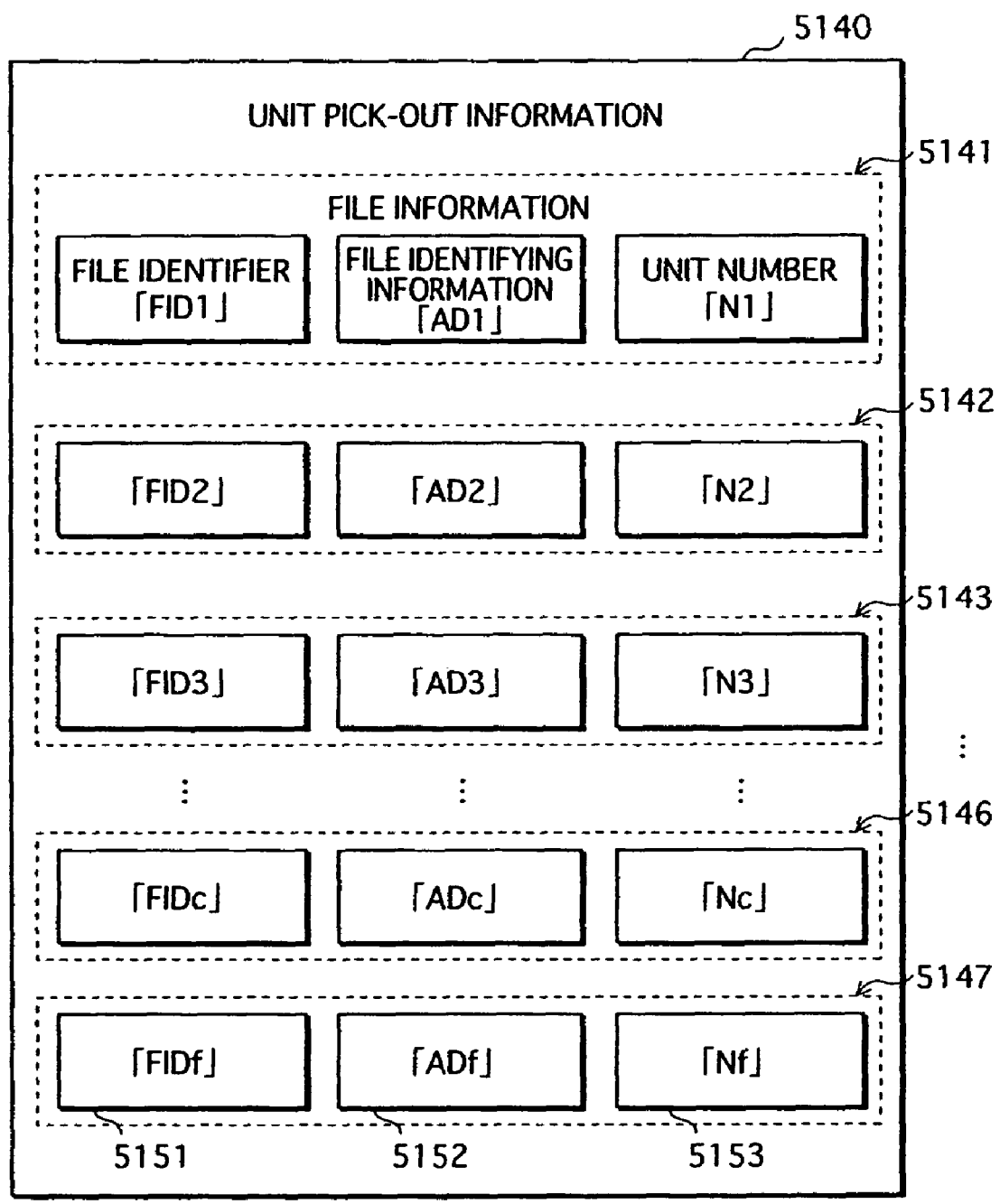
FIG. 57 shows a structure of unit pick-out information 5140 outputted from the filling contents generating unit 5108.

When having generated the filling contents and split filling contents 5120, the filling contents generating unit 5108 generates a piece of file information composed of the generated file identifier "FIDf", the generated piece of file identifying information "ADf", and a unit number "Nf" indicating the number of generated units, and adds the generated piece of file information to the received unit pick-out information. FIG. 57 shows unit pick-out information 5140 after the generated piece of file information has been added thereto. The unit pick-out information 5140 is composed of (c+1) pieces of file information 5141, 5142, 5143, . . . , 5146, and 5147, and each piece of file information includes a file identifier, a piece of file identifying information, and a unit number. The pieces of file information 5141, 5142, 5143, . . . , and 5146 are generated by the unit generating unit 5105 based on the contents, and are the same as the pieces of file information 1201, 1202, 1203, . . . , and 1204 making up the unit pick-out information 1200 shown in FIG. 7. The piece of file information 5147 is generated by the filling contents generating unit 5108 based on the filling contents, and includes a file identifier "FIDf" 5151 corresponding to the filling contents, a piece of file identifying information "AD1" 5152, and a unit number "Nf" 5153.

Next, the filling contents generating unit 5108 outputs: the generated filling contents and unit pick-out information 5140 to the recording unit 5114; the generated filling file information to the header information generating unit 5107; and the unit pick-out information 5140 to the signature information generating unit 5111.

5.2.4 Header Information Generating Unit 5107

The header information generating unit 5107 receives the encrypted split contents from the encryption processing unit 5106, while receiving the filling file information 5156 including the file identifier "FIDf" and piece of split filling contents 5120 from the filling contents generating unit 5108.

Figure 58:
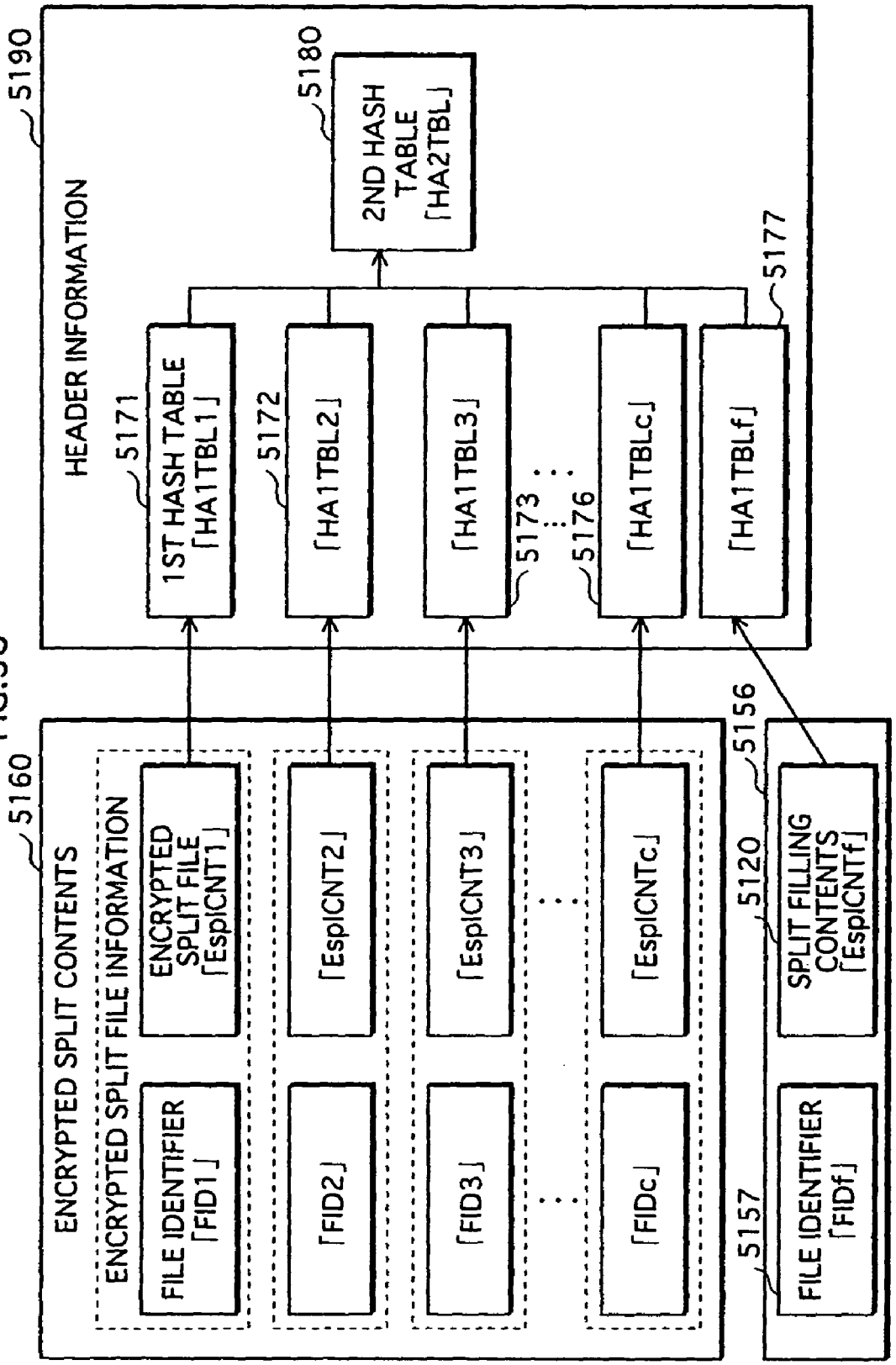
FIG. 58 shows a general outline of a generation procedure of header information 5109 performed by a header information generating unit 5107.

When receiving the filling file information 5156 and encrypted split contents 5160, the header information generating unit 5107 generates header information 5190 from the received sets of information as shown in FIG. 58. FIG. 58 shows a general outline of a generation procedure of the header information 5190 performed by the header information generating unit 5107. The following describes the generation procedure of the header information 5190 with the aid of FIG. 58.

The header information generating unit 5107 generates 1st hash tables "HA1TBL1" 5171, "HA1TBL2" 5172, "HA1TBL3" 5173, . . . , and "HA1TBLc" 5176 from the received encrypted split contents 5160. The 1st hash tables "HA1TBL1" 5171, "HA1TBL2" 5172, "HA1TBL3" 5173, . . . , and "HA1TBLc" 5176 generated here are the same as the 1st hash tables "HA1TBL1" 1261, "HA1TBL2" 1262, "HA1TBL3" 1263, . . . , and "HA1TBLc" 1264, and the generation procedures are also the same. Therefore, the descriptions of these 1st hash tables are omitted.

Next, the header information generating unit 5107 generates a 1st hash table "HA1TBLf" 5177 based on the filling contents included in the received filling file information 5156. The generation procedure is the same as the procedure for generating a 1st hash table from the encrypted split file, and therefore the description is left out.

Next, the header information generating unit 5107 calculates file hash values based respectively on (c+1) pieces of 1st hash tables, generates pieces of file hash information, each of which includes one of the calculated (c+1) pieces of file hash values and a file identifier corresponding to the file hash value, and further generates a 2nd hash table "HA2TBL" 5180 composed of the generated (c+1) pieces of file information. A specific procedure for generating the 2nd hash table is the same as the generation procedure for the 2nd hash table 1269 in the first embodiment except for using the file identifier "FIDf" 5157 and the split filling contents 5120 received from the filling contents generating unit 5108, and therefore the detailed explanation is omitted.

Figure 59:
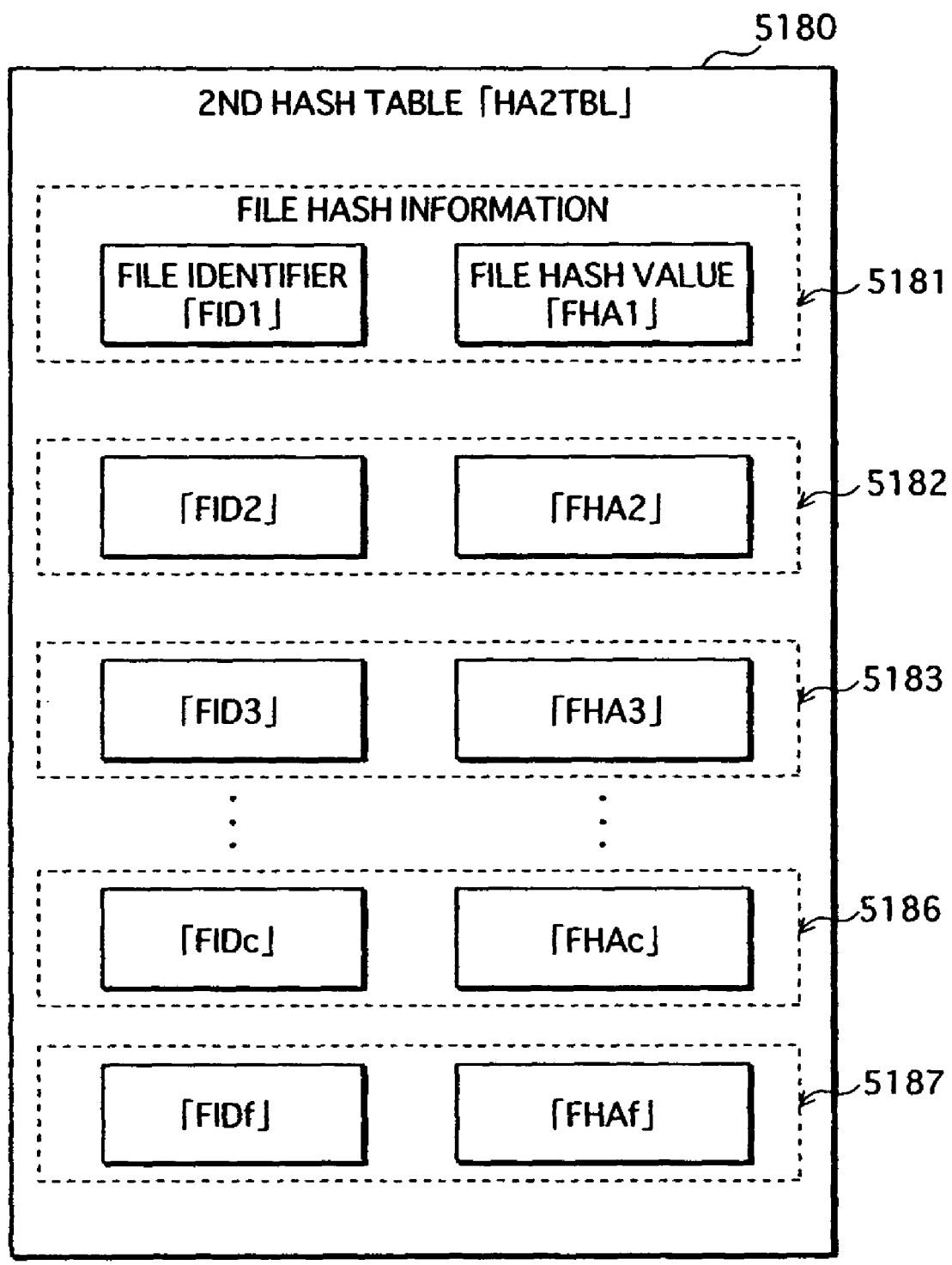
FIG. 59 shows a structure of a 2nd hash table 5180 generated by a header information generating unit 5107.

FIG. 59 shows a structure of the 2nd hash table "HA2TBL" 5180 generated at this point. The 2nd hash table "HA2TBL" 5180 is composed of (c+1) pieces of file hash information 5181, 5182, 5183, . . . , 5186, and 5187. Each piece of file hash information includes a file identifier and a file hash value. The pieces of file hash information 5181 to 5186 are generated from the encrypted split contents 5160, and are the same as the pieces of file hash information 1301 to 1304 making up the 2nd hash table "HA2TBL" 1269 described in the first embodiment. The piece of file hash information 5187 is generated based on the filling file information 5156.

The header information generating unit 5107 outputs the generated 2nd hash table 5160 to the signature information generating unit 5111, while outputting the header information 5190 including the generated (c+1) pieces of 1st hash tables and the 2nd hash table "HA2TBL" 5180 to the recording unit 5114.

5.2.5 Signature Information Generating Unit 5111

The signature information generating unit 5111 receives the unit pick-out information 5140 from the filling contents generating unit 5108, while receiving the 2nd hash table "HA2TBL" 5180 from the header information generating unit 5107.

When receiving the unit pick-out information 5140 and 2nd hash table "HA2TBL" 5180, the signature information generating unit 5111 reads the signature key 1113 recorded by the signature key storing unit 1112.

Next, the signature information generating unit 5111 generates signature information by applying the signature generating algorithm S to a combined result formed by combining the (c+1) pieces of file hash values making up the received 2nd hash table "HA2TBL" 5180 and the (c+1) pieces of file information making up the received unit pick-out information 5140 by using the read signature key 1113.

Next, the signature information generating unit 5111 outputs the generated signature information to the recording unit 5114.

5.2.6 Recording Unit 5114

The recording unit 5114 is loaded with a DVD.

The recording unit 5114 measures a storage capacity of a writable area on the loaded DVD in response to an instruction of the filling contents generating unit 5108.

The recording unit 5114 receives: the key block from the key block generating unit-1103; the encrypted contents from the encryption processing unit 5106; and the filling contents and unit pick-out information 5140 from the filling contents generating unit 5108. In addition, the recording unit 5114 receives the header information 5190 from the header information generating unit 5107, while receiving the signature information from the signature information generating unit 5111.

When receiving these sets of information, the recording unit 5114 writes the receive key block, encrypted contents, filling contents, unit pick-out information 5140, header information 5190, and signature information to DVD.

5.3 DVD 5500

Figure 60:
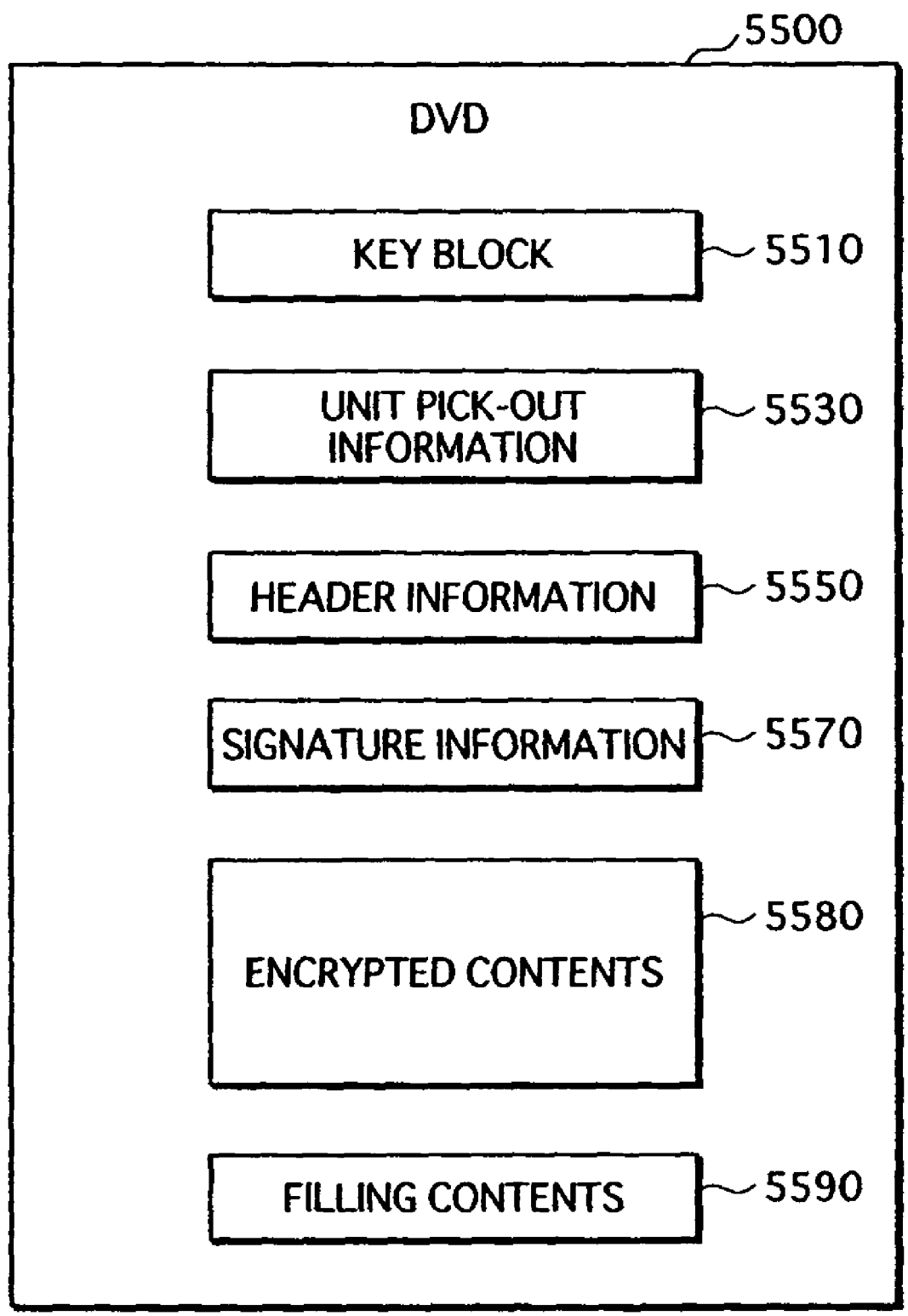
FIG. 60 shows information recorded on a DVD 5500 of the fifth embodiment.

FIG. 60 shows information stored in a DVD of the fifth embodiment. As shown in FIG. 60, a DVD 5500 stores a key block 5510, unit pick-out information 5530, header information 5550, encrypted contents 5580, and filling contents 5590.

These sets of information have been written by the distributing device 5100. Structures of the individual sets of information are as stated above, and therefore the descriptions are omitted here.

5.4 Executing Device 5600

Figure 61:
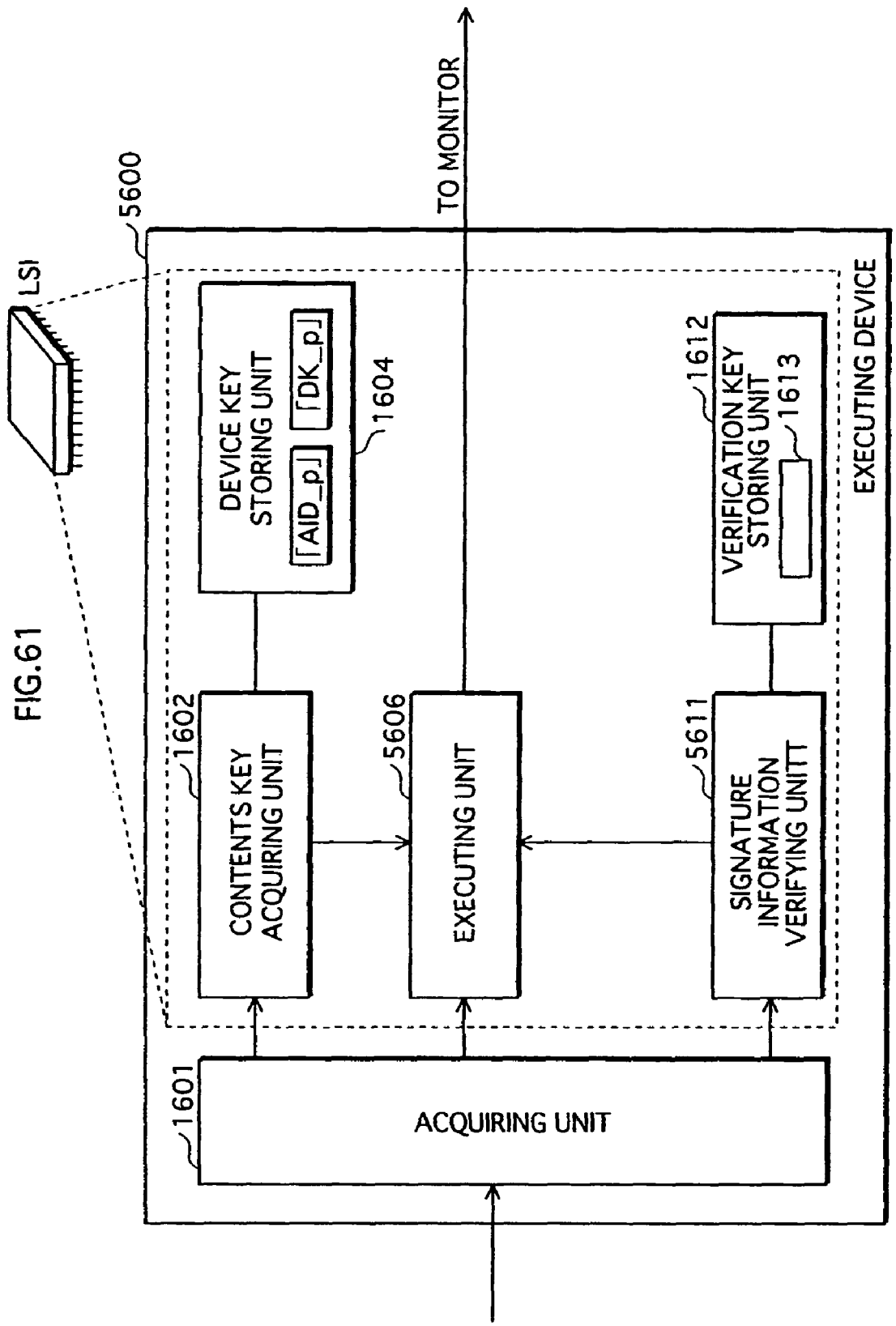
FIG. 61 is a block diagram, showing a structure of an executing device 5600 of the fifth embodiment.

As shown in FIG. 61, an executing device 5600 is composed of an acquiring unit 1601, a contents key acquiring unit 1602, a device key storing unit 1604, an executing unit 5606, a signature information verifying unit 5611, and a verification key storing unit 1612.

The following describes individual components constituting the executing device 5600. Note that, since the acquiring unit 1601, contents key acquiring unit 1602, and verification key storing unit 1612 are the same in the first embodiment, the descriptions for these components are left out.

5.4.1 Signature Information Verifying Unit 5611

The signature information verifying unit 5611 receives the unit pick-out information 5530 and signature information 5570 from the acquiring unit 1601.

When receiving these sets of information, the signature information verifying unit 5611 verifies the received signature information 5570 with the use of the received unit pick-out information 5530 as well as the header information 5550, encrypted contents 5580, and filling contents 5590 stored in the DVD 5500. A specific procedure for verification is omitted since it is the same as the verification of the signature information performed by the signature information verifying unit 1611 constituting the executing device 1600 of the first embodiment, except for using the filling contents 5590 in addition to the encrypted contents 5580.

5.4.2 Executing Unit 5606

The executing unit 5606 prestores the 56-bit length playback impracticable information "DAMY".

The executing unit 5606 receives the contents key "CK" from the contents key acquiring unit 1602. In addition, the executing unit 5606 may receive playback prohibition information from the signature information verifying unit 5611.

When receiving the contents key "CK", the executing unit 5606 reads, one by one, encrypted files "ECNT1", "ECNT2", "ECNT3", . . . , and "ECNTc" constituting the encrypted contents 5580 or filling contents 5590 via the acquiring unit 1601.

The executing unit 5606 compares the first 56 kits of the read encrypted file or the first 56 bits of the read filling contents with the stored playback impracticable information "DAMY". When these two do not conform to each other, the read information is an encrypted file and playable, and therefore the executing unit 5606 generates a file by decrypting the read encrypted file with respect to each unit by using the received contents key "CK". Next, the executing unit 5606 expands the generated file to generate video and audio data, generates video and audio signals from the generated video and audio data, and plays the contents by outputting the generated video and audio signals to a monitor.

When the first 56 bits and the stored playback impracticable information "DAMY" conform to each other, the read information is filling contents and is not able to be played, and therefore the executing unit 5606 aborts the above decryption, expansion and playback, and moves to processing of the next encrypted file.

Until having completed reading all the encrypted files and filling contents, the executing unit 5606 repeats readout, comparison with the playback impracticable information "DAMY", decryption, expansions and playback in a similar procedure.

If receiving playback prohibition information from the signature information verifying unit 5611 during the above repetition, the executing unit 5606 aborts the repetition.

5.5 Operational Behaviors

The following describes operational behaviors of the distributing device 5100 and executing device 5600 of the fifth embodiment.

5.5.1 Operational Behavior of Distributing Device 5100

Figure 62:
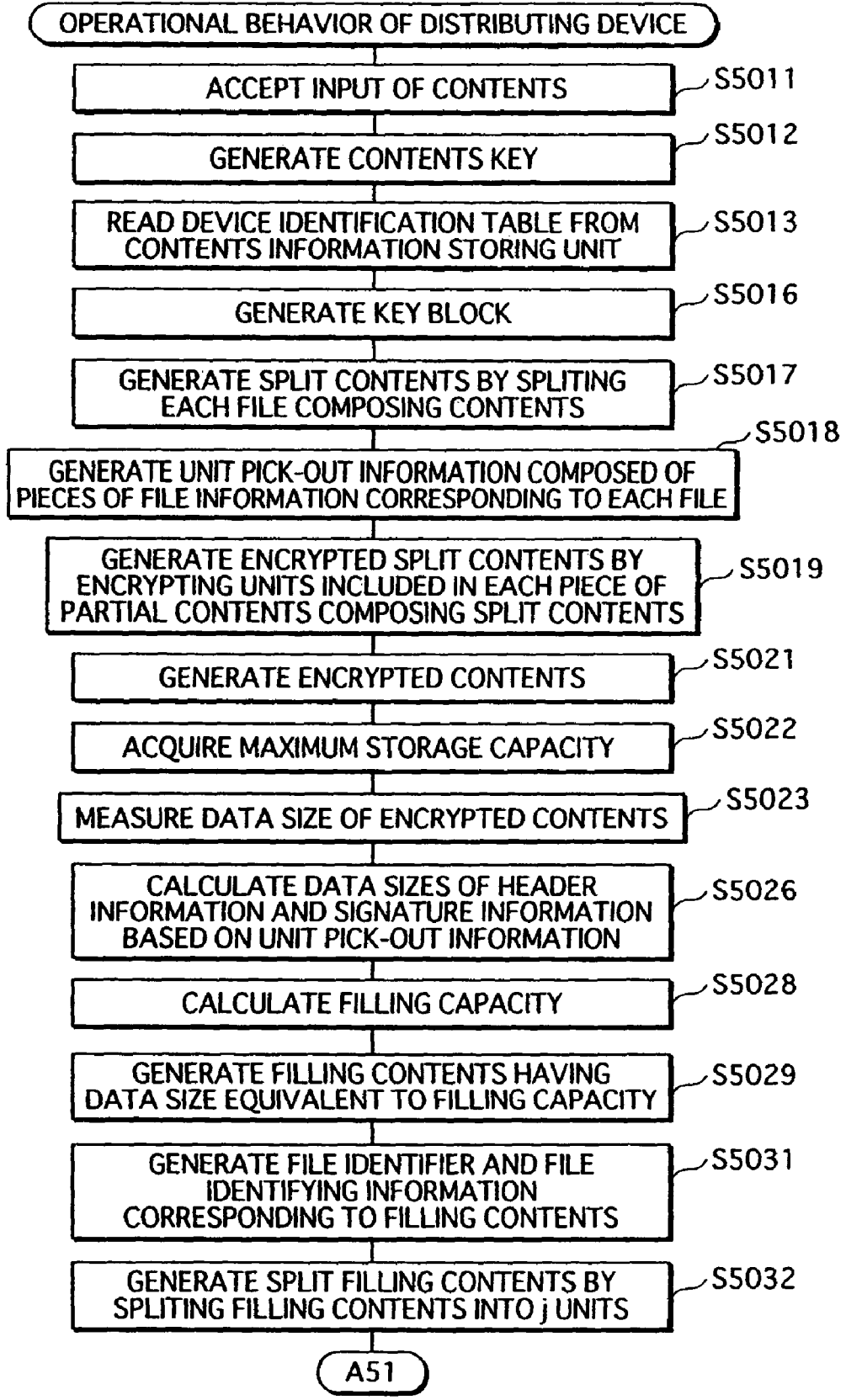
FIG. 62 is a flowchart showing operational behavior of the distributing device 5100.
Figure 63:
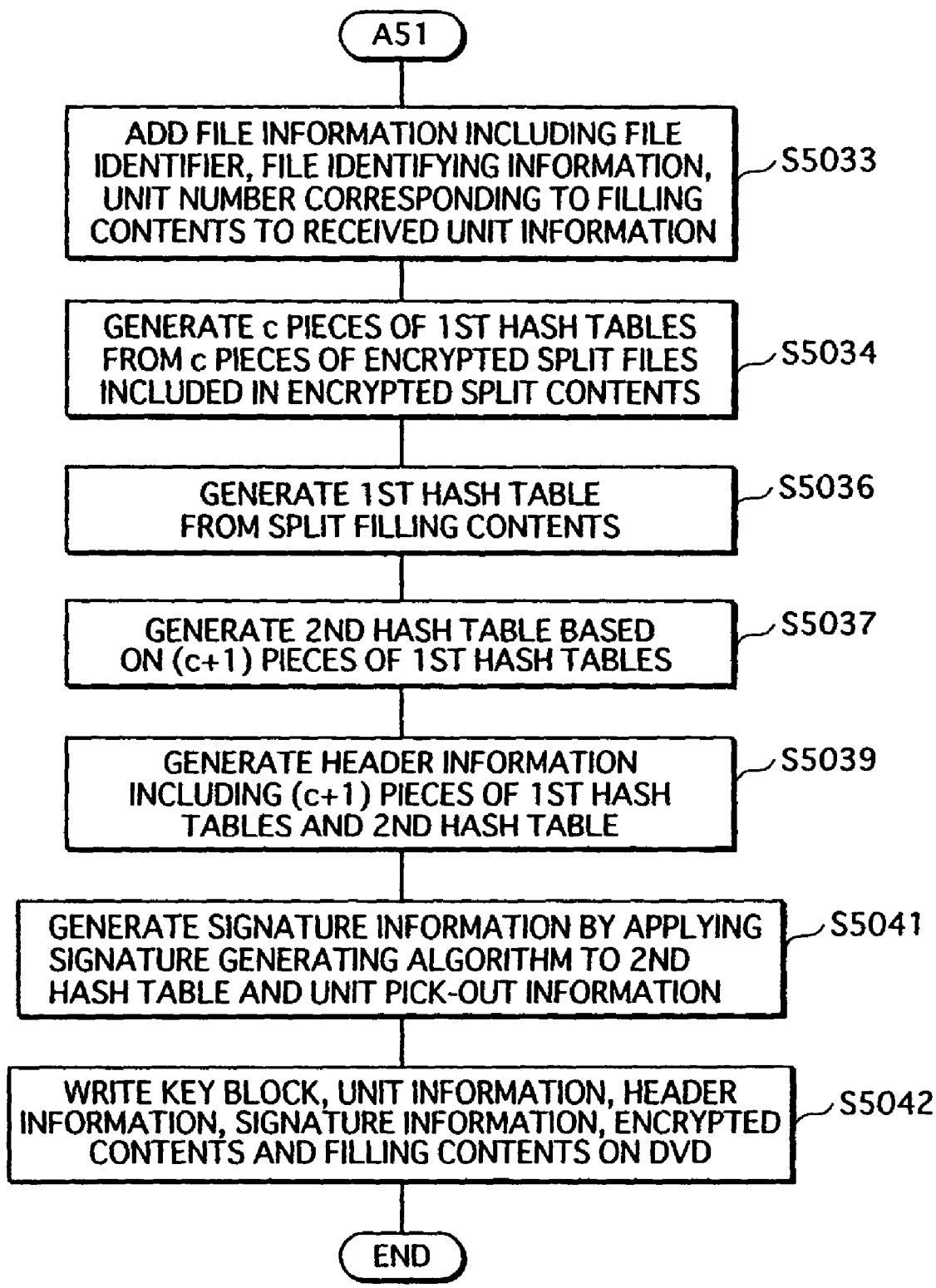
FIG. 63 is a flowchart showing operational behavior of the distributing device 5100 (continued from FIG. 62)
Figure 64:
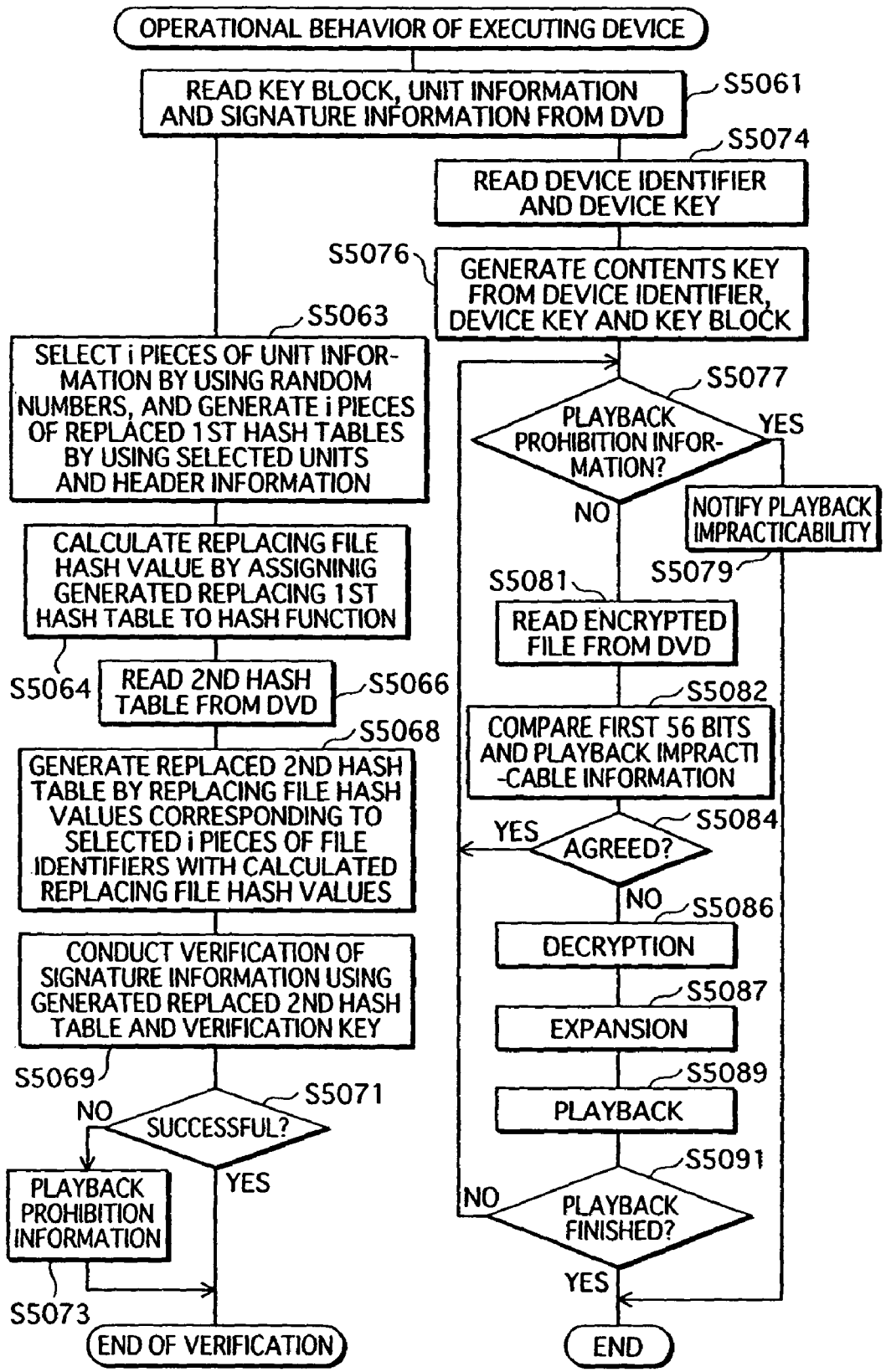
FIG. 64 is a flowchart showing operational behavior of the executing device 5600.

The operational behavior of the distributing device 5100 is described with the aid of flowcharts shown in FIGS. 62 and 63.

The input unit 5101 of the distributing device 5100 accepts an input of contents (step S5011), outputs the accepted contents to the unit generating unit 5105, and instructs the contents key generating unit 1102 to generate a contents key.

The contents key generating unit 1102 generates the contents key according to the instruction of the input unit 1101 (Step S5012), and outputs the generated contents key to the key block generating unit 1103 and encryption processing unit 5106.

The key block generating unit 1103 receives the contents key. When receiving the contents key, the key block generating unit 1103 reads a device identification table from the executing device information storing unit 1104 (Step S5013), and generates a key block based on the received contents key and the read device identification table (Step S5016). Next, the key block generating unit 1103 outputs the generated key block to the recording unit 5114.

When receiving the contents, the unit generating unit 5105 splits each file constituting the received contents into units to generate split contents (Step S5017). When having generated the split contents, the unit generating unit 5105 generates unit pick-out information composed of pieces of file information which respectively corresponds to the split files (Step S5018), and outputs the generated unit pick-out information to the filling contents generating unit 5108 while outputting the split contents to the encryption processing unit 5106.

When receiving the contents key and split contents, the encryption processing unit 5106 generates encrypted split contents by encrypting each unit of the contents included in the received split contents with the use of the contents key (Step S5019). The encryption processing unit 5106 extracts encrypted units included in the generated encrypted split contents, generates encrypted contents (Step S5021), and outputs the generated encrypted contents to the recording unit 5114 and filling contents generating unit 5108 while outputting the generated encrypted split contents to the header information generating unit 5107.

When receiving the unit pick-out information and encrypted contents, the filling contents generating unit 5108 acquires a maximum storage capacity of the DVD 5500 via the recording unit 5114 (Step S5022), and measures a data size of the received encrypted contents (Step S5023).

Next, the fill contents generating unit 5108 calculates a data size of the header information and a data size of the signature information based on the received unit pick-out information (Step S5026), and further calculates a filling capacity based on the acquired maximum storage capacity, data sizes of header information and signature information, and the like (Step S5028).

Next, the filling contents generating unit 5108 generates filling contents having a data size of the calculated filling capacity by combining playback impracticable information and a random number (Step S5029), and generates a file identifier and file identifying information corresponding to the filling contents (Step S5031).

The filling contents generating unit 5108 generates split filling contents by splitting the generated filling contents into j pieces of units based on the stored split number "j" (Step S5032).

Next, the filling contents generating unit 5108 generates file information including the generated file identifier and identifying information, and a unit number indicating the number of generated units, and adds the generated file information to the received unit pick-out information (Step S5033). The filling contents generating unit 5108 outputs: the generated filling contents and unit pick-out information 5140 to the recording unit 5114; filling file information 5156 composed of the generated file identifier and split filling contents 5120 to the header information generating unit 5107; and the unit pick-out information 5140 to the signature information generating unit 5111.

When receiving the encrypted split contents and filling file information 5156, the header information generating unit 5107 generates c pieces of 1st hash tables from c pieces of encrypted split files included in the received encrypted split contents (Step S5034). Subsequently, the header information generating unit 5107 generates a 1st hash table from split filling contents included in the received filling file information 5156 (Step S5036).

The header information generating unit 5107 generates a 2nd hash table based on the generated (c+1) pieces of 1st hash tables (Step S5037), generates header information including the (c+1) pieces of 1st hash tables and the 2nd hash table (Step S5039), and outputs the generated header information to the recording unit 5114 while outputting the generated 2nd hash table to the signature information generating unit 5111.

When receiving the unit pick-out information 5140 and 2nd hash table, the signature information generating unit 5111 generates signature information by applying a signature generating algorithm to the received unit pick-out information and 2nd hash table (Step S5041), and outputs the generated signature information to the recording unit 5114.

When receiving the key block, encrypted contents, filling contents, unit pick-out information, header information, and signature information, the recording unit 5114 writes the received key block, encrypted contents, filling contents, unit pick-out information, header information, and signature information to the DVD 5500 (Step S5042).

5.5.2 Operational Behavior of Executing Device 5600

Figure 65:
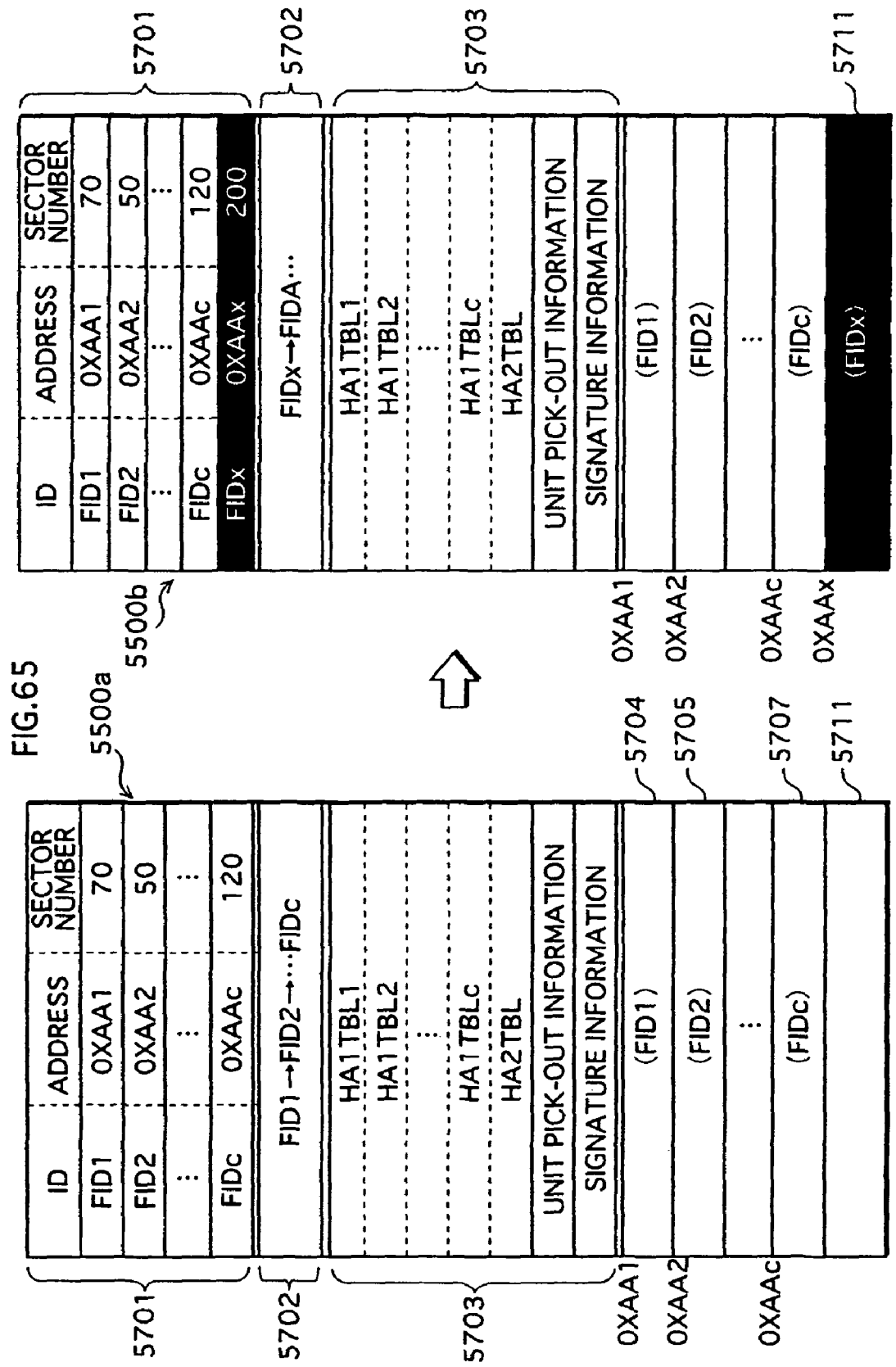
FIG. 65 shows an envisioned unauthorized DVD 5500*b*.

The operational behavior of the executing device 5600 is described with the aid of flowcharts shown in FIGS. 664 and 65.

When being loaded with the DVD 5500, the acquiring unit 1601 reads the key block 5510, unit pick-out information 5530, and signature information 5570 from the DVD 5500, and outputs the key block 5510 to the contents key acquiring unit 1602 while outputting the unit pick-out information 5530 and signature information 5570 to the signature information verifying unit 1611 (Step S5061).

The signature information verifying unit 5611 receives the unit pick-out information 5530 and signature information 5570, selects i pieces out of multiple encrypted units included in the encrypted contents 5580 and j pieces of units included in the filling contents 5590 with the use of random numbers and unit pick-out information 5530, and generates i pieces of replaced 1st hash tables by using the selected i pieces and the header information (Step S5063).

The signature information verifying unit 5611 calculates a replacing file hash value from each of the generated i pieces of replaced hash tables (Step S5064).

Next, the signature information verifying unit 5611 reads the 2nd hash table from the DVD 5500 (Step S5066), and generates a replaced 2nd hash table by replacing, with the replacing hash values, file hash values Corresponding to the generated i pieces of replacing file hash values (Step S5068). The signature information verifying unit 5611 verifies the signature information 5570 by using the generated replaced 2nd hash table, the received unit pick-out information 5530, and the verification key 1613 stored in the verification key storing unit 1612 (Step S5069). If the verification of the signature information 5570 is unsuccessful (Step S5071: NO), the signature information verifying unit 5611 outputs playback prohibition information to the executing unit 5606 (Step S5073).

When the verification of the signature information 5570, is successful (Step S5071: YES), the signature information verifying unit 5611, then, ends the verification.

The contents key acquiring unit 1602 receives the key block 5510, and reads a device identifier and a device key from the device key storing unit 1604 (Step S5074). The contents key acquiring unit 1602 generates the contents key "CK" from the read device identifier, device key, and key block 5510, and outputs the generated contents key "CK" to the executing unit 5606 (Step S5076).

The executing unit 5606 receives the contents key from the contents key acquiring unit 1602. Here, if receiving playback prohibition information from the signature information verifying unit 5611 (Step S5077: YES), the executing unit 5606 notifies the user of the playback impracticability of the contents stored in the DVD 5500 (Step S5079), and aborts the subsequent playback.

If not receiving playback prohibition information (Step S5077: NO), the executing unit 5606 reads one of c pieces of encrypted files making up the encrypted contents and filling contents (Step S5081). The executing unit 5606 compares the read encrypted file or the first 56 bits of the filling contents with the prestored playback impracticable information (Step S5082). When these two conform to each other (Step S5084: Yes), the executing unit 5606 returns to Step S5077.

When these two do not agree (Step S5084: NO), the read file is an encrypted file and playable. Therefore, the executing unit 5606 generates a file by decrypting the encrypted file with the use of the received contents key (Step S5086), expands the generated file (Step S5087), and has the monitor play the expanded file (Step S5089). When having finished reading all the encrypted flies making up the encrypted contents and filling contents or being instructed to finish the playback by the user (Step S5091: YES), the executing unit 5606 ends the playback. If having not finished reading all the encrypted files making up the encrypted contents and filling contents, and the executing unit 5606 has not been received an instruction for finishing the playback from the user (Step S5091: NO), the executing unit 5606 returns to step S5077 and repeats the processing of Steps 5077 to S5091.

5.6 Summary and Advantageous Effects

As having been described, in the present embodiment, the DVD 5500 stores, in addition to various information including encrypted contents, filling contents having an appropriate data size so as not to leave a writable storage area in the DVD 5500. Furthermore, the header information and signature information are generated based not only on the encrypted contents but also on the filling contents.

The executing unit 5606 constituting the executing device 5600 sequentially reads files written on the DVD 5500, and compares the first 56 bits of the individual read files and prestored playback impracticable information. When these two conforms to each other, the executing unit 5606 judges that the read file is the filling contents, and avoids playback of the file.

When the DVD 5500 has not stored such filling contents, two cases involving fraudulent acts described below can be assumed.

FIG. 65 shows a structure of a DVD 5500b that is created by adding a file containing unauthorized contents to a DVD 5500a which has been generated by a legitimate right holder.

The DVD 5500a stores the header information, unit pick-out information, signature information in an area 5703 while storing individual encrypted files constituting the encrypted contents in areas 5704, 5705, ..., and 5707. In addition to these sets of information, the DVD 5500a also stores a file table and a playback order file in the area 5701 and the area 5702, respectively.

The file table stored in the area 5701 includes file identifiers for all files stored in the DVD 5500, start addresses of the files, and sector numbers that the individual files occupy on the DVD, associating the file identifiers, start addresses, and the sector numbers of the individual files. For example, a file having a file identifier "FID1" is stored in the 70 sectors starting at an address "0XAA1".

The playback order file stored in the area 5702 shows a playback order of files stored in the DVD. In an example here, files are to be played in the order from a file having a file identifier "FIF1" to a file having a file identifier "FIDc".

In addition, nothing has been stored in an area 5711 on the DVD 5500a.

In this situation, assume that an unauthorized third person has written a file including unauthorized contents in the area 5711 of the DVD 5500a, and has generated the DVD 5500b by falsifying the file table and playback order file.

In the area 5701 on the DVD 5500b, a file identifier "FIDx" corresponding to the unauthorized file, a start address "0XAAx" of the unauthorized file, and a sector number "200" have been added. In addition, a playback order file stored in the area 5702 has been falsified so that the playback will start with the file having the file identifier "FIDx".

Figure 66:
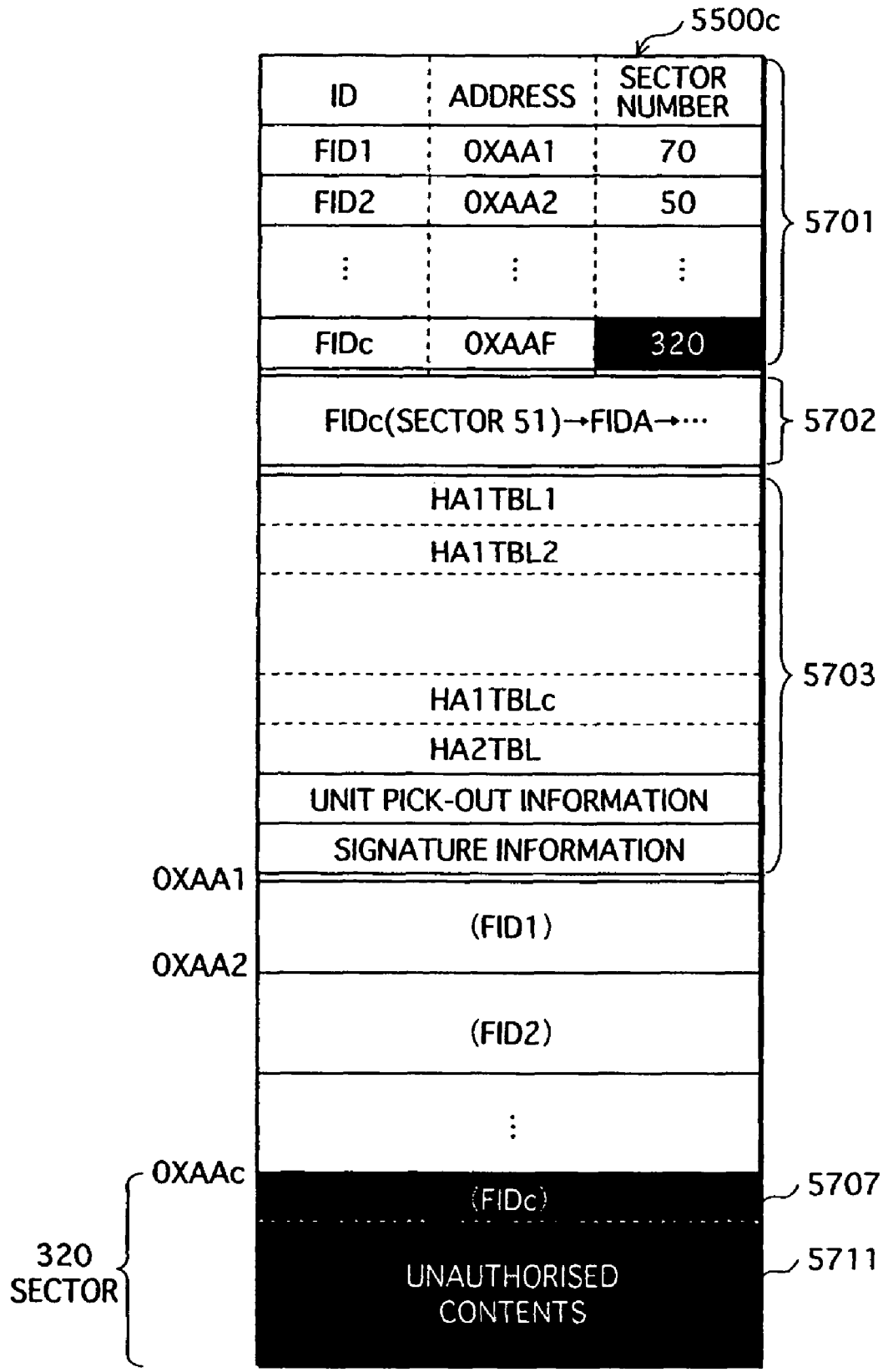
FIG. 66 shows an envisioned unauthorized DVD 5500*c*.

Additionally, a case is also considered in which a DVD 5500c shown in FIG. 66 is generated by adding unauthorized contents to the valid file stored in the DVD 5500a.

The DVD 5500c stores unauthorized contents in the area 5711, which is immediately after a file validly recorded in an area 5707. The sector number corresponding to the file stored in the area 5707 in the file table has been falsified to "320" which was obtained by adding a sector number in which the file is originally stored to a sector number in which the added unauthorized contents are stored. The playback order file has been altered so that the playback will start with the 51st sector in the file having the file identifier "FIDc", i.e., the added unauthorized contents.

Thus, when unauthorized falsification has been conducted, since the header information, unit pick-out information, signature information, and encrypted contents have not been falsified at all, the executing device reads the unauthorized file and starts the playback according to the order indicated by the order file once the verification of the signature information is completed normally.

In the present embodiment, a writable storage area is not left on the DVD 5500 because of the presence of the filling contents. In addition, the filling contents are also used for the generation of the signature information. Therefore, it the filling contents are replaced with an unauthorized file, the verification of the signature information will be unsuccessful in the executing device 5600 and therefore the playback will be aborted.

6. Sixth Embodiment

A sixth embodiment of the present invention is described below.

6.1 Unauthorized Contents Detection System

The unauthorized contents detection system of the sixth embodiment is composed of a distributing device, an executing device, and a monitor, as in the unauthorized contents detection system of the first embodiment.

The distributing device generates, in addition to the key block, unit pick-out information, encrypted contents, header information, and signature information described in the first embodiment, area information for indicating a storage area on a DVD where information validly written by the distributing device is stored, and writes the generated area information on the DVD.

The executing device reads the area information from the DVD, and reads only information stored in the storage area indicated by the read area information.

6.2 Distributing Device 6100

Figure 67:
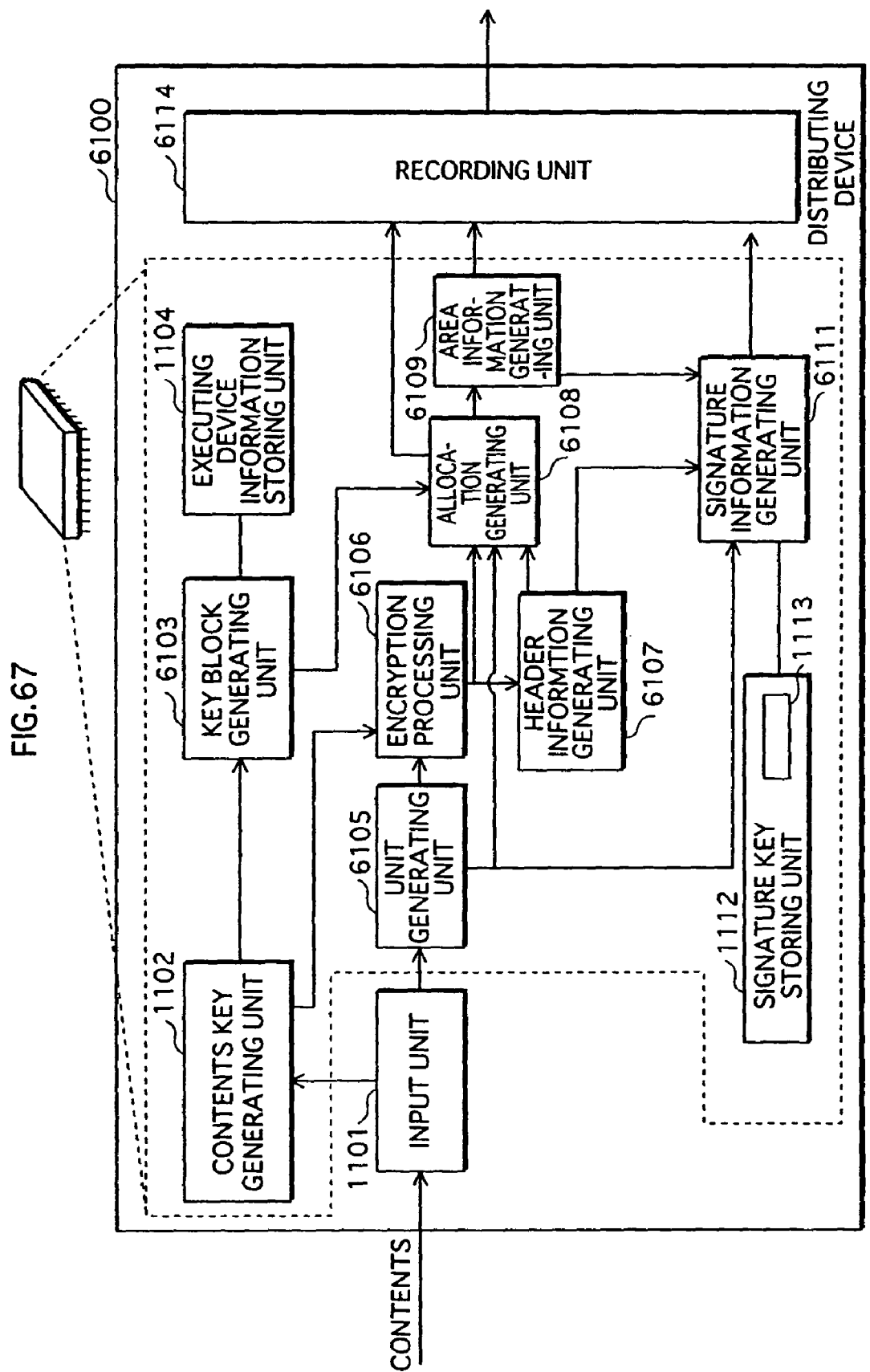
FIG. 67 is a block diagram showing a structure of a distributing device 6100 of a sixth embodiment.

FIG. 67 shows a structure of a distributing device constituting the unauthorized contents detection system of the sixth embodiment. As shown in FIG. 67, a distributing device 6100 is composed of an input unit 1101, a contents key generating unit 1102, a key block generating unit 6103, an executing device information storing unit 1104, a unit generating unit 6105, an encryption processing, unit 6106, a header information generating unit 6107, allocation generating unit 6108, an area information generating unit 6109, a signature information generating unit 6111, a signature key storing unit 1112, and a recording unit 6114.

Individual components composing the distributing device 6100 are described below. Note that, since the input unit 1101, contents key generating unit 1102, executing device information storing unit 1104, and signature key storing unit 1112 are the same as in the distributing device 1100 of the first embodiment, the descriptions for these components are left out.

Here, instead of the recording unit outputting the key block, unit pick-out information, encrypted contents and header information, the key block generating unit 6103, unit generating unit 6105, encryption processing unit 6106, and header information generating unit 6107, individually output its own generated information to the allocation generating unit 6108. Other than this, the key block generating unit 6103, unit generating unit 6105, encryption processing unit 6106 and header information generating unit 6107 are the same as the key block generating unit 1103, unit generating unit 1105, encryption processing unit 1106 and header information generating unit 1107 of the first embodiment, respectively, and therefore the descriptions for these components are omitted.

6.2.1 Allocation Generating Unit 6108

The allocation generating unit 6108 prestores a maximum data size of signature information generated by the signature information generating unit 6111. In addition, the allocation generating unit 6108 stores a data size of area information generated by the area information generating unit 6109.

The allocation generating unit 6108 receives: a key block from the key block generating unit 6103; unit pick-out information from the unit generating unit 6105; encrypted contents from the encryption processing unit 6106; and header information from the header information generating unit 6107.

Figure 68:
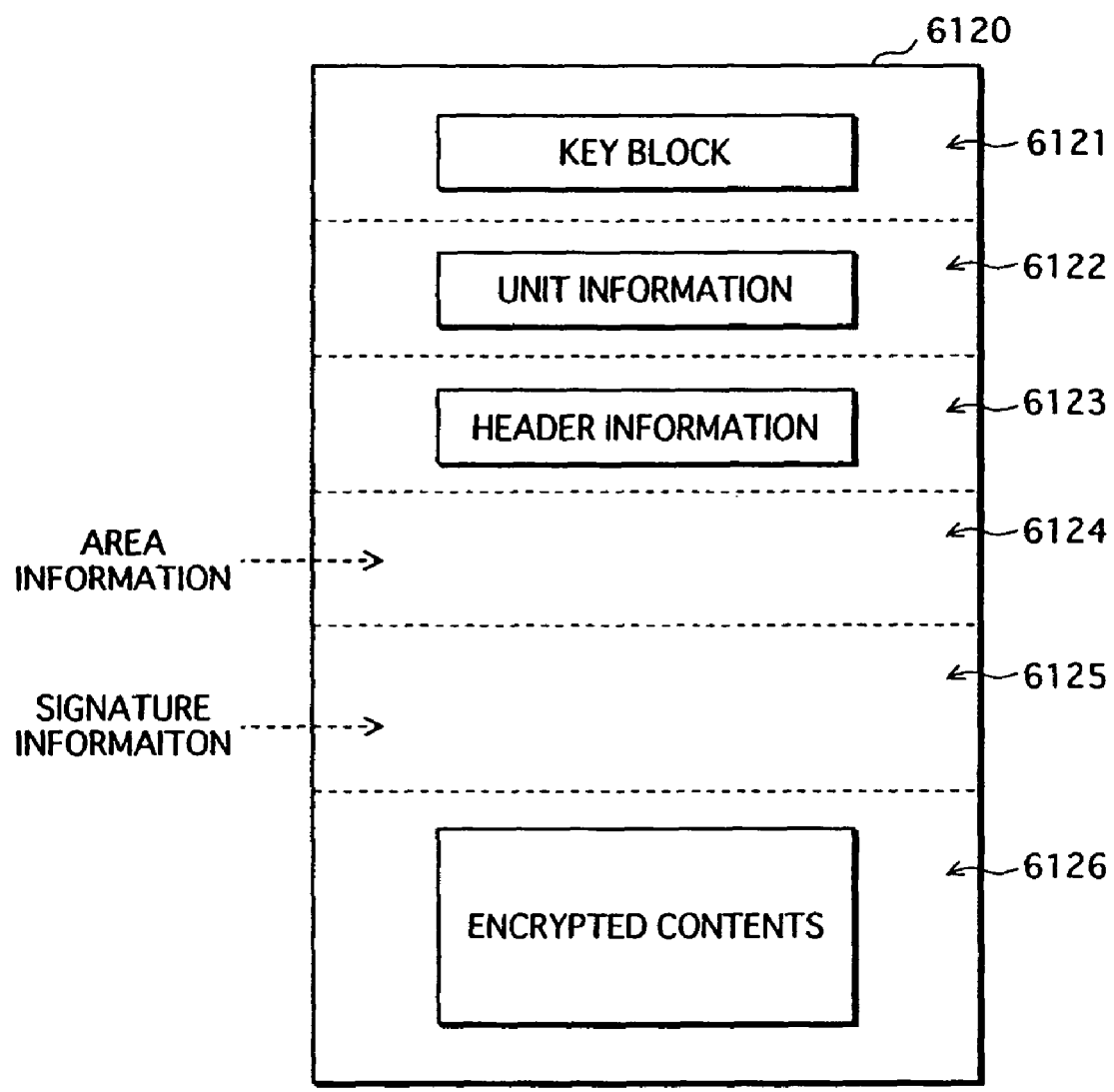
FIG. 68 shows writing-in allocation information 6120 generated by an allocation generating unit 6108.

When receiving these sets of information, the allocation generating unit 6108 generates writing-in allocation information 6120 as shown in FIG. 68. The writing-in allocation information 6120 is created by arranging the received sets of information in the same configuration as on the DVD and writing the arranged sets of information on memory. A procedure for generating the writing-in allocation information 6120 is described below with the aid of FIG. 68.

The allocation generating unit 6108 writes: the key block in an area 6121 on memory; the unit information in an area 6122; and the header information in an area 6123.

Next, the allocation generating unit 6108 acquires areas 6124 and 6125 corresponding respectively to maximum data sizes of the stored area information and signature information. Then, the allocation generating unit 6108 writes the encrypted contents in an area 6126 following the area 6125.

The allocation generating unit 6108 outputs the generated writing-in allocation information 6120 to the area information generating unit 6109 and recording unit 6114.

Note that the allocation order of the sets of information shown in the FIG. 68 is merely an example, and the present invention is not limited to this.

Here, the allocation generating unit 6108 stores the maximum data size of the signature information. However, the allocation generating unit 6108 may, for example, calculate the data size of the signature information in the same manner as the filling contents generating unit 5108 of the fifth embodiment.

6.2.2 Area Information Generating Unit 6109

The area information generating unit 6109 receives the writing-in allocation information 6120 from the allocation generating unit 6108. When receiving the writing-in allocation information 6120, the area information generating unit 6109 generates area information from the received writing-in allocation information 6120. The area information is information for indicating an area on a DVD in which valid information written by the distributing device 6100 is stored. The area information is, for example, a pair of addresses of the start position (hereinafter, start address) and of the ending position (ending address) for writing the writing-in allocation information 6120 on a DVD.

The area information is not limited to this example, and any information is applicable, such as a pair of a start address and a sector number at which valid information is stored, as long as the information identifies an area where the valid information is stored.

The area information generating unit 6109 outputs the generated area information to the signature information generating unit 6111 and recording unit 6114.

6.2.3 Signature Information Generating Unit 6111

The signature information generating unit 6111 receives: the unit pick-out information from the unit generating unit 6105; the 2nd hash table from the header information generating unit 6107; and the area information from the area information generating unit 6109.

When receiving these sets of information, the signature information generating unit 6111 reads the signature key 1113 from the signature key storing unit 1112.

Next, the signature information generating unit 6111 generates signature information by applying the signature generating algorithm S to a combined result formed by combining c pieces of file hash values included in the received 2nd hash table, c pieces of file information making up the unit pick-out information, and the received area information with the use of the read signature key 1113.

Next, the signature information generating unit 6111 outputs the generated signature information to the recording unit 6114.

6.2.4 Recording Unit 6114

The recording unit 6114 is loaded with a DVD.

The recording unit 6114 receives: the writing-in allocation information 6120 from the allocation generating unit 6108; the area information from the area information generating unit 6109; and the signature information from the signature information generating unit 6111.

When receiving these sets of information, the recording unit 6114 inserts the received area information to the area 6124 in the writing-in allocation information 6120 while inserting the signature information to the area 6125.

When having inserted the area information and signature information in the writing-in allocation information 6120, the recording unit 6114 writes the writing-in allocation information 6120 to a DVD.

6.3 DVD 6500

Figure 69:
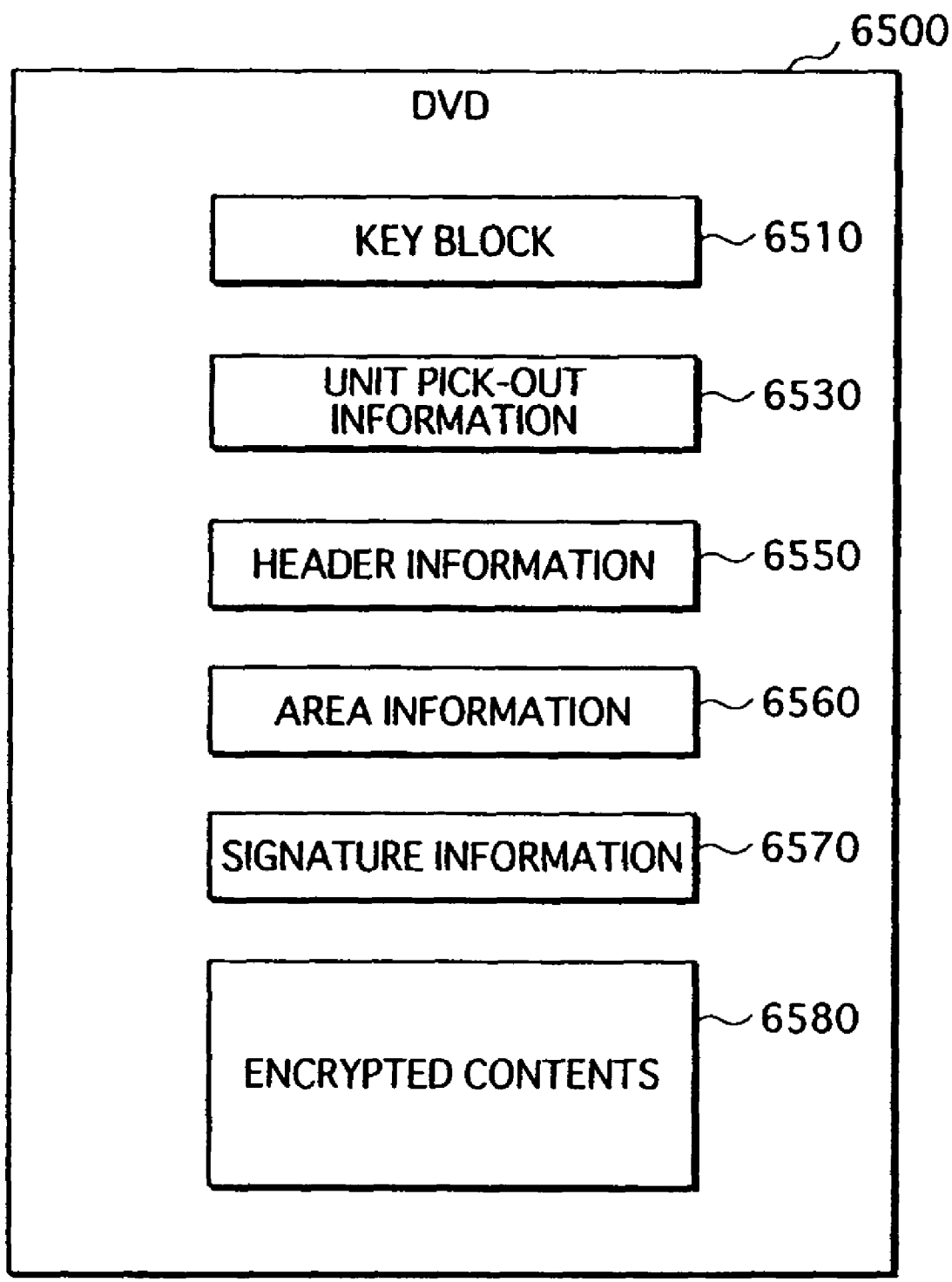
FIG. 69 shows information recorded on a DVD 6500 of the sixth embodiment.

FIG. 69 shows information stored in a DVD of the sixth embodiment. As shown in FIG. 69, a DVD 6500 stores a key block 6510, unit pick-out information 6530, header information 6550, area information 6560, signature information 6570, and encrypted contents 6580. These have been written by the distributing device 6100, and therefore the descriptions are here omitted.

6.4 Executing Device 6600

Figure 70:
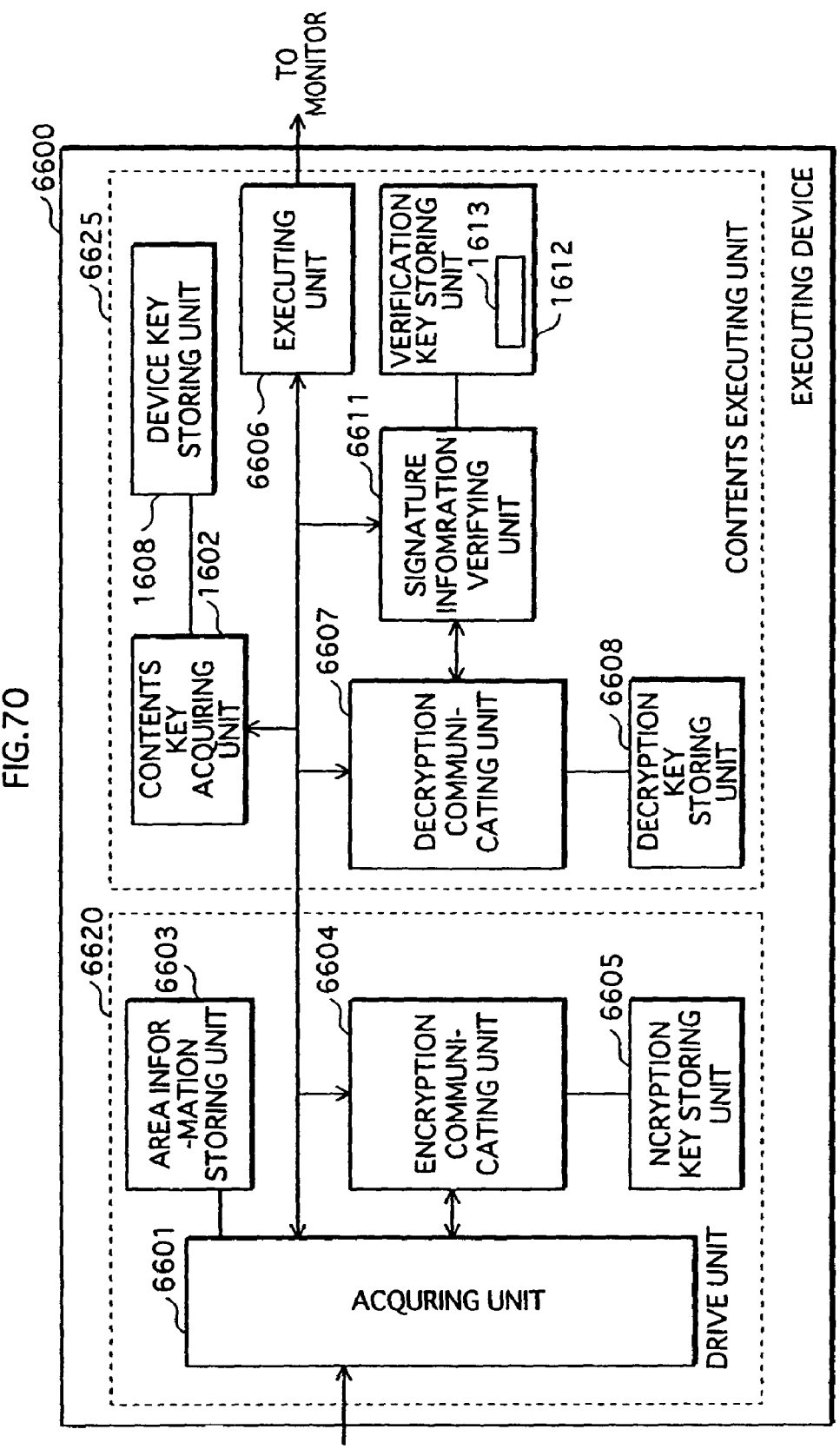
FIG. 70 is a block diagram showing a structure of an executing device 6600 of the sixth embodiment.

FIG. 70 shows a structure of an executing device of the sixth embodiment. As shown in FIG. 70, an executing device 6600 is composed of a drive unit 6620 and a contents executing unit 6625.

The drive unit 6620 is composed of an acquiring unit 6601, an area information storing unit 6603, an encryption communicating unit 6604 and an encryption key storing unit 6605.

The contents executing unit 6625 is composed of a contents key acquiring unit 1602, a device key storing unit 1604, a decryption communicating unit 6607, decryption key storing unit 6608, a signature information verifying unit 6611, a verification key storing unit 1612, and an executing unit 6606.

Individual components making up the executing device 6600 are described below. Note that, since the contents key acquiring unit 1602, device key storing unit 1604, and verification key storing unit 1612 are the same as in the executing device 1600 of the first embodiment, the descriptions of these components are left out.

6.4.1 Acquiring Unit 6601

The acquiring unit 6601 is loaded with the DVD 6500. When being loaded with the DVD 6500, the acquiring unit 6601 first reads the area information 6560, then writes the read area information 6560 in the area information storing unit 6603, and outputs the read area information 6560 to the encryption communicating unit 6604.

Next, the acquiring unit 6601 reads the key block 6510, unit pick-out information 6530, and signature information 6570 from the DVD 6500, and outputs, the read key block 6510 to the contents key acquiring unit 1602 while outputting the read unit pick-out information 6530 and signature information 6570 to the signature information verifying unit 6611.

In addition, the acquiring unit 6601 receives requests for reading various sets of information from the signature information verifying unit 6611 and executing unit 1606. When receiving a readout request, the signature information verifying unit 6611 reads the area information from the area information storing unit 6603. When a requested set of information is stored in an area indicated by the area information, the acquiring unit 6601 reads the requested information from the DVD 6500, and outputs the read information to a request source, i.e. the signature information verifying unit 6611 or the executing unit 1606.

When a requested set of information is ant stored in the area indicated by the read area information, the acquiring unit 6601 outputs an error notification signal indicating that the requested set of information cannot be react.

6.4.2 Area Information Storing Unit 6603

The area information storing unit 6603 is, for example, composed of a RAM, and stores area information written by the acquiring unit 6601.

6.4.3 Encryption Communicating Unit 6604 and Encryption Key Storing Unit 6605

The encryption key storing unit 6605 is, for example, composed of a ROM, and stores a 56-bit length encryption key.

The encryption communicating unit 6604 receives the area information 6560 from the acquiring unit 6601. When receiving the area information 6560, the encryption communicating unit 6604 reads an encryption key from the encryption key storing unit 6605, and generates encrypted area information by applying an encrypting algorithm E2 to the read encryption key. Here, DES (Data Encryption Standard) is used, as an example, for the encrypting algorithm E2.

Next, the encryption communicating unit 6604 outputs the generated encrypted area information to the decryption communicating unit 6607.

6.4.4 Decryption Communicating Unit 6607 and Decryption Key Storing Unit 6608

The decryption key storing unit 6608 is, for example, composed of a ROM, and stores a 56-bit length decryption key. Here, the decryption key is the same as the encryption key stored by the encryption key storing unit 6605.

The decryption communicating unit 6607 receives the encrypted area information from the encryption communicating unit 6604. When receiving the encrypted area information, the decryption communicating unit 6607 reads a decryption key from the decryption key storing unit 6608, and generates area information by applying a decrypting algorithm D2 to the received encrypted area information with the use of read decryption key. Here, the decrypting algorithm D2 is an algorithm used for decrypting encrypted texts generated by using the encrypting algorithm E2.

Next, the decryption communicating unit 6607 outputs the generated area information to the signature information verifying unit 6611.

The above description is given assuming that the encryption key and decryption key are the same, and the decryption communicating unit 6607 uses a symmetric key cryptosystem. However, the present invention is not limited to this, and a public key cryptosystem may be used instead. Alternatively, a public key cryptosystem and a symmetric key cryptosystem may be combined together to generate a different key every time when communication is conducted, and cipher communication may be performed with the use of the generated key.

In addition, here only the area information is encrypted and then outputted to the contents executing unit 6625, however, all information sent and received between the contents executing unit 6625 and drive unit 6620 can be encrypted.

6.4.5 Signature Information Verifying Unit 6611

The signature information verifying unit 6611 receives: the unit pick-out information 6530 and signature information 6570 from the acquiring unit 6601; and the area information from the decryption communication unit 6607.

When receiving the unit pick-out information 6530 and signature information 6570, the signature information verifying unit 6611 generates a replaced 2nd hash table based on the received unit pick-out information 6530, and the encrypted contents 6580 and header information 6550 stored in the DVD 6500. A procedure for generating the replaced 2nd hash table is the same as a generation procedure of a replaced 2nd hash table performed by the signature information verifying unit 1611 of the 1st embodiment, and therefore the description is omitted.

Next, the signature information verifying unit 6611 reads the verification key 1613 from the verification key storing unit 1612. Then, the signature information verifying unit 6611 generates signature verification information by applying, with the use of the read verification key 1613, the signature verifying algorithm V to a combined result formed by combining all file hash values and replacing file hash values included in the generated replaced 2nd hash table, all pieces of file information included in the received unit pick-out information 6530, and the area information. The signature information verifying unit 6611 compares the generated signature verification information and the received signature information 6570.

When these two do not conform with each other, the signature information verifying unit 6611 judges that the verification of signature information is unsuccessful, and outputs playback prohibition information to the executing unit 1606.

When these two agree, the signature information verifying unit 6611 judges that the verification of the received signature information 6570 is successful, and ends the verification processing.

During the above processing, the signature information verifying unit 6611 instructs the acquiring unit 6601 to read part of the encrypted contents and header information. However, at this point, the signature information verifying unit 6611 may receive an error notification signal indicating that the readout is not possible.

When receiving the error notification signal, the signature information verifying unit 6611 aborts the verification processing of the signature information and outputs playback prohibition information to the executing unit 1606.

6.4.6 Executing Unit 6606

The executing unit 6606 receives a content key from the contents key acquiring unit 1602, and starts repeating readout, decryption, and playback of encrypted files, as is the case with the executing unit 1606 constituting the executing devise 1600 of the first embodiment.

During the repetition, the executing unit 6606 may receive playback prohibition information from the signature information verifying unit 6611.

Additionally, in the repetition, the executing unit 6606 requests the acquiring unit 6601 to read encrypted files making up the encrypted contents 6580. At this point, however, the executing unit 6606 may receive from the acquiring unit 6601 an error notification signal indicating that the readout is not possible.

When receiving playback prohibition information or an error notification signal, the executing unit 6606 aborts the playback processing, and notifies the user of playback impracticability of the loaded DVD.

6.5 Summary and Advantageous Effects

As having been described, the distributing device 6100 constituting the unauthorized contents detection system of the present embodiment generates area information indicating an area where information validly written by the distributing device 6100 is stored, and writes the generated area information to a DVD. Furthermore, the distributing device 6100 generates signature information from the 2nd hash table, unit pick-out information, and area information, and writes these to the DVD.

When being loaded with the DVD 6500, the acquiring unit 6601 of the executing device 6600 first reads the area information from the DVD 6500, and then reads only information in an area indicated by the read area information while not reading information written in the other areas.

Herewith, even when fraudulent acts involving writing unauthorized contents in free space on the DVD 6500, as described in the fifth embodiment, are committed, the unauthorized contents cannot be played in the executing device 6600.

In addition, the signature information stored in the DVD 6500 is generated with the use of the area information, and the signature information verifying unit 6611 of the executing device 6600 uses the area information read from the DVD 6500 in order to verify the signature information. Therefore, even if an unauthorized third person falsifies the area information together with insertion of unauthorized contents, the verification of the signature information performed by the signature information verifying unit 6611 will be unsuccessful and therefore the unauthorized contents will not be played.

When there is no free space left on the DVD, a fraudulent act may be committed, such as copying all the data stored in the valid DVD onto another medium having a larger storage capacity than the valid DVD does, and adding unauthorized contents to free space of the medium. Even in this situation, the executing device 6600 in the unauthorized contents detection system of the present embodiment does not read information in storage areas other than an area indicated by the area information. Accordingly, the present embodiment is capable of preventing such a fraudulent act.

6.6 Modification of Sixth Embodiment

In the sixth embodiment, the area information generated by the distributing device 6100 is information indicating an area where information validly written by the distributing device is stored. Alternatively, the area information can be the total data size of information validly written by the distributing device 6100.

In this case, the acquiring unit 6601 of the executing device 6600 first reads the total data size from the DVD 6500, and then measures the total data size of the information stored in the DVD 6500. When the measured data size is larger than the read data size, the acquiring unit 6601 aborts reading data from the DVD 6500 and outputs an error notification signal to the executing unit 6606.

7. Other Modifications

Although the present invention has been described based on the above embodiments, it is a matter of course that the present invention is not confined to these embodiments. The present invention also includes the following cases.

[1] In the above first, fifth and sixth embodiments, the distributing device calculates unit hash values by assigning encrypted units to a hash function, and generates header information and signature information based on the calculated unit hash values, while the executing device verifies the signature information by using selected i piece of encrypted units. However, the distributing device may calculate unit hash values by using units before encryption, and the executing device may generate i pieces of units by decrypting the selected pieces of encrypted units and verify the signature information by using the generated i pieces of units.

[2] On the other hand, in the second to fourth embodiments, the distributing device calculates partial hash values by assigning pieces of partial contents to a hash function, and generates header information and signature information based on the calculated partial hash values. However, the distributing device may calculate partial hash values by assigning, to the hash function, encrypted partial contents which are generated by encrypting individual pieces of partial contents, and generate header information and signature information base on the calculated partial hash values.

In this case, the executing device uses the encrypted partial contents for the verification of the header information. This eliminates the need for equipping the representative partial contents decrypting unit and the partial contents decrypting unit, which leads to a reduction in size of the detection system's circuit.

[3] In the second to fourth embodiments, after the verifications of signature information and header information have succeeded, the executing unit starts decryption, expansion, and playback of the encrypted contents. However, the executing unit may start the processing relating to the playback in parallel with the verifications. In this case, when the individual verifications performed by the signature information verifying unit and the header information verifying unit, respectively, are unsuccessful, the signature information verifying unit and header information verifying unit direct the executing unit to abort the playback.

[4] In the first, fifth, and sixth embodiments, the signature information verifying unit may have a timer for measuring the passage of time, and judge that a verification is unsuccessful if the verification of the signature information is not completed within a predetermined time.

In the case when the verification of signature information is performed in parallel with the playback, if the contents, signature information, or header information has been falsified, unauthorized contents will be played until the verification is completed.

Accordingly, setting up a time-limit for the verification of signature information allows to counteract fraudulent acts involving extending the playback time of unauthorized contents by making the falsification so that the completion of the verification of signature information gets delayed.

In addition, the signature information verifying unit and header information verifying unit in Modification [3] may have a timer in a similar manner.

[5] In the first to the sixth embodiments above, the distributing device has a signature key while the executing device has a corresponding verification key, and these devices generate and verify signature information with the use of a signature generating algorithm such as DSA.

In general, many signature generating algorithms are based on public key cryptosystems, as typified by DSA and RSA (Rivest-Shamir-Adleman). However, in the present invention, any signature generating algorithm, such as one based on a symmetric key cryptosystem for example, is applicable as long as it is capable of proving that signature information recorded on the DVD is information generated by a legitimate right holder.

As another example, a one-way function may be used with the processing concealed. In this case, the distributing device and executing device respectively store the same one-way function in a storage area which cannot be read by external devices. The distributing device generates signature information with the use of the one-way function, while the executing device generates signature verification information by using the same one-way function.

[6] Information to which a signature generating algorithm is applied at the generation of signature information is not limited to those described in the above embodiments. For example, in the first embodiment, the signature generating algorithm is applied to both the 2nd hash table and unit pick-out information, however, the signature generating algorithm may be applied only to the 2nd hash table, or may be applied to the contents key "CK" and the data size of the encrypted contents in addition to the 2nd hash table. In the case of the second embodiment, the signature generating algorithm may be applied to the pieces of representative partial contents themselves, instead of applying a signature generating algorithm to partial hash values generated from the pieces of representative partial contents.

Especially, in the second embodiment, when signature information is generated from the pieces of representative partial contents, k pieces of signature information may be generated by respectively applying the signature generating algorithm to the k pieces of representative partial contents.

In this case, the executing device generates k pieces of representative partial contents based on the selected position information, and verifies the k pieces of signature information by using the generated k pieces of representative partial contents.

Alternatively, the distributing device may generate signature information by applying the signature generating algorithm to a combined result formed by combining the k pieces of representative partial contents, while the executing device verifies the signature information by using the combined result.

In this situation, if the verification of the signature information is successful, the following two things are confirmed at one time: the signature information was generated by a legitimate right holder; and the representative partial contents are free from falsification. This eliminates the need for generating header information and writing the header information to the DVD, which leads to a reduction in size of data written to the DVD.

[7] In the second and third embodiments, the executing device may prestore selected position information and encrypted selected position information may not be recorded on the DVD. Herewith, the valid executing device is capable of performing verification of header information with the use of the prestored selected position information.

[8] In the third embodiment, header selecting information and x pieces of header groups are written to the DVD. However, in the case of Modification [7], the distributing device may select one of the 1st header to x-th header groups, extract a header identifier, header information, and signature information included in the selected header group, and write these to the DVD.

The executing device may prestore x pairs of a piece of selected position information and a header identifier, select a piece of selected position information based on a header identifier written to the DVD, and use the selected piece of selected position information in the subsequent processing.

[9] The above first to seventh embodiments are described assuming that the executing device is a single device. However, multiple devices may be employed to fulfill the function of the executing device.

[10] In the third embodiment, the acquiring unit of the executing device selects one of the x pieces of header identifiers. However, the present invention is not limited to this, and two or more identifiers may be selected instead, and the verifications of the signature information and header information may be repeated two times or more. Herewith, it is possible to detect unauthorized contents more reliably.

[11] In the above embodiments and modifications, the signature key storing unit of the distributing device and the verification key storing unit of the executing device respectively store one piece of key information, however, the present invention is not confined to this.

[11-1] For example, the signature key storing unit may store a signature key and a key identifier corresponding to the signature key, and the recording unit writes the key identifier to the DVD together with the signature information.

The verification key storing unit of the executing device stores multiple verification keys and key identifiers corresponding one-to-one with the verification keys. The signature information verifying unit receives the key identifiers together with the signature information, retrieves a key identifier conforming to the received key identifier from among multiple key identifiers stored by the verification key storing unit, reads out a verification key corresponding to a retrieved verification key identifier, and uses the read verification key to verify the signature information.

Herewith, the present invention is applicable even if there are a plurality of different distributing devices.

[11-2] The executing device may not have the verification key storing unit, and a signature key and a verification key corresponding to the signature key may be stored in the signature key storing unit of the distributing device. In this situation, the recording unit writes the verification key to the DVD together with the signature information.

[11-3] The distributing device may store, in addition to the signature key and verification key, authentication information of the verification key generated by an impartial third-party body. Here, assume that the authentication information is a key signature generated by applying a signature generating algorithm to the verification key with the use of a secret key of the third-party body.

The recording unit writes the verification key and key signature to the DVD together with the signature information.

The verification key storing unit of the executing device stores key verification information, instead of the verification key. The key verification information is information for verifying the key signature, and is, in this case, a public key paired with the secret key of the impartial third-party body that generated the key signature.

The signature information verifying unit receives the key signature and verification key, and performs verification of the key signature by using the received key and key verification information in advance of verification of the signature information. Only when the verification is successful, the signature information verifying unit starts the verification of the signature information as described in the above embodiments.

Herewith, even when there are multiple distributing devices, the executing device only has to hold the key verification information of the third-party body, and does not have to have multiple verification keys.

[12] In Modification [11], the executing device may store a revocation list which indicates invalidated verification keys. The signature information verifying unit judges whether the received key identifier or verification key has been registered to the revocation list, and aborts the verification of the signature information when it has been registered.

[13] The executing device may acquire the revocation list, described in Modification [12], from an outside source. For example, the revocation list may be acquired via a recording medium such as DVD, or may be retrieved via the Internet, broadcasting and the like. Alternatively, the executing device may periodically acquire an updated revocation list.

Herewith, the present invention is capable of dealing with a situation where a verification key needed to be invalidated is newly found.

[14] The distributing device distributes various information, such as encrypted contents and signature information, to the executing device via DVD. However, the present invention is not limited to DVD, and the information can be distributed via: an optical disk such as CD-ROM and DVD-ROM; a writable optical disk such as CD-R, DVD-R, and DVD-RAM; a magnetic optical disk; and a memory card. Alternatively, e semiconductor memory, such as a flash memory and a hard disk, can be incorporated inside the executing device.

Furthermore, the present invention is not limited to such recording media, and the information can be distributed via communication systems such as an Internet, or can be distributed by broadcasting.

[15] Although the above embodiments and modifications describe assuming that the contents are video contents composed of images and audio, the contents can be a computer program. For example, assume that the executing device is a game console; the contents are a computer program stored in a flash memory incorporated in the game console. Here, the computer program is a judging program for judging whether game software (such as an optical disk and memory card) loaded on the game console is valid software. In this situation, even if an unauthorized user falsifiers the judging program so as to allow execution of unauthorized game software, the present invention is capable of detecting the falsification by performing verification of whether unauthorized contents are included with the use of the signature information and header information, and thus the execution of the judging program itself is prevented or aborted. Thus, by stopping the execution itself, it is possible to prevent unauthorized operations materialized by the judging program on which unauthorized falsification has been conducted, namely to prevent execution of unauthorized game software.

[16] As described in the above modification, in the case when the contents are a computer program stored in a flash memory loaded on a microcomputer incorporated in the executing device, fraudulent acts described in the fifth embodiment may take place. Specifically speaking, first an unauthorized program is added to free space of the flash memory with no falsification of the valid computer program stored in the flash memory involved. Then, a buffer over-run is caused by using bugs in the valid computer program so that a starting point of the program jumps to the head of the added unauthorized program, and the execution of the unauthorized program is started.

Here, fraudulent acts mentioned above can be prevented by writing filling contents in the flash memory so as not to leave free space in the flash memory, as in the fifth embodiment, since unauthorized contents cannot be added.

Alternatively, as in the sixth embodiment, area information indicating an area where valid information written by the distributing device is stored may be written to the flash memory in advance, and the executing device is designed not to read out information in areas other than an area indicated by the area information. Thereby, even when an unauthorized program is added, the executing device does execute the unauthorized program.

[17] The above first to sixth embodiments and modifications describe assuming that the executing unit is a component which plays the content composed of video and audio, however, the executing unit may be a component which outputs the contents to an external recording medium, or a component which has a print function and prints image data on paper and the like.

[18] In the above embodiments, the contents key generating unit generates a contents key every time when a set of contents is input to the distributing device. However, the contents key generating unit may prestore multiple contents keys, and select and output one of the stored contents keys.

[19] In the above embodiments, the executing device is designed to start verifications of header information, signature information, and the like when a DVD is loaded thereon, however, the present invention is not confined to this.

For example, the executing device may start such verifications when being directed to perform playback according to user's button operations, or may perform the verifications in regular intervals from when the DVD is loaded thereon.

[20] In the second and third embodiments, it is not indispensable that header information is written to the DVD.

When header information is not written to the DVD, the executing device extracts k pieces of representative partial contents based on the selected position information, and calculates verifying hash values by respectively assigning the extracted pieces of representative partial contents to a hash function.

Then, the executing device generates signature verification information by applying the signature verifying algorithm V to a combined result formed by combining the calculated verifying hash values, with the use of the verification key. The executing device verifies the signature information by comparing with the generated signature verification information.

In this case, the executing device no more requires the header information verifying unit, which leads to a reduction in size of the detection system's circuit. In addition, the verification of whether unauthorized contents are included can be completed at the name time by verifying the signature information.

[21] In the fourth embodiment, the executing device 4600 verifies only k pieces out of c pieces of partial hash values included in the header information after verification of the signature information performed by the signature information verifying unit 4606 has succeeded. However, both the signature information and the header information can be verified with a single verification by using k pieces of encrypted partial contents and header information.

More specifically, the executing device extracts k pieces of encrypted partial contents from the encrypted contents based on the contents position information, and generates k pieces of partial contents by decrypting the extracted k pieces of encrypted partial contents. Then, the executing device calculates replacing partial hash valves by respectively assigning the generated k pieces of partial contents to a hash functions.

Next, the executing device replaces, from among c pieces of partial hash values included in the header information, partial hash values corresponding to the selected k pieces of encrypted partial contents with the calculated replacing partial hash values.

The executing device verifies the signature information by using the verification key and a combined result formed by combining replacing partial hash values and partial hash values included in the replaced header information.

In this case, the executing device no more requires the header information verifying unit, which results in a reduction in size of the detection system's circuit. In addition, the verification of whether unauthorized contents are included can be completed at the same time by verifying the signature information.

[22] In the above first to sixth embodiments, written to the DVD are only one set of encrypted contents, and one piece each of signature information and header information corresponding to this set of encrypted contents. However, a number of different sets of encrypted contents along with pieces of header and signature information respectively corresponding to these sets may be stored instead.

In addition, the DVD may include only one piece of signature information generated based on all pieces of header information. Furthermore, the DVD may include, besides these sets of encrypted contents, contents that do not require copyright protection, for example, advertisements, an opening screen, a menu screen, and the like. These copyright protection-free contents may be played while the verifications of signature information and header information are performed.

[23] In the first to sixth embodiments and modifications, when at least one of the verification of signature information and the verification of header information is unsuccessful, the executing device may store a disk identifier for identifying a DVD loaded on the acquiring unit and a contents identifier for identifying a set of contents on the point of being played.

When a DVD having the same disk identifier as the recorded one is loaded, the executing device aborts playback of the contents. Alternatively, when being directed to play a set of contents having the same identifier as the recorded one, the executing device aborts playback of the set of contents.

[24] In the above embodiments and modifications, when at least one of the verification of signature information and the verification of header information is unsuccessful, the executing device aborts playback of the contents, and notifies the user that the contents are unauthorized by, for example, displaying a screen of error notification on the monitor. The operational behavior taken by the executing device at the time of verification failure is not limited to this, and the following cases can also be considered. Furthermore, the following three modifications can be combined.

[24-1] Both the distributing device and the executing device are connected to an Internet. When at least one of the verification of signature information and the verification of header information is unsuccessful, the executing device notifies the distributing device of the verification failure via an Internet. At this point, the executing device also sends a contents identifier indicating the contents whose verification was unsuccessful.

The distributing device prestores the contents identifier and a creation date of the contents indicated by the contents identifier, associating these two with each other.

The distributing device receives the notification of verification failure and the contents identifier from the executing device via an Internet. The distributing device generates playback permission information indicating permission of the contents playback or playback prohibition information indicating prohibition of the playback according to a creation date corresponding to the received contents identifier. For example, when the contents identifier indicates new contents less than half a year from the creation date, the distributing device generates playback prohibition information. On the other hand, when the contents identifier indicates old contents having been around for half a year or more from the creation date, the distributing device generates playback permission information.

Next, the distributing device sends the generated playback permission information or playback prohibition information to the executing device via an Internet, and the executing device decrypts and plays encrypted contents stored in the DVD only when receiving the playback permission information.

Assume the case where contents have already been around for a set period of time since the release and a demand for the contents has been met to some extent, and therefore the future sales of the contents is predicted to be not very significant. In this case, the above modification allows to place priority on the interests of a user who has purchased the DVD by permitting the user to view the contents. On the other hand, when contents have been recently released, and the future sales of the contents is expected to be significant, this modification allows to place priority on the rights of a copyright holder by prohibiting the playback. Namely, the modification is capable of adjusting the interests of the user and the interests of the copyright holder.

Note that a means for deciding which of playback permission information and playback prohibition information is to be sent is not limited to this, and the distributing device may store, with respect to each set of contents, terms of permission reflecting the intentions of, for example, the copyright holder of the contents set and the selling agency.

[24-2] As has already been described, a medium recording the contents is not confined to DVD but may be a rewritable recording medium. Here, a memory card equipped with a flash memory is used as an example.

When the verification of signature information or header information is unsuccessful, the executing device deletes part or all of information of the encrypted contents recorded in the memory card.

Herewith, it is possible to reliably prevent the future use of the unauthorized contents.

[24-3] In the case when the contents are HD (high definition) video data, the executing device plays the video data after converting it to SD (standard definition) if the verification is unsuccessful.

When the contents are high-quality sound (5.1 channel) audio data, the executing device plays the audio data after converting it to standard-quality sound (2 channel) audio data if the verification is unsuccessful.

Thus, by allowing the playback on condition of degrading the playback quality, it is possible to adjust the convenience of the user and the interests of the copyright holder to some extent.

[25] In the second and third embodiments, the executing device reads out the key block, encrypted selected position information, header information signature information, and encrypted contents when the DVD is loaded thereon. However, the executing device may read out only required information according to the processing progress of each component via the acquiring unit.

For example, the executing device accordingly reads out: only the key block when the DVD is loaded; the encrypted selected position information when generation of the contents key is completed; and the signature information and header information when decryption of the encrypted selected position information is completed, and then performs verification of the signature information. Once the verification of the signature information is completed, the executing device reads k pieces of encrypted blocks indicated by the selected position information.

In the fourth embodiment also, only required information may be read as needed in a similar fashion.

[26] In the first embodiment, when the selected i pieces of encrypted units are read, the readout speed can be increased by arranging the order of the readout as described below.

For ease of description, here assume that i=4, and the case in which four pieces of encrypted units are to be read out is considered.

On an optical disk such as DVD, a region for recording data divides into portions, and areas in a tree-ring pattern are respectively referred to as tracks. Several sectors are included in each track, and data in read and written sector by sector. A size of one sector is, for example, 512 bytes. In this case, pieces of the data targeted for readout on the DVD can be identified using track identifying numbers, sector identifying numbers, or sector sizes.

Figure 71:
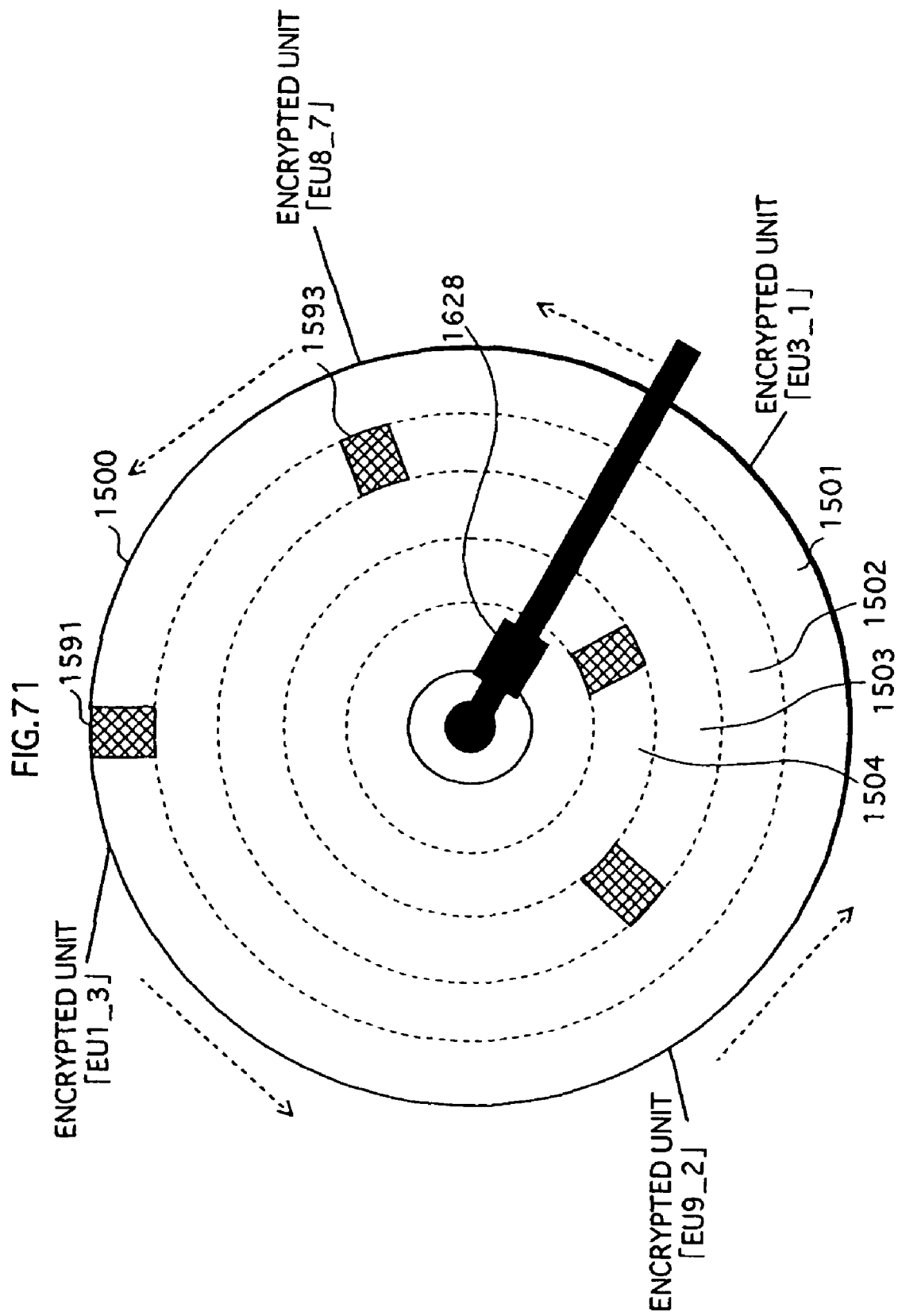
FIG. 71 shows a configuration of the DVD 1500 and a structure of an acquiring unit 1601.

FIG. 71 shows a configuration of the DVD 1500 and a structure of the acquiring unit 1601. Concentric areas in the figure are tracks.

As shown in FIG. 71, the acquiring unit 1601 has a head part (also referred to as a "pickup") 1628 and a rotation axis 1629. The DVD 1500 is rotated in a counterclockwise direction by rotating the rotation axis 1629. Arrows with a dotted line in the figure indicate the rotation direction. By specifying a track identifying number, sector identifying number or a sector size, the acquiring unit 1601 moved the head part 1628 and acquires a piece of data targeted for readout.

In general, it is known that moving the head part 1628 to a track where a readout-target piece of data is stored requires time. In other words, as the moving distance on the DVD from the inner to the outer circumference or from the outer to inner circumference increases, it takes a longer time to read out data.

Here, four encrypted unit "EU1_3", "EU3_1", "EU8_7", and "EU9_2" are readout targets, and are stored in portions 1591, 1592, 1593, and 1594, respectively, on the DVD 1500.

On the DVD 1500, assume that the head part 1628 is in the location shown in FIG. 71.

In this case, according to the procedure described in the first embodiment, the acquiring unit 1601 first moves the head part 1628 to a track 1501 on which the portion 1591 exists, and reads out the encrypted unit "EU1_3" recorded in the portion 1591. Then, the acquiring unit 1601 moves the head part 1628 to a track 1504 and reads out the encrypted unit "EU3_1" from the portion 1592. Then; in a similar manner, the acquiring unit 1601 moves the head part 1628 to a track 1502 to read out the encrypted unit "EU8_7" in the portion 1593, and subsequently to a track 1503 to read out the encrypted unit "EU9_2" in the portion 1594.

Thus, when the procedure described in the first embodiment is followed, the moving distance of the head part 1628 becomes long, and as a result, it takes a long time to read out all encrypted units.

Here, the order of reading out the four encrypted units is changed so that the head part 1628 always moves to the closest track from a track on which it is located at the time. Namely, the acquiring unit 1601 compares a track number indicating a location of the head part 1628 with sector numbers and track numbers indicating locations of the portions 1591, 1592, 1593 and 1594 where the four encrypted units are stored. Then, the acquiring unit 1601 rearranges the order of the acquired sector numbers and track numbers of the four portions so that the head part 1628 takes the shortest moving distance for the readout, and accesses each portion in the rearranged order.

Herewith, the time required for reading out data can be shortened. Additionally, in the case when encrypted units to be read out are located on the same track or on proximate tracks, the readout order can be changed based on the current location of the head part 1628 and the sector numbers indicating the portions in which individual encrypted units are stored.

Note that a means for optimizing the readout order depends on operational attributes of the rotation axis and the head part of the acquiring unit 1601, and therefore the optimization procedure described here is merely an example. For example, the rotation control method of the optical disk includes a constant angular velocity method and a constant linear velocity method, and characteristics of such a method may be taken into consideration. In addition, when a hard disk is used instead of an optical disk such as DVD, the arrangement of the readout order can be achieved in a similar fashion.

In the fifth and sixth embodiments also, the readout speed can be improved in a similar fashion. This is also the case with Modification [20] according to the second to fourth embodiments.

[27] In the first, fifth and sixth embodiments, the executing device selects i pieces of encrypted files at random, and further selects one piece of encrypted unit from each of the selected encrypted files. However, the selecting procedure is not limited to this, and multiple encrypted units may be selected from one encrypted file as long as the selected pieces total i.

[28] In the first, fifth and sixth, pieces "i" of the encrypted units selected by the executing device may be preset in the executing device, or may be written to the DVD.

As the number of the selected encrypted units "i" becomes larger, the accuracy of the validation of whether unauthorized contents are included increases, while processing load involved in the verification of signature information also increases.

Thus, the number "i" of encrypted units to be selected is recorded on the DVD, and then the executing device performs the verification of signature information according to "i" acquired from the DVD. Herewith, it is possible to reflect the intentions of the DVD producer in the verification.

Additionally, this technique is also applicable for selecting k pieces of encrypted partial contents in the fourth embodiment.

[29] in the first, fifth and sixth embodiments, the signature information is generated by applying a signature generating algorithm to a combined result formed by combining c pieces of file hash values. However, the signature information may be generated by calculating a combined hash value by further assigning the combined result to a hash function and applying the signature generating algorithm to the calculated combined hash value.

[30] In the first, fifth and sixth embodiments, the header information is composed of hash values having a two-layer structure. That is, the two-layer structure is made up of: unit hash values generated from respective encrypted units; and file hash values generated from a pieces of unit hash values generated based on the same file. On the other hand, the signature information is composed of c pieces of file hash values.

Instead, the header information may include hash vales having a three-layer structure. Specifically speaking, the header information includes y pieces of combined file hash values. The pieces of combined file hash values are generated by first dividing c pieces of file hash values into y pieces of groups and individually assigning combined results, which are formed by combining file hash values with respect to each group, to a hash function. In this case, the signature information is generated by using the y pieces of combined file hash values.

Thus, by increasing the number of layers in the structure, it is possible to reduce information to be read from the DVD.

[31] As has been described in the fifth embodiment, it is sometimes the case that a playback order file showing the playback order of the contents is stored in a DVD. In this case, the DVD may include signature information for the playback order file.

Herewith, as is described in the fifth embodiment, even if an unauthorized third person performs addition or replacement of unauthorized contents and falsifies the playback order file, the falsification will be detected by verifying the signature information of the playback order file, and thereby unauthorized contents will not be played.

[32] In the third embodiment, the total pieces of representative partial contents that the selecting unit 3105 of the distributing device 3100 selects from one set of contents are (k×x) pieces.

In this case, it may be designed that all of the c pieces of partial contents are to be selected at least once as a piece of representative partial contents. Herewith, in the case when part of the encrypted contents stored in the DVD is replaced, it is possible to increase the accuracy of detecting the unauthorized contents.

[33] In the first, fifth and sixth embodiments, the distributing device writes the unit pick-out information to the DVD. Instead, the distributing device may write, to the DVD, encrypted unit pick-out information generated by encrypting the unit pick-out information with the use of the content key.

Additionally, in the fourth embodiment, the distributing device writes the contents position information to the DVD. Instead, the distributing device may write, to the DVD, encrypted contents position information generated by encrypting the contents position information with the use of the contents key.

[34] In the first to sixth embodiments and the modifications, the unit hash values are calculated by respectively assigning encrypted units to a hash function, while the partial hash values are calculated by respectively assigning pieces of partial contents to the hash function. However, each of the unit hash values may be calculated from a combined result formed by combining an identifier corresponding to an encrypted unit, a piece of identifying information, and the encrypted unit. In a similar fashion, each of the partial hash values may be calculated from a combined result formed by combining an identifier corresponding to a piece of partial contents, a piece of identifying information, and the piece of partial contents.

[35] In the fifth embodiment, the data size of the filling contents to be generated is the same as the filling capacity. However, the data size is not limited to this as long as the data size can make the free space left on the DVD sufficiently small.

[36] In the first to sixth embodiments, the executing device plays the contents by outputting the video and audio signals to the external monitor. However, the executing device may have such a monitor built-in.

[37] Part or all of the components making up the above individual devices may be assembled as a single system LSI (Large Scale Integration). The system LSI is an ultra-multi-functional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function. Alternatively, each component may be structured on an individual integrated circuit.

Although it is referred to here as system LSI, may be also referred to an IC, LSI, super LSI, and ultra LSI, depending on the degree of integration. In addition, the method for assembling integrated circuits is not limited to LSI, and a dedicated communication circuit or a general-purpose processor may be used to achieve this. A FPGA (Field Programmable Gate Array), which is programmable after the LSI is produced, or a reconfigurable processor, which allows reconfiguration of the connection and setting of circuit cells inside the LSI, may be used.

[38] The present invention may be a method of accomplishing the above described unauthorized contents detection system. The present invention may be a computer program that achieves the method by a computer, or may be a digital signal representing the computer program.

The present invention may also, be achieved by a computer-readable recording medium, such as a flexible disk, a hard disk, a CD-ROM (Compact Disk Read Only Memory), MO (Magneto-Optical) disk, a DVD, a DVD-ROM (Digital Versatile Disk Read Only Memory), a DVD-RAM (Digital Versatile Disk Random Access Memory), a BD (Blu-ray Disk), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

[39] The present invention includes a structure in which two or more of the above embodiments and modifications are combined.

The present invention is applicable operationally, continuously and repeatedly, in industries that produce, sell, transfer and use contents, and also in industries that manufacture, sell and use various electrical apparatuses for playing, editing and processing the contents.

The invention claimed is:

1. A data generating device for generating data to be written to a recording medium together with a digital work, comprising:
   an obtaining unit operable to obtain the digital work;
   a filling capacity calculating unit operable to calculate a data size based on free space on the recording medium becoming a predetermined amount or less than a predetermined amount;
   a filling content generating unit operable to generate filling content and a random number to be recorded to the recording medium together with the digital work, the filling content having the data size calculated by said filling capacity calculating unit and the random number being included in the filling content;
   a header information generating unit operable to generate record digest values, each of which is generated from a different one of a plurality of data blocks constituting the digital work and a plurality of data blocks constituting the filling content;
   a signature information generating unit operable to generate signature data based on a number of the record digest values; and
   a writing unit operable to write, to the recording medium, at least the digital work, the filling content, the number of the record digest values and the signature data.

2. The data generating device of claim 1,
   wherein said filling content generating unit generates the filling content that cannot be used by a playback device using the digital work.

3. The data generating device of claim 1,
   wherein said filling capacity calculating unit includes a capacity-information obtaining subunit operable to obtain information regarding a maximum recording capacity indicating a data amount that can be written to the recording medium, and
   said filling capacity calculating unit determines the data size of the filling content based on at least the maximum recording capacity and a data size of the digital work.

4. The data generating device of claim 3,
   wherein said capacity-information obtaining unit obtains the maximum recording capacity of the mounted recording medium via the writing unit.

5. A data processing device for utilizing a digital work recorded on a recording medium having also recorded thereon (i) filling content including a random number and having a data size based on free space on the recording medium becoming a predetermined amount or less than a predetermined amount, (ii) record digest values, each of which is generated from a different one of a plurality of data blocks constituting the digital work and the filling content and (iii) signature data generated based on a number of record digest values, the processing device comprising:
   a using unit operable to use the digital work;
   a selecting unit operable to randomly select a predetermined number of data blocks from the plurality of data blocks;
   a calculating unit operable to calculate a calculation digest value with respect to each of the selected data blocks;
   a reading unit operable to read remaining record digest values, each of which corresponds to one of unselected data blocks among the plurality of data blocks;
   a verifying unit operable to verify validity of the digital work and the filling content by using the signature data, the calculation digest values and the remaining record digest values; and
   a use controlling unit operable to stop said using unit from using the digital work when said verifying unit determines that at least one of the digital work and the filling content is not valid.

6. The data processing device of claim 5,
   wherein the filling content includes playback impracticable information indicating data prohibited from being played back, and
   the using unit does not use part of the digital work, which is indicated by the playback impracticable information.

7. A data generating method used on a data generating device that generates data to be written to a recording medium together with a digital work, comprising:
   an obtaining step of obtaining the digital work;
   a filling capacity calculating step of calculating a data size based on free space on the recording medium becoming a predetermined amount or less than a predetermined amount;
   a filling content generating step of generating filling content and a random number to be recorded to the recording medium together with the digital work, the filling content having the data size calculated in said filling capacity calculating step and the random number being included in the filling content;
   a header information generating step of generating record digest values, each of which is generated from a different one of a plurality of data blocks constituting the digital work and a plurality of data blocks constituting the filling content;
   a signature information generating step of generating signature data based on a number of the record digest values; and
   a writing step of writing, to the recording medium, at least the digital work, the filling content, the number of the record digest values and the signature data.

8. A non-transitory computer-readable recording medium having recorded thereon a data generating program used on a data generating device that generates data to be written to the recording medium together with a digital work, the data generating program causing the data generating device to execute:
   an obtaining step of obtaining the digital work;
   a filling capacity calculating step of calculating a data size based on free space on the recording medium becoming a predetermined amount or less than a predetermined amount;
   a filling content generating step of generating filling content and a random number to be recorded to the recording medium together with the digital work, the filling content having the data size calculated in said filling capacity calculating step and the random number being included in the filling content;
   a header information generating step of generating record digest values, each of which is generated from a different one of a plurality of data blocks constituting the digital work and a plurality of data blocks constituting the filling content;
   a signature information generating step of generating signature data based on a number of the record digest values; and
   a writing step of writing, to the recording medium, at least the digital work, the filling content, the number of the record digest values and the signature data.

9. An integrated circuit mounted on a data generating device that generates data to be written to a recording medium together with a digital work, comprising:

an obtaining unit operable to obtain the digital work;

a filling capacity calculating unit operable to calculate a data size based on free space on the recording medium becoming a predetermined amount or less than a predetermined amount;

a filling content generating unit operable to generate filling content and a random number to be recorded to the recording medium together with the digital work, the filling content having the data size calculated by said filling capacity calculating unit and the random number being included in the filling content;

a header information generating unit operable to generate record digest values, each of which is generated from a different one of a plurality of data blocks constituting the digital work and a plurality of data blocks constituting the filling content;

a signature information generating unit operable to generate signature data based on a number of the record digest values; and a writing unit operable to write, to the recording medium, at least the digital work, the filling content, the number of record digest values and the signature data.

* * * * *